June 21, 1966 — H. C. SAVINO ETAL — 3,256,958
ELEVATOR CONTROL WHEREIN THE CLOSEST
AVAILABLE CAR SERVES DEMAND Filed March 10, 1961

WITNESSES

INVENTORS
John Suozzo and
Henry C. Savino
BY
ATTORNEY

United States Patent Office 3,256,958
Patented June 21, 1966

3,256,958
ELEVATOR CONTROL WHEREIN THE CLOSEST AVAILABLE CAR SERVES DEMAND
Henry C. Savino, Hackensack, and John Suozzo, Paramus, N.J., assignors to Westinghouse Electric Corporation, East Pittsburgh, Pa., a corporation of Pennsylvania
Filed Mar. 10, 1961, Ser. No. 94,723
30 Claims. (Cl. 187—29)

This invention relates to elevator systems, and it has particular relation to elevator systems wherein a plurality of elevator cars are arranged in a structure to operate as a bank.

The problem of providing an efficient elevator system for a structure is complicated by the frequent variations in traffic demands or traffic patterns which are encountered. Although such variations or patterns differ for different structures, it will be helpful to consider the variations for a typical office building.

On each business day, periods are encountered during which their are frequent demands for elevator service. These demands may be divided into three types. Immediately before the start of the business day and usually toward the end of the lunch period, a heavy demand for up travel from the lower terminal or first floor is encountered. This may be referred to as an "up peak."

Immediately after the close of the business day and usually at the start of the lunch hour, a heavy demand for travel toward the lower terminal floor is encountered. This demand for service predominately in the down direction may be referred to as a "down peak."

During the remainder of the business day, a demand for elevator service which is predominately equal to the two directions of travel generally is encountered. The period of this demand for substantially equal service in the two directions may be referred to as an "off peak."

Following the close of the business day, a period occurs during which the demand for elevator service is infrequent or occasional. For example, such a period occurs during the night in most office buildings, and similar infrequent demand for elevator service is encountered on holidays. Such periods may be termed "off hour" periods.

Furthermore, the traffic demands during each of the foregoing periods need not be uniform. For example, during the off hour periods, the entry and departure of service personnel, such as charwomen, may introduce intervals of increased demand for elevator service.

Expressions such as "traffic demand," "service demand" and "traffic condition" herein are employed to designate traffic pictures which may be utilized for specified control purposes. As is pointed out below, such traffic demands or conditions may include calls for elevator service registered by call means, loading of elevator cars, elevator car stopping, direct functions or rate functions.

An elevator system may be designed for attendant operation or for automatic operation. In attendant operation, an attendant located in each of the elevator cars is available for supervising the loading of his elevator car, the unloading of the elevator car and the dispatch of the elevator car from a floor. Although aspects of the invention may be incorporated in elevator systems employing either a single elevator car or a number of elevator cars arranged in a bank, and although aspects of the invention may be incorporated in elevator systems arranged either for automatic operation or attendant operation, the entire invention is particularly suitable for and may be considered adequately with reference to a bank of elevator cars arranged for automatic operation. For this reason, the following discussion will be directed primarily to such an elevator system.

In a bank of elevator cars arranged for automatic operation, the cars may operate principally between two terminal floors, which consist generally of an upper terminal floor and a lower or street terminal or first floor. A plurality of intermediate floors are located between the two terminal floors.

Certain or all of the elevator cars may additionally provide service for an extension floor, such as a basement floor. However, the invention may be described adequately for a system having no such extension floor.

Each of the elevator cars has a motor for moving the associated car relative to the associated building structure. In a preferred embodiment of the invention, each motor is an electric motor energized from the generator of an individual motor-generator set.

In order to provide for the registration of calls for elevator service, suitable call registering means are provided. Such call registering means may include up floor call registering means, including an operating member located at each of the floors from which elevator service is desired in the up direction. In addition, the call registering means may include down floor call registering means, including an operating member located at each of the floors from which elevator service is desired in the down direction. Finally, car call registering means may be provided for the purpose of registering calls for floors desired by the load within the associated elevator car. Such car call registering means may include an operating member within the elevator car for each floor to which a passenger in the car may desire to be transported.

Equitable service for two-way traffic in an elevator system traditionally has been provided by dispatching the elevator cars from both the uper and lower terminal floors at predetermined dispatching intervals in order to space the elevator cars vertically with respect to each other in their associated hoistways.

In accordance with the invention, each of the elevator cars in a bank is conditioned to be dispatched from each of the floors served thereby in a manner such as to provide optimum service under all traffic conditions, while car standing time is maintained at a minimum.

A non-rotational dispatcher may be employed for controlling the departure of the elevator cars from the lower terminal floor. In a preferred embodiment of the invention, the lower-terminal dispatcher includes means for dispatching successive elevator cars from the lower terminal floor at suitable loading or dispatching intervals.

The dispatcher for the lower terminal floor may select each of the elevator cars which is to be dispatched therefrom. The dispatcher further may condition such elevator car to be loaded. For an attendant-operated elevator car, the selection and instructions to load may be conveyed to the car attendant by operation of a suitable signal, such as a lamp. However, in an automatic elevator system, the selection and instructions to load preferably are conveyed by opening the doors of the elevator car which is to be loaded. If desired, a lantern may be provided which is illuminated to indicate that such elevator car is to be loaded for movement in a predetermined direction.

Upon the expiration of the loading period, the dispatcher may start the selected elevator car. In an attendant-operated system, instructions to start such car may be conveyed to a car attendant by operation of a suitable signal, such as a lamp. However, in the automatic elevator system herein considered, the doors of the selected car are closed upon the expiration of the loading interval. Upon closing, the doors initiate the starting of the elevator car.

In a preferred embodiment of the invention, an elevator car which is located at the lower terminal floor may become available for dispatching or assignment to serve another floor if the dispatcher has selected such car as the next car to leave the lower terminal floor, the dispatching interval has expired and no car call is registered for such car or if such car has not been selected as the next car to be dispatched from the first floor and its doors are closed. An elevator car which is not assigned to serve a floor and which is stopped at a floor other than the lower terminal floor may become available for dispatching or assignment to serve any other floor, including the lower terminal floor, provided that it is conditioned for up travel, its doors are closed and no car call or up floor call is registered for a floor above the floor at which such car is located.

The assignment and dispatching of an available elevator car to serve a particular floor may depend upon several factors. Among these may be its location relative to floors for which there are demands for service; the type of service, up or down, desired; the relative positions of other cars with respect to floors for which service demands exist; the respective directions of travel for which such other cars are conditioned; and the location of other cars which may be available for dispatching or assignment. In consideration of these factors, a decision may be made to dispatch an available car to a floor or to a zone of floors in order to provide the most favorable service.

It will be observed that as a result of the foregoing operation, elevator car standing time is reduced to a minimum, and cars do not make useless stops at the upper terminal floor, as sometimes is the case in systems employing an upper terminal floor dispatcher. In addition, an elevator car which is located at the lower terminal floor is treated, under certain conditions, as an available car in the same manner as any other available car which is located above the first floor. As a result, the problems which otherwise might occur as a result of the "bunching" of elevator cars at a terminal floor do not exist.

In considering up and down floor calls, the floors above the lower terminal floor of a structure served by an elevator system embodying the invention conveniently may be divided into a plurality of up and down zones. Each of these zones may comprise either one floor or a plurality of adjacent floors, depending upon factors such as the total number of floors served by the system, special traffic conditions which may be encountered at a particular floor or group of floors and the quantity and cost of equipment required. It is to be understood that the number of down zones need not necessarily be equal to the number of up zones and that the same floor or floors need not necessarily be included in both a particular down zone and a particular up zone.

With respect to down floor calls, if there are more down zones requiring service than there are elevator cars which are conditioned for down travel and which are located above such zones, or if there is at least one down zone requiring service and such zone is located above the highest car conditioned for down travel, a down zone demand for service is registered. Upon such registration, the first elevator car which becomes available for assignment preferably is conditioned to travel to the highest floor for which a down floor call is registered, provided that such floor is above the highest down-traveling car. Conveniently, an elevator car which subsequently becomes available for assignment is dispatched, in general, to a point intermediate the remaining down zones requiring service if there is more than one such zone, provided that such down zones are not located above the highest elevator car conditioned for down travel.

In order to expedite service, an elevator car which has been assigned to serve a specific down zone is conditioned to by-pass all floors for which floor calls are registered and which are located between such car and the zone to which it is assigned and to proceed directly to the assigned zone. When the car has answered all down floor calls for floors in the down zone to which it is assigned, it is conditioned to answer all down floor calls for floors therebelow to which another car has not been assigned. In a preferred embodiment of the invention, each elevator car conditioned for down travel proceeds finally to the lower terminal floor.

In order to minimize the waiting time of certain prospective passengers, preferential elevator service may be provided for floors for which priority calls are registered. Such priority calls may be down floor calls which have been unanswered for at least a predetermined time. To this end, an available elevator car may be assigned to serve a zone in which there is such a floor, i.e., to serve a timed-out down zone, in preference to a zone which includes a floor for which a down floor call has been registered for less than such predetermined time, that is, in preference to a non-timed-out down zone. If there is more than one timed-out down zone, an available car conveniently may be dispatched to the highest of such zones.

For simplicity, the floors of the structure served by the elevator system intermediate the terminal floors thereof may be divided into two up zones. These may be designated, respectively, the low up zone and the high up zone.

In a preferred embodiment of the invention, up floor calls are answered in the following manner: an elevator car which is traveling up and which is not assigned to answer down floor calls, answers up floor calls for floors above the car in the up zone in which such car is traveling. When an up floor call is registered and no car which is conditioned for up travel and which may answer such call is located in the corresponding up zone, an up service demand is registered, and an elevator car which is available for assignment is selected to respond to such demand. If the selected car is located in the low up zone and is assigned to answer an up floor call for a floor in the high up zone, such car is conditioned to by-pass all floors for which up floor calls are registered in the low up zone. If, however, the selected car is located in the high up zone and is assigned to answer an up floor call for a floor in the low up zone, such car will travel down to the low up zone, and its direction of travel will be reversed from down to up upon its arrival at the lowest floor for which an up floor call is registered in the low up zone. Subsequently, the car also will answer all car calls and up floor calls for floors above the car.

Preferential elevator service also may be provided for floors for which up floor calls have been unanswered for at least a predetermined time. To this end, an available car may be assigned to serve a timed-out up zone in preference to a non-timed-out up zone. Desirably, however, if there is more than one timed-out up zone, an available car is dispatched to the lowest of such zones.

Additional modifications and refinements may be introduced in order to provide increased efficiency of elevator service. In a preferred embodiment of the invention, if there are a plurality of demands for elevator service, up and down zones are given preferential service in accordance with the following sequence: timed-out down zones, timed-out up zones, non-timed-out down zones, non-timed-out up zones.

Under certain conditions, the operation of the dispatcher for the lower terminal floor may be modified. For example, although the dispatching interval has not expired, an elevator car which has been selected as the next car to be dispatched from the lower terminal floor may be dispatched therefrom immediately upon a predetermined loading of the car, such as upon the loading of the car to its rated capacity. In addition, the selected elevator car may be dispatched immediately from the lower terminal or first floor, although the loading interval has not expired, if a car call is registered for such car and if a passenger, by mistake, has entered a car which has not been selected as the next car to leave the first floor and has registered a car call therefor.

Furthermore, upon a predetermined loading, such as capacity loading, of an elevator car which is conditioned for down travel, an elevator car which has been selected as the next car to leave the lower terminal floor may be dispatched immediately therefrom, provided that a car call is registered therefor, although the dispatching interval has not yet expired. Such operation may be termed instant dispatch operation and may be maintained for at least a predetermined time after cessation of the condition which initiated such operation.

In order to provide more efficient service for the lower terminal or first floor, an artificial or automatic service demand for such floor may be registered under certain conditions. Such a service demand may be treated similarly to down zone service demands, as set forth heretofore. Thus, if no elevator car is located at the lower terminal floor for a predetermined time, such as for one half of the first floor elevator car dispatching interval, a service demand may be registered for this floor. However, this service demand conveniently may be prevented from being registered when the elevator system is conditioned for instant dispatch operation, as explained above.

An automatic service demand for the lower terminal floor also may be registered when there is a substantial demand for elevator service in the up direction. The demand for service in the up direction may be measured in various ways. In a preferred embodiment of the invention, the service demand in the up direction is determined by a measurement of the loading of an elevator car conditioned for up travel at the lower terminal floor. When this loading reaches a predetermined value, such as capacity loading, the elevator system may be transferred to a form of intense up traffic operation which may be termed nodemand return operation.

In addition, the demand for service in the up direction may be determined by the measurement of all stops made by all of the elevator cars in the bank and of stops made by elevator cars when conditioned for up travel. When the ratio of the latter stops to the former stops exceeds a predetermined value during a predetermined interval of time, thereby indicating a substantial demand for up service, the elevator system also may be conditioned for no demand return operation.

During no demand return operation, an automatic service demand may be registered for the lower terminal floor if no elevator car is located at the lower terminal floor or if no elevator car which is available for assignment is located at such floor. (The conditions under which an elevator car located at the lower terminal floor is available for assignment have been described hereinabove.)

If there is an elevator car at the first floor which has been selected as the next car to be dispatched therefrom and only one additional car at the first floor, the latter car preferably cannot become available to respond to up or down zone service demands above during no demand return operation. If, however, there is a "next" car and two or more "non-next" cars at the lower terminal floor, each of such cars may become available to respond to up or down zone service demands above during such operation.

Preferably, when the elevator system becomes conditioned for no demand return operation, it remains so conditioned for at least a predetermined period of time in order to prevent the system from hunting in the event of temporary decreases in a substantial demand for up service as determined by the above-described loading of cars or ratio of up stops to total stops. It will be appreciated that the term no-demand return operation obtains from the fact that during such operation elevator cars are dispatched to the first floor in response to an artificial or automatic demand for service therefor under the specified conditions.

Under certain conditions, for example, during periods of light traffic, a plurality of elevator cars may be available for assignment, and such cars may be located at various floors of the structure served by the system. When a demand for service is registered under such conditions, therefore, it is desirable to select for response thereto that available car which is in the best position to answer it, commensurate with practical circuit design considerations. To this end, in a preferred embodiment the floors of the structure are divided into a plurality of zones in order to determine the respective positions of the available cars relative to a zone of floors for which there is a service demand. For simplicity, only two zones, a low zone and a high zone, will be considered, although it is to be understood that the floors of the structure may be divided into a greater number of zones for this purpose, if desired.

As an example, when a service demand such as a down service demand is registered for a floor in the aforementioned high zone, the highest available car which is located in the high zone is selected to respond thereto. If no available car is located in the high zone, the highest available car in the aforementioned low zone is selected. On the other hand, if a down floor call is registered for a floor in the low zone, the highest available car in the low zone is selected to respond thereto. If there is no available car in the low zone, however, the highest available car in the high zone is selected.

With respect to the selection of an available car which is located in the low zone, if no such car is positioned at a floor above the lower terminal floor, the selection process conveniently may continue in order to choose an available car located at the lower terminal floor which has not been selected by the dispatcher as the next car to leave such floor, and, if there is no such car then an available car which the dispatcher has so selected.

If there is a demand for down service for each of the low and high zones and a plurality of elevator cars are available for assignment, the highest available car located in the high zone is selected to respond to the down service demand for such zone. However, if no available car is located in the high zone, an available car in the low zone is selected for such response, the preferred sequence for the selection of a low zone available car being that set forth in the preceding paragraph. Subsequent to such selection, another available car may be assigned to travel to a predetermined position in the low zone to provide down service for such zone.

If a plurality of elevator cars are available for assignment and there is a demand for up service for each of the low and high zones, an available car located in the low zone is selected to respond to the up service demand for such zone, the preferred sequence for the selection of a low zone available car again being that set forth above. If, however, no available car is located in the low zone, the highest available car in the high zone is selected for such response. Following such selection, another available car is assigned to respond to the up service demand for the high zone.

It should be noted that when there are simultaneously a plurality of available cars and a plurality of service demands, elevator cars are selected to provide priority service in accordance with the sequence set forth heretofore.

During certain periods, little or no demand for elevator service may exist. For example, an absence of demand may occur during off hour periods, such as nights, in office buildings. Under such circumstances, the elevator cars park at predetermined stations.

One measure of the intensity of demand for elevator service is the availability for assignment of an elevator car or of a plurality of elevator cars. Thus, in a preferred embodiment of the invention, if traffic diminishes to an extent such that an elevator car or elevator cars continuously are available for assignment for a predetermined period of time, all of the available elevator cars in the bank may be signaled or conditioned to park. Such parking may be effected for each available car at the floor of its last stop. Preferably, however, the cars park at the lower terminal floor. The motor generator set of each available car which is located at the lower terminal floor may be shut down or stopped immediately upon the reception of the parking signal. Each available car which is located above the lower terminal floor is conditioned to be returned automatically thereto when it receives the parking signal, and, upon its arrival at the lower terminal floor, its motor-generator set also may be shut down.

One of the elevator cars parked at the lower terminal floor is selected by the dispatcher as the next car to leave such floor. The doors of all of the elevator cars which are parked may be closed. Alternatively, the doors of the selected elevator car alone may be retained in open condition.

When a call for elevator service is registered from one of the floors or if a car call is registered for the selected elevator car, the motor-generator set of the selected car is started, and such car is dispatched to answer the registered call.

If the selected elevator car is placed in operation, it proceeds to the farthest floor for which a call is registered while the elevator car is set for travel in the up direction. Subsequently, the car is returned automatically to the lower terminal floor.

If the first selected elevator car is away from the lower terminal floor, a second car may be started therefrom under each of the following conditions:

A car call is registered for the second car and

The lower terminal floor elevator car dispatching interval has expired (it may be desirable under these conditions to reduce such dispatching interval by a predetermined amount, such as by one-half);

The first selected car is conditioned for down travel and there are a predetermined first number of down zone demands for service;

The first selected car is conditioned for up travel and there are a predetermined number less than the aforesaid first number of down zone demands for service;

The elevator system is conditioned for no demand return operation or for instant dispatch operation.

Provision is also made for starting additional elevator cars from the lower terminal floor when required.

It is apparent from the preceding discussion that a single basic mode of operation, which provides for the maximum movement of elevator cars, may be employed for all of the traffic demand variations or traffic patterns encountered by the elevator system, while the modifications and refinements which have been described tend to optimize the efficiency of elevator service under specific traffic conditions.

It is, therefore, a first object of the invention to provide an improved elevator system comprising a bank of elevator cars.

It is a second object of the invention to provide an improved elevator system comprising a bank of elevator cars having a single basic mode of operation, the performance of the elevator cars varying in accordance with demand for elevator service.

It is a third object of the invention to provide an improved bank of elevator cars wherein the floors served thereby are divided into a plurality of zones, and the elevator cars are assigned and dispatched to serve such zones in accordance with the service demands therefor.

It is a fourth object of the invention to provide an elevator system as defined in the preceding object in which, under predetermined system conditions, each of the elevator cars becomes available for assignment and dispatching from each of the floors served thereby.

It is a fifth object of the invention to provide an improved elevator system as set forth in the preceding object in which an available elevator car automatically is dispatched to a terminal floor to provide expedited service therefor upon the occurrence of predetermined system conditions.

It is a sixth object of the invention to provide an improved elevator system as defined in the fourth object wherein an assigned elevator car is conditioned to by-pass each floor for which there is a demand for service between such car and the zone to which it is assigned.

It is a seventh object of the invention to provide an improved elevator system as set forth in the fourth object, including means for selecting a particular one of a plurality of available elevator cars to furnish optimum service for a zone for which there is a service demand.

It is an eighth object of the invention to provide an improved elevator system as defined in the fourth object wherein elevator cars are parked in response to a predetermined availability for assignment and dispatching of elevator cars, and elevator cars are started successively in response to each of a plurality of predetermined traffic conditions evidencing an increase in demand for elevator service.

It is a ninth object of the invention to provide an improved elevator system as defined in the preceding paragraph in which energized equipment associated with a parked elevator car automatically is deenergized.

It is a tenth object of the invention to provide an improved elevator system as defined in any of the preceding objects in which priority service is provided for floors for which there are service demands in accordance with a predetermined sequence.

It is an eleventh object of the invention to provide an improved elevator system of the type set forth in any of the preceding objects wherein a non-rotational dispatcher is incorporated for automatically selecting and conditioning successive elevator cars to be started from a predetermined floor at predetermined intervals.

It is a twelfth object of the invention to provide an elevator system as set forth in the preceding object wherein the dispatching interval is reduced by a predetermined amount under predetermined traffic conditions to provide expedited elevator service.

Other objects of the invention will be apparent from the following description, taken in conjunction with the accompanying drawings, in which:

FIGURE 1 is a schematic view in straightline form of a portion of an elevator control system embodying the invention;

Figure 11:
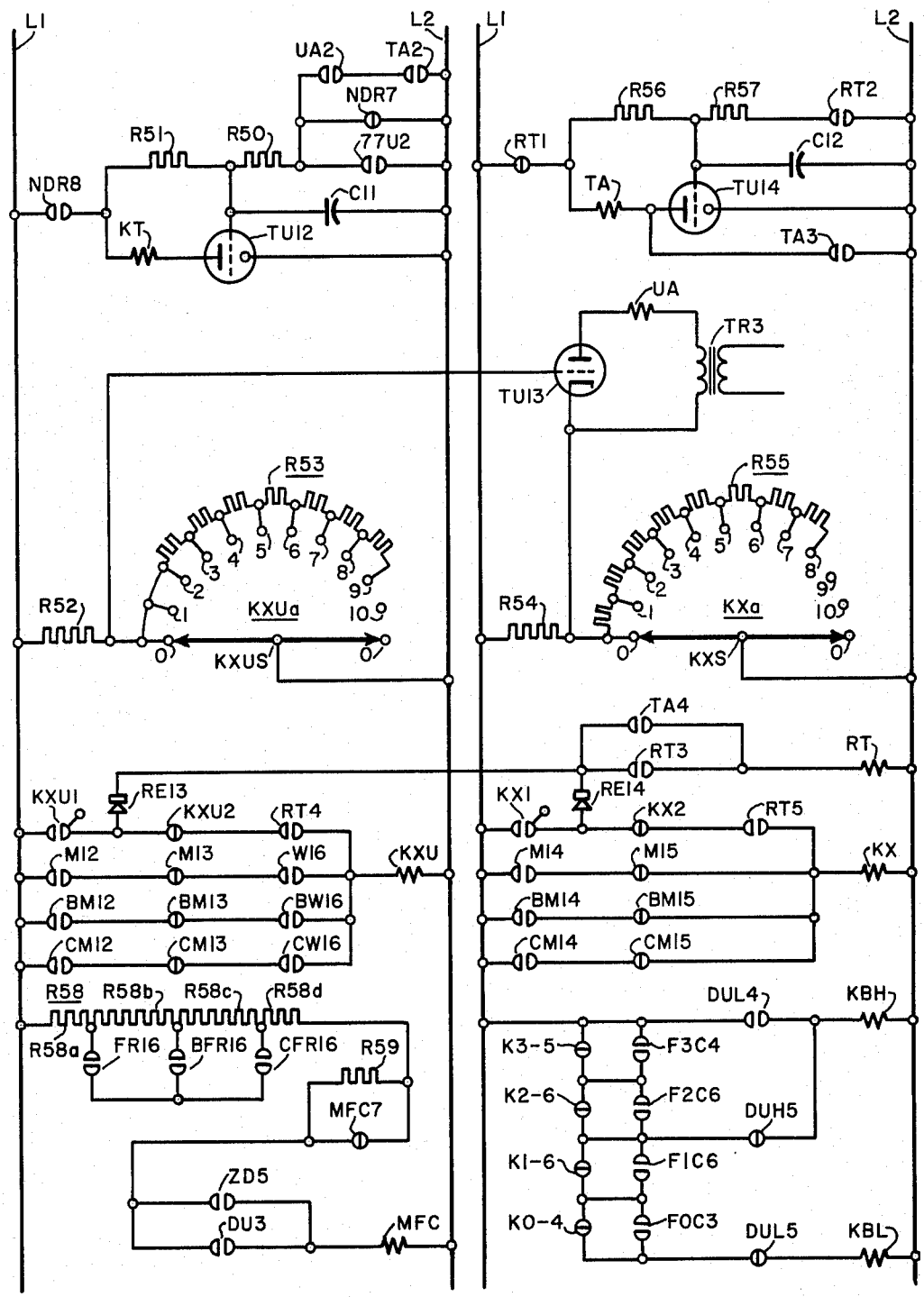
Figure 12:
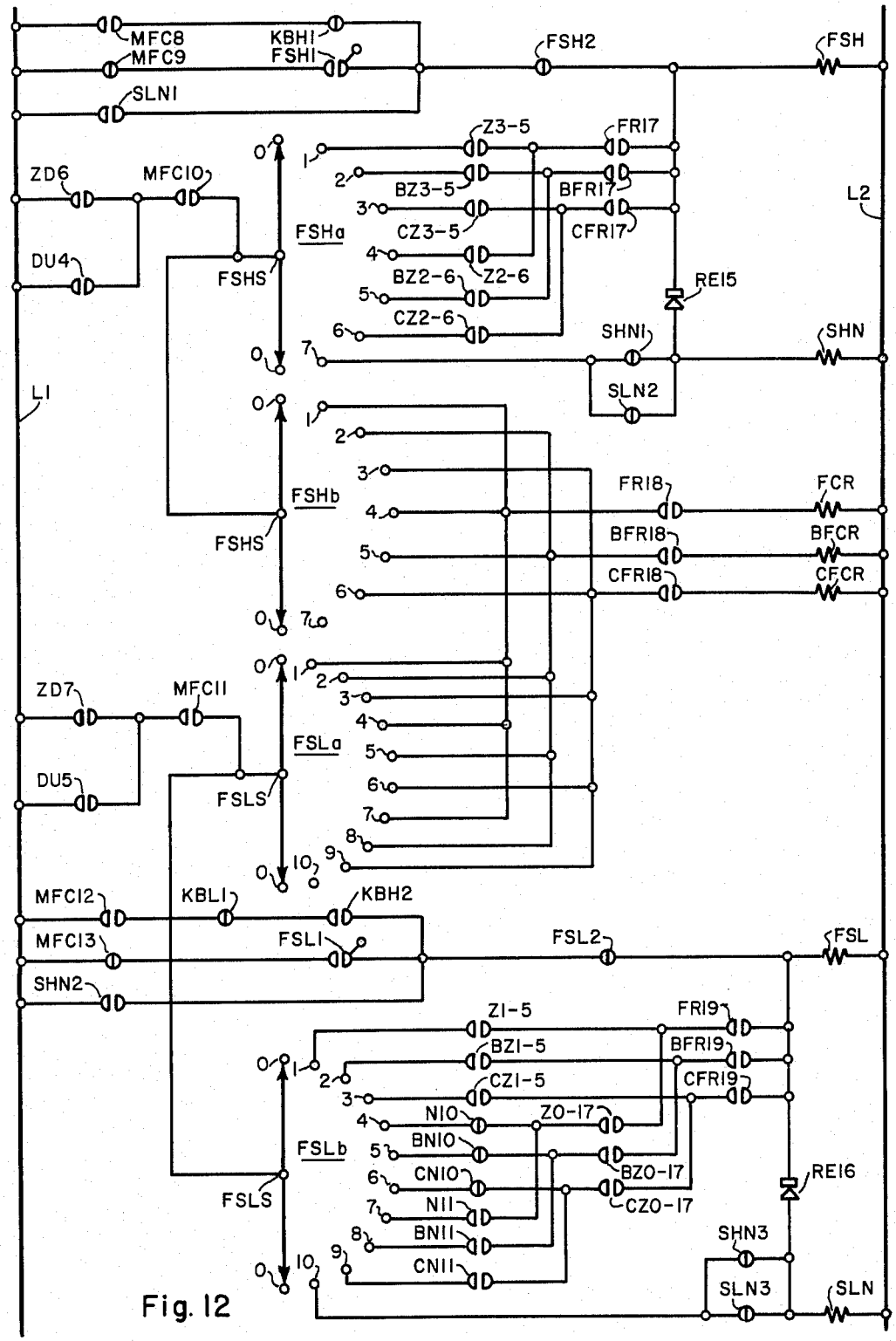
Figure 13:
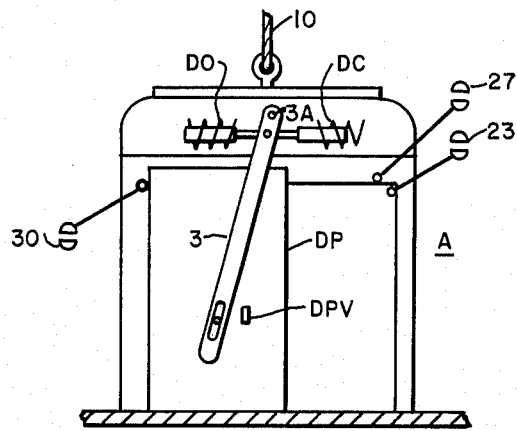
FIG. 13 is a view in front elevation illustrating suitable door operating components for one of the elevator cars of FIG. 1.
Figure 14:
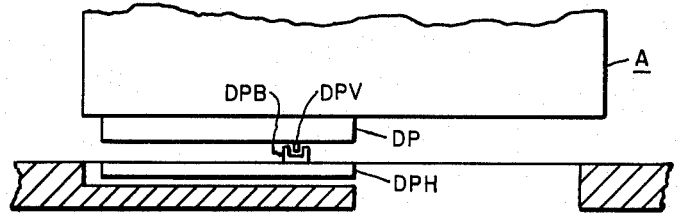

FIG. 14 is a top plan view with parts broken away, parts in section and parts not shown of the elevator car of FIG. 13 associated with a hoistway; and FIGS. 15A through 15H are key representations in stem form of electromagnetic relays, solenoids and switches and their respective associated contacts employed in the circuits of FIGS. 1 through 12. In these figures, the switches, solenoids and relays are arranged first in alphabetical and then in numerical sequence. Each stem is headed by a reference character which designates the coil of the particular relay or switch with which it is associated.

Figure 16:
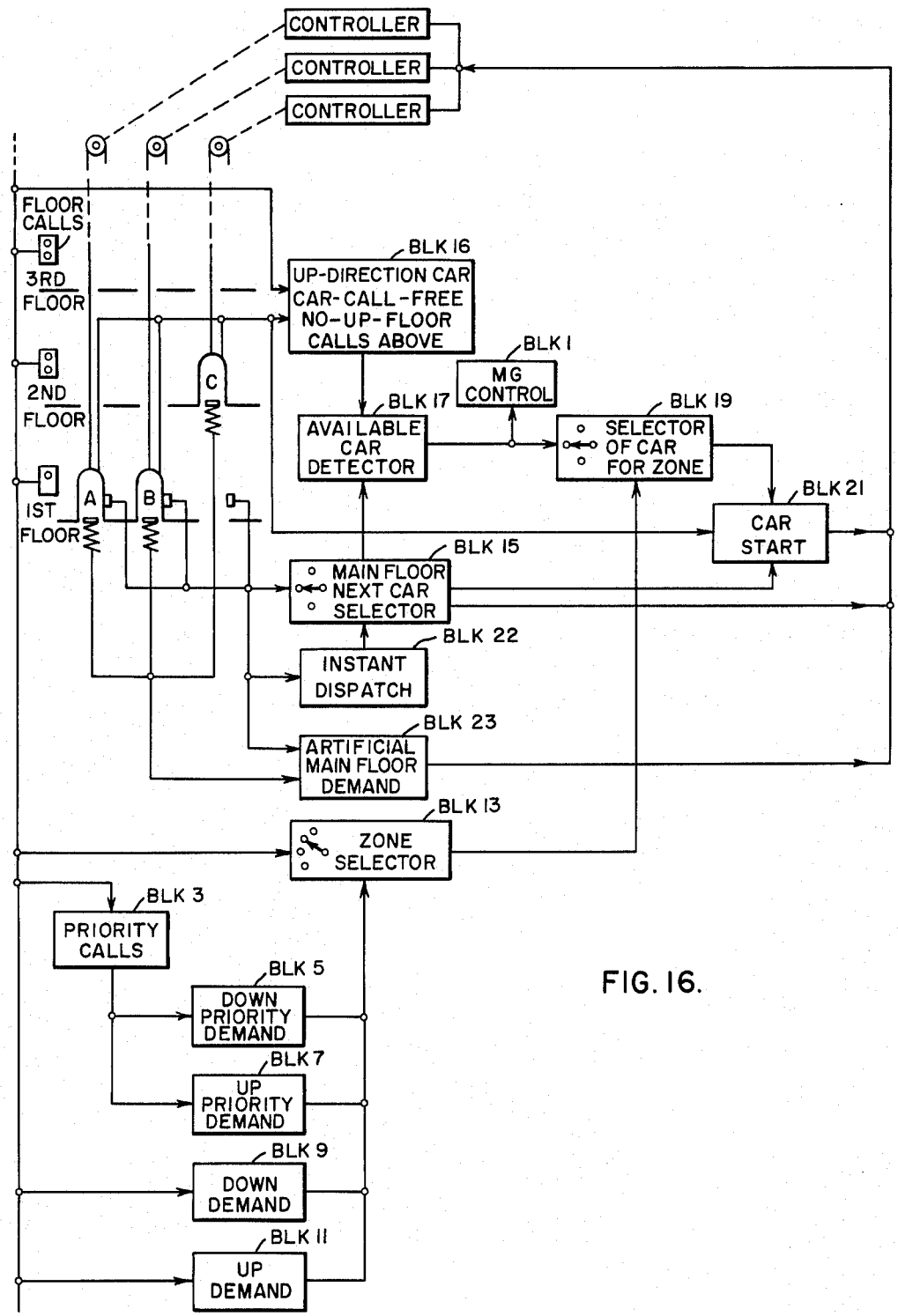

FIG. 16 is a block diagram of a system incorporating the invention.

Although aspects of the invention may be incorporated in an elevator system having any desired number of elevator cars, arranged either for attendant operation or for automatic operation to serve any desired number of floors, the invention may be described adequately with reference to an elevator system having three elevator cars serving a building or structure having six floors and arranged for fully automatic operation. For this reason, the illustration and description of the invention will be directed particularly to such a system. In addition, for illustrative purposes the second through sixth floors served by the elevator system will be divided into first, second and third down zones, while the intermediate or second through fifth floors will be divided into low and high up zones. The first down zone comprises the second and third floors, the second down zone includes the fourth and fifth floors and the third down zone comprises the sixth floor. The low up zone includes the second and third floors and the high up zone comprises the fourth and fifth floors.

The three elevator cars of the system are designated by the reference characters A, B and C. Inasmuch as certain circuits for each of the elevator cars generally are similar, circuits for the elevator cars A and B are shown in substantial detail, and components for the elevator car C are introduced as required for the discussion. Insofar as is practicable, circuits and components for the elevator car A are illustrated on the left side of FIGS. 1 through 6, and circuits for the elevator car B on the right side of such figures. FIGS. 7 through 12 in general illustrate circuits which are common to all of the elevator cars.

Before proceeding with a discussion in detail of a system the block diagram of FIG. 16 will be considered. In FIG. 16 two elevator cars A and B are located at the first or main floor and a third car C is positioned at the second floor of the building. Signals representing information such as floor call registration, car direction, car positions, car loading, car call registration are supplied to apparatus which controls operation of the system.

The cars may be parked at different floors with their motor-generator sets shut down (BLK1).

The floors are divided into down zones (for down landing calls) and up zones (for up landing calls). A zone which requires preferred service is designated as a "priority" zone, and may be one having a priority call (e.g. a timed-out call) registered therein (BLKs3-11).

Zones are selected to receive service in a preferred order such as:

(1) Highest priority down demand zone
(2) Lowest priority up demand zone
(3) Highest down demand zone
(4) Lowest up demand zone by a zone selector (BLK13).

A car at a main floor is selected as the "next" car to be loaded by a selector (BLK15) and another car at the main floor or a car spaced from the main floor (BLK16) may be designated as an "available" car (BLK17) if it is set for up travel, has no car call and has its doors closed. One of these cars is selected by a selector (BLK 19) for assignment to a selected zone to provide service in an order such as:

(1) Available car spaced from main floor
(2) Available car at main floor
(3) Next car at main floor.

The assignment of an elevator car to serve a particular zone depends on a number of factors such as locations and directions of cars, locations of floors having demands for service, and direction of service demand. On its way to an assigned zone the car may be arranged to by-pass floor calls registered in other zones.

The selected car at the main floor may be started by registration of a car call therein after expiration of a minimum loading interval, by registration of a car call in another car at the main floor prior to expiration of the interval (BLK21) or by presence of a loaded car set for down travel (BLK22).

Absence of cars from the main floor or a substantial demand for up service can register an artificial service demand for the main floor (BLK23), thus favoring service from the main floor.

Various factors govern car assignment. Thus to respond to down demand in a high zone, the highest available car in the high zone may be assigned or in its absence the highest available car in a low zone. For a down demand in the low zone the highest available car in the low zone or in its absence the highest in the high zone is assigned.

The equipment and control circuits for the elevator cars A, B and C include many similar components. For this reason, components for the cars B and C which are similar to corresponding components for elevator car A are identified by the reference characters employed for the car A components preceded by the prefixes B and C, respectively. For example, associated with the elevator cars A, B and C are the next car relays N, BN and CN. For these reference characters, the prefixes B and C indicate that the relays BN and CN are associated, respectively, with the elevator cars B and C.

Electromagnetic switches and relays employed in the control circuits may have numerous contacts of either or both of two types. One type may be referred to as back or break contacts. Such contacts are closed when the associated switch or relay is deenergized and dropped out. The contacts are opened when the associated switch or relay is energized and picked up. The second type of contacts may be referred to as front or make contacts. Such contacts are opened when the associated switch or relay is deenergized and dropped out. These contacts are closed when the associated switch or relay is energized and picked up. The relays and switches in the accompanying schematic views are illustrated in their deenergized and dropped out conditions.

Each set of contacts of a relay or switch is designated by the reference character employed for the relay or switch, followed by a suitable numeral specific to the set of contacts. For example, the reference characters U1 and U6 designate, respectively, the first and sixth sets of contacts associated with the up switch U of the elevator car A. These contacts may be located by application of the key representations, FIGS. 15A through 15H, to the schematic views, FIGS. 1 through 12.

Referring to FIGS. 15A through 15H, distributed along each stem located therein are the coil or coils and all of the contacts of the associated relay, solenoid or switch. Adjacent each coil is a numeral which indicates the figure number of the schematic view on which such coil appears. Adjacent each set of contacts is a pair of numerals separated by a dash. The first of these numerals indicates the number of the particular set of contacts under consideration, while the second of these numerals designates the particular schematic view on which the contacts are located.

The symbols designating the contacts on the schematic views and the key representations indicate whether a particular set of contacts are make or break. Each coil and set of contacts is positioned on its associated stem in the key representations in substantial horizontal alignment with its position in the schematic view on which it is located. Thus, a coil or set of contacts of a particular switch or relay may be found in the schematic views by first determining the key representation figure on which the switch or relay stem is located, according to its alphabetical or numerical order, locating the desired coil or contacts along its associated stem, noting the schematic view figure number on which the desired coil or contacts are located and finally by aligning the particular key representation figure horizontally with the particular schematic view so determined. The desired coil or set of contacts then will be found on such schematic view in substantial horizontal alignment with that coil or set of contacts on the key representation in use.

Figure 15A:
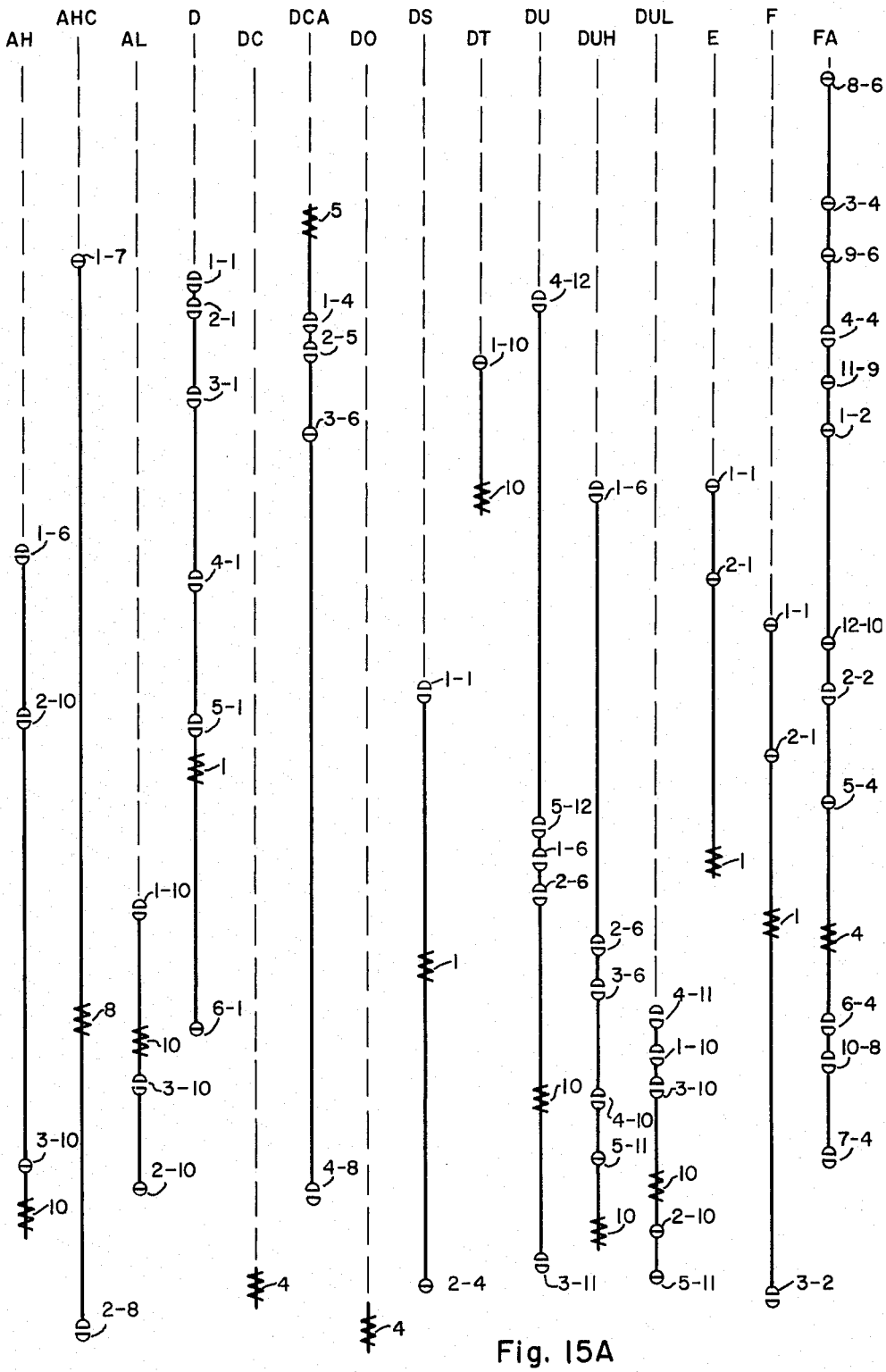
Figure 15B:
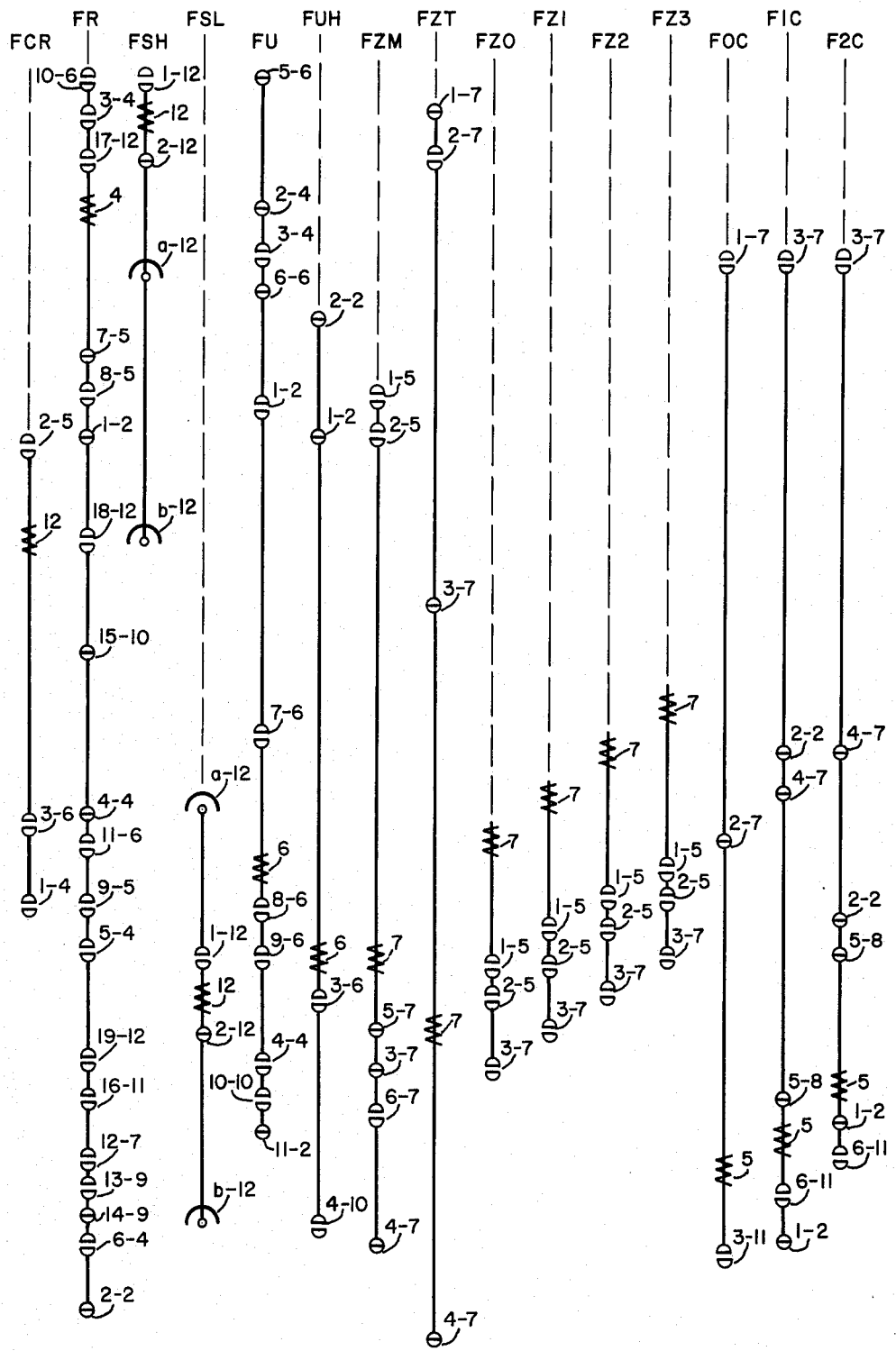
Figure 15C:
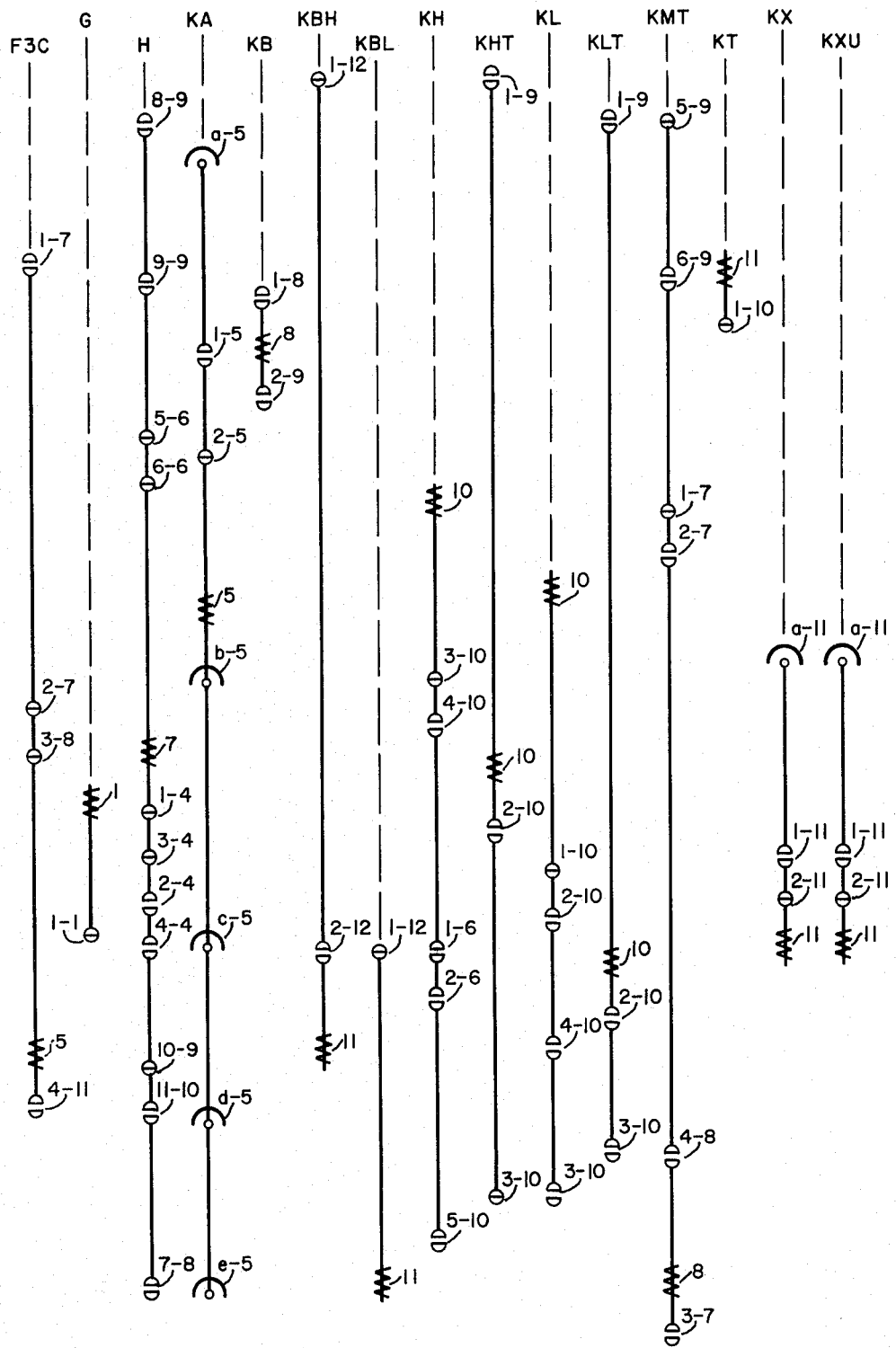
Figure 15D:
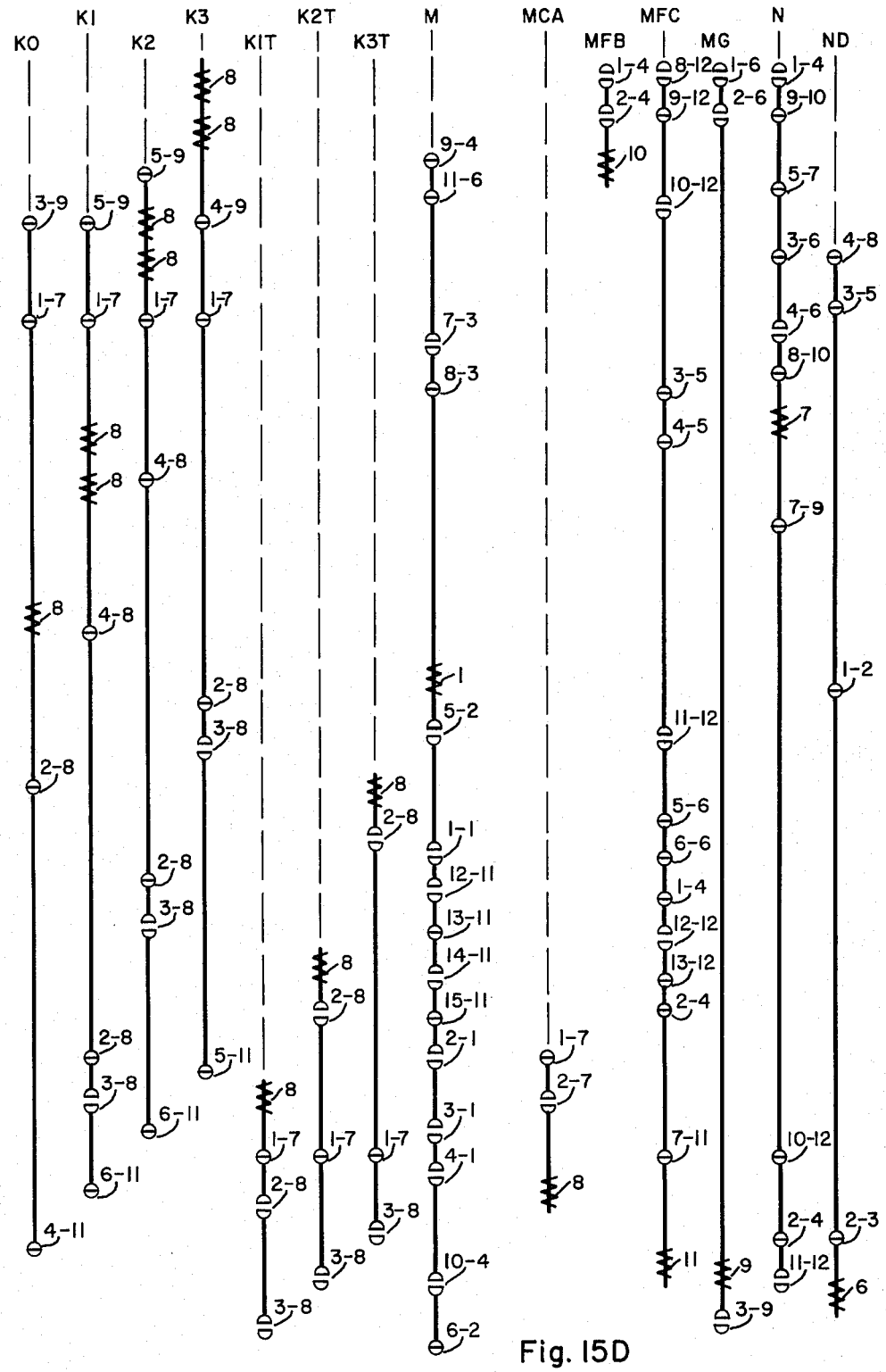
Figure 15E:
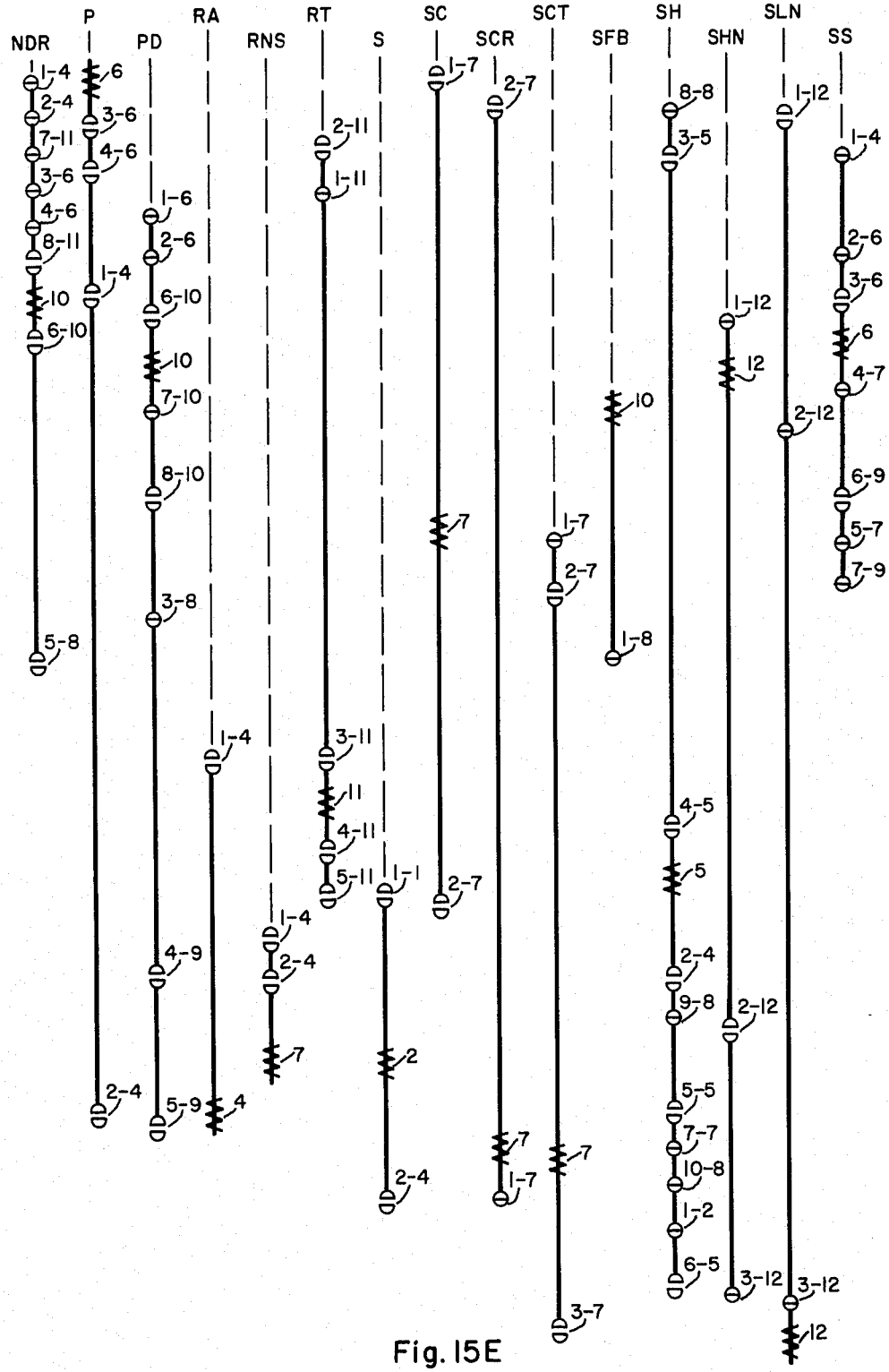
Figure 15F:
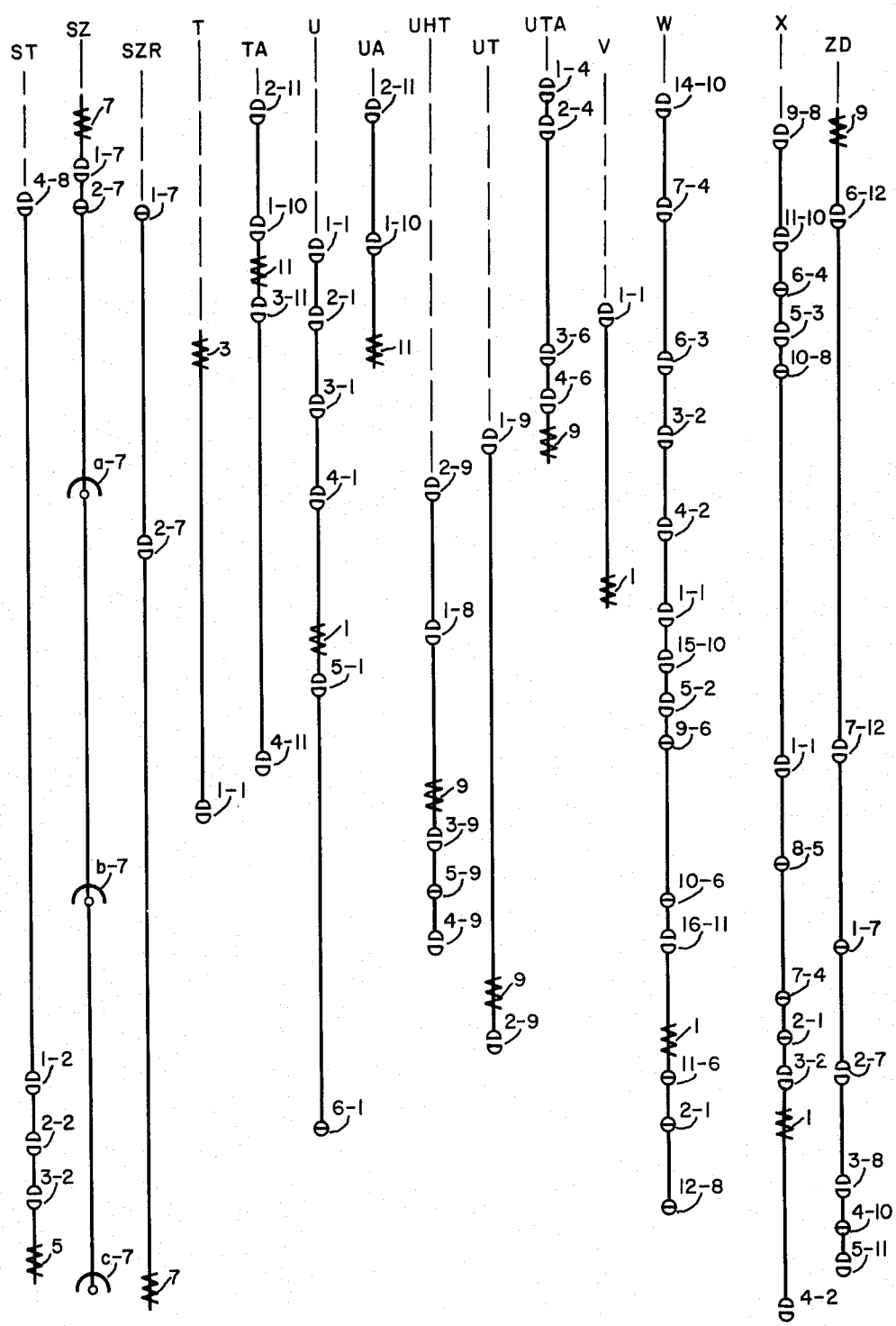
Figure 15G:
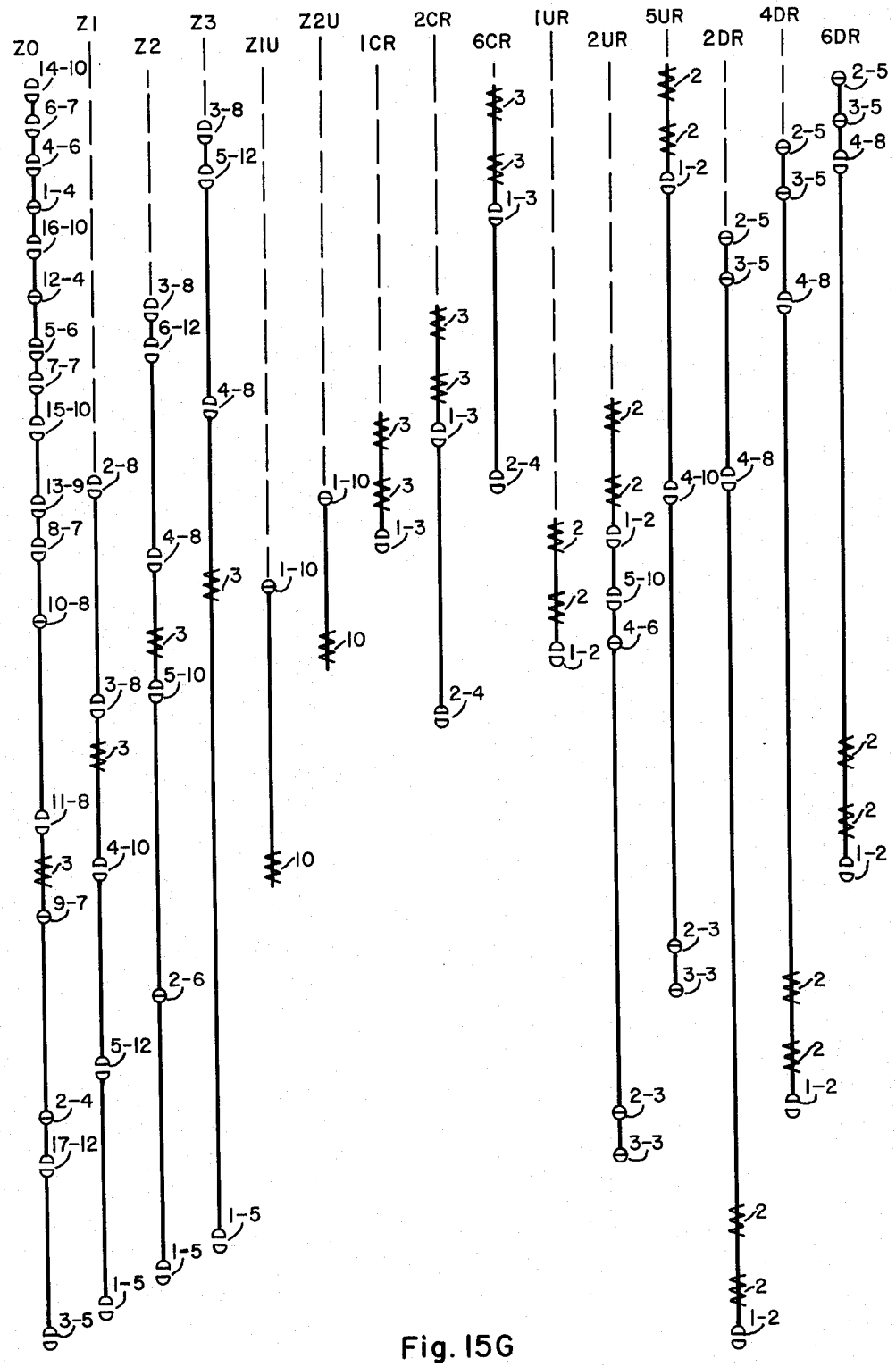
Figure 15H:
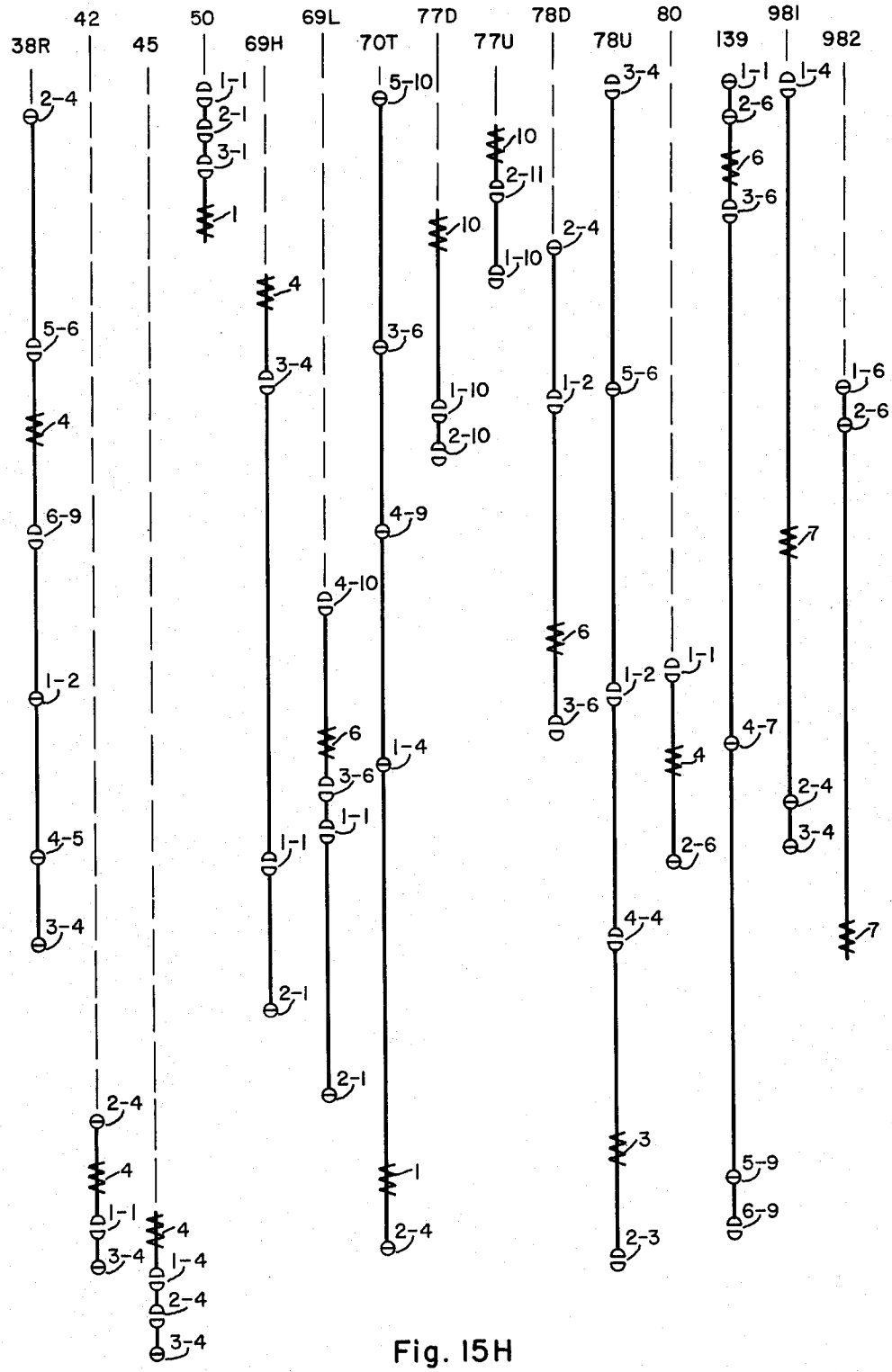

For example, in order to locate the coil and contacts of the up switch U in the schematic views, reference is first made to FIG. 15F, in which the stem for the up switch U is located. Proceeding along this stem, it will be found that the numeral 1 is adjacent the coil of the up switch U, indicating that such coil is located in FIG. 1 of the schematic views. In addition, it will be found that the numeral 1, indicating FIG. 1, follows the dash after the make contacts numbered 1 of the up switch U, while the numeral 1, also indicating FIG. 1, follows the dash adjacent the break contacts numbered 6 of the up switch U. Consequently, the coil of the up switch U, the make contacts U1 and the break contacts U6 all appear in FIG. 1. This coil and these contacts may be located in FIG. 1 by horizontally aligning FIG. 15F with FIG. 1, and the corresponding coil and contacts of the two figures will be found to be in substantial horizontal alignment. The location of all other coils and contacts in the schematic views, FIGS. 1 through 12, may be determined by application of the key representations, FIGS. 15A through 15H, in a similar manner.

The control circuits of the present elevator system include a plurality of electromagnetic stepping switches, each of which has a set of make and a set of break contacts and one or more levels. The stems for these stepping switches also appear in the key representation figures in their proper alphabetical sequence. Each level of a stepping switch is designated by the reference character employed for the switch followed by a suitable lower-case letter specific to the particular level, and each level is represented by a semicircle on its associated stem. For example, the stem for the assigned zone stepping switch KA will be found on FIG. 15C. It will be noted therein that the coil KA, the make contacts KA1, the break contacts KA2 and the five levels KAa, KAb, KAc, KAd and KAe all are located in FIG. 5 of the schematic views. The location of these components in FIG. 5 may be ascertained in a manner which will be clear from the preceding discussion.

Since the circuits for the elevator cars A and B in FIGS. 1 through 6 generally are similar, the key representation drawings, FIGS. 15A through 15H, include components specific to the car A and components common to all of the elevator cars. Car B components in FIGS. 1 through 6 may be located in a manner which will be clear from the preceding discussion.

In order to facilitate the presentation of the invention, certain apparatus specific to the car A and certain apparatus common to all of the elevator cars are set forth as follows:

APPARATUS FOR ELEVATOR CAR A

D—Down switch
DCA—Down call above relay
DC—Door-close solenoid
DO—Door-open solenoid
DS—Door relay
E—Inductor slowdown relay
F—Inductor stopping relay
FA—Down call assigned relay
FCR—Demand response relay
FR—Available car relay
FU—Up call assigned relay
FUH—High up zone assigned relay
G—Holding relay
KA—Assigned zone stepping switch
KB—Down zone call below relay
M—Running relay
N—Next car relay
ND—Notching relay
P—Parking relay
RA—First auxiliary running relay
S—Floor call stopping relay
SH—Down zone assigned relay
SS—Start relay
ST—Assigned zone stopping relay
T—Car call stopping relay
U—Up switch
V—Speed relay
W—Up preference relay
X—Down preference relay
Z0, Z1, Z2, Z3—Zone position relays 1CR through 6CR—Car call registering relays
38R—Car call above relay
42—Auxiliary door-control relay
45—Door-control relay
50—Motor-generator starting relay
69H—High call reversal relay
69L—Low call reversal relay
70T—Non-interference relay
78D—Up call below relay
78U—Up call above relay
80—Second auxiliary running relay
139—Motor-generator shutdown relay
981—Lower terminal no-start relay

APPARATUS COMMON TO ALL CARS

AH—Master high up zone assigned relay
AHC—Highest down call relay
AL—Low up zone assigned relay
DT—Down by-pass timing relay
DU—Up zone demand relay
DUL—Low up zone demand relay
DUH—High up zone demand relay
FSH—High zone stepping switch
FSL—Low zone stepping switch
FZM—Master zone relay
FZT—Zone resetting relay
FZ0, FZ1, FZ2, FZ3—Zone relays
F0C, F1C, F2C, F3C—Assigned zone relays
H—Motor-generator running relay
KBH—High zone demand relay
KBL—Low zone demand relay
KH—High up zone call relay
KHT—High up zone timing relay
KL—Low up zone call relay
KLT—Low up zone timing relay
KMT—Down zone priority relay
KT—Up demand timing relay
KX—Stop counting stepping switch
KXU—Up stop counting stepping switch
K0, K1, K2, K3—Down zone demand registering relays
K1T, K2T, K3T—Down zone timing relays
MCA—Master down call above relay
MFB—Lower terminal surplus car relay
MFC—Multiple available car relay
MG—Motor-generator timing relay
NDR—No demand return relay
PD—Instant dispatch relay
RNS—No scan relay
RT—Reset relay
SC—Down demand mid-point relay
SCR—Pulsing relay
SCT—Firing relay
SFB—Lower terminal non-next relay
SHN—High zone no selection relay
SLN—Low zone no selection relay
SZ—Down demand mid-point stepping switch
SZR—Scan relay
TA—Ratio timing relay
UA—Stop ratio relay
UHT—First dispatching interval relay
UT—Second dispatching interval relay
UTA—Dispatching interval expired relay
ZD—Down zone demand relay
Z1U—Low up zone position relay
Z2U—High up zone position relay
1UR through 5UR—Up floor call registering relays
2DR through 6DR—Down floor call registering relays
77D—Down by-pass relay
77U—Up by-pass relay
982—Master lower terminal relay In order to present the invention in an orderly manner, the apparatus and control circuits for each of the FIGS. 1 through 14 will be discussed separately. Thereafter, a number of typical operations of the entire system will be considered.

Since many similar components are employed in the apparatus and control circuits for the elevator cars A, B and C, the description of the apparatus and control circuits will be directed primarily to those associated with the car A. With the notation employed, similar components employed for the other elevator cars readily may be traced. If different components are employed for certain of the elevator cars, these different components will be discussed as required.

FIGURE 1

FIG. 1 shows the elevator cars A and B and certain control circuits associated therewith. The elevator car A (illustrated in the left column) will be assumed to be stopped at the second floor of the structure, whereas the elevator car B (illustrated in the right column) will be assumed to be stopped at the fifth floor of the structure.

The elevator car A is connected by a rope or cable 10 to a counterweight 11. The rope 10 passes over a sheave 12, which is secured to a shaft 13 for rotation therewith. The shaft 13 is rotated by a motor 14 which may be of any conventional type. For present purposes, it will be assumed that the motor 14 is a direct-current motor having its armature 14A secured to the shaft 13 and having a field winding 14F, which is permanently connected across two direct-current buses L1 and L2, which supply direct-current energy for the control circuits.

The elevator car A has therein a plurality of normally-open car-call push buttons 1c through 6c, which are actuated for the purpose of registering calls for the first through sixth floors, respectively, as desired by passengers entering the elevator car.

To permit registration of calls for service by prospective passengers located at the various floors served by the elevator cars, push button stations are located at such floors. Such a station is shown in FIG. 1 for the third floor. It includes a normally-open up floor call push button 3U, which is pressed by a prospective passenger desiring elevator service in the up direction. A similar push button is located at each floor from which service in the up direction may be desired. The station also includes a normally-open push button 3D, which is pressed by a prospective passenger desiring elevator service in the down direction. A similar push button is located at each floor from which elevator service in the down direction may be desired. The numeral of each reference character (as 3D or 3U) indicates the floor at which the push button is located.

The elevator car A also has mounted thereon an inductor slowdown relay E and an inductor stopping relay F which may be of conventional construction. The slowdown relay E has two sets of break contacts E1 and E2 associated therewith. The relay has a normally incomplete magnetic circuit, and energization of the winding of the relay alone does not affect the associated contacts. However, if the slowdown relay E, when its winding is energized, reaches an up inductor plate UEP located in the hoistway of the elevator car, the contacts E1 open. In FIG. 1 the inductor plate UEP is assumed to be mounted in the hoistway to be reached by the slowdown relay E as the elevator car A nears the third floor. If the elevator car A is to stop at the third floor, the winding of the relay E is energized; and when the relay reaches the inductor plate UEP for the third floor, the contacts E1 open to initiate a slowdown operation of the elevator car. It will be understood that a similar inductor plate is similarly associated with each of the floors at which the elevator car A may stop during up travel thereof.

During down travel of the elevator car A, the inductor slowdown relay E cooperates with down inductor plates DEP to initiate a slowdown operation of the elevator car as it approaches a floor at which the elevator car is intended to stop. For example, if the elevator car is to stop during down travel at the third floor, the winding of the inductor relay E is energized as the elevator car nears the third floor. When the inductor relay reaches the down inductor plate DEP for the third floor, the break contacts E2 open to initiate a slowdown operation of the elevator car. It will be understood that a similar inductor plate DEP is provided for each of the floors at which the elevator car A is to stop during down travel thereof.

The inductor stopping relay F similarly cooperates with inductor plates UFP and DFP for the purpose of bringing the elevator car to a stop as it reaches a floor at which it is to stop. Thus, if the elevator car A during up travel is to stop at the third floor, the winding of the stopping relay F is energized; and as the stopping relay F reaches the stopping inductor plate UFP for the third floor, its break contacts Fi open. These contacts in opening effect the stopping of the elevator car at the third floor. A similar inductor plate is provided at each of the floors at which the elevator car A is to stop during up travel thereof.

If the elevator car A is to stop at the third floor during down travel thereof, the winding of the inductor stopping relay F is energized; and as the relay reaches the inductor plate DFP for the third floor, its break contacts F2 open to produce a stopping operation of the elevator car at the third floor. At the same time, make contacts F3 close for a purpose pointed out below. It will be understood that a similar inductor plate is provided for each of the floors at which the elevator car A is to stop during down travel thereof.

When the elevator car A is loaded to capacity, a load switch LW is operated to open its break contacts LW1 and LW3 and to close its make contacts LW2, LW4 and LW5. Such load switches are well known in the art.

Because of the large number of control circuits required, it is conventional practice to provide each elevator car with a floor selector. The selector 15 for the elevator car A includes a plurality of rows of contact segments mounted on an insulating panel 15A. Only two rows of contact segments, $a2$ through $a5$ and $b1$ through $b5$ are illustrated in FIG. 1. These contact segments are successively engaged during travel of the elevator car respectively by brushes $aa$ and $bb$ for the purpose of controlling the energizations of certain circuits. For example, if the elevator car A during up travel is to stop at the third floor in response to an up floor call, the brush $aa$ engages the contact segment $a3$ shortly before the elevator car A reaches the third floor to initiate a stopping operation thereof.

The brushes $aa$ and $bb$ are mounted on a brush carriage 15C, which is mounted for reciprocation in accordance with movement of the elevator car. Consequently, as the elevator car A moves, the brushes mounted on the carriage 15C permit the energization of appropriate circuits at various points of travel of the elevator car. Additional floor selector contact segments and brushes also are provided but are not illustrated in FIG. 1. The arrangement of these contact segments and brushes will be understood from the preceding discussion.

The floor selector 15 may be of any conventional type. For example, the carriage 15C thereof may be disposed for movement in synchronism of movement with the elevator car A, but at a greatly reduced rate. Or the carriage may notch rapidly in discrete steps in advance of the car as the car moves from floor to floor. In the present instance, it will be assumed that the floor selector is of the latter type.

Although the driving motor 14 may be energized in various ways, it will be assumed that the control of this motor is of the type commonly referred to as a variable voltage control. In such a control, a direct-current generator 16 has its armature 16A connected in a loop with the armature 14A of the motor 14. A series field winding 16S for the generator also may be included in this loop. The generator has a main field winding 16F which is connected for energization from the buses L1 and L2 through a reversing switch. This reversing switch includes make contacts U2 and U3 of the up switch U. When these contacts are closed, the field winding is energized with proper polarity for up travel of the elevator car. On the other hand, when make contacts D2 and D3 of the down switch D are closed, the field winding is energized with proper polarity for down travel of the elevator car. The energization of the field winding is completed through a resistor R1 for slow speed operation of the elevator car or through make contacts V1 of the speed relay V for full speed operation of the elevator car.

The armature of the direct-current generator 16 is rotated at a constant rate in any suitable manner, as by means of a three-phase induction motor 17, which is connected to a suitable three-phase source of energy through make contacts 50–1, 50–2 and 50–3 of the motor-generator starting relay 50. The relay 50, in turn, is energized from one phase of this three-phase source through a manually-operable switch MGS and break contacts 139–1 of the motor-generator shutdown relay 139. Thus, the motor 17 may be started manually by operation of the switch MGS to its closed condition and thereafter may be stopped and started automatically by operation of the break contacts 139–1.

The elevator car A is provided with a conventional spring-applied electromagnetically-released brake. This brake includes a brake drum 18D, which is secured to the shaft 13 for rotation therewith. A brake shoe 18C normally is biased against the brake drum by means of a spring (not shown). The brake is released upon energization of a brake coil 18B, which cooperates with a magnetic armature 18A secured to the shoe 18C. The coil 18B is connected to the buses L1 and L2 for energization either through make contacts U1 or through make contacts D1 of the up switch U or the down switch D, respectively.

The speed relay V is connected for energization from the buses L1 and L2 through either of two paths. One of these paths includes make contacts U4 of the up switch U, a limit switch 19 and break contacts E1 of the inductor slowdown relay E. The limit switch 19 is a normally-closed overtravel safety switch, which is cam-operated to open as the elevator car A nears its upper limit of travel.

The remaining path of energization of the speed relay V comprises make contacts D4 of the down switch D, a limit switch 20 and break contact E2 of the inductor slowdown relay E. The limit switch 20 is a normally-closed overtravel safety switch and is cam-operated to open as the elevator car A nears its lower limit of travel.

As long as the elevator car A is running, the running relay M is energized. This relay can be energized only as long as make contacts DS1 of the door relay DS are closed. These contacts are closed only as long as all of the doors associated with the car A are closed. Such safety provisions are well known in the art.

The running relay M initially can be energized only if make contacts 80–1 of the second auxiliary running relay 80 are closed. Assuming that these contacts are closed, the relay may be energized initially through either of two paths. One of these paths is as follows:

L1, 80–1, W1, F1, 21, U, M, DS1, L2

Since the up switch U is energized through this path, it follows that the elevator car will be conditioned for up travel. The limit switch 21 is a normally-closed mechanically-operated overtravel safety switch which is opened as the elevator car A nears its upper limit of travel. When energized, the up switch U closes its make contacts U5 to establish a holding circuit around the contacts 80–1 and W1.

The second path for initially energizing the running relay M may be traced as follows:

L1, 80–1, X1, F2, 22, D, M, DS1, L2

Since the down switch D now is energized, it follows that the elevator car A is conditioned for down travel. The limit switch 22 is a mechanically-operated normally-closed overtravel safety switch which is opened as the elevator car A nears its lower limit of travel. When the down switch D picks up, it closes its make contacts D5 to establish a holding circuit around the contacts 80–1 and X1.

The inductor slowdown relay E, the inductor stopping relay F, and the holding relay G are energized in parallel from the buses L1 and L2 through make contacts M1 of the running relay M. To complete an initial energizing circuit for these relays E, F and G, one of four conditions must be present. First, make contacts T1 are closed to indicate that a car call is registered for a floor which the elevator car A is approaching. Second, make contacts 69L1 are closed to indicate that the elevator car A, while traveling in the down direction, is approaching a landing or floor at which it is to reverse its direction of travel. Third, make contacts 69H1 are closed to indicate that the car A, while traveling up, is approaching a landing or floor at which it is to reverse its direction of travel. Fourth, make contacts S1 are closed to indicate that the elevator car A is conditioned to stop at a floor in answer to a registered floor call for such floor.

When the holding relay G is energized, it closes its make contacts G1 to establish with the make contacts M1 a holding circuit for the inductor relays E and F.

It will be recalled that the door relay DS must be energized before the elevator car A can be started from a floor. This relay is energized through a limit switch 23 operated by each of the doors associated with the elevator car A, including hoistway doors, if employed. The switch for each of the doors is closed only when the associated door is in closed position. Consequently, all of the doors associated with the car A must be closed before the relay DS can be energized to permit departure of the car A.

The direction of travel of the elevator car A is determined initially by the up preference relay W and the down preference relay X. For the up preference relay W to be energized, break contacts D6 must be closed (i.e., the down switch D is deenergized) and break contacts X2 must be closed (i.e., the down preference relay X is deenergized). Energization of the up preference relay W also requires closure of at least one of two sets of contacts. These include break contacts 69H2, which are closed when the elevator car A is not conditioned to reverse its direction of travel at an intermediate floor or landing while traveling in the up direction. Make contacts M2 are closed as long as the elevator car A is running.

The down preference relay X may be energized only if break contacts U6 are closed (i.e., the up switch U is deenergized); break contacts W2 are closed (i.e., the up preference relay W is deenergized); and a limit switch 24 is closed. This limit switch is normally closed and is cam-operated to open as the elevator car A reaches the lower terminal or first floor.

Energization of the down preference relay X also requires closure of at least one of two sets of contacts. These include break contacts 69L2, which are closed when the elevator car A is not conditioned to reverse its direction of travel at an intermediate floor or landing while traveling in the down direction. Make contacts M3 are closed as long as the car A is running.

As long as the elevator car A is running, make contacts M4 are closed to energize the non-interference relay 70T. When the car A stops, the contacts M4 open to deenergize this relay. However, the relay 70T has a substantial delay in dropout. This delay may be provided in any suitable manner, as by connecting a resistor R2 across the relay coil. The time delay in dropout is selected to be sufficient to permit discharge of passengers from the elevator car A or entry of passengers into the elevator car A after each stop. If the car A is stopped with its doors closed at a floor to which it is assigned to answer a floor call, make contacts 42–1 of the auxiliary door control relay 42 close to energize the non-interference relay 70T.

FIGURE 2

Figure 2:
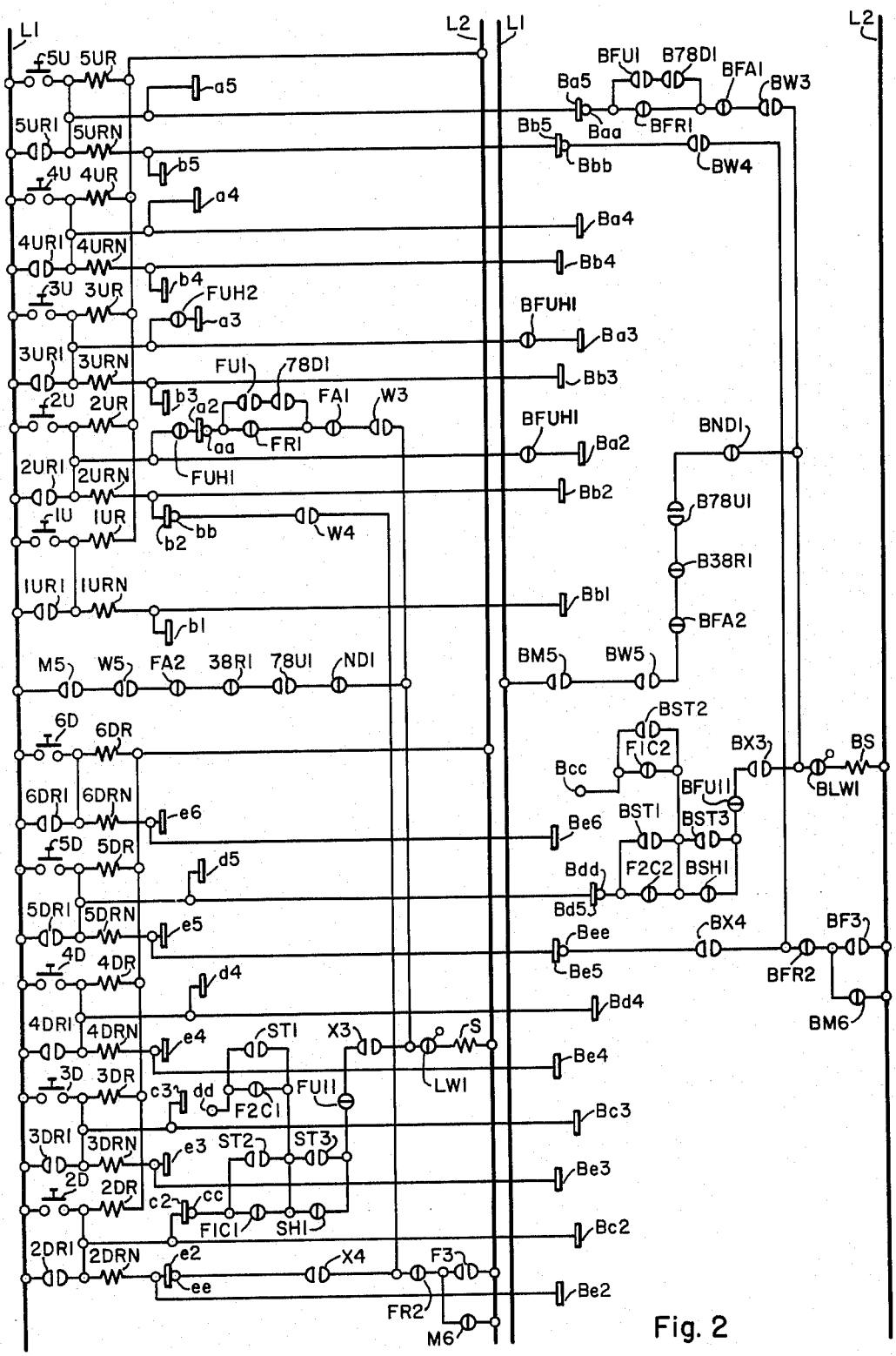
FIGS. 2 through 12 are schematic views with circuits shown in straight-line form of further portions of the elevator control system illustrated in FIG. 1.

FIGURE 2 shows the floor call registration circuits for the elevator cars. The upper part of the figure illustrates up floor call registering circuits. These circuits are operated by the push buttons 1U through 5U which, it will be recalled, are located respectively at the first through fifth floors. Associated with the push buttons are the up floor call registering relays 1UR through 5UR, respectively. Each of these relays has a cancelling coil associated therewith identified by the same reference character followed by the suffix N. For example, the up floor call registering relay 5UR for the fifth floor has a cancelling coil 5URN wound on the same core and energized in opposition to the energization of the operating coil of the relay. Consequently, when the cancelling coil is energized, the relay is reset. It will be understood that the up floor call push buttons normally are biased to their open positions.

The up floor call registering relays 1UR through 5UR and their cancelling coils are associated with two rows of contact segments located on the car A floor selector 15 of FIG. 1. The arrangement of the contact segments will be understood from the discussion of FIG. 1, wherein the mounting of the contact segments $a2$ through $a5$ was discussed. It will be recalled that each of these rows of contact segments has a brush associated therewith for engaging successively the contact segments in accordance with movement of the elevator car A.

The contact segments $a2$ through $a5$ cooperate with the brush $aa$ for the purpose of initiating a stopping operation of the elevator car A during up travel of the car respectively at the first through fifth floors in response to registered up floor calls therefor. The contact segments $b1$ through $b5$ cooperate with a brush $bb$ in order to cancel up floor calls which are answered during travel of the car A. It will be understood that for each contact segment the numeral of its reference character designates the floor with which the contact segment is associated. Thus, the reference character $b1$ designates the contact segment for the first floor in the $b$ row.

It will be noted that the contact segment $a5$ for the fifth floor is connected to the bus L1 through the make contacts 5UR1. In a similar manner, each of the remaining contact segments in the $a$ row is connected through make contacts of its associated up floor call registering relay to the bus L1. The contact segment $b5$ for the fifth floor is connected to the bus L1 through the cancelling coil 5URN and the make contacts 5UR1 of the up floor call registering relay 5UR. The contact segments in the $b$ row associated with the first through fourth floors similarly are connected through cancelling coils and make contacts of their associated up floor call registering relays to the bus L1.

Let it be assumed that while the elevator car A is traveling up a prospective passenger waiting on the fifth floor presses the up floor call push button 5U to energize the up floor call registering relay 5UR. This relay closes its make contacts 5UR1 to establish a holding circuit around the push button.

Since the elevator car is running, break contacts M6 of the running relay M are open. Inasmuch as the elevator car is assumed to be traveling up, make contacts W3 and W4 of the up preference relay W are closed. Furthermore, under the assumed conditions, break contacts FA1 of the down call assigned relay FA and break contacts FR1 and FR2 of the available car relay FR all are closed. It is assumed in addition that the elevator car A is not fully loaded and that load switch contacts LW1, therefore, also are closed. As the carriage of the floor selector for the car A notches to its fifth-floor position, the brush $aa$ engages the contact segment $a5$ to complete the following circuit:

L1, 5UR1, $a5$, $aa$, FR1, FA1, W3, LW1, S, L2

The energization of the floor call stopping relay S initiates the stopping of the elevator car A at the fifth floor.

In response to movement of the car A floor selector carriage to its fifth-floor position, the brush $bb$ also engaged the contact segment $b5$. As the car comes to a stop at the fifth floor, break contacts M6 close to complete the following cancelling circuit:

L1, 5UR1, 5URN, $b5$, $bb$, W4, FR2, M6, L2

This results in the resetting of the up floor call registering relay 5UR. The brushes $aa$ and $bb$ remain in engagement with the contact segments $a5$ and $b5$, respectively, as long as the car A remains at the fifth floor.

By inspection of FIG. 2, it will be observed that the contact segments in the $a$ row are connected to corresponding contact segments for the other elevator cars in the bank. For example, the segment $a5$ is connected to contact segment B$a5$ for the elevator car B. Similarly, the contact segments in the $b$ row are connected to corresponding contact segments for the remaining cars of the bank, e.g., the segment $b5$ is connected to contact segment B$b5$ for the car B. Consequently, operation of the push button 5U is effective to stop the first up-traveling elevator car which reaches the fifth floor and which is conditioned to accept the call at the fifth floor.

Under certain conditions to be discussed below, it is desirable to prevent the response of the elevator car A to certain registered up floor calls during up travel of the car A. To this end, the intermediate floors served by the elevator cars are divided into two up zones, a low up zone, which comprises the second and third floors, and a high up zone, which includes the fourth and fifth floors. This is accomplished by operation of the high up zone assigned relay FUH for the elevator car A. It will be observed that this relay has break contacts FUH1 and FUH2 in series with the contact segments $a2$ and $a3$, respectively. Consequently, if the car A is assigned to answer registered up floor calls in the high up zone, the relay FUH is picked up to open its break contacts FUH1 and FUH2, thus preventing energization of the floor call stopping relay S as the car A while traveling up approaches the second and third floors, respectively, although up floor calls may be registered for such floors.

The elevator car A may be stopped at a floor with its doors closed while awaiting assignment for service, i.e., it may be an available car. Under these conditions, an up floor call may be registered for the floor at which the car is located, and the car A may be selected to answer such call. Consequently, it is necessary that the doors of the car A be opened.

Referring to FIG. 2, and assuming that the car A is an available car and is located at the second floor with its doors closed, the available car relay FR is picked up to open its break contacts FR1 and FR2. Next, assume that a prospective passenger pushes the push button 2U to register an up floor call for the second floor (the relay 2UR is energized). If the elevator car A is assigned to answer such call, break contacts FUH1 and the make contacts FU1 are closed. In general, if no up floor call is registered for any floor below the car A (in this example, for the first floor), make contacts 78D1 of the up call below relay 78D are closed. Since the car A is not assigned to answer down calls, break contacts FA1 are closed. Finally, make contacts W3 of the up preference relay W also are closed at this time, inasmuch as the car A must be conditioned for up travel in order for it to be available for assignment. Consequently, when the push button 2U is pressed, the floor call stopping relay S is energized through the following circuit:

L1, 2U, FUH1, $a2$, $aa$, FU1, 78D1, FA1, W3, LW1, S, L2

Pickup of the relay S under these conditions results in the opening of the doors of the elevator car A, as will be discussed hereinafter, to permit the passenger who registered the up floor call for the second floor to enter the car A. Inasmuch as the car A has received an assignment for service, it is no longer an available car, and the available car relay FR drops out to close its break contacts FR2. Such closure results in energization of the cancelling coil 2URN to cancel the registered up floor call for the second floor in a manner which will be clear from the preceding discussion.

Since the elevator car A does not stop during up travel at the lower terminal or first floor, a contact segment for the first floor is not required in the *a* row. With this exception, the up floor call registering circuits for the first floor are similar to those described for the fifth floor. Inasmuch as the sixth or upper terminal floor is the highest floor served by the elevator cars in the illustrated embodiment of the invention, it is apparent that no up floor call registering circuits need be provided for the sixth floor.

Under certain conditions, it may be desirable to stop the car A at the next floor reached by the car although no car or floor call is registered for such floor. Thus, if the following conditions are met, the floor call stopping relay S is energized: The car A is running (make contacts M5 are closed) in the up direction (make contacts W5 are closed), it is not assigned to answer down floor calls (break contacts FA2 are closed), no car call is registered for the car A for a floor above the position of the car (break contacts 38R1 are closed), no up floor call is registered for a floor above the location of the car A (make contacts 78U1 are closed), and the car A floor selector carriage is notching (break contacts ND1 are closed). Energization of the floor call stopping relay S in this manner results in the stopping of the car A at the next floor reached thereby.

The lower part of FIG. 2 illustrates the down floor call registering circuits for the elevator cars. Down floor calls are registered by operation of normally-open push buttons 2D through 6D, with which are associated down floor call registering relays 2DR through 6DR and cancelling coils 2DRN through 6DRN. Each push button cooperates with its call registering relay and its cancelling coil in the manner discussed with reference to the up floor call push buttons.

For the elevator car A, two contact segments $c2$ and $c3$ cooperate with a brush $cc$, while two contact segments $d4$ and $d5$ cooperate with a brush $dd$. These contact segments and brushes control the stopping of the elevator car A in response to registered down floor calls. In addition, a row of contact segments $e2$ through $e6$ cooperates with a brush $ee$ to cancel down floor calls which are answered by the elevator car A. The foregoing contact segments and their associated brushes are mounted on the floor selector 15 of FIG. 1. It will be understood that the numeral in the reference character for each contact segment designates the floor with which such contact segment is associated.

Let it be assumed that the elevator car A while traveling down is approaching the fifth floor, for which a down floor call has been registered by operation of the push button 5D. Such operation results in energization of the down floor call registering relay 5DR to close make contacts 5DR1. Since the elevator car is traveling down, make contacts X3 and X4 are closed. It will be assumed further that break contacts FU11 are closed to indicate that the car A is not assigned to answer up floor calls, that the car A is not assigned to serve a particular down zone of floors and that no other elevator car specifically is assigned to answer down floor calls in the second down zone (comprising the fourth and fifth floors), in which case break contacts SH1 and F2C1 both are closed, and that the car A is not fully loaded, so that load switch contacts LW1 also are closed.

As the carriage of the floor selector for the elevator car A notches to its fifth-floor position, the brush $dd$ engages the contact segment $d5$ to complete the following circuit:

L1, 5DR1, $d5$, $dd$, F2C1, SH1, FU11, X3, LW1, S, L2

The energization of the floor call stopping relay S initiates a stopping operation of the elevator car A at the fifth floor.

In response to movement of the car A floor selector carriage to its fifth-floor position, the brush $ee$ also engaged the contact segment $e5$. The stopping of the elevator car A at the fifth floor results in the closure of make contacts F3 of the inductor stopping relay F to complete the following cancelling circuit:

L1, 5DR1, 5DRN, $e5$, $ee$, X4, FR2, F3, L2

The energization of the cancelling coil 5DRN resets the call registering relay 5DR. (If greater lead in cancelling is desired, the contacts F3 could be replaced by make contacts of the inductor slowdown relay E.) As the elevator car A comes to a stop, break contacts M6 close to maintain the cancelling circuit. The brushes $dd$ and $ee$ preferably remain in engagement with their respecive associated contact segments $d5$ and $e5$ as long as the car A remains at the fifth floor.

Let it next be assumed that the elevator car A while traveling down is approaching the second floor, at which a down floor call has been registered by operation of the push button 2D. Such operation results in energization of the down floor call registering relay 2DR to close make contacts 2DR1. In addition, it is assumed once again that the car A is not assigned to answer up floor calls and that it is not assigned to serve a particular down zone of floors and that no other elevator car specifically has been assigned to answer down floor calls in the first down zone, comprising the second and third floors. As a result, break contacts FU11, SH1 and F1C1 all are closed.

As the carriage of the floor selector for the car A notches to its second-floor position, the brush $cc$ engages the contact segment $c2$ to complete the following circuit:

L1, 2DR1, $c2$, $cc$, F1C1, SH1, FU11, X3, LW1, S, L2

The energization of the floor call stopping relay S now initiates a stopping operation of the elevator car A at the second floor. In response to movement of the car A floor selector carriage to its second-floor position, the brush $ee$ also engaged the contact segment $e2$, and upon the stopping of the car A, the down floor call for the second floor is cancelled by the resetting of the call registering relay 2DR in a manner which will be clear from the preceding discussion of the cancellation of the down floor call for the fifth floor.

Next assume that the elevator car A while traveling down is approaching the fifth floor, that down floor calls have been registered for both the fifth and second floors by the pressing of the push buttons 5D and 2D, respectively, and that the car A specifically is assigned to answer down floor calls in the first down zone (comprising the second and third floors) in a manner which will be discussed hereinafter. Under these conditions, break contacts F1C1 and SH1 are open, and make contacts ST1, ST2 and ST3 of the assigned zone stopping relay ST also are open. Since the assigned zone stopping relay ST does not pick up until the car A reaches the down zone to which it is assigned, no energizing circuit for the floor call stopping relay S is completed when the brush $dd$ engages the contact segment $d5$ as the floor selector carriage for the car A notches to its fifth-floor position. Consequently, the car by-passes the fifth floor at this time, although it is assumed that a down floor call is registered for the fifth floor, and continues its downward travel.

As the elevator car A approaches the third floor, which is in the zone to which the car now is assigned, the assigned zone stopping relay picks up to close its make contacts ST1, ST2 and ST3. Inasmuch as it is assumed that no down floor call is registered for the third floor, however, the car A continues past the third floor.

As the carriage of the floor selector for the elevator car A notches to its second-floor position, the brush $cc$ engages the contact segment c2 to complete the following circuit:

L1, 2DR1, c2, cc, ST2, ST3, FU11, X3, LW1, S, L2

The energization of the floor call stopping relay S now initiates a stopping operation of the car A at the second floor, and the registered down floor call for the second floor is cancelled as a result of the engagement of the contact segment e2 by the brush ee as will be apparent from the preceding discussion.

By inspection of FIG. 2, it will be observed that the contact segments associated with the down floor call circuits are connected to corresponding contact segments for the other elevator cars in the bank. For example, the contact segments c2, d5 and e5 respectively are connected to contact segments Bc2, Bd5 and Be5 for the elevator car B. Consequently, the first unassigned elevator car to approach a floor while traveling down will answer a registered down floor call for such floor provided that no other elevator car specifically is assigned to answer down floor calls in the zone which includes such floor.

The down floor call registering circuits for all of the intermediate floors are similar, with the exception of the arrangement of the brushes cc and dd and their associated contact segments and relay contacts as hereinbefore pointed out, and such circuits may be traced readily in FIG. 2. The down floor call registering circuits for the upper terminal or sixth floor also may be similar. However, since the elevator car A does not stop at the sixth floor during down travel, a contact segment corresponding to those in the c and d rows may be omitted for the sixth floor. Since the elevator cars do not travel downwardly from the lower terminal or first floor, no down floor call registering circuits are provided for the first floor.

It will be observed by inspection of FIG. 2 that the opening of break contacts LW1 of the load switch LW to indicate that the car A is fully loaded prevents energization of the floor call stopping relay S and thus the stopping of the elevator car A in response to registered up and down floor calls. In other words, as long as the car A is fully loaded, the opening of the contacts LW1 in response thereto causes the car A to by-pass all floors for which floor calls are registered.

*FIGURE 3*

Figure 3:
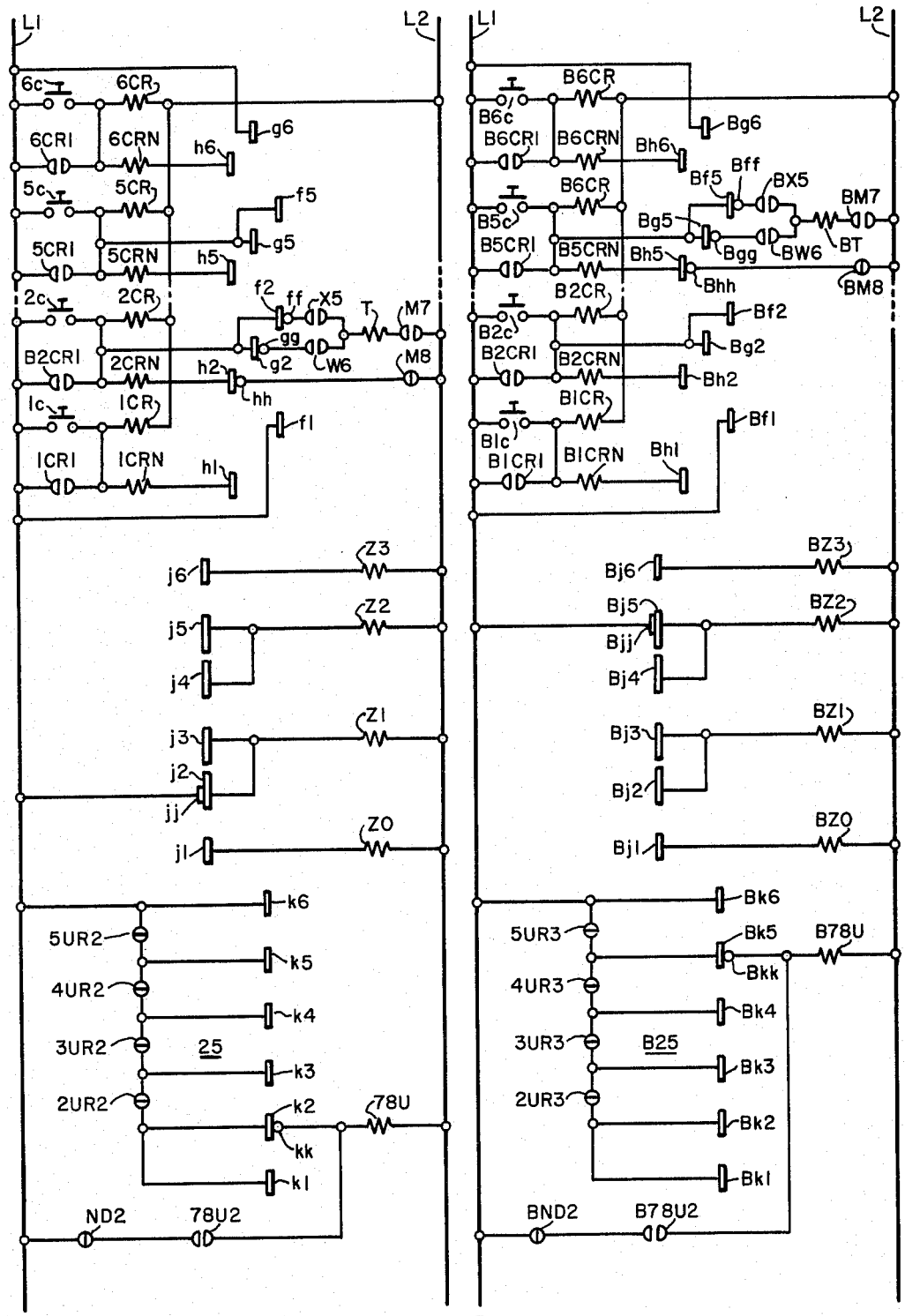

Car call registration circuits are illustrated for the elevator cars A and B in the upper part of FIG. 3. This figure also shows circuits associated with the zone position relays Z0 through Z3 and with the up call above relay 78U.

The car call registering circuits for all of the intermediate floors are similar to each other. For this reason and to conserve space, intermediate floor car call registering circuits are illustrated in FIG. 3 for only the second and fifth floors.

It will be recalled that the elevator car A is provided with a plurality of push buttons 1c through 6c for the purpose of registering car calls for the first through sixth floors, respectively. The push buttons are normally open and are respectively associated with car call registering relays 1CR through 6CR and cancelling coils 1CRN through 6CRN in a manner which will be clear from the discussion of the floor call registering relays and cancelling coils associated with the up and down floor call push buttons of FIG. 2.

The push buttons and car call registering relays cooperate with three rows of contact segments located on the floor selector 15 for the elevator car A. Contact segments f1 through f5 cooperate with a brush ff for the purpose of initiating a stopping operation of the elevator car during down travel of the car respectively at the first through fifth floors. Contact segments g2 through g6 cooperate with a brush gg for the purpose of initiating a stopping operation of the elevation car A during up travel of the car respectively at the second through sixth floors.

A brush hh cooperates with a row of contact segments h1 through h6 for the purpose of cancelling registered car calls as they are answered during down travel and up travel of the elevator car. It will be understood that for each contact segment the numeral of the reference character therefor designates the floor with which the contact segment is associated. Thus, the reference character f1 designates the contact segment for the first floor in the f row.

By reference to FIG. 3, it will be observed that when the car call push button 5c is pressed, the car call registering relay 5CR is connected therethrough across the buses L1 and L2. This relay closes its make contacts 5CR1 to establish a holding circuit around the push button. The contact segments f5 and g5 are connected through this set of contacts to the bus L1.

If the elevator car A is set for down travel, make contacts X5 are closed; and if the elevator car is approaching the fifth floor, make contacts M7 of the running relay also are closed. Consequently, as the floor selector carriage for elevator car notches to its fifth-floor position, the brush ff engages the contact segment f5 to complete the following energizing circuit for the car call stopping relay T:

L1, 5CR1, f5, ff, X5, T, M7, L2

The energization of the relay T initiates a stopping operation of the elevator car A at the fifth floor.

When the car A selector carriage notched to its fifth-floor position, the brush hh also engaged the contact segment h5. Thus, as the elevator car comes to a stop, break contacts M8 of the running relay close to complete the following cancelling circuit:

L1, 5CR1, 5CRN, h5, hh, M8, L2

Energization of the cancelling coil 5CRN resets the car call registering relay 5CR. The brushes ff and hh remain in engagement with their respective associated contact segments f5 and h5 as long as the elevator car A remains at the fifth floor.

Next it will be assumed that the same call is registered for the fifth floor as the elevator car A travels up toward the fifth floor. Under these circumstances, make contacts W6 of the up preference relay are closed. As the car A floor selector carriage notches to its fifth-floor position, the brush gg engages the contact segment g5 to complete the following circuit:

L1, 5CR1, g5, gg, W6, T, M7, L2

The energization of the car call stopping relay T results in the initiation of a stopping operation of the car A at the fifth floor. In addition, the brush hh engages the contact segment h5 to effect the cancellation of the fifth floor car call in a manner which will be clear from the preceding discussion. The brushes gg and hh remain in engagement with the respective associated contact segments g5 and h5 as long as the elevator car A is at the fifth floor.

The car call registering circuits for the upper terminal or sixth floor may be similar to those employed for the intermediate floors. However, since the elevator car A stops at the sixth floor only during up travel, a contact segment for the sixth floor need not be provided in the f row. By reference to FIG. 3, it will be noted that only contact segments g6 and h6 are provided for the sixth floor. Contact segment g6, however, is connected directly to the bus L1, since the car always stops at the sixth floor if it reaches such floor. The car call registering circuits for the lower terminal or first floor may be similar to those provided for the intermediate floors. Since the elevator car A stops at the first floor only during down travel, a contact segment for the first floor need not be provided in the g row. For this reason, in the car call registering circuits only contact segments f1 and h1 are illustrated for the first floor. By reference to FIG. 3, it will be noted that the contact segment *f*1 is connected directly ot the bus L1, since the car A always stops at the first floor if it reaches such floor.

In order to ascertain the position of the elevator cars with respect to the floors of the building, a plurality of zone position relays are provided for each of the cars. For the elevator car A, these relays comprise the zone position relays Z0, Z1, Z2 and Z3. Such relays are associated with a row of contact segments *j*1 through *j*6 for the first through sixth floors, respectively, which cooperate with a brush *jj*. The contact segments and the brush are incorporated in the floor selector 15 of FIG. 1 in a manner which will be clear from the preceding discussion of the floor selector.

The brush *jj* is connected directly to the bus L1, while each of the zone position relays is connected to a contact segment or segments and to the bus L2. In the present case, the six floors of the structure served by the elevator system are divided into four zones, the relay Z0 being associated with the first floor, the relay Z1 being associated with the second and third floors, the relay Z2 being associated with the fourth and fifth floors and the relay Z3 being associated with the sixth floor. The brush *jj* and the contact segments *j*1 through *j*6 are so proportioned that when the elevator car A is located in a particular zone, the corresponding zone position relay for that zone will be energized and picked up. Thus, when the elevator car A is at or adjacent the first floor, the brush *jj* engages the contact segment *j*1 to energize the zone position relay Z0. Assuming that the car A is traveling upwardly from the first floor, as its floor selector carriage notches to its second-floor position, the brush *jj* disengages the contact segment *j*1 to deenergize the relay Z0 and thereafter engages the contact segment *j*2 to energize the zone position relay Z1. When the selector carriage notches to its third-floor position as the car continues its upward travel, the brush *jj* engages both the contact segments *j*2 and *j*3 to maintain the relay Z1 for this zone energized. As the car proceeds upwardly from the third floor, the brush *jj* disengages the contact segment *j*3 to drop out the zone position relay Z1 and thereafter engages the contact segment *j*4 for the fourth floor to energize and pick up the zone position relay Z2. Energization of the relay Z2 is maintained until the car A selector carriage notches to its sixth-floor position, at which time the brush *jj* disengages the contact segment *j*5 to drop out the relay Z2 and thereafter engages the contact segment *j*6 to energize zone position relay Z3 for the sixth floor, as will be apparent by inspection of FIG. 3. It will be observed that down travel of the car A from the sixth floor results in energization of the zone position relays in the reverse order from the foregoing. Consequently, as the elevator car A travels in its hoistway, the zone position relays Z0 through Z3 indicate the position of the car with respect to the zones into which the floors are divided.

In order to ascertain whether an up floor call is registered for a floor at or above a floor at which an elevator car may be located, an up floor call above circuit is provided for each of the elevator cars. For the elevator car A, the up floor call above circuit 25 includes break contacts of the up floor call registering relays for all of the intermediate floors arranged in the order of the floors. This circuit may be traced as follows:

L1, 5UR2, 4UR2, 3UR2, 2UR2

Associated with the up floor call above circuit 25 is a row of contact segments *k*1 through *k*6, which are engaged successively by a brush *kk* as the floor selector carriage for the elevator car A notches from its first to its sixth-floor position, respectively. These contact segments and their associated brush are incorporated in the floor selector 15 of FIG. 1 in a manner which will be clear from the preceding discussion.

Each of the contact segments in the *k* row is connected to the up floor call above circuit 25 in such a way that the break contacts of all up floor call registering relays requiring travel of the elevator car A above the floor represented by a contact segment are located above such contact segment. Thus, the contact segment *k*5 is connected to the up floor call above circuit between the break contacts 5UR2 and 4UR2. The contact segment *k*4 is connected between the break contacts 4UR2 and 3UR2. The respective locations of the remaining contact segments similarly may be ascertained by reference to FIG. 3. No contacts of the up floor call registering relay 1UR for the first floor are included in the up floor call above circuit 25, since a registered up floor call for the first floor always requires travel of the elevator car A down to the first floor, if the car is not already located at the first floor, i.e., in the present elevator system, the car cannot travel in the up direction to the first floor in order to answer an up floor call therefor. It will be noted that the contact segment *k*6 is connected directly to the bus L1, since the sixth floor is the upper terminal floor in the present elevator system. It also will be observed that the up call above relay 78U is connected between the brush *kk* and the bus L2. When the relay 78U picks up, it closes its make contacts 78U2 to establish a holding circuit for the relay, provided break contacts ND2 of the notching relay ND are closed. The contacts ND2 are closed during notching of the elevator car A floor selector carriage and are open when the carriage is not notching. Thus, if the relay 78U is picked up, it is maintained energized through its holding circuit during notching of the floor selector carriage for the car A by means of the contacts ND2.

From the preceding description it will be apparent that as long as no up floor call is registered for a floor at (with the exception of the first floor) or above the floor at which the elevator car A may be located, the up call above relay 78U will be energized and picked up; and the holding circuit for the relay maintains such energization during notching of the carriage of the floor selector for the car. In addition, the relay 78U is energized whenever the elevator car A floor selector carriage is located in its sixth-floor position.

FIGURE 4

Figure 4:
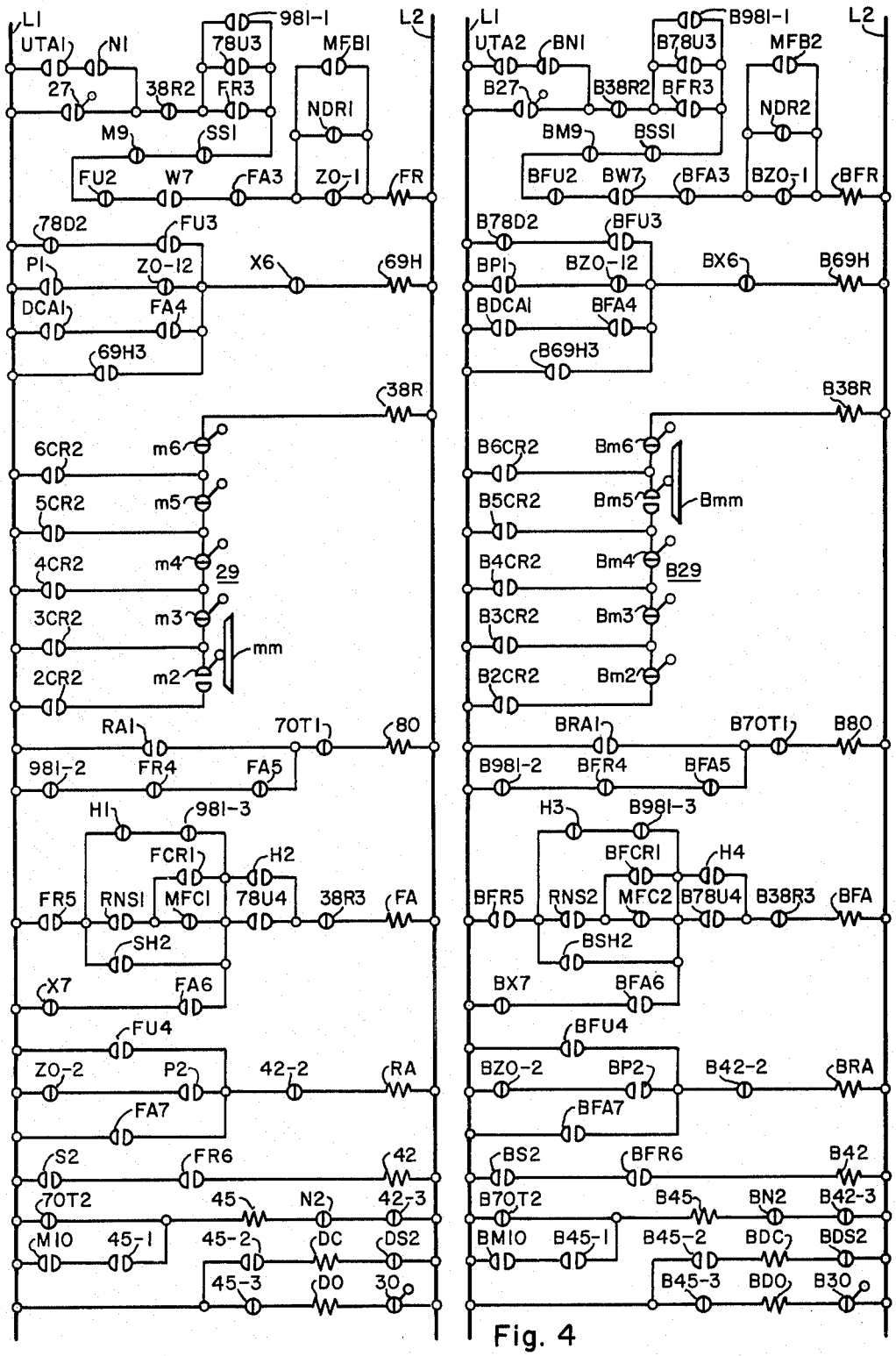

FIG. 4 illustrates circuits for the available car relay FR, the high call reversal relay 69H, the car call above relay 38R, the second auxiliary running relay 80, the down call assigned relay FA, the first auxiliary running relay RA and circuits for controlling the doors of the elevator cars.

The available car relay FR, when energized, indicates that the elevator car A is available to accept an assignment for service. Let it be assumed that the car A is stopped (break contacts M9 of the running relay M are closed) at the lower terminal or first floor (break contacts Z0–1 of the zone position relay Z0 are open), that the car A is conditioned for up travel (make contacts W7 of the up preference relay W are closed) and that the doors of the elevator car A are open. Since the doors of the car A are open, a switch 27 also is in open condition. The switch 27 is cam operated to close as the doors of the car A close when such doors are approximately four inches from their fully-closed position. Assume further that break contacts 38R2 are closed to indicate that no car call is registered for the car A, that the car A is not to be started from the first floor (break contacts SS1 are closed), that it is not assigned to answer an up floor call (break contacts FU2 are closed) and that it is not assigned to answer a down floor call (break contacts FA3 are closed).

If the preceding conditions are met, an energizing circuit is completed for the relay FR if the following conditions also are met: Make contacts UTA1 are closed to indicate that the dispatching interval has expired, and make contacts N1 are closed to indicate that the car A is the next car to be dispatched from first floor; make contacts 981–1 are closed to signify that the car A is at the first floor and is not to be started or, when the car A is not located at the first floor, make contacts 78U3 are closed to indicate that no up floor call is registered for a floor at or above which the car A is located; finally, break contacts NDR1 are closed to signify that the elevator system is not conditioned for no demand return operation and/or make contacts MFB1 are closed to indicate that at least two cars are located at the first floor but that neither is the next car to be dispatched therefrom, i.e., that another car is available for assigment at the first floor. When the available car relay FR picks up, its make contacts FR3 close to establish a holding circuit around the make contacts 981–1 and 78U3.

If in the preceding example the dispatching interval has not expired and/or the elevator car A is not the next car to be dispatched (make contacts UTA1 and/or N1, respectively, are open), the available car relay FR may be energized if the doors of the elevator car A are closed, since such closure is accompanied by closure of the cam-operated switch 27, as aforesaid.

From the preceding discussion, it will be observed that if the elevator car A is stopped at a floor other than the first floor and is conditioned for up travel, the available car relay FR may be energized to indicate that the car A is available to accept an assignment for service if the doors of the car A are closed, if no car call is registered for the car A and if no up floor call is registered for a floor above the floor at which the car A is located, as follows:

L1, 27, 38R2, 78U3, SS1, M9,
FU2, W7, FA3, Z0–1, FR, L2

For purposes which will be discussed hereinafter, the available car relay FR is provided with a slight time delay in dropout by any conventional means.

The high call reversal relay 69H, when energized, causes the elevator car A to reverse from up to the down direction of travel. In order for this relay to be energized, break contacts X6 must be closed to indicate that the car A is not conditioned for down travel. Energization of the relay 69H may be completed through one of three parallel circuit. The first of such circuits comprises break contacts 78D2, which are closed whenever the car A is located at the upper terminal or sixth floor and, if the car A is located at the third, fourth or fifth floor, when an up floor call is registered for a floor below the floor at which the car is located. This circuit also includes make contacts FU3, which are closed when the car A is assigned to answer an up floor call. Break contacts Z0–12 are closed if the car A is not located at the first floor and make contacts P1 in series therewith are closed when the car A is to travel to the first floor to park thereat. Finally, make contacts DCA1 are closed when no down floor call which the car A may answer is registered for a floor above the floor at which the car A is located, and make contacts FA4 are closed when the elevator car A is assigned to answer a down floor call. Pickup of the high call reversal relay 69H is accomplished by closure of its make contacts 69H3 to establish a holding circuit for itself through the contacts X6. Consequently, the relay remains energized until the last-named contacts open to indicate that the car A is conditioned for down travel.

In order to ascertain whether a car call exists for a floor above the position of an elevator car, a car call above circuit is provided for each of the elevator cars. For the elevator car A, the car call above circuit 29 includes make contacts of the car A car call registering relays for floors above the first floor. These contacts are connected in parallel with each other through a plurality of normally-closed switches $m2$ through $m6$ for the second through sixth floors, respectively. The switches $m2$ through $m6$ are located on the panel 15A of the floor selector 15 of FIG. 1 and are operated by a cam $mm$, which is mounted on the carriage 15C of the floor selector.

Each of the switches in the $m$ row is connected to the car call above circuit 29 in such a way that the contacts of all car call registering relays requiring travel of the elevator car A above the floor represented by a switch are located above such switch. For example, the contacts 6CR2, 5CR2, 4CR2 and 3CR2 represent car call registering relays which require travel of the car A above the second floor. Consequently, these contacts all are located in the car call above circuit 29 above the switch $m2$.

As long as a car call is registered which requires travel of the elevator car A above its position, the make contacts associated therewith in the car call above circuit 29 are closed to energize the car call above relay 38R. To illustrate, assume that the car A is located at the third floor and that a car call for the car A is registered for the fifth floor. This establishes the following energizing circuit for the relay 38R:

L1, 5CR2, $m5$, $m6$, 38R, L2

It will be observed that when the car A is located at the third floor and the cam $mm$ is in engagement with the operating member of the switch $m3$ to open the switch, the registration of a car call for the second floor can have no effect on energization of the relay 38R for the reason that the open switch $m3$ is above the contacts 2CR2. No contacts for the first floor car call registering relays and no cam-operated switches for the first floor are provided in the car call above circuit of FIG. 4, inasmuch as the elevator cars do not travel below the first floor in the illustrated embodiment of the invention.

The cam $mm$ is proportioned to bridge the switches in the $m$ row for the floor at which the car A is located and for the next succeeding floor to be approached by the car A during notching of the selector carriage for the car. Such bridging prevents energization of the relay 38R during notching of the selector carriage, in response to the registration of a car call for a floor below the floor at which the car is located. When the selector carriage is not notching, the cam $mm$ is in engagement with only one of the switches in the $m$ row.

The second auxiliary running relay 80, when energized, causes the elevator car A to run. This relay can be energized only if the break contacts 70T1 are closed to indicate that the non-interference relay 70T has timed out. If the car A is at the first floor and is to be started or if the car is not at the first floor, break contacts 981–2 are closed. If the car is not available for assignment, break contacts FR4 are closed. Finally, if the car A is not assigned to answer a registered down floor call, break contacts FA5 are closed. As long as the foregoing conditions are met and break contacts 70T1 are also closed, the second auxiliary running relay 80 remains energized and picked up. When the car A becomes available for assignment, break contacts FR4 open to drop out the relay 80. As a result, the car will remain at the floor at which it made its last stop while traveling in the up direction. Once the car A is assigned to answer a registered up or down floor call or is conditioned to travel to the lower terminal floor to park, make contacts RA1 close to energize the second auxiliary running relay 80 through the contacts 70T1.

The down call assigned relay FA, when energized, primarily indicates that the car A is assigned to answer a down floor call. In order for this relay to be energized initially, make contacts FR5 must be closed to signify that the elevator car A is available for assignment for service. Energization of the relay FA may be completed through any one of several paths. For example, if the car A is assigned to run to the highest floor for which a down floor call is registered, if the car A is the only elevator car available for assignment, if no up floor call is registered for a floor above the floor at which the car A is located and if no car call is registered for the car A for a floor above the floor at which the car is located, the following energizing circuit is completed:

L1, FR5, RNS1, MFC1, 78U4, 38R3, FA, L2

If at least two elevator cars are available for assignment, break contacts MFC1 are open. However, if the car A is selected to respond to a demand for service, make contacts FCR1 paralleling the contacts MFC1 are closed. Should the elevator car A be assigned to run to a specific down zone of floors, the down call assigned relay FA may be energized through make contacts SH2 (make contacts RNS1 then are open). If fewer than two elevator car motor-generator sets are running, break contacts H1 of the motor-generator running relay H are closed; and if the elevator car A is at the first floor and is to be started or the car A is not located at the first floor, break contacts 9S1–3 are closed, and the relay FA under these conditions may be energized through the contacts H1 and 9S1–3. If two or more elevator car motor-generator sets are running, break contacts H1 are open and make contacts H2 are closed. Thus, under these conditions the relay FA may be picked up through the last-named contacts, although an up floor call is registered for a floor above the location of the car A (make contacts 78U4 are open).

Upon energization, the down call assigned relay FA closes its make contacts FA6 to complete a holding circuit for the relay through break contacts X7 of the down preference relay X. Consequently, the relay FA may remain energized through its holding circuit until the contacts X7 open to indicate that the elevator car A is conditioned for down travel.

The first auxiliary running relay RA can be energized only if break contacts 42–2 of the auxiliary door control relay for the elevator car A are closed. An energizing circuit for this relay is completed if the car A is assigned to answer a registered up floor call (make contacts FU4 are closed) or a registered down floor call (make contacts FA7 are closed). Furthermore, the relay RA may be energized if the elevator car A is not located at the first floor (break contacts Z0–2 are closed) and if the car A is to travel to such floor to park thereat (make contacts P2 are closed). The relay RA is provided with a slight time delay in pickup by any conventional means for reasons which will be discussed hereinafter.

Although the doors of the elevator cars may be of the manually-opened, spring-closed type, they are preferably of conventional power-operated design. The lower portion of FIG. 4 illustrates door control circuits for the elevator cars.

In order for the auxiliary door control relay 42 to be energized, make contacts FR6 must be closed to indicate that the car A is available for assignment, and make contacts S2 of the elevator car A floor call stopping relay also must be closed.

The doors for the car A are controlled by a door-control relay 45. For this relay initially to be energized, break contacts N2 must be closed to indicate that the elevator car is not the next car to be dispatched from the lower terminal or first floor. In addition, break contacts 42–3 must be closed to signify that the auxiliary door control relay 42 is deenergized and dropped out. Finally, break contacts 70T2 must be closed to indicate that the non-interference time has expired. When the relay 45 picks up, it closes its make contacts 45–1 partially to complete a holding circuit for the relay through make contacts M10 of the running relay.

The door-control relay 45 controls energization of the door-close solenoid DC and the door-open solenoid DO. If the contacts 45–2 of the door-control relay are closed and break contacts DS2 are closed, the solenoid DC is energized. The contacts DS2 are closed when the door of the elevator car A or an associated hoistway door is away from its closed position.

If the door control relay 45 is dropped out, its break contacts 45–3 are closed to complete with a switch 30 an energizing circuit for the door-open solenoid DO. The switch 30 is a limit switch which is normally closed and which is opened as the door reaches its fully-open position.

Additional door operating components are illustrated in FIGS. 13 and 14, which will be discussed hereinafter.

Figure 5:
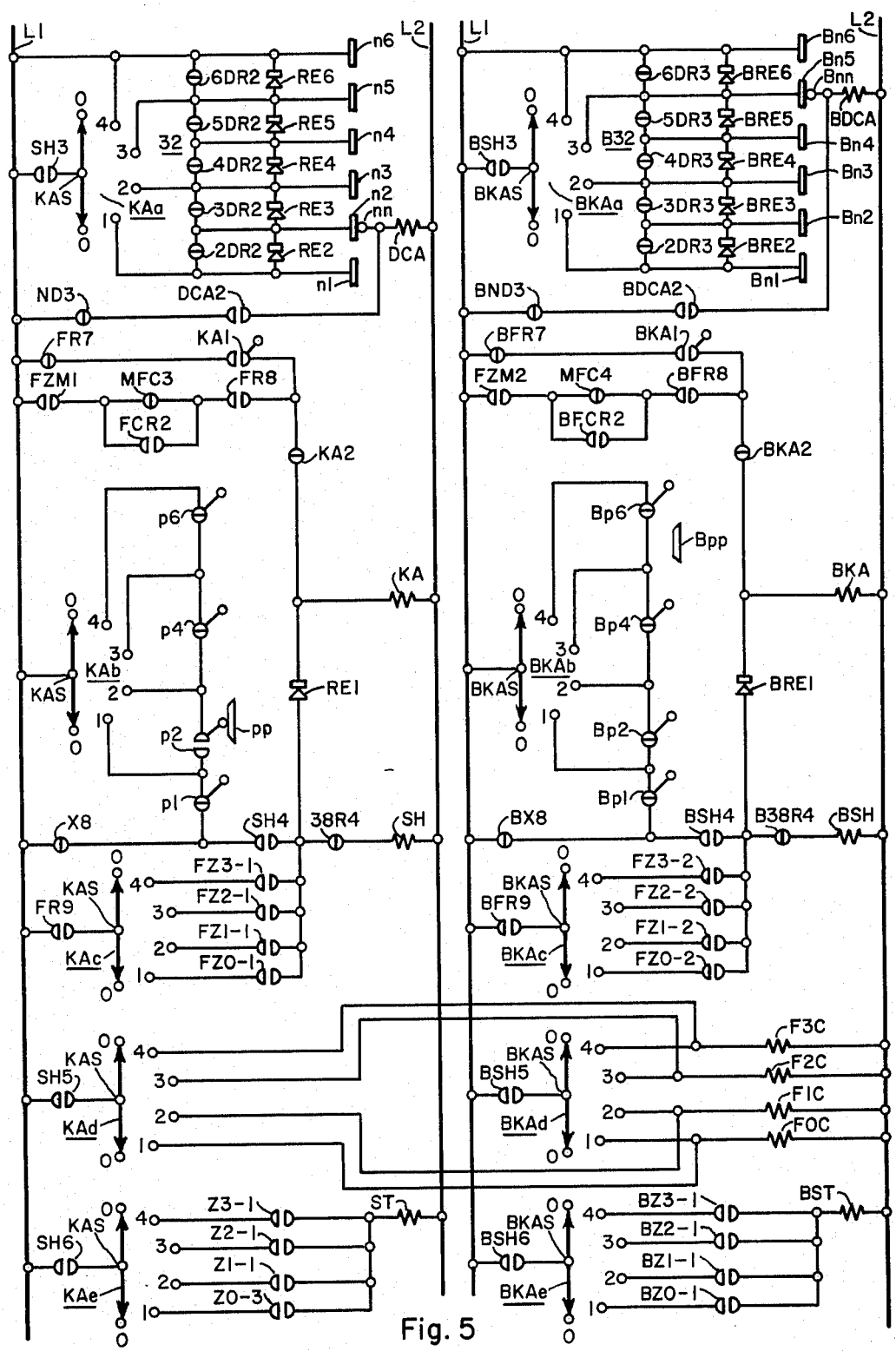

*Figure 5*

FIG. 5 illustrates circuits associated with the assigned zone stepping switch KA. This switch indicates the down zone of floors, if any, to which the elevator car A is assigned for service.

The stepping switch KA comprises five levels, KA$a$, KA$b$, KA$c$, KA$d$ and KA$e$. Each of these levels, in turn, includes a semi-circular row of contacts, which are engaged by two brushes, the brushes being displaced from each other by 180° about a common shaft KAS. The brushes of each level are suitably insulated from the brushes of each of the remaining levels.

In FIG. 5, the brushes associated with the stepping switch KA are illustrated in their homing position, in which they engage blank contacts (numbered 0). The remaining four positions or contacts associated with each of the brushes are numbered 1 through 4, respectively. The stepping switch KA is provided with a set of homing contacts KA1. These contacts are cam operated by the stepping switch to open when the brushes associated with the switch are in their homing position. When the brushes are in any position other than their homing position, the contacts KA1 are closed.

In order to step the shaft KAS, the stepping switch KA is provided with a set of self-stepping break contacts KA2. For initial energization of the coil of the switch KA, the contacts KA2 must be closed, and certain other conditions, to be discussed below, must be met. Upon energization of the coil of the switch KA through its contacts KA2, these contacts open, and if no other energizing circuit is completed for the coil, the brushes of the switch step rapidly in a counterclockwise direction, as viewed in FIG. 5. As long as the coil of the switch remains energized, however, the brushes cannot step, and they remain in a fixed position. Such stepping switches are well known in the art.

In order to ascertain whether a down floor call is registered for a floor above the position of an elevator car, a down floor call above circuit is provided for each of the elevator cars. For the car A, the down floor call above circuit 32 includes break contacts of the down floor call registering relays for the second through sixth floors arranged in the order of the floors. This circuit may be traced as follows:

L1, 6DR2, 5DR2, 4DR2, 3DR2, 2DR2

Associated with the down floor call above circuit 32 is a row of contact segments $n1$ through $n6$, which are engaged successively by a brush $nn$ as the elevator car A moves from the first to the sixth floor, respectively. These contact segments and their associated brush are incorporated in the floor selector 15 of FIG. 1 in a manner which will be understood from the preceding discussion.

Each of the contact segments in the $n$ row is connected to the down floor call above circuit 32 in such a way that the break contacts of all down floor call registering relays requiring travel of the car A below the floor represented by a contact segment are located below such contact segment. Thus, the contact segment $n5$ is connected to the down floor call above circuit between break contacts 6DR2 and 5DR2. The contact segment $n4$ is connected between break contacts 5DR2 and 4DR2. The respective locations of the remaining contact segments similarly may be ascertained by reference to FIG. 5. It will be noted that the contact segment $n6$ is connected directly to the bus L1, since the sixth floor is the upper terminal floor in the present elevator system. It also will be observed that the down call above relay DCA is connected between the brush nn and the bus L2. When the relay DCA picks up, it closes its make contacts DCA2 to establish a holding circuit for the relay, provided break contacts ND3 are closed. The contacts ND3 are closed during notching of the floor selector carriage for the elevator car A and are open when the carriage is not notching. Thus, if the relay DCA is picked up, it is maintained energized through its holding circuit during notching of the car A selector carriage by means of the contacts ND3.

Assuming that make contacts SH3 of the down zone assigned relay SH are open, it will be apparent from the preceding discussion that as long as no down floor call is registered for a floor above the position of the elevator car A, the down call above relay DCA will be energized and picked up; and the holding circuit for this relay maintains such energization during notching of the car A floor selector carriage. In addition, the relay DCA is energized whenever the elevator car A floor selector carriage is located in its sixth-floor position. (The operation of the a level of the stepping switch KA in the circuit of relay DCA will be discussed below.)

In order to illustrate operation of the assigned zone stepping switch KA, it will be assumed that the brushes of the stepping switch are in their homing position, as is shown in FIG. 5, that a down floor call is registered for the fourth floor (break contacts 4DR2 are open) and that the elevator car A is stopped at the second floor (the brush nn is in engagement with the contact segment n2 and make contacts Z1–1 are closed). In addition, it will be assumed that make contacts FZ2–1 are closed to indicate that the elevator car to be assigned to answer the aforesaid down floor call for the fourth floor will be assigned to the second down zone and that make contacts FZM1 are closed to to indicate that the master zone relay FZM has determined the zone to which the assigned elevator car shall proceed. Furthermore, it will be assumed that the elevator car A is available for assignment (break contacts FR7 are open and make contacts FR8 and FR9 are closed) and that the car A is the only car available for assignment (break contacts MFC3 are closed) or that, if more than one car is available for assignment (contacts MFC3 are open), the car A has been selected to respond to the demand for service (make contacts FCR3 are closed). Under these conditions the following energizing circuit is established for the coil of the stepping switch KA:

L1, FZM1, MFC3 or FCR2, FR8, KA2, KA, L2

(It will be observed that a blocking rectifier RE1 prevents energization of the down zone assigned relay SH at this time, since it is assumed that the bus L1 is positive and the bus L2 is negative.)

Upon energization of its coil, the assigned zone stepping switch KA opens its self-stepping break contacts KA2. This results in deenergization of the switch coil, and consequently the brushes associated therewith step in a counterclockwise direction away from their homing position to their first position. In so doing, the cam-operated homing contacts KA1 close, but such closure has no effect on operation, since the contacts FR7 in series therewith are open under the assumed conditions. It will be observed that the stepping of the brushes to their first position also has no immediate effect on operation for the reason that under the assumed conditions no energizing circuit is completed for the remaining relays illustrated in FIG. 5. Upon deenergization of the coil of the stepping switch, its break contacts KA2 once again close to reenergize the coil. As a result, the brushes of the stepping switch step rapidly to their next or second position, without further effect on operation.

By the same sequence, the brushes next step to their third position. In so doing, the level KAc effects completion of the following energizing circuit for the coil of the stepping switch:

L1, FR9, FZ2–1, RE1, KA, L2

Thus, the coil of the stepping switch KA now is energized continuously, and its break contacts KA2 are open. As a result, the stepping action of the brushes ceases, and the brushes remain in their third position.

It will be observed that at this time an energizing circuit simultaneously is completed for the down zone assigned relay SH through break contacts 38R4 to indicate that the elevator car A has been assigned to a particular down zone. (Since under the assumed conditions the car A is available for assignment, the contacts 38R4 must be closed.) Closure of make contacts SH3 upon pickup of the relay SH has no immediate effect on operation for the reason that break contacts 4DR2 are open, as aforesaid. Closure of make contacts SH4 establishes a holding circuit for the relay SH through break contacts X8 and 38R4. (In order for the elevator car A to be available for assignment, the car must be conditioned for up travel, and the down preference relay X consequently must be dropped out to close its break contacts X8.) It will be observed that the contacts X8 and SH4 also provide a parallel energizing circuit for the coil of the stepping switch KA through the rectifier RE1.

The relay SH also closes its make contacts SH5 to energize and pick up the assigned zone relay F2C through the d level of the switch KA. It will be noted that the assigned zone relays F0C through F3C also are controlled by the d level of the assigned zone stepping switch BKA for the elevator car B. It will be understood that the assigned zone relays similarly are controlled by the d level of the assigned zone stepping switch for the elevator car C (not shown). Pickup of the assigned zone relay F2C prevents any elevator car other than the car A from being assigned to or stopping in the selected zone or the zone of assignment, in this case the second down zone. Pickup of the relay F2C also effects the opening of make contacts FZ2–1 as will be discussed hereinafter, but such opening has no immediate effect on operation for the reason that the down zone assigned relay SH and the assigned zone stepping switch KA are maintained energized through the holding circuit described above.

Finally, the relay SH closes its make contacts SH6, but such closure has no immediate effect on operation, since, under the assumed conditions, the elevator car A is located at the second floor or in the first down zone, and make contacts Z1–1 thus are closed, while make contacts Z2–2 are open to prevent energization of the assigned zone stopping relay ST at this time.

Since the elevator car A has received an assignment for service, it is no longer an available car. Consequently, the available car relay FR drops out, but closure of its break contacts FR7 and opening of its make contacts FR8 and FR9 have no immediate effect on operation. As will be discussed hereinafter, the elevator car A next proceeds to travel up to the assigned or second down zone. When the carriage of the car A floor selector notches to its fourth-floor position, make contacts Z2–1 close to energize the assigned zone stopping relay ST through make contacts SH6 and the e level of the stepping switch KA. However, pickup of the relay ST has no effect when the car is traveling in the up direction. Such carriage notching also results in engagement of the contact segment n4 by the brush nn to establish an energizing circuit for the down call above relay DCA, since the open break contacts 4DR2 now are located below the brush nn. This circuit may be traced as follows:

L1, 6DR2, 5DR2, n4, nn, DCA, L2

Pickup of the relay DCA indicates that no down floor call is registered for a floor above the floor corresponding to the position of the elevator car A floor selector carriage. Such pickup effects a stopping operation of the car A at the fourth floor. The down call above relay also closes its make contacts DCA2, but this has no immediate effect on operation, inasmuch as break contacts ND2 in the holding circuit of the relay are open when floor selector carriage of the elevator car A is not notching.

By inspection of FIG. 5, it will be observed that the *b* level of the assigned zone stepping switch KA is associated with a plurality of series-connected switches *p*1, *p*2, *p*4 and *p*6. These normally-closed switches are located on the floor selector panel for the elevator car A and are operated by a cam *pp* located on the carriage of the selector to open when the carriage notches to its first, second, fourth and sixth-floor positions respectively. It will be apparent, however, that as long as the elevator car A is not conditioned for down travel (break contacts X8 are closed) the opening and closing of these cam-operated switches have no immediate effect on operation, but when the car A is conditioned for down travel (the contacts X8 are open), the series-connected switches *p*1, *p*2, *p*4 and *p*6 form an active part of the holding circuits for the down zone assigned relay SH and the assigned zone stepping switch KA through the contacts SH4 and the brushes and contacts associated with the *b* level of the switch KA.

Inasmuch as the elevator car A has arrived at the fourth floor in the second down zone while traveling in the up direction in response to a registered down floor call, the car subsequently must run from the fourth floor in the down direction. Consequently, the down preference relay X picks up to condition the car for down travel and to open break contacts X8. It will be noted that at this time the cam *pp* is in engagement with the switch *p*4 to open the switch. Consequently, the holding circuits for the relay SH and the stepping switch KA are interrupted. (It will be apparent from the foregoing description that the purpose of the switches *p*1, *p*2, *p*4 and *p*6 is to maintain the relay SH and the coil of the stepping switch KA energized until carriage of the floor selector for the elevator car A notches to its position corresponding to the lower floor of the down zone to which the car is assigned when the car is located above such floor. For example, if the car A is located at the sixth floor (the switch *p*6 is open), is assigned to answer a down floor call for the fourth floor and is conditioned for down travel (break contacts X8 are open), the following holding circuit is completed for the relay SH:

L1, *p*4, *p*2, *p*1, SH4, 38R4, SH, L2

When the carriage of the selector for the car A notches to its fourth floor position, the switch *p*4 opens to interrupt this holding circuit.)

Deenergization and dropout of the relay SH upon interruption of its holding circuit is accompanied by the opening of its make contacts SH3 and SH4 without immediate effect on operation. Opening of the make contacts SH5 results in dropout of the assigned zone relay F2C, while opening of the make contacts SH6 effects dropout of the assigned zone stopping relay ST.

Deenergization of the coil of the assigned stepping switch KA upon interruption of its holding circuit results in a stepping operation of the brushes associated therewith to their fourth position without immediate effect on operation. Such deenergization, however, is accompanied by the closure of break contacts KA2 to establish a circuit which reenergizes the stepping switch as follows:

L1, FR7, KA1, KA2, KA, L2

It will be apparent from the preceding discussion that as a result of such reenergization the brushes of the stepping switch step to their homing position. When the brushes arrive at such position, the cam-operated contacts KA1 are opened to prevent further stepping action of the switch. (It will be recalled that the elevator car A no longer is available for assignment and that make contacts FR8 consequently are open.) Consequently, the brushes remain in their homing position.

It will be noted that make contacts 2DR2 through 6DR2 in the down floor call above circuit 32 for the elevator car A are paralleled by rectifiers RE2 through RE6, respectively. When the elevator car A is assigned to a floor which is below the position of the car, the down call above relay DCA must be energized and picked up to effect down travel of the car A to the assigned floor even though a down floor call may be registered for a floor above the position of the car. The rectifiers RE2 through RE6 provide means for energizing the relay DCA under these conditions. For example, assume that the elevator car A is located at the fourth floor, that down floor calls are registered for the fifth, fourth and third floors (break contacts 5DR2, 4DR2 and 3DR2, respectively, are open) and that the car A is assigned to serve the first down zone floor (the brushes of the assigned zone stepping switch KA are in their second position). Under these conditions, the down call above relay DCA must be energized and picked up. It will be apparent, however, that an energizing path for this relay cannot be established through the break contacts of the down floor call registering relays associated with the relay DCA, but that the rectifier RE4 provides the following energizing circuit:

L1, SH3, RE4, *n*4, *nn*, DCA, L2

As a result of the energization and pickup of the down call above relay DCA, the elevator car A runs from the fourth floor in the down direction. When the carriage of the car A floor selector notches to its third floor position, make contacts Z1–1 close to energize the assigned zone stopping relay ST through make contacts SH6 and the *e* level of the stepping switch KA to effect a stopping operation of the car A at the third floor in the first down zone in response to the registered down floor call for the third floor.

FIGURE 6

The parking relay P, when energized, indicates that the elevator car A is to park at the lower terminal or first floor. In order for this relay to be energized initially, make contacts FR10 must be closed to indicate that the car A is available for assignment, break contacts FA8 and FU5 must be closed to signify that the car A is not assigned to answer down floor calls or up floor calls, respectively, and the motor-generator set for the elevator car A must not be shut down (break contacts 139–2 are closed). Finally, make contacts MG1 also must be closed to indicate that at least one elevator car in the system is continuously available for assignment for a predetermined time. When the parking relay P picks up, it closes its make contacts P3 to establish a holding circuit for itself around the contacts MG1 and FR10 through the contacts 139–2, FA8 and FU5. The parking relay P remains energized until the motor-generator set for the car A is shut down (break contacts 139–2 open).

Energization of the motor-generator shutdown relay 139 effects shutdown of the motor-generator set for the elevator car A. In order for this relay to be energized, the car A must be located at the lower terminal or first floor (make contacts Z0–4 are closed), make contacts P4 must be closed to indicate that the car A is to park at the first floor and break contacts M11 must be closed to indicate that the car A is not running. Pickup of the relay 139 is accompanied by closure of its make contacts 139–3 to establish a self-holding circuit. Consequently, this relay is maintained energized until the elevator car A is selected as the next car to be dispatched from the first floor (break contacts N3 are open) and the elevator system is conditioned either for instant dispatch operation (break contacts PD1 are open) or for no demand return operation (break contacts NDR3 are open). If the elevator car A is to be started from the first floor, break contacts SS2 open to interrupt the holding circuit for the motor-generator shutdown relay 139. Finally, if the car A is assigned to answer a registered down floor call or a registered up floor call, break contacts FA9 or FU6, respectively, open to interrupt the holding circuit for the relay 139. Dropout of the relay 139 effects the starting of the motor-generator set for the elevator car A.

The start relay SS, when picked up, indicates that the elevator car A is to be started from the lower terminal or first floor. In order for this relay to be energized, make contacts Z0-5 must be closed to signify that the car A is located at the first floor. If the elevator car A is the next car to be dispatched, if the dispatching interval has expired, if the non-interference time for the car A has expired and if a car call is registered for the car A for a floor above the first floor, the following energizing circuit is established:

L1, N4, UTA3, 70T3, 38R5, Z0-5, SS, L2

If the car A is fully loaded, make contacts LW2 of the load switch LW are closed. Under this condition, the relay SS may be energized regardless of whether or not make contacts N4 are closed to indicate that the car A is the next car to be dispatched and make contacts UTA3 are closed to signify that the dispatching interval has expired. The remaining contacts in the circuit of the start relay SS are effective for energizing the relay only when fewer than two elevator car motor-generator sets are running (break contacts H5 are closed), all elevator cars are located at the first floor and/or a demand for down service is registered (break contacts 982-1 are closed) and an up or down floor call is registered for a floor above the first floor (break contacts 78U5 or DCA3, respectively, are closed).

When the start relay SS picks up, its make contacts SS3 close to establish a holding circuit for the relay through make contacts Z0-5. Consequently, the relay remains picked up until the contacts Z0-5 open to indicate that the car A has moved away from the first floor.

In order to ascertain whether an up floor call is registered for an intermediate floor below the position of an elevator car when such car is located at an intermediate floor, an up floor call below circuit is provided for each of the elevator cars. Thus, in the illustrated embodiment of the invention, these circuits include in common serially-connected break contacts 2UR4, 3UR4 and 4UR4 of the respective up floor call registering relays for the second, third and fourth floors arranged in the order of such floors. For the elevator car A, associated with the up floor call below circuit is a row of contact segments $r1$ through $r5$, which are engaged successively by a brush $rr$ as the floor selector carriage for the car A notches from its first to its fifth-floor position, respectively. These contact segments and their associated brush are incorporated in the floor selector 15 of FIG. 1 in a manner which will be clear from the preceding discussion.

Each of the contact segments in the $r$ row is connected to the up floor call below circuit in such a way that the break contacts of all intermediate floor up floor call registering relays requiring travel of the elevator car A below the floor represented by a contact segment are located below such contact segment. Thus, the contact segment $r5$ is connected to the contacts 4UR4 in the up floor call below circuit. The contact segment $r4$ is connected between break contacts 4UR4 and 3UR4. The location of the remaining contact segments similarly may be ascertained by reference to FIG. 6. It will be noted that the contact segments $r1$ and $r2$ are connected directly to the bus L1, that no contact segment is provided in the $r$ row for the sixth floor and that the up call below relay 78D is connected between the brush $rr$ and the bus L2.

From the preceding description, it will be apparent that as long as the elevator car A floor selector carriage is located in its third, fourth or fifth floor position and no up floor call is registered for an intermediate floor below the floor corresponding to the position of the carriage, the up call below relay 78D will be energized and picked up. The relay 78D is always picked up when the car A selector carriage is located in its first or second-floor position. Finally, since there is no contact segment in the $r$ row for the sixth floor, the relay 78D is always dropped out when the car A selector carriage is located in its sixth-floor position.

A rectifier RE8 is provided in order to maintain the up call below relay 78D picked up when the elevator car A is located at the third floor in the low up zone (second and third floors) and the car is assigned to serve the high up zone (fourth and fifth floors) if up floor calls are registered for the third and second floors. For example, assume that the car A is located at the third floor, that break contacts 2UR4 and 3UR4 are open to indicate the registration of up floor calls for the second and third floors and that make contacts DUH1 of the high up zone demand relay or make contacts AH1 of the master high up zone assigned relay are closed. Under these conditions, the following energizing circuit is completed for the relay 78D:

L1, DUH1 or AH1, RE8, $r3$, $rr$, 78D, L2

Thus, under the above conditions, the up call below relay 78D is energized and picked up although an up floor call is registered for the floor at which and for a floor below which the car A is located. (It will be appreciated that in an elevator control system for a structure having greater than two floors in the low up zone, a rectifier similar to the rectifier RE8 will be connected in parallel with break contacts in the up floor call below circuit of each up floor call registering relay for each floor in such low up zone above the second floor. In such a case, therefore, if make contacts DUH1 or AH1 are closed and the car A is located at any floor in the low up zone, the up call below relay 78D will be energized regardless of the location of floors for which up floor calls are registered relative to the location of the car A.)

It will be observed that if make contacts DUH1 or AH1 are closed, the relay 78D is energized and picked up whenever the car A is located at the fourth floor, i.e., at the lowermost floor in the high up zone. If the contacts DUH1 and AH1 both are open, the relay 78D, when dropped out, indicates that an up floor call is registered for an intermediate floor below the position of the car A and, if the car A is assigned to answer such up floor call below, effects reversal of the direction of travel for which the car A is conditioned from the up to the down direction.

Figure 6:
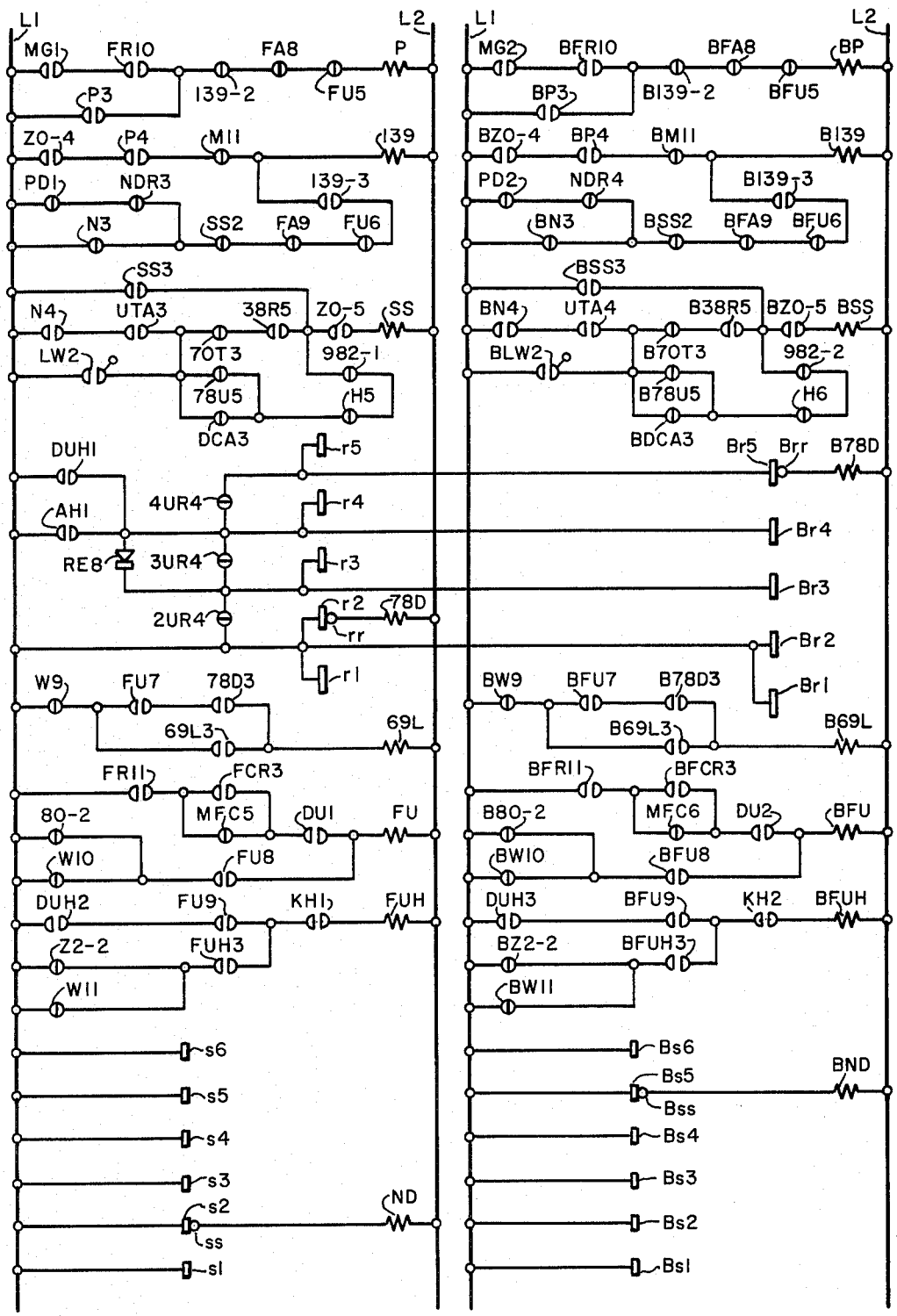

By inspection of FIG. 6, it will be observed that the contact segments in the $r$ row are connected to corresponding contact segments for the other elevator cars in the bank. For example, the segment $r5$ is connected to the contact segment B$r5$ for the elevator car B. Consequently, the up call below relays for the cars B and C operate in a manner similar to that described for the elevator car A.

The low call reversal relay 69L is energized and picked up when the elevator car A while traveling down reaches the lowest floor for which an up floor call is registered in the up zone to which the car is assigned. Thus, in order for the relay 69L to be energized, the car A must be conditioned for down travel (break contacts W9 are closed), the car must be assigned to answer up floor calls (make contacts FU7 are closed) and there must be no registered up floor call for a floor below the location of the car A in the up zone to which the car is assigned (make contacts 78D3 are closed). Pickup of the relay 69L causes the elevator car A to stop at the lowest floor for which an up floor call is registered in the up zone to which the car A is assigned. Such pickup is accompanied by closure of make contacts 69L3 to establish a holding circuit for the relay through the contacts W9. Consequently, the relay is maintained energized until the contacts W9 open to indicate that the car A is conditioned for up travel.

The up call assigned relay FU, when picked up, indicates that the elevator car A is assigned to answer a registered up floor call. In order for this relay initially to be energized, there must be a demand for up service for an intermediate floor (make contacts DU1 are closed) and the car A must be available for assignment (make contacts FR11 are closed). If the car A is the only elevator car available for assignment, break contacts MFC5 are closed. However, if more than one car is available for assignment, the contacts MFC5 are open; and if the elevator car A is selected to respond to the demand for service, make contacts FCR3 are closed. When the relay FU picks up, it closes its make contacts FU8 to establish a holding circuit therefor, provided the car A is conditioned for down travel (break contacts W10 are closed) and/or the car A has not been conditioned to run (break contacts 80-2 are closed). If the elevator car A is conditioned for up travel, the contacts W10 are open, and the holding circuit for the up call assigned relay FU is interrupted when break contacts 80-2 open to indicate that the car A is conditioned to run.

When the up call assigned relay FU picks up, it also closes its make contacts FU9 in the initial energizing circuit of the high up zone assigned relay FUH. If, in general, there is a demand for up service for the high up zone (fourth and fifth floors), make contacts DUH2 and KH1 are closed to complete the initial energizing circuit for the relay FUH. Pickup of the relay FUH indicates that the elevator car A is assigned to answer up floor calls in the high up zone. Such pickup is accompanied by closure of make contacts FUH3 to establish a holding circuit for the relay through make contacts KH1. Thus, the high up zone assigned relay FUH is maintained energized through its holding circuit until the demand for up service for the high up zone is terminated (make contacts KH1 open), or until the car A reaches the high up zone (break contacts Z2-2 open) when traveling in the up direction (break contacts W11 are open).

As has been noted heretofore, contacts of the notching relay ND are employed to prevent the loss of certain indications during notching of the carriage of the floor selector for the elevator car A. Associated with the notching relay is a row of contact segments s1 through s6, which are engaged successively by a brush ss as the carriage of the floor selector 15 (FIG. 1) for the elevator car A notches from its first to sixth-floor position, respectively. These contact segments and their associated brush are incorporated in the floor selector in a manner which will be understood from the preceding discussion.

It will be noted that each of the contact segments s1 through s6 is connected directly to the bus L1, whereas the notching relay ND is connected between the brush ss and the bus L2. Consequently, as long as the brush ss is in engagement with one of its associated contact segments, the relay ND is energized and picked up.

Each of the contact segments s1 through s6 is relatively short compared to the length of each contact segment in the circuits respectively associated with the break contacts of the notching relay ND. Thus, as the carriage of the floor selector for the elevator car A notches from one floor to the next, the brush ss leaves the contact segment associated with the former floor in the s row to drop out of the relay ND before the brushes in the circuits associated with the break contacts of the relay ND leave their respective associated contact segments for such floor. Likewise, the latter brushes engage their respective associated contact segments for the floor to which the selector carriage notches before the brush ss engages the corresponding contact segment in the s row to reenergize the relay ND. This sequence will be described in greater detail in the section entitled "Operation."

FIGURE 7

Figure 7:
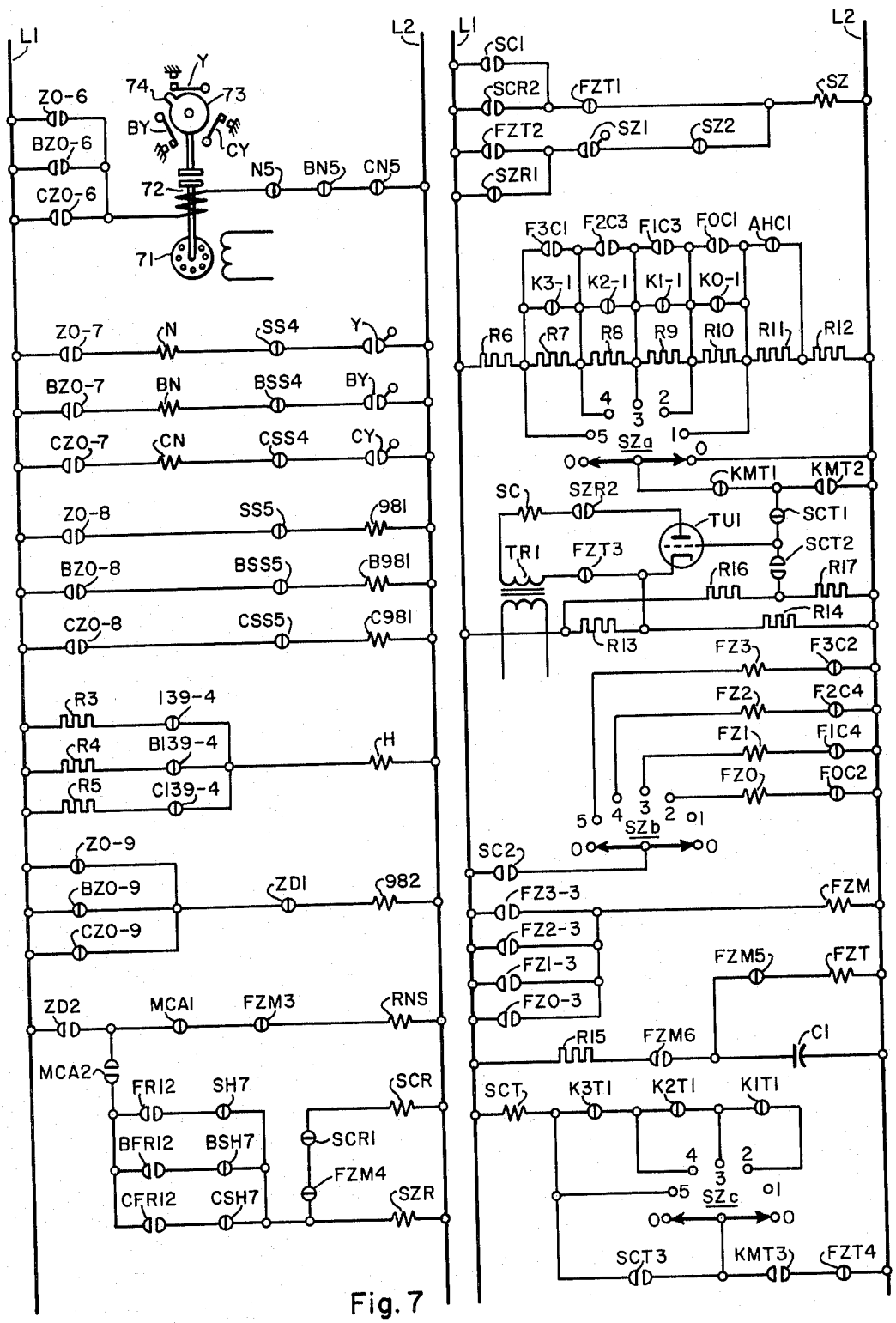

In FIG. 7, a dispatching device is illustrated which normally controls the dispatching of the elevator cars employed in the system.

The dispatching mechanism includes as one component a motor 71 which operates at substantially constant speed. This motor may be of any suitable type, but for present purposes it will be assumed that the motor is a squirrel-cage alternating current motor which is energized from a suitable source of alternating current (not shown). The motor 71 is connected through a spring-released electromagnetically-applied clutch 72 to a cam 73 having a protuberance 74 for successively operating mechanical switches Y, BY and CY, which are associated with the respective elevator cars. The electromagnetic clutch can be energized only if one or more elevator cars are located at the dispatching floor, which is assumed to be the first floor (one or more of the make contacts Z0-6, BZ0-6 and CZ0-6 are closed), and if no elevator car has been selected as the next car to leave the dispatching floor (break contacts N5, BN5, CN5 all are closed).

If the car A is at the first floor (make contacts Z0-7 are closed), if it has been selected as the next car to leave the dispatching floor (switch Y is closed) and if it is not to be started (break contacts SS4 are closed), the next car relay N for the car A is energized. This relay may be employed in a conventional way to permit loading of the elevator car A. For example, the next car relay, when energized, may operate a loading signal, such as a lamp, which indicates that passengers may enter the elevator car. In the present system, the next car relay, when energized, effects the opening of the normally-closed doors of the elevator car A to permit entry of passengers into the elevator car.

If the elevator car A is at the lower terminal or first floor (make contacts Z0-8 are closed) and if it is not to be started (break contacts SS5 are closed), the lower terminal no-start relay 981 for the elevator car A is energized. This relay controls the assignment for service of the car A from the lower teminal floor.

The motor-generator running relay H is employed for the purpose of indicating the number of elevator car motor-generator sets that are running. This relay is controlled by break contacts 139-4, B139-4 and C139-4 of the motor-generator shutdown relays 139, B139 and C139 which are associated respectively with the elevator cars A, B and C. The motor-generator running relay H is connected between the buses L1 and L2 through three parallel circuit branches, each including a separate one of the above-mentioned break contacts of the motor-generator shutdown relays and a separate one of resistors R3, R4 and R5. The parameters of the circuit are so selected that a predetermined number of the break contacts in the parallel circuit branches must be closed before the motor-generator running relay is energized sufficiently to pick up. For present purposes, it will be assumed that the motor-generator running relay H picks up when two or more of the break contacts 139-4, B139-4 and C139-4 are closed. Consequently, pickup of the motor-generator running relay indicates that two or more of the elevator car motor-generator sets are running, whereas dropout of the relay H signifies that only one or no motor-generator set is running. When the relay H is dropped out, the demand for service required to start an available car is modified.

The master lower terminal relay 982, when dropped out, causes an elevator car to be started from the lower terminal or first floor. In order for this relay to be dropped out, break contacts ZD1 must be open to indicate the existence of a down zone service demand or all of the elevator cars must be located at the first floor (break contacts Z0-9, BZ0-9 and CZ0-9 all are open). If the elevator car A, for example, is away from the first floor (break contacts Z0-9 are closed) and there is no down zone service demand (break contacts ZD1 are closed), the master lower terminal relay 982 is energized and picked up.

When a demand for down service exists, either the no scan relay RNS or the scan relay SZR will be energized, depending upon whether the master down call above relay MCA is picked up or dropped out. If the relay RNS is energized, a car selected to answer registered down floor calls must travel to the highest floor for which a down floor call is registered. If the relay SZR becomes energized, however, a sequence is begun by which an available car is assigned to a down zone in which there is a demand for down service and which is approximately the mid-point of down zone demands between the first floor and the highest unassigned elevator car conditioned for down travel or the zone in which the highest down floor call is registered, provided an elevator car has been assigned to answer the last-named call. For example, if there is a demand for down service, make contacts ZD2 are closed. If a down floor call is registered for a floor above the location of the highest unassigned elevator car conditioned for down travel, the master down call above relay MCA is dropped out and its break contacts MCA1 consequently are closed, while its make contacts MCA2 are open. Additionally, under these conditions, break contacts FZM3 of the master zone relay FZM are closed. As a result, the no scan relay RNS is energized and picked up to indicate that a car selected to answer registered down floor calls must travel to the highest floor for which such a call is registered.

On the other hand, if there is a demand for down service (make contacts ZD2 are closed) but no such demand for a floor above the highest unassigned elevator car conditioned for down travel or if a down floor call has been registered continuously for at least a predetermined time, break contacts MCA1 are open, while make contacts MCA2 are closed. Assuming that the elevator car A is available for assignment (make contacts FR12 are closed) and is not assigned to serve a particular down zone (break contacts SH7 are closed), the scan relay SZR is energized and picked up. In addition, if at this time break contacts FZM4 of the master zone relay FZM are closed, the pulsing relay SCR is energized through its break contacts SCR1. The contacts SCR1 are self-interrupting contacts, since, when the relay SCR picks up, these contacts open to interrupt the energizing circuit for the pulsing relay. Upon dropout of the pulsing relay, the break contacts SCR1 once again close to reenergize the pulsing relay. The relay SCR continues to cycle in the foregoing manner until break contacts FZM4 open, at which time the energizing circuit for the pulsing relay is interrupted continuously. Preferably, the pulsing relay SCR is provided with a slight time delay in dropout by any conventional means in order that this relay may pulse at a relatively slow rate.

The down demand mid-point stepping switch SZ is similar in construction and operation to the assigned zone stepping switch KA, which has been described in detail in the discussion of FIG. 5. The stepping switch SZ has homing contacts SZ1, self-stepping break contacts SZ2 and three levels SZa, SZb and SZc. Each level, in turn, has a semi-circular row of contacts comprising a pair of homing contacts (numbered 0) and five additional contacts (numbered 1 through 5, respectively) through which its associated brushes may step in sequence.

The stepping switch SZ is employed to select the mid-point of down zone demands for service. In order to illustrate the operation of this switch, let it be assumed that the elevator car A is located at the first floor and is available for assignment, that the car B is traveling up and is not assigned to answer a down floor call, that the car C is traveling down from the sixth floor, that break contacts K1–1 are open to indicate the registration of a demand for down service for the first down zone (second and third floors) and that break contacts K2–1 are open to signify the registration of a demand for down service for the second down zone (fourth and fifth floors). It will be assumed further that the down zone priority relay KMT is dropped out to open its make contacts KMT3 in order to prevent energization of the firing relay SCT. Finally, assume that the brushes of the three levels of the down demand mid-point stepping switch SZ are in their homing position, as is illustrated in FIG. 7.

Under the assumed conditions, make contacts ZD2 of the down zone demand relay are closed, and the master down call above relay MCA is picked up to open its break contacts MCA1 and to close its make contacts MCA2 to indicate that there is no demand for down service for a floor above the highest unassigned elevator car conditioned for down travel. This results in the establishment of the following energizing circuit for the scan relay SZR:

L1, ZD2, MCA2, FR12, SH7, SZR, L2

Opening of break contacts SZR1 upon pickup of the relay SZR prevents the subsequent self-stepping of the stepping switch SZ. Closure of make contacts SZR2 partially completes an energizing circuit for the down demand mid-point relay SC.

It will be observed that the energizing circuit for the relay SC includes an electronic tube TU1, the conduction of current by which, in turn, is controlled by a bridge circuit. This tube may be of the cold-cathode type or of the high-vacuum, hot-cathode type. However, for present purposes it will be assumed that the tube TU1 is a gaseous-discharge tube of the hot-cathode type commonly known as a thyratron.

The tube TU1 has a control electrode, which is connected to the junction of break contacts SCT1 and make contacts SCT2 of the firing relay SCT. Under the assumed conditions, the control electrode of the tube TU1 is connected through break contacts SCT1 and KMT1 to the brushes of the level SZa of the stepping switch SZ. Thus, when these brushes are in their homing position, the control electrode is biased negatively by virtue of its direct connection of the bus L2, and conduction of current by the tube consequently is prevented. It will be noted that the remaining contacts of the level SZa are connected to various points of a voltage divider comprising serially-connected resistors R6 through R12, which are connected directly across the buses L1 and L2. These resistors all are of equal resistance, a typical value being ten thousand ohms.

The tube TU1 also has a cathode electrode, which is connected to the junction of two resistors R13 and R14, which likewise form a voltage divider across the buses L1 and L2. The resistors R13 and R14 also are of equal value, and each may have a resistance of ten thousand ohms. In addition, the tube TU1 includes an anode electrode, which is connected to make contacts SZR2 in the energizing circuit of the down demand mid-point relay SC. This circuit also includes break contacts FZT3 of the zone resetting relay FZT and the secondary winding of a transformer TR1. The primary winding of this transformer is connected to any suitable alternating current source of energy (not shown). It will be assumed that the tube TU1 conducts current or fires when zero or a positive bias is applied to its control grid electrode.

Under the assumed conditions, the pulsing relay SCR pulses through break contacts FZM4 and SCR1. On the first pulse of the relay SCR, its make contacts SCR2 close to energize the coil of the down demand mid-point stepping switch SZ through break contacts FZT1. When break contacts SCR1 open upon energization of the relay SCR, the relay SCR drops out to open its make contacts SCR2, which, in turn, deenergize the coil of the stepping switch SZ. This results in the stepping of the brushes of all levels of the switch SZ to their first position, and the control electrode of the tube TU1 now is connected to the junction of the resistors R10 and R11 through the $a$ level of the stepping switch. Such stepping to the first position, however, has no effect on operation, since under the assumed conditions break contacts AHC1 are closed to shunt the resistor R11, inasmuch as no elevator car is assigned at this time to run to the highest floor for which a down floor call is registered, i.e., although the resistor R12 now is interposed between the control electrode and the bus L2, the control electrode still is biased negatively to prevent the firing of the tube TU1 (it will be recalled that under the assumed conditions break contacts K1–1 and K2–1 both are open). Consequently, the brushes of the stepping switch SZ continue to step in a counterclockwise direction, as viewed in FIG. 7, in unison with the pulsing of the pulsing relay SCR.

The stepping of the brushes of the level SZa to their second position also has no effect on operation, since under the assumed conditions break contacts K0–1 are closed to shunt the resistor R10. When these brushes step from their second to their third position, however, the bias applied to the control electrode of the tube TU1 decreases to zero, since in the third position the cathode electrode and the control electrode both are at the same potential with respect to the buses L1 and L2. This follows from the fact that the control electrode now is connected to the mid-point of the effective resistance in the voltage divider comprising the resistors R6, R8, R9 and R12, i.e., the bridge circuit is balanced. Consequently, the TU1 now fires or conducts current during those half cycles of the secondary winding voltage of the transformer TR1 when its anode electrode is positive with respect to its cathode electrode. As a result, the down demand mid-point relay SC is energized. If desired, a suitably-poled rectifier (not shown) may be connected across the coil of the relay SC in order to maintain the conduction of curent therethrough during those half cycles of the secondary winding voltage of the transformer TR1 when the anode electrode of the tube TU1 is negative with respect to the cathode electrode thereof.

Upon pickup, the relay SC closes its make contacts SC1 to energize the coil of the stepping switch SZ continuously through break contacts FZT1. Such energization prevents the further stepping of the brushes of the stepping switch SZ. It will be noted that the stepping switch ceased stepping when the brush of its level SZa reached the "mid-point" of the down zone service demands, which are represented by the open break contacts K1–1 and K2–1.

Closure of make contacts SC2 upon pickup of the relay SC establishes the following energizing circuit through the level SZb:

L1, SC2, FZ1, F1C4, L2

Pickup of the zone relay FZ1 indicates that the elevator car to be selected to respond to the demand for down service should proceed to the first down zone, comprising the second and third floors. Such pickup is accompanied by closure of make contacts FZ1–3 to energize the master zone relay FZM.

Opening of break contacts FZM3 has no immediate effect on operation. Break contacts FZM4 open to interrupt continuously the energizing circuit of the pulsing relay SCR to prevent further pulsing thereof. Break contacts FZM5 open to prevent energization therethrough of the zone resetting relay FZT, while make contacts FZM6 close to charge a capacitor C1 through a charging resistor R15, which limits the magnitude of capacitor charging current.

By a sequence which will be discussed hereinafter, the elevator car A, which, under the assumed conditions, is available for assignment at the first floor, is selected to run to the first down zone. When such selection is made, make contacts F1C3 close to shunt the resistor R9. Consequently, a negative bias once again is applied to the control electrode of the tube TU1 to deenergize and drop out the down demand mid-point relay SC. Thus, make contacts SC1 open to deenergize the coil of the stepping switch SZ, while make contacts SC2 open to disconnect the brushes of the level SZb from the bus L1.

Selection of the elevator A to run to the first down zone also is accompanied by the opening of break contacts F1C4 to deenergize the zone relay FZ1. Upon dropout of this relay, its make contacts FZ1–3 open to deenergize and drop out the master zone relay FZM. Closure of break contacts FZM3 has no immediate effect on operation. Closure of make contacts FZM4 also has no effect on operation, since make contacts FR12 in the energizing circuit of the pulsing relay SCR opened when the elevator car A was assigned for service. Opening of make contacts FZM6 interrupts the charging circuit for the capacitor C1, but break contacts FZM5 close to discharge the capacitor C1 through the zone resetting relay FZT to energize and pick up the relay FZT for a relatively short time.

Upon pickup, the zone resetting relay FZT opens its break contacts FZT1, FZT3 and FZT 4 without immediately affecting operation. Recalling that the homing contacts SZ1 are closed when the brushes of the stepping switch SZ are away from their homing position, closure of make contacts FZT2 establishes the following energizing circuit:

L1, FZT2, SZ1, SZ2, SZ, L2

(Since under the assumed conditions the elevator car A was the only car available for assignment, the scan relay SZR dropped out to close its break contacts SZR1 paralleling the contacts FZT2 when the car A was assigned to run to the second down zone and the contacts FR12 opened. It will be observed, however, that if the car B or C also were available for assignment, the relay SZR might remain picked up through make contacts BFR12 or CFR12, respectively, after the selection of the car A, preventing closure of the contacts SZR1 to energize the coil of the stepping switch SZ.) Consequently, the brushes of the down demand mid-point stepping switch SZ rapidly step in a counterclockwise direction, until they reach their homing position, by a sequence which will be clear from the preceding discussion. In such position, the homing contacts SZ1 are opened to prevent further self-stepping of the switch SZ. In addition, it will be observed that in such position a negative bias once again is applied to the control electrode of the tube TU1 from the bus L2 through the level SZa of the stepping switch.

Let it next be assumed that the brushes of the down demand mid-point stepping switch SZ are in their homing position, that the elevator car A is available for assignment at the first floor and that it is the only elevator car available for assignment. Let it further be assumed that down floor calls have been registered continuously for at least a predetermined time for floors in the first and second down zones (break contacts K1T1 and K2T1, respectively, are open). Under the assumed conditions, the done zone priority relay KMT is picked up. Such pickup is accompanied by the opening of break contacts KMT1 to render the brushes of the level SZ$^a$ of the stepping switch SZ ineffective to control the bias applied to the control electrode of the tube TU1. Make contacts KMT2, however, close to apply a negative bias to the control electrode from the bus L2 through break contacts SCT1. Finally, make contacts KMT3 close to connect the brushes of the level SZc of the stepping switch SZ directly to the bus L2 through breaks contacts FZT4. It will be assumed once again that all registered down floor calls are for floors below the highest unassigned elevator car conditioned for down travel (make contacts MCA2 are closed). Consequently, the brushes of the down demand mid-point stepping switch SZ step in sequence with the pulsing of the pulsing relay SCR.

Referring to the level SZc of the stepping switch SZ, it will be observed that the stepping of the brushes of this level through their first three positions has no effect on operation. When these brushes arrive at their fourth position, however, the following energizing circuit is established:

L1, SCT, K3T1, KMT3, FZT4, L2

Opening of break contacts SCT1 upon pickup of the firing relay SCT disconnects the control electrode of the tube TU1 from the bus L2, while closure of make contacts SCT2 connects the control electrode to the junction of a pair of resistors R16 and R17. These resistors are connected across the buses L1 and L2 to form a voltage divider for applying a fixed bias to the control electrode of the tube TU1. The resistors R16 and R17 may be proportioned to apply a positive bias to the control electrode, in which case the resistor R17 will have a higher value of resistance than that of the resistor R16; or the resistors R16 and R17 may be of equal value in order to apply zero bias to the control electrode of the tube TU1. In the latter instance, these resistors each may have a value of ten thousand ohms, for example. In either case, the opening of break contacts SCT1 and the closure of make contacts SCT2 effects the firing of the tube TU1 to pick up the down demand mid-point relay SC, and the brushes of the three levels of the stepping switch SZ consequently remain in their fourth position.

Closure of make contacts SCT3 establishes a holding circuit for the firing relay SCT through make contacts KMT3 and break contacts FZT4. Thus, the relay SCT remains energized and picked up until the zone resetting relay FTZ picks up to open its break contacts FZT4.

Since the brushes of the level SZb are stopped in position number 4, the zone relay FZ2 is energized and picked up through make contacts SC2 and break contacts F2C4. Pickup of the relay FZ2 indicates that elevator car to be selected for assignment should run to the second down zone, that is, under the assumed conditions, to the highest down zone in which there is a floor for which a down floor call has been registered continuously for at least a predetermined time. Break contacts F2C4 remain closed until a specific car is selected for such assignment. Upon pickup of the zone relay FZ2, its make contacts FZ2–3 close to energize and pick up the master zone relay FZM. After the elevator car A is selected to run to the second down zone, the brushes of the down demand mid-point stepping switch SZ reset to their homing position by a sequence of operations which will be clear from the foregoing discussion.

In summary, the down demand mid-point stepping switch SZ operates in general to select a specific down zone of assignment for an available elevator car. If no down floor call has been registered continuously for at least a predetermined time, such zone is approximately the mid-point of down zone demands for service between the lower terminal or first floor and the highest down zone for which a demand for down service is registered, provided no down floor call is registered for a floor above the highest unassigned elevator car conditioned for down travel (the master down call above relay MCA is picked up to open its break contact MCA1 and to close its make contacts MCA2).

From the preceding description of operation, it will be appreciated that the conduction of current by the tube TU1 is controlled by a bridge circuit and that the tube fires to energize and pick up the down demand mid-point relay SC when either zero or a positive bias is applied to the control electrode of the tube. If an even number of down zone demands for service are registered, the relay SC picks up when zero bias is applied to the control electrode (the bridge circuit is balanced), as in the preceding example. If an odd number of down zone demands are registered, the relay SC is energized and picked up when a positive bias is applied to the control electrode. (It will be noted, for example, that in the present elevator system if three down zone demands for service are registered, e.g., break contacts K1–1, K2–1 and K3–1 of the respective down zone demand registering relays K1, K2 and K3 all are open, the brushes of the switch SZ will cease stepping under control of the pulsing relay SCR when they reach position number 4, in which case the control electrode of the tube TU1 is positively biased to energize and pick up the relay SC. Thus, under these conditions, the zone of assignment is the second down zone, i.e., that down zone comprising the fourth and fifth floors.)

Under certain conditions to be described hereinafter, it is desirable to indicate the existence of an automatic or artificial demand for down service for the lower terminal or first floor, although in the present elevator system the elevator cars do not travel in the down direction from the first floor, in order to modify the operation of the stepping switch SZ. This is accomplished by break contacts K0–1 and the resistor R10 in the bridge circuit associated with the level SZa. Similarly, break contacts AHC1 open to introduce the resistor R11 into the bridge circuit to modify operation of the switch SZ when an elevator car is assigned to run to the highest floor for which a down floor call is registered.

Finally, when one or more down floor calls respectively have been registered continuously for at least a predetermined time, the level SZc rather than the level SZa of the stepping switch SZ controls operation of the tube TU1 and consequently operation of the down demand mid-point relay SC. Under these conditions, an elevator car available for assignment is assigned to the highest down zone in which there is a floor for which such a call is registered.

*FIGURE 8*

Figure 8:
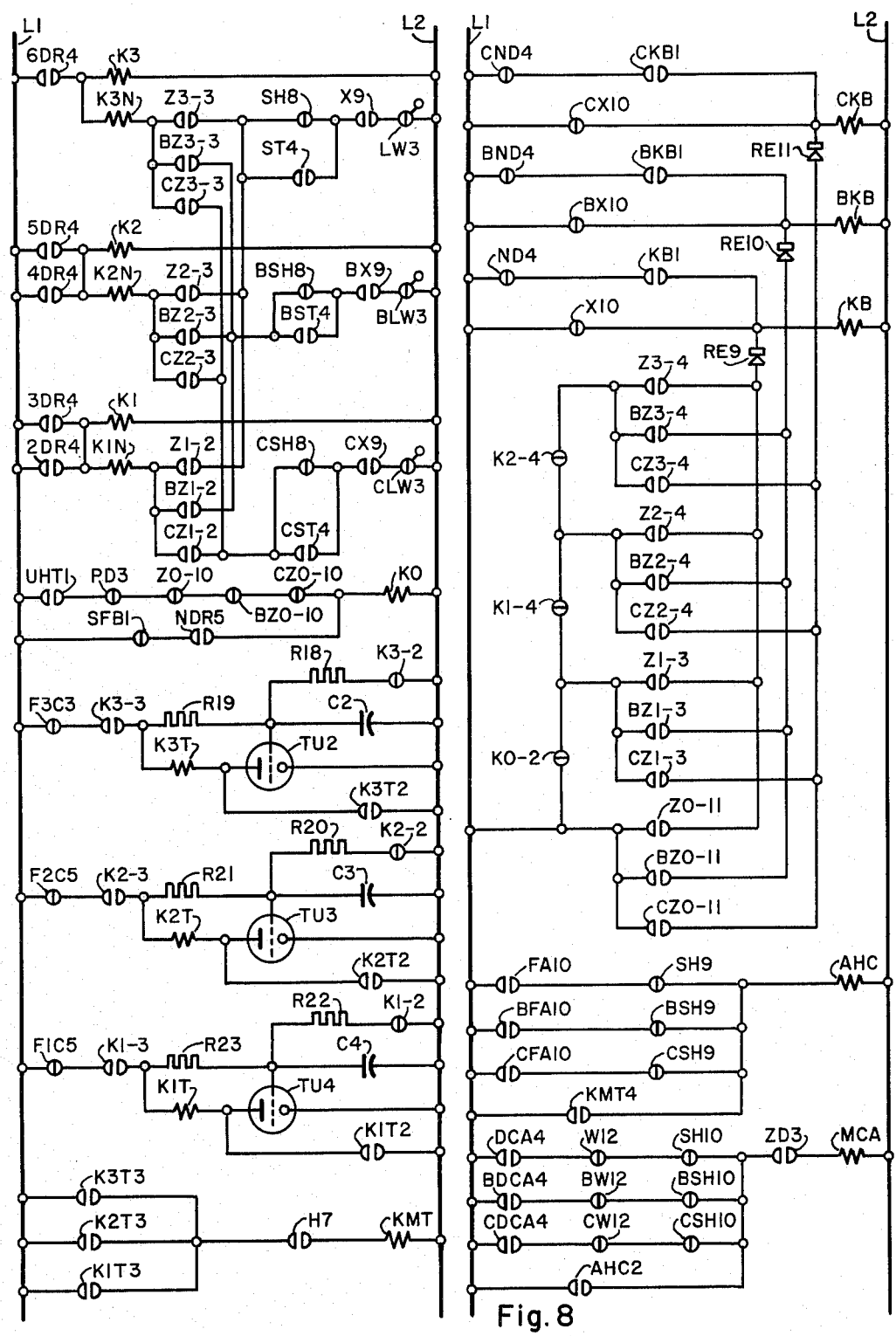

FIG. 8 illustrates circuits for the down zone demand registering relays K0, K1, K2 and K3, the down zone timing relays K1T, K2T and K3T, the down zone priority relay KMT, the down zone call below relays KB, BKB and CKB associated with the elevator cars A, B and C, respectively, the highest down call relay AHC and circuits for the master down call above relay MCA.

If a down floor call is registered, one of the down zone demand registering relays K1, K2 or K3 is energized, and the relay remains energized and picked up until an elevator car conditioned for down travel is disposed to answer the down floor call in its associated down zone. In the present elevator system, there are three down zones. The down zone demand registering relay K1 is associated with the first down zone, comprising the second and third floors, the relay K2 is associated with the second down zone, comprising the fourth and fifth floors, while the relay K3 is associated with the third down zone, which consists of the upper terminal or sixth floor. Each of these relays is energized by make contacts of the down floor call registering relay or relays for the floor or floors, as the case may be, in the zone with which the respective relay is associated. Each of the down zone demand registering relays K1, K2 and K3 has a cancelling coil associated therewith identified by the same reference character followed by the suffix N. For example, the down zone demand registering relay K3 for the third down zone has a cancelling coil K3N wound on the same core and energized in opposition to the energization of the relay energizing coil. Consequently, when the cancelling coil is energized, the relay is reset and drops out. (The down zone demand registering relay K0 will be discussed separately below).

Let it be assumed that a down floor call is registered for the fourth or fifth floor (make contacts 4DR4 or 5DR4 are closed). As a result, the down zone demand registering relay K2 is eenrgized and picked up to indicate the registration of a demand for down service for the second down zone. Any elevator car which stops in the second down zone to answer the down floor call which is registered therein will cancel the second down zone demand for service. For example, if the elevator car A is conditioned for down travel (make contacts X9 are closed), is not fully loaded (break contacts LW3 are closed), is located at the fourth or fifth floor (make contacts Z2–3 are closed) and is not assigned to serve a particular down zone (break contacts SH8 are closed), or if it is assigned to serve the second down zone (break contacts SH8 are open), when it reaches such zone (make contacts ST4 close), the following energizing circuit is established:

L1, 4DR4 or 5DR4, K2N, Z2–3, SH8 or ST4, X9 LW3, L2

Energization of the cancelling coil K2N results in the resetting and dropout of the down zone demand registering relay K2 to indicate cancellation of the demand for down service for the second down zone.

The down zone demand registering relay cancelling coils K1N and K3N operate in a manner similar to that described for the cancelling coil K2N, as will be apparent by inspection of FIG. 8.

From the preceding description, it will be understood that references herein to the registration of down zone demands for service refer to the conditions of the down zone demand registering relays K1, K2 and K3. In other words, pickup of one of these relays indicates the registration of a down zone demand for service as opposed to the registration of a down floor call for service, while dropout thereof signifies the absence or cancellation of such a down zone demand. It will be appreciated that in order for one of the relays K1, K2 or K3 to be picked up, a down floor call must be registered for a floor in the associated down zone, but when such a down floor call is registered, the associated down zone demand registering may be dropped out as a result of the operation of its associated cancelling coil; i.e., a down floor call must be registered in order to register a down zone demand for service, but the absence of the registration of a down zone demand for service does not necessarily indicate the absence of a registered down floor call for a floor in the associated down zone.

The down zone demand registering relay K0 may be energized through either of two parallel circuits. Make contacts UHT1 are closed if one-half of the first floor car-dispatching interval has expired. If, within a predetermined period of time, no down-traveling elevator car was loaded to capacity, break contacts PD3 are closed. In addition, if no elevator car is located at the lower terminal or first floor, break contacts Z0–10, BZ0–10, and CZ0–10 all are closed, and the down zone demand registering relay K0 consequently is energized and picked up. Furthermore, if no elevator car, other than the next car to be dispatched therefrom, is located at the first floor, break contacts SFB1 are closed. In addition, if the elevator system is conditioned for no demand return operation (traffic is predominantly in the up direction), make contacts NDR5 are closed to energize the relay K0. Pickup of the relay K0 indicates the existence of demand for elevator service for the first floor under the conditions enumerated above. This is an automatic or artificial demand for first floor service, and such an indication is provided for the reason that a prospective passenger occasionally will fail to press the up floor call push button for the first floor to register an up floor call therefor when no elevator car is located at the first floor. In addition, it is desirable, under certain traffic conditions, to provide this indication in order to expedite up traffic from the lower terminal floor, as will be discussed in greater detail hereinafter.

The down zone timing relays K1T, K2T and K3T respectively are associated with the first, second, and third down zones, which have been described above. These relays may be of any suitable construction capable of providing the desired timing operations. In the embodiment in FIG. 8, the relays are electronically controlled by circuits including electronic devices such as tubes TU2, TU3, and TU4. These tubes may be of any suitable type and may be either of the high-vacuum or the gaseous discharge type. In a preferred embodiment of the invention, the tubes TU2, TU3 and TU4 are gaseous discharge tubes of the type known as thyratrons. These thyratrons may be either of the cold-cathode or of the hot-cathode type. For present purposes, it will be assumed that they are of the former type.

Since the tube TU2 and its associated down zone timing relay K3T are typical, operation of these components will be described in detail. It will be understood by inspection of FIG. 8 that the remaining down zone timing relays K1T and K2T and their respective associated tubes operate in a similar manner.

The tube TU2 has a plate electrode, which is connected to the junction of the coil of the relay K3T and its make contact K3T2, a cathode electrode, which is connected directly to the bus L2, and a control or grid electrode which is connected to the junction of two resistors R18 and R19 and a capacitor C2. The voltage between the control and cathode electrodes is determined by the capacitor C2. The capacitor is discharged through a path which includes the resistor R18 and break contacts K3–2.

When the capacitor C2 is to be charged, it is connected across the buses L1 and L2 through a circuit which includes the resistor R19, make contacts K3–3 and break contacts F3C3. It will be understood that the bus L1 represents the positive terminal of the direct-current source of electrical energy.

When the tube TU2 fires or has a discharge initiated between its plate and cathode electrodes, the down zone timing relay K3T picks up and closes its make contacts K3T2 to establish a holding circuit around the tube TU2. Closure of the contacts K3T2 also shunts the plate and cathode electrodes of the tube TU2 to terminate the discharge therein.

In order to illustrate the operation of the tube TU2, it will be assumed that a demand for down service is registered for the third down zone (break contacts K3–2 are open and make contacts K3–3 are closed) and that no elevator car has been assigned to serve the third down zone (break contacts F3C3 are closed). As a result, the capacitor C2 charges through its charging resistor R19. When the capacitor C2 has charged for a time sufficient to build up the voltage between the cathode and grid electrodes to a suitable value, the tube TU2 fires to establish the following energizing circuit for the down zone timing relay K3T:

L1, F3C3, K3–3, K3T, TU2, L2

If desired, the resistor R19 may have an adjustable resistance or the capacitor C2 may have an adjustable capacitance, or both of these components may be adjustable for the purpose of adjusting the time delay of the relay K3T. As representative of suitable parameters, it will be assumed that each of the relays K3T, K2T and K1T has a time delay in pickup of the order of forty seconds. The specific time delay, however, will depend upon the requirements of each specific installation.

In picking up, the relay K3T closes its make contacts K3T2 to establish a holding circuit for itself around the tube TU2 and to extinguish the discharge in the tube.

Pickup of the down zone timing relay K3T indicates that a demand for down service has been registered for the third down zone (in this case the sixth floor) for at least a predetermined period of time (forty seconds), and similarly for the down zone timing relays K2T and K1T relative to the registration of demands for down service for the second and first down zones, respectively. If the down zone demand registering relay K3 drops out in the manner heretofore described to open its make contacts K3–3, or if an elevator car is assigned to serve the third down zone (break contacts F3C3 open), the down zone timing relay K3T drops out. It will be observed that dropout of the relay K3 also results in closure of its break contacts K3-2 to establish a discharge circuit for the capacitor C2.

When each of the down zone timing relays picks up, it closes its respective make contacts K1T3, K2T3, or K3T3, as the case may be, to energize the down zone priority relay KMT, provided that more than one elevator car motor-generator set is running (make contacts H7 are closed).

The upper portion of the right-hand column of FIG. 8 are illustrated circuits for controlling the down zone call below relays KB, BKB and CKB for the elevator cars A, B, and C, respectively. Each of these relays, when deenergized, indicates that a demand for down service is registered for a down zone below the down zone in which the associated elevator car is located when such car is conditioned for down travel. Assume, for example, that the elevator car A is located at the sixth floor in the third down zone (make contacts Z3-4 are closed) and that it is conditioned for down travel (break contacts X10 are open).

It will be apparent that under these conditions if any of the down zone demand registering relays K0, K1 or K2 is picked up (break contacts K0-2, K1-4 or K2-4, respectively, are open), the down zone call below relay KB must be deenergized and dropped out. If no down service demand is registered for a down zone below the third down zone, however, the following energizing circuit is established for the down zone call below relay KB:

L1, K0-2, K1-4, K2-4, Z3-4, RE9, KB, L2

Pickup of the relay KB is accompanied by closure of its make contacts KB1 to establish through break contacts ND4 of the notching relay ND a holding circuit for the relay KB when the carriage of the floor selector for the elevator car A notches from a position corresponding to a floor in one zone to a position corresponding to a floor in the next succeeding zone. For example, if the elevator car A is located at the sixth floor in the third down zone (make contacts Z3-4 are closed) and is conditioned for down travel (break contacts X10 are open) and the relay KB is picked up as aforesaid, when the selector carriage for the car A notches its fifth-floor position in the second down zone, make contacts Z3-4 open before make contacts Z2-4 close. During such notching however, the notching relay ND for the car A drops out to close its break contacts ND4 to maintain the relay KB energized and picked up through its holding contacts KB1. Thus, dropout of the zone position relay Z3 to open its make contacts Z3-4 before the zone position relay Z2 picks up to close its make contacts Z2-4 is ineffective to denergize the down zone call below relay KB. It will be noted further that the relay KB always is energized when the elevator car A is conditioned for up travel (break contacts X10 are closed).

Rectifiers RE9, RE10 and RE11 are provided to prevent the establishment of undesired energizing circuits for the down zone call below relays KB, BKB and CKB by way of the holding circuits furnished therefor (it will be recalled that the bus L1 is positive). If, for example, the elevator car A is conditioned for up travel (break contacts X10 are closed) and is located in the second down zone (make contacts Z2-4 are closed), if the elevator car B is located in the second down zone (make contacts BZ2-4 are closed) and is conditioned for down travel (break contacts BX10 are open) and if a down service demand is registered for the first down zone (break contacts K1-4 are open), the down zone call below relay BKB for the elevator car B should be deenergized and dropped out. In the absence of the rectifier RE9, however, an energizing circuit would be established for the relay BKB, as follows:

L1, ND4 and KB1 or X10, Z2-4, BZ2-4, BKB, L2

It will be evident, on the other hand, that the rectifier RE9 prevents the establishment of such an energizing circuit and that the relay BKB consequently will be deenergized and dropped out under the foregoing conditions, as desired.

The down zone call below relays BKB and CKB for the elevator cars B and C, respectively, operate in a manner similar to that described for the relay KB for the elevator car A, as will be apparent by inspection of FIG. 8.

The highest down call relay AHC, when energized, indicates that an elevator car is assigned to run to the highest floor for which a down floor call is registered. If the elevator car A, for example, is assigned to answer down floor calls, make contacts FA10 are closed, and if the car A is not assigned to serve a specific down zone of floors, break contacts SH9 are closed to energize the relay AHC. In addition, the highest down call relay AHC is energized if a demand for down service has been registered for at least a predetermined period of time (forty seconds) and more than one elevator car motor-generator set is running (make contacts KMT4 are closed).

The master down call above relay MCA, when energized, indicates that there is a demand for down service and that no down floor call is registered for a floor above the position of an elevator car which is conditioned for down travel and which is not assigned to serve a particular down zone. For example, if there is a demand for down service (make contacts ZD3 are closed), if the elevator car A is conditioned for down travel (break contacts W12 are closed) and is not assigned to serve a particular down zone (break contacts SH10 are closed), and if no down floor call is registered for a floor above the location of the car A (make contacts DCA4 are closed), the relay MCA is energized and picked up. Conversely, if a down floor call is registered for a floor above the location of the highest elevator car, make contacts DCA4, BDCA4 and CDCA4 all are open to prevent energization of the relay MCA therethrough, regardless of the direction of travel for which each elevator car is conditioned.

The master down call above relay MCA, when picked up, effects the assignment of an available elevator car to serve a specific down zone and, when dropped out, causes an elevator car which is assigned for down service to run to the highest floor for which a down floor call is registered. It will be observed that if there is a demand for down service (make contacts ZD3 are closed), the relay MCA is energized if an elevator car is assigned to run to the highest floor for which a down floor call is registered (make contacts AHC2 are closed). Pickup of the relay MCA under these conditions causes an elevator car which subsequently is assigned for down service to be assigned to a specific down zone rather than to the highest floor for which a down floor call is registered.

*FIGURE 9*

Figure 9:
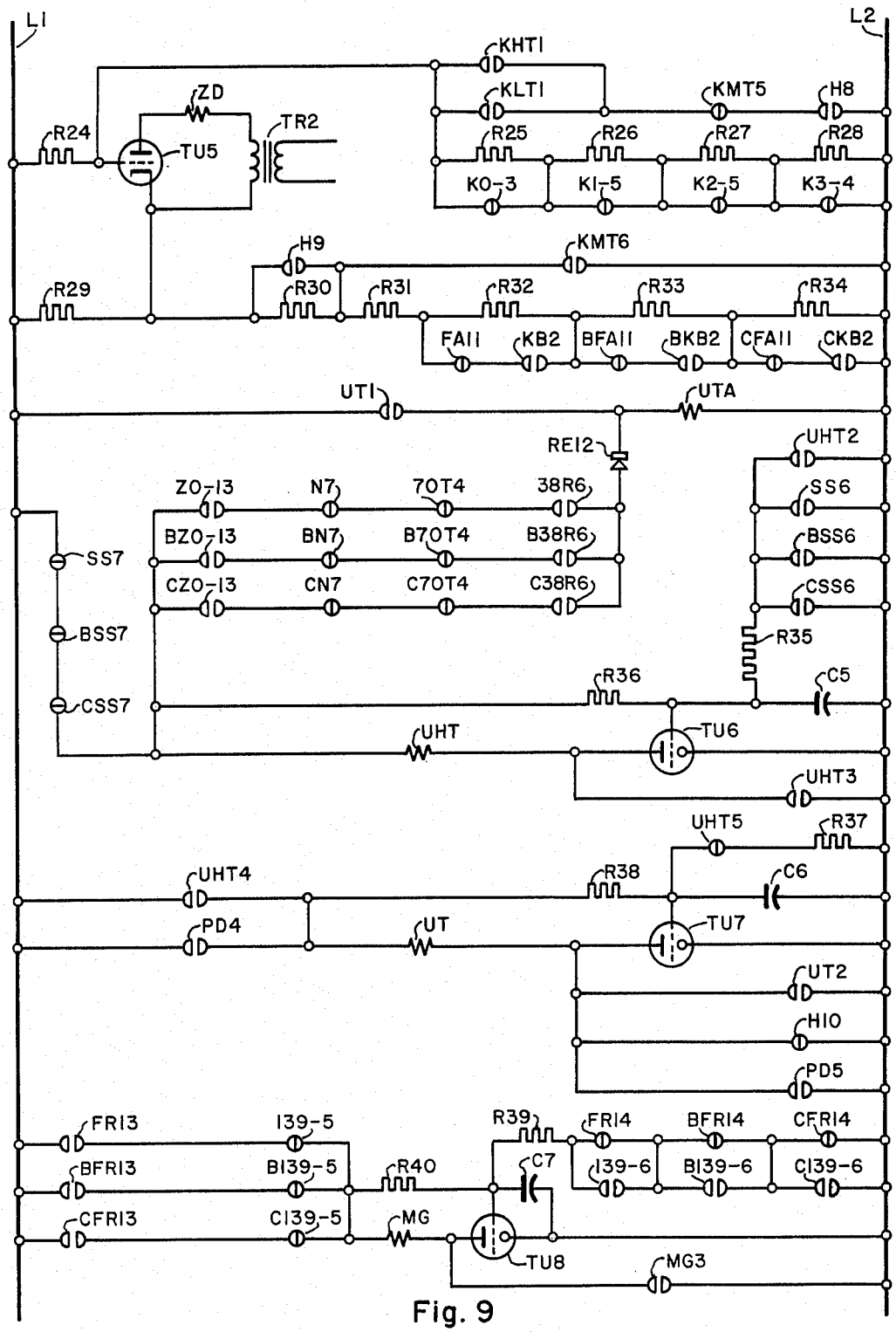

FIGURE 9 illustrates circuits for controlling the down zone demand relay ZD, the dispatching interval expired relay UTA, the first dispatching interval relay UHT, the second dispatching interval relay UT and the motor-generator timing relay MG.

The down zone demand relay ZD, when picked up, indicates the existence of a demand for down service. When this relay is deenergized, however, it does not necessarily indicate the absence of such a service demand, as will be pointed out below.

Energization of the relay ZD is controlled by a bridge circuit which basically is similar to the bridge circuit for controlling the down demand mid-point relay SC of FIG. 7. Thus, this circuit includes an electronic tube TU5, conveniently a hot-cathode gaseous-discharge thyratron, having a control electrode, which is connected to the junction of two resistors R24 and R25. These resistors are parts of a voltage divider comprising resistors R24 through R28, which are connected in series across the buses L1 and L2. These resistors are all of equal resistance, a typical value being 10,000 ohms.

The tube TU5 also has a cathode electrode, which is connected to the junction of two resistors R29 and R30, which likewise form parts of a voltage divider comprising serially-connected resistors R29 through R34 connected directly between the buses L1 and L2. The resistors R29 through R34 also are of equal value, and each may have a resistance of 10,000 ohms. The anode electrode of the tube TU5 is connected to the down zone demand relay ZD. Anode electrode voltage for the tube TU5 is supplied by the secondary winding of a transformer TR2, whose primary winding is energized by any suitable alternating-current source of energy (not shown).

In order to illustrate operation of the bridge circuit which controls energization of the down zone demand relay ZD, it first will be assumed that make contacts H9 are closed to indicate that more than one elevator car motor-generator set is running, that no down zone demand for service is registered (down zone demand registering relay break contacts K0–3, K1–5, K2–5 and K3–4 are closed and down zone priority relay make contacts KMT6 are open), that no elevator car is assigned to answer down floor calls (break contacts FA11, BFA11 and CFA11 are closed) and that no down zone demand for service is registered for a down zone below the down zone in which any elevator car conditioned for down travel is located (make contacts KB2, BKB2 and CKB2 are closed). Under these conditions, the bridge circuit is unbalanced by virtue of the fact that the resistors R29 and R31 both are effective in the cathode electrode voltage divider circuit, while only the resistor R24 is effective in the control electrode voltage divider circuit; i.e., the control electrode is negatively biased as a result of its direct connection to the bus L2 through break contacts K0–3, K1–5, K2–5 and K3–4. Consequently, the tube TU5 cannot fire, and the down zone demand relay ZD thus is deenergized and dropped out.

Assume now that a down zone demand for service is registered for the second down zone (fourth and fifth floors) to open break contacts K2–5. As a result, the resistor R27 is inserted into the control electrode voltage divider circuit to balance the bridge circuit, thus applying zero bias to the control electrode, as will be apparent by inspection of FIG. 9. It follows that the tube TU5 now conducts current during those half cycles of the secondary winding voltage of the transformer TR2 when the anode electrode of the tube is positive with respect to the cathode electrode thereof to energize and pick up the down zone demand relay ZD. If desired, a suitably-poled rectifier (not shown) may be connected across the coil of the relay ZD in order to maintain the conduction of current therethrough during those half cycles of the secondary winding voltage of the transformer TR2 when the anode electrode of the tube TU5 is negative with respect to the cathode electrode thereof.

It also will be apparent that if make contacts H9 are open to indicate that fewer than two elevator car motor-generator sets are running and to insert the resistor R30 into the cathode electrode voltage divider circuit, two or more down zone service demands must be registered, that is, two or more of break contacts K0–3, K1–5, K2–5, and K3–4 must be open in order to effect energization and pickup of the relay ZD. In addition, if, under certain conditions, an up floor call has been registered for a floor in either the high or the low up zone for at least a predetermined period of time (make contacts KHT1 or KLT1, respectively, are closed), if no down zone demand for service has been registered for at least forty seconds when more than one elevator car motor-generator set is running (break contacts KMT5 are closed) and if more than one elevator car motor-generator set is running (make contacts H8 are closed), the control electrode of the tube TU5 is connected directly to the negative bus L2 to prevent energization and pickup of the down zone demand relay ZD even though a down zone demand for service simultaneously may be registered (break contacts K0–3, K1–5, K2–5 or K3–4 are open). Finally, it will be observed that if a down zone demand for service has been registered for at least forty seconds when more than one elevator car motor-generator set is running, break contacts KMT5 are open to interrupt the direct connection of the control electrode to the bus L2, while make contacts KMT6 are closed to connect the cathode electrode directly to the bus L2 through make contacts H9. Since, under these conditions, at least one of the sets of the break contacts K0–3, K1–5, K2–5 and K3–4 are open, a positive bias is applied to the control electrode of the tube TU5 to effect energization and pickup of the down zone demand relay ZD.

From the preceding description of operation of the down zone demand relay ZD, it will be noted that, in general, this relay is energized and picked up if a down zone demand for service is registered (break contacts K0–3, K1–5, K2–5 or K3–4 are open). Under certain system conditions, however, operation of the bridge circuit to energize the relay ZD is modified. Such conditions and their effects on system operation will be discussed hereinafter in greater detail in the section entitled "Operation."

The circuits for controlling the first and second dispatching interval relays UHT and UT, respectively, basically are similar to those for controlling the down zone timing relays K1T, K2T and K3T of FIG. 8. Thus, in the embodiment of FIG. 9, the relays UHT and UT are electronically controlled by circuits including tubes TU6 and TU7. In a preferred embodiment of the invention, each of the tubes TU6 and TU7 is a cold-cathode gaseous-discharge tube of the type known as a thyratron.

The voltage between the control and cathode electrodes of the tube TU6 is determined by a capacitor C5. The capacitor is discharged through a path which includes a resistor R35 and parallel make contacts UHT2 and SS6, BSS6 and CSS6 of the start relays for the elevator cars A, B and C, respectively. When the capacitor C5 is to be charged, it is connected across the buses L1 and L2 through a circuit which includes a resistor R36 and serially-connected break contacts SS7, BSS7 and CSS7. (It will be recalled that the bus L1 represents the positive terminal of the direct-current source of electrical energy.)

When the tube TU6 fires or has a discharge initiated between its plate and cathode electrodes, the first dispatching interval relay UHT picks up and closes its make contacts UHT3 to establish a holding circuit around the tube TU6. Closure of the contacts UHT3 also shunts the plate and cathode electrodes of the tube to terminate the discharge therein.

The voltage between the control and cathode electrodes of the tube TU7 is determined by a capacitor C6. This capacitor is provided with a discharge circuit which includes a resistor R37 and break contacts UHT5 of the first dispatching interval relay UHT. When the capacitor C6 is to be charged, it is connected across the buses L1 and L2 through a circuit which includes a resistor R38 and make contacts UHT4 of the first dispatching interval relay.

When the tube TU7 fires, the second dispatching interval relay UT picks up and closes its make contacts UT2. These contacts establish a holding circuit around the tube for the relay. In addition, the contacts shunt the plate and cathode electrodes of the tube to terminate the discharge therebetween. (It is assumed that break contacts H10 are open at this time. The effect of closure of these contacts will be discussed below.)

In order to illustrate operation of the relays UTA, UHT and UT, it will be assumed that the elevator cars A, B and C are located at the lower terminal or first floor (make contacts Z0–13, BZ0–13 and CZ0–13 are closed), that the motor-generator sets of at least two of the elevator cars A and B, are running (break contacts H10 are open), that the elevator system is not conditioned for instant dispatch operation (make contacts PD4 and PD5 are open) and that no car call is registered for any of the elevator cars (make contacts 38R6, B38R6 and C38R6 are open. In addition, it will be assumed that the elevator car A is to be started, in which case make contacts SS6 are closed to discharge the capacitor C5 through the resistor R35 and break contacts SS7 are open to interrupt the energizing circuit of the first dispatching interval relay UHT. Since the relay UHT is dropped out, its make contacts UHT4 are open to prevent energization of the second dispatching interval relay UT therethrough, while its break contacts UHT5 are closed to complete the discharge circuit for the capacitor C6 through the resistor R37. Inasmuch as the relay UT is dropped out, its make contacts UT1 are open to prevent energization therethrough of the dispatching interval expired relay UTA. Finally, it will be assumed that the elevator car B has been selected as the next car to be dispatched from the first floor.

When the elevator car A leaves the first floor, its associated start relay SS drops out to open its make contacts SS6 to interrupt the discharge circuit for the capacitor C5. Closure of the start relay break contacts SS7 results in completion of the following charging circuit for the capacitor C5:

L1, SS7, BSS7, CSS7, R36, C5, L2

The capacitor C5 now charges at a rate determined by the resistance and the capacitance of its charging circuit.

Upon expiration of the time required for the voltage across the capacitor C5 to build up to a suitable value, the tube TU6 fires to establish the following energizing circuit for the first dispatching interval relay UHT:

L1, SS7, BSS7, CSS7, R36, C5, L2

If desired, the resistor R36 may have an adjustable resistance or the capacitor C5 may have an adjustable capacitance, or both may be adjustable for the purpose of adjusting the time delay of the relay UHT. As representative of suitable parameters, it will be assumed that the relay UHT has a time delay in pickup of the order of fifteen seconds. However, the specific time delay will depend upon the requirements of each specific installation.

In picking up, the relay UHT closes its make contacts UHT2 to discharge the capacitor C5 through the resistor R35. The relay UHT also closes its make contacts UHT3 to establish a holding circuit around the tube TU6. Inasmuch as the contacts UHT3 shunt the plate and cathode electrodes of the tube TU6, the discharge between such electrodes is terminated.

The first dispatching interval relay UHT also opens its break contacts UHT5 to interrupt the discharge circuit for the capacitor C6. This relay, in addition, closes its make contacts UHT4 to complete the following charging circuit for the capacitor C6:

L1, UHT4, R38, C6, L2

The capacitor C6 now charges at a rate determined by the resistance and the capacitance of its charging circuit. When the voltage across the capacitor builds up to a suitable value, the tube TU7 fires to complete the following circuit:

L1, UHT4, UT, TU7, L2

The time delay in pickup of the second dispatching interval relay UT depends upon the specific requirements of each installation. As representative of suitable parameters, it will be assumed that this relay has a time delay in pickup of the order of fifteen seconds. The resistor R38 or the capacitor C6 or both of these components may be adjustable for the purpose of adjusting the time delay of the relay UT.

Upon picking up, the relay UT closes its make contacts UT2 to establish a holding circuit around the tube TU7. Since these contacts shunt the plate and cathode electrodes of the tube, the tube discharge is extinguished.

Pickup of the relay UT also is accompanied by closure of its make contacts UT1 to energize and pick up the dispatching interval expired relay UTA. Pickup of the relay UTA effects the starting of the elevator car B from the first floor, since, under the assumed conditions, the car B has been selected as the next car to be dispatched from the first floor.

It will be observed from the preceding discussion that a total time of thirty seconds has expired between the starting of the elevator car A from the first floor and the starting of the car B therefrom. This follows from the facts that the first dispatching interval relay UHT and the second dispatching interval relay UT each has a time delay in pickup of fifteen seconds and that the relay UHT must pick up before the capacitor C6 starts to charge to effect pickup of the relay UT.

Since the elevator car B is to be started from the first floor, break contacts BSS7 of its start relay BSS open to interrupt the charging circuit for the capacitor C5 and the energizing circuit for the first dispatching interval relay UHT. In addition, make contacts BSS6 in the discharge circuit of the capacitor C5 close to maintain the discharge circuit, although make contacts UHT2 in such circuit open when the relay UHT drops out.

When the first dispatching interval relay UHT drops out, its make contacts UHT3 open with no immediate effect on the operation of the system. Opening of make contacts UHT4 effects deenergization and dropout of the second dispatching interval UT, while closure of break contacts UHT5 establishes a discharge circuit for the capacitor C6. In dropping out, the relay UT opens its make contacts UT2 without immediately affecting system operation, and opens its make contacts UT1 to drop out the dispatching interval expired relay UTA.

This completes one cycle of operation of the relays UHT, UT and UTA. When the elevator car B leaves the first floor, its associated start relay drops out to open its make contacts BSS6 and to close its break contacts BSS7. Consequently, another cycle of operation of the dispatching interval relays then is initiated. It will be appreciated that this cycle is repeated each time an elevator car leaves the lower terminal or first floor.

Next assume that the elevator car A has arrived at the first floor (make contacts Z0–13 are closed) and that it has not been selected as next car to be dispatched from the first floor (break contacts N7 are closed), but that a passenger has entered the car A and has registered a car call for a floor above the first floor (make contacts 38R6 are closed) before the non-interference time has expired to effect closure of the doors of the car A. Upon expiration of the non-interference time, break contacts 70T4 close to establish the following energizing circuit:

L1, SS7, BSS7, CSS7, Z0–13, N7, 70T4, 38R6, RE12, UTA, L2

Energization and pickup of the dispatching interval expired relay UTA effects the immediate starting from the first floor of that elevator car which has been selected as the next car to be dispatched therefrom, provided that a car call is registered for such next car for a floor above the first floor. It will be observed that in this instance such starting is effected although the thirty-second dispatching interval, as determined by the dispatching interval relays UHT and UT, has not expired.

It will be noted further that the dispatching interval expired relay UTA drops out when the aforesaid next car to be dispatched from the first floor is to be started therefrom, as a result of the opening of the associated break contacts BSS7 or CSS7, as the case may be. After such next car leaves the first floor, however, its associated contacts BSS7 or CSS7 close to reenergize the relay UTA, as aforesaid. Consequently, under the foregoing conditions, elevator cars are started from the first floor, despite the fact that the thirty-second dispatching interval has not expired, until the elevator car A is selected as the next car to be dispatched therefrom. As a result, break contacts N7 open to deenergize the relay UTA, and a complete cycle of operation of the relays UHT, UT and UTA is initiated in a manner which will be clear from the preceding discussion. The foregoing operation is provided under the assumed conditions in order to prevent two elevator cars from being "tied up," at the lower terminal or first floor until the normal dispatching interval has expired.

Recalling that the bus L1 is negative and assuming that the relay UHT is picked up through its holding contacts UHT3 and break contacts SS7, BSS7 and CSS7 and that the relay UT also is picked up, it will be observed that the rectifier RE12 prevents the establishment of a holding circuit for the relay UHT through the contacts UT1 under the conditions specified in the preceding paragraph.

Next assume that fewer than two elevator car motor-generator sets are running (break contacts H10 are closed). Under this condition, it will be observed that the second dispatching interval relay UT is energized immediately upon closure of the first dispatching interval relay contacts UHT4 rather than upon the expiration of a fifteen-second time delay after closure of the contacts UHT4, as explained heretofore. Once again, pickup of the relay UT results in closure of its make contacts UT1 to energize the dispatching interval expired relay UTA. Consequently, in the present embodiment of the invention, if fewer than two elevator car motor-generator sets are running, the interval between the dispatching or starting of successive elevator cars from the lower terminal or first floor is halved from thirty seconds to fifteen seconds.

Under certain traffic conditions, such as when an elevator car is conditioned for down travel and is fully loaded, it may be desirable to dispatch cars from the first floor in rapid succession rather than requiring each car, before being started, to await the expiration of a predetermined dispatching interval after the starting of the preceding elevator car from the first floor. Thus, if an elevator car is conditioned for down travel and is fully loaded, make contacts PD4 and PD5 of the instant dispatch relay PD are closed to energize continuously the second dispatching interval relay UT and thus the dispatching interval expired relay UTA by means of make contacts UT1. Such continuous energization of the relay UTA results in the rapid dispatching of successive elevator cars from the first floor. This mode of system operation conveniently may be termed instant dispatch operation. When the elevator system becomes conditioned for such operation, it remains so conditioned for at least a predetermined time, as will be discussed in greater detail hereinafter.

The lower portion of FIG. 9 illustrates circuits for controlling the motor-generator timing relay MG, which, when energized, effects shutdown of the elevator car motor-generator sets. This relay may be of any suitable construction capable of providing the desired timing operation. In the embodiment illustrated in FIG. 9, the relay MG is electronically controlled by circuits which are similar to those for controlling the first and second dispatching interval relays UHT and UT, respectively. Thus, such circuits include a cold-cathode thyratron tube TU8.

The voltage between the control and cathode electrodes of the tube TU8 is determined by a capacitor C7. This capacitor is discharged through a path which includes a resistor R39, break contacts FR14, BFR14 and CFR14, which are closed when their respective associated elevator cars are not available for assignment, and make contacts 139–6, B139–6 and C139–6, which are closed when the motor-generator sets of their respective associated elevator cars are shut down. When the capacitor C7 is to be charged, it is connected across the buses L1 and L2 through a resistor R40 and at least one of three parallel circuit branches, each of which is associated with a different one of the elevator cars A, B and C. For example, make contacts FR13 are closed when the elevator car A is available for assignment, and break contacts 139–5 are closed if the motor-generator set of the car A is not shut down. By inspection of FIG. 9, it will be observed that the contacts in the two remaining branches of the charging circuit for the capacitor C7 operate in a similar manner with respect to the elevator cars B and C, respectively.

When the tube TU8 fires or has a discharge initiated between its plate and cathode electrodes, the motor-generator timing relay MG picks up and closes its make contacts MG3 to establish a holding circuit around the tube TU8. Closure of the contacts MG3 also shunts the plate and cathode electrodes of the tube to terminate the discharge therein.

Operation of the relay MG now will be considered in detail. It will be assumed that the conditions are such that the relay MG is deenergized, that the elevator car A is available for assignment (make contacts FR13 are closed and break contacts FR14 are open) and that the motor-generator set of the elevator car A is not shut down (break contacts 139–5 are closed and make contacts 139–6 are open). This results in completion of the following charging circuit for the capacitor C7:

L1, FR13, 139–5, R40, C7, L2

The capacitor C7 now charges at a rate determined by the resistance and the capacitance of its charging circuit.

Upon expiration of the time required for the voltage across the capacitor C7 to build up to a suitable value, the tube TU8 fires to establish the following energizing circuit for the motor-generator timing relay MG:

L1, FR13, 139–5, MG, TU8, L2

If desired, the resistor R40 may have an adjustable resistance or the capacitor C7 may have an adjustable capacitance, or both may be adjustable for the purpose of adjusting the time delay in pickup of the relay MG. As representative of suitable parameters, it will be assumed that relay MG has a time delay in pickup of the order of four minutes. The specific time delay, however, will depend upon the requirements of each specific installation.

In picking up, the relay MG closes its make contacts MG3 to establish a holding circuit around the tube TU8. Inasmuch as the contacts MG3 shunt the plate and cathode electrodes of the tube, the discharge therebetween is terminated.

From the preceding description, it will be appreciated that under the assumed conditions the elevator car A continuously was available for assignment for four minutes in order to effect energization of the motor-generator timing relay MG. By inspection of FIG. 9, however, it will be observed that since the charging circuit for the capacitor C7 includes three parallel branches, one for each elevator car, no one car continuously must remain available for assignment for a period of four minutes in order for the capacitor C7 to charge sufficiently to fire the tube TU8, as long as the sum total of elevator car availability times is at least four uninterrupted minutes.

For example, assume that the motor-generator set for the elevator car A is not shut down and that the car A is available for assignment to charge the capacitor C7 through make contacts FR13 and break contacts 139–5, as aforesaid. Assume further that the motor-generator set for the car B is not shut down (break contacts B139–5 are closed and make contacts B139–6 are open) and that after two minutes has expired the car B also becomes available for assignment (make contacts BFR13 close and break contacts BFR14 open). Next, assume that after the expiration of three minutes the elevator car A becomes assigned for service (make contacts FR13 open). (It will be noted that break contacts FR14 close at this time, but since the car B still is available for assignment and since its motor-generator set is not shut down, break contacts BFR14 and make contacts B139–6 respectively are open to insure the continued interruption of the discharge circuit for the capacitor C7.) Although the capacitor C7 now cannot charge through that branch of its charging circuit associated with the car A, under the assumed conditions it continues to charge through the contacts BFR13 and B139–5. Consequently, at the expiration of four minutes from the time the car A first became available for assignment, the tube TU8 fires to pick up the motor-generator timing relay MG. In other words, as long as the charging circuit of the capacitor C7 remains uninterrupted for a period of four minutes, the relay MG will be energized at the expiration thereof to effect shutdown of the elevator car motor-generator sets. It is not necessary, however, that during this period the same elevator car continuously remains available for assignment, as long as the sum total of availability times of elevator cars whose motor-generator sets are not shut down is at least four uninterrupted minutes.

Returning to the preceding example wherein the elevator car A was the only car available for assignment for a period of at least four minutes, assume that, subsequent to the pickup of the motor-generator timing relay MG, the available car relay FR drops out to indicate that the car A no longer is available for assignment. Opening of make contacts FR13 interrupts the charging circuit for the capacitor C7 and the energizing circuit for the relay MG. In addition, break contacts FR14 close to establish a discharge circuit for the capacitor C7. Inasmuch as the timing relay MG now is deenergized and dropped out, its make contacts MG3 open with no immediate effect on system operation. If, thereafter, shutdown of the motor-generator set for the car A is effected, break contacts 139–5 open to prevent subsequent energization therethrough of the relay MG and make contacts 139–6 close to permit subsequent discharge therethrough of the capacitor C7.

FIGURE 10

The up by-pass relay 77U, when energized, indicates that an elevator car whose non-interference time has expired is located at the lower terminal or first floor, is conditioned for up travel and is fully loaded. Thus, the relay 77U may be energized through any one or more of three parallel circuit branches, each of which is associated with a separate one of the elevator cars in the system. For example, if the elevator car A is located at the first floor (make contacts Z0–14 are closed), if it is conditioned for up travel (make contacts W14 are closed), if it is fully loaded (make contacts LW4 of the load switch LW are closed) and if its non-interference time has expired (break contacts 70T5 are closed), the relay 77U is energized and picked up. It will be apparent that the two remaining circuit branches for energizing the relay 77U operate similarly with respect to the elevator cars B and C, respectively.

Pickup of the up by-pass relay 77U is indicative of the existence of a substantial demand for elevator service in the up direction from the lower terminal or first floor. Such pickup is accompanied by closure of make contacts 77U1 to energize the no demand return relay NDR, which, when picked up, conditions the elevator system to expedite service for the first floor.

Pickup of the relay NDR results in closure of its make contacts NDR6 to establish with break contacts KT1 a holding circuit for the relay. As will be discussed more fully hereinafter, the contacts KT1 remain closed for at least a predetermined time after pickup of the relay NDR before opening to interrupt the holding circuit for the no demand return relay. This period of time may be of the order of 2½ minutes. Consequently, the elevator system maintains its no demand return service despite momentary decrease of a substantial demand for elevator service in the up direction.

It will be observed that a second initial energizing circuit also is provided for the no demand return relay NDR. If the ratio of stops made by the elevator cars while conditioned for travel in the up direction to all stops made by the elevator cars exceeds a predetermined value during a predetermined time interval, make contacts UA1 and TA1 are closed to energize the relay NDR, and such energization results in the expediting of elevator service in the up direction.

The lower terminal non-next relay SFB, when energized, indicates that at least one elevator car is located at the lower terminal or first floor and that such car is not the next car to be dispatched therefrom. This relay may be energized through any one or more of three parallel circuit branches, each of which is associated with a separate one of the elevator cars. For example, if the car A is located at the first floor, make contacts Z0–15 are closed, and if it is not the next car to be dispatched therefrom, break contacts N8 are closed to energize the relay SFB.

In the present elevator system, the intermediate floors 2 through 5 are divided into two up zones, a low up zone, comprising the second and third floors, and a high up zone, comprising the fourth and fifth floors. Under certain conditions, it is desirable to determine if an up floor call is registered in the aforesaid low or high up zone. The high up zone call relay KH and the low up zone call relay KL are provided for this purpose. Thus, if break contacts Z2U1 are closed and an up floor call is registered for the fourth or fifth floor (make contacts 4UR5 or 5UR4, respectively, are closed), the high up zone call relay KH is energized and picked up. Similarly, if break contacts Z1U1 are closed and an up floor call is registered for the second or third floor (make contacts 2UR5 or 3UR5, respectively, are closed), the low up zone call relay KL is energized and picked up. Operation of the contacts Z2U1 and Z1U1 will be discussed below.

Under certain conditions, it also is desirable to determine if an up floor call has been registered for a floor in the high or low up zone for more than a predetermined time. The high up zone timing relay KHT and the low up zone timing relay KLT are provided for this purpose. By inspection of FIG. 10, it will be apparent that the respective timing circuits for these relays basically are similar to those for the relays UHT, UT and MG of FIG. 9 and the relays K1T, K2T, and K3T of FIG. 8, which have been described in detail heretofore. Consequently, it appears unnecessary at this time to discuss the functions of the various components in the timing circuits for the relays KHT and KLT, and the present discussion will be directed instead primarily to the operation of such circuits.

Referring to the circuits associated with the high up zone timing relay KHT, it will be noted that such circuits include a firing capacitor C8, which has a discharge resistor R41 and a charging resistor R42, and a cold-cathode thyratron tube TU9. It will be assumed that system conditions are such that make contacts AH2 are open to indicate that no elevator car is assigned to answer up floor calls for floors in the high up zone and that the high up zone call relay KH has picked up to indicate the registration of an up floor call for the fourth or fifth floor. Immediately prior to such pickup, the relay KHT was deenergized.

In picking up, the relay KH opens its break contacts KH3 to interrupt the discharge circuit for the capacitor C8. Closure of make contact KH4 results in completion of the following charging circuit for the capacitor C8:

L1, KH4, R42, C8, L2

The capacitor C8 now charges at a rate determined by the resistance and the capacitance of its charging circuit.

Upon expiration of the time required for the voltage across the capacitor C8 to build up to a suitable value, the tube TU9 fires to establish the following energizing circuit for the high up zone timing relay KHT:

L1, KH4, KHT, TU9, L2

The time delay in pickup of the relay KHT depends upon the specific requirements of each installation. As representative of suitable parameters, it will be assumed that this relay has a time delay in pickup of the order of forty seconds. The resistor R42 or the capacitor C8 or both of these components may be adjustable for the purpose of adjusting the time delay of the relay.

In picking up, the relay KHT closes its make contacts KHT2 to establish a holding circuit around the tube TU9. Inasmuch as the contacts KHT2 shunt the plate and cathode electrodes of the tube TU9, the discharge between such electrodes is terminated.

Assuming that the high up zone call relay KH subsequently drops out, its make contacts KH4 open to interrupt the charging circuit for the capacitor C8 and the energizing circuit for the high up zone timing relay KHT. In addition, break contacts KH3 close to establish a discharge circuit for the capacitor C8. Inasmuch as the relay KHT now is deenergized and dropped out, its make contacts KHT2 open with no immediate effect on the operation of the system.

If an elevator car is assigned to answer up floor calls for floors in the high up zone, make contacts AH2 are closed to establish a discharge circuit for the capacitor C8. Consequently, if the contacts AH2 close before the high up zone timing relay KHT picks up, such relay is rendered inoperative, regardless of the condition of the high up zone call relay KH. If, however, the relay KHT already is picked up when the contacts AH2 close, such closure is without effect, and the relay KHT remains picked up until the relay KH drops out to open its make contacts KH4.

Referring next to the circuits associated with the low up zone timing relay KLT, it will be observed that such circuits include a capacitor C9, a capacitor discharge resistor R43, a capacitor charging resistor R44 and a cold-cathode thyratron tube TU10. It now will be assumed that the system conditions are such that no elevator car is assigned to answer up floor calls for floors in the low up zone (make contacts AL1 are open) and that the low up zone call relay KL has picked up to indicate the registration of an up floor call for the second or third floor. Immediately prior to such pickup, the relay KLT was deenergized.

When the relay KL picked up, it opened its break contacts KL1 to interrupt the discharge circuit for the capacitor C9. Closure of make contacts KL2 resulted in completion of the following charging circuit:

L1, KL2, R44, C9, L2

The capacitor C9 charges at a rate determined by the resistance and the capacitance of its charging circuit.

Upon expiration of the time required for the voltage across the capacitor C9 to build up to a suitable value, the tube TU10 fires to establish the following energizing circuit for the low up zone timing relay KLT:

L1, KL2, KLT, TU10, L2

If desired, the resistor R44 may have an adjustable resistance or the capacitor C9 may have an adjustable capacitance, or both may be adjustable for the purpose of adjusting the time delay of the relay KLT. As representative of suitable parameters, it will be assumed that the relay KLT also has a time delay in pickup of the order of forty seconds. However, the specific time delay will depend upon the requirements of each specific installation.

Upon picking up, the relay KLT closes its make contacts KLT2 to establish a holding circuit around the tube TU10. Since these contacts shunt the plate and cathode electrodes of the tube, the tube discharge is extinguished.

Assuming next that the low up zone call relay KL subsequently drops out, its make contacts KL2 open to interrupt the charging circuit for the capacitor C9 and the energizing circuit for the low up zone timing relay KLT. In addition, its break contacts KL1 close to establish a discharge circuit for the capacitor C9. Inasmuch as the relay KLT now is deenergized and dropped out, its make contacts KLT2 open without affecting system operation.

If an elevator car is assigned to answer up floor calls for floors in the low up zone, make contacts AL1 are closed to establish a discharge circuit therethrough for the capacitor C9. Thus, if the contacts AL1 close before the low up zone timing relay KLT picks up, such relay is rendered inoperative, regardless of the condition of the low up zone call relay KL. On the other hand, if the relay KLT already is picked up when the contacts AL1 close, such closure has no effect, and the relay KLT remains picked up until the relay KL drops out to open its make contacts KL2.

In order for the up zone demand relay DU to be picked up to indicate the existence of an up zone demand for service, make contacts H11 must be closed to signify that more than one elevator car motor-generator set is running. An energizing path for the relay DU is completed if make contacts DUL1 are closed to indicate the existence of a demand for service for the low up zone (second and third floors) or make contacts DUH4 are closed to signify the existence of a demand for service for the high up zone (fourth and fifth floors).

In order for the low up zone demand relay DUL or the high up zone demand relay DUH to be picked up, break contacts ZD4 must be closed to indicate the absence of a down zone demand for service, break contacts AL2 must be closed to indicate that no elevator car is assigned to answer up floor calls for floors in the low up zone and break contacts AH3 must be closed to indicate that no elevator car is assigned to answer up floor calls for floors in the high up zone.

If the preceding conditions are met, an energizing circuit for the low up zone demand relay DUL is completed if make contacts KL3 are closed to indicate that under certain conditions an up floor call is registered for a floor in the low up zone and make contacts KLT3 are closed to signify that under said certain conditions an up floor call for a floor in the low up zone has been registered for at least a predetermined time or break contacts KHT3 are closed to indicate that under certain conditions an up floor call for a floor in the high up zone has not been registered, if at all, for a predetermined time.

On the other hand, an energizing circuit for the high up zone demand relay DUH is completed if make contacts KH5 are closed to indicate that under certain conditions an up floor call is registered for a floor in the high up zone and break contacts DUL2 are closed to signify that the relay DUL is not picked up.

It is to be understood that in the present discussion a demand for up service for the low up zone refers to the condition of the low up zone demand relay DUL and a demand for up service for the high up zone has reference to the condition of the high up zone demand relay DUH.

Figure 10:
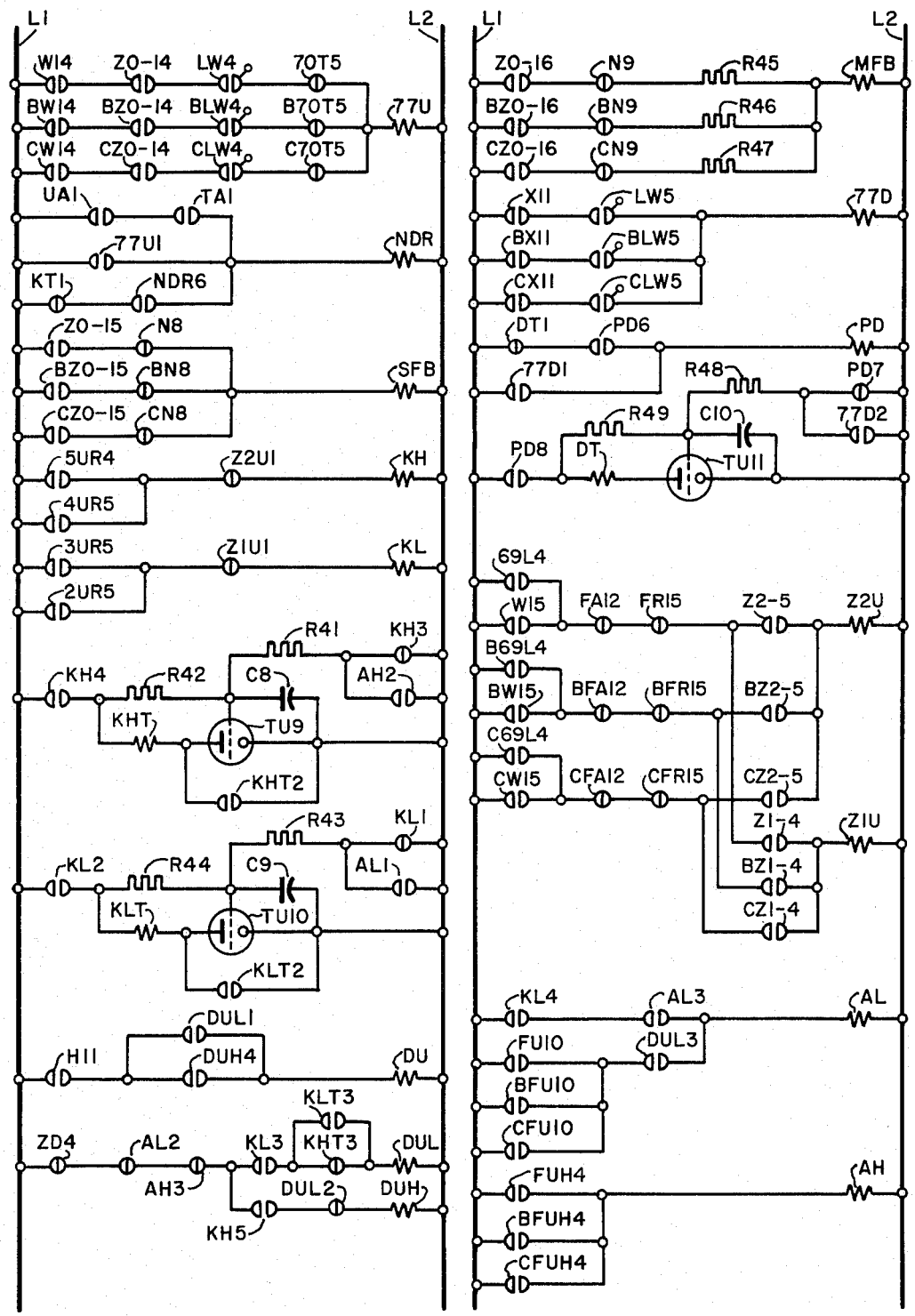

Energization of the lower terminal surplus car relay MFB indicates that at least two elevator cars are located at the lower terminal or first floor and that none of such cars is the next car to be dispatched therefrom. As is shown in FIG. 10, the relay MFB is connected for energization between the buses L1 and L2 through three parallel circuit arms, each of which is associated with a separate one of the elevator cars A, B and C. Each of these arms includes make contacts of the first-floor zone position relay for the associated elevator car, break contacts of the next car relay for such car and a resistor. For example, the arm associated with the elevator car A includes make contacts Z0–16 of the zone position relay Z0 and break contacts N9 of the next car relay N for the car A and a resistor R45. The resistors and the relay MFB are so related that the relay picks up only when energized through at least two of the parallel circuit arms.

The down by-pass relay 77D is energized whenever an elevator car is conditioned for down travel and is fully loaded, thus indicating a substantial demand for elevator service in the down direction. It will be observed that this relay may be energized through any one or more of three parallel circuit branches, each of which is associated with a separate one of the elevator cars A, B and C. Each of these branches includes make contacts of the down preference relay for the associated elevator car and make contacts of the load switch for such car. For example, if the elevator car A is conditioned for down travel, make contacts X11 are closed, and if the car A simultaneously is fully loaded, make contacts LW5 are closed to energize and pick up the down by-pass relay 77D.

Operation of those branches of the energizing circuit for the relay 77D respectively associated with the elevator cars B and C will be understood from the preceding discussion.

Pickup of the down by-pass relay 77D is accompanied by closure of its make contacts 77D1 to energize the instant dispatch relay PD. It will be recalled from the discussion of FIG. 9 that pickup of the relay PD effects the rapid dispatching of successive elevator cars from the lower terminal or first floor. Upon picking up, the relay PD closes its make contacts PD6 to establish a self-holding circuit through break contacts DT1 of the down by-pass timing relay DT.

The relay PD also operates break contacts PD7 and make contacts PD8 in circuits associated with the down by-pass timing relay DT. Such circuits are similar to those heretofore described for other timing relays in the elevator control system and include a firing capacitor C10, a capacitor discharge resistor R48, a capacitor charging resistor R49 and a thyratron tube TU11.

Assuming that system conditions are such that the down by-pass relay 77D and the instant dispatch relay PD have pickup and that immediately prior to such operation the down by-pass timing relay DT was deenergized (break contacts DT1 are closed), break contacts PD7 are open, but make contacts 77D2 are closed to maintain the discharge circuit for the capacitor C10. Consequently the capacitor cannot charge, although make contacts PD8 in its charging circuit are closed. Next assume that demand for down elevator service decreases to a point such that the relay 77D drops out. Opening of make contacts 77D1 has no immediate effect on system operation for the reason that the relay PD is maintained energized through its holding circuit. Make contacts 77D2, however, open to interrupt the discharge circuit for the capacitor C10, and the capacitor charges through the following circuit:

L1, PD8, R49, C10, L2

When the voltage across the capacitor C10 reaches a suitable value, the tube TU11 fires to complete the following circuit:

L1, PD8, DT, TU11, L2

The time delay in pickup of the down by-pass timing relay DT depends upon the specific requirements of each installation. As representative of suitable parameters, it will be assumed that this relay has a time delay in pickup of the order of two minutes. The resistor R49 or the capacitor C10 or both of these components may be adjustable for the purpose of adjusting the time delay of the relay DT.

In picking up, the down by-pass timing relay DT opens its break contacts DT1 to interrupt the holding circuit of the instant dispatch relay PD. Consequently, the rapid dispatching of successive elevator cars from the lower terminal or first floor, which conveniently may be termed instant dispatch operation, is terminated.

Inasmuch as the relay PD now is deenergized and dropped out, its make contacts PD6 open with no immediate effect on the operation of the system. In addition, break contacts PD7 close to complete with the resistor R48 a discharge circuit for the capacitor C10, while make contacts PD8 open to interrupt the energizing circuits for the capacitor C10 and the down by-pass timing relay DT. Reclosure of break contacts DT1 upon dropout of the relay DT has no immediate effect on system operation.

From the preceding discussion, it will be clear that if an elevator car is fully loaded when conditioned for down travel, the down by-pass relay 77D picks up to energize the instant dispatch relay PD, which, in turn, promptly conditions the elevator system for instant dispatch operation; and when the relay 77D drops out, the termination of instant dispatch operation is subjected to the full delay of two minutes introduced by the down by-pass timing relay DT. Consequently, the system maintains its instant dispatch service despite momentary decreases in down traffic.

In order for the high up zone position relay Z2U to be energized, an elevator car must be located in the high up zone (4th and 5th floors, make contacts Z2–5, BZ2–5 or CZ2–5, as the case may be, are closed). In order for the low up zone position relay Z1U to be energized, an elevator car must be located in the low up zone (2nd and 3rd floors, make contacts Z1–4, BZ1–4 or CZ1–4, as the case may be, are closed). Furthermore, in order for each of these up zone position relays to be energized, an elevator car which is located in the associated up zone, as aforesaid, must not be available for assignment (break contacts FR15, BFR15 or CFR15, as the case may be, are closed), and the down call assigned relay associated with the same elevator car must be dropped out (break contacts FA12, BFA12 or CFA12, as the case may be, are closed). Additionally, the same elevator car must be conditioned for up travel (make contacts W15, BW15 or CW15 are closed) or it must be conditioned, when assigned to answer up floor calls while traveling in the down direction, to stop at the lowest floor for which an up floor call is registered (make contacts 69L4, B69L4 or C69L4 are closed).

For example, if the elevator car A is conditioned for up travel, or if it is conditioned, when asigned to answer up floor calls while traveling in the down direction, to stop at the lowest floor for which an up floor call is registered, if it is not assigned to anwer down floor calls, if it is not available for assignment and if it is located in the high up zone, the following energizing circuit is completed for the relay Z2U:

L1, W15, or 69L4, FA12, FR15, Z2–5, Z2U, L2

In picking up, the high up zone position relay Z2U opens its break contacts Z2U1 in the energizing circuit of the high up zone call relay KH, to which reference may be made in the left-hand column of FIG. 10. Consequently, under these conditions, the relay KH cannot pick up, although an up floor call may be registered for a floor in the high up zone (make contacts 4UR5 or 5UR4 are closed).

Returning now to the low up zone position relay Z1U and assuming that the same conditions exist as enumerated above, with the exception that the elevator car A is located in the low up zone, the following energizing circuit is completed:

L1, W15 or 69L4, FA12, FR15, Z1–4, Z1U, L2

Pickup of the low up zone position relay Z1U is accompanied by the opening of its break contacts Z1U1 in the energizing circuit of the low up zone call relay KL in the left-hand column of FIG. 10. Thus, under the last-named conditions, the relay KL cannot pick up, although an up floor call may be registered for a floor in the low up zone (make contacts 2UR5 or 3UR5 are closed).

By inspection of FIG. 10, it will be observed that if no elevator car is located in the high up zone (make contacts Z2–5, BZ2–5 and CZ2–5 all are open), the high up zone position relay Z2U cannot pick up. Similarly, if no elevator car is located in the low up zone (make contacts Z1–4, B1–4 and C1–4 all are open), the low up zone position relay Z1U cannot pick up. Furthermore, if all of the elevator cars are available for assignment (break contacts FR15, BFR15 and CFR15 all are open), or if all of the elevator cars are assigned to answer down floor calls (break contacts FA12, BFA12 and CFA12 all are open), or if none of the elevator cars is conditioned for up travel (make contacts W15, BW15 and CW15 all are open) and no elevator car, while traveling down, is conditioned to stop at the lowest floor for which an up floor call is registered (make contacts 69L4, B69L4 and C69L4 all are open), neither the relay Z1U nor the relay Z2U can be picked up.

The low up zone assigned relay AL, when energized, indicates that an elevator car has been assigned to answer up floor calls for floors in the low up zone (2nd and 3rd floors). In order for this relay initially to be energized, there must be a demand for up service for the low up zone (make contacts DUL3, are closed). In addition, at least one elevator car must be asigned to answer up floor calls (make contacts FU10, BFU10 or CFU10, as the case may be, are closed).

In picking up, the low up zone assigned relay AL closes its make contacts AL3 to establish with make contacts KL4 a holding circuit for the relay AL. (Since make contacts DUL3 must be closed in order for the relay AL to pick up and make contacts KL3 must be closed in order for the low up zone demand relay DUL to pick up, make contacts KL4 in the holding circuit of the relay AL must be closed when the relay AL initially is energized.) Thus, the relay AL is maintained energized through its holding circuit until the low up zone positioned relay Z1U picks up to open its break contacts Z1U1 to drop out the low up zone call relay KL.

The master high up zone asigned relay AH, when energized, indicates that an elevator car has been asigned to answer up floor calls for floors in the high up zone (4th and 5th floors). Thus, this relay is energized when the high up zone assigned relay for any elevator car is energized and picked up. For example, if the elevator car A is assigned to answer up floor calls for floors in the high up zone, make contacts FUH4 are closed to energize the relay AH. The contacts FUH4 remain closed until the car A, when conditioned for up travel, is located in the high up zone, at which time such contacts open to terminate energization therethrough of the master high up zone assigned relay AH.

FIGURE 11

FIG. 11 is directed to circuits for the up demand timing relay KT, to circuits for measuring the ratio of stops made by the elevator cars while conditioned for travel in the up direction to all stops made by the elevator cars, and to circuits for the multiple available car relay MFC, the high zone demand relay KBH and the low zone demand relay KBL.

The circuits for controlling the up demand timing relay KT include a firing capacitor C11, a capacitor discharge resistor R50, a capacitor charging resistor R51 and a cold-cathode thyratron tube TU12. In order to illustrate the operation of this relay, it will be assumed that the system conditions are such that the ratio of stops made by the elevator cars while conditioned for travel in the up direction to all stops made by the elevator cars does not exceed a predetermined value during a predetermined time interval (make contacts UA2 and TA2 are open), that the elevator system is conditioned for no demand return operation (break contacts NDR7 are open and make contacts NDR8 are closed), and that no fully-loaded elevator car is conditioned for up travel and located at the lower terminal or first floor (make contacts 77U2 are open). Immediately prior to such operation, the relay KT was de-energized.

Opening of break contacts NDR7 interrupts the discharge circuit for the capacitor C11, while closure of make contacts NDR8 results in completion of the following charging circuits for the capacitor C11:

L1, NDR8, R51, C11, L2

When the voltage across the capacitor C11 builds up to a suitable value, the tube TU12 fires to complete the following circuit:

L1, NDR8, KT, TU12, L2

The time delay in pickup of the up demand timing relay KT depends upon the specific requirements of each installation. As representative of suitable parameters, it will be assumed that this relay has a time delay in pickup of the order of 2½ minutes. The resistor R51 or the capacitor C11 or both of these components may be adjustable for the purpose of adjusting the time delay of the relay KT.

Pickup of the relay KT results in the termination of no demand return operation by the elevator system. As a result, make contacts NDR8 open to interrupt the charging circuit for the capacitor C11 and the energizing circuit for the up demand timing relay KT. In addition, break contacts NDR7 close to establish a discharge circuit for the capacitor C11. Consequently, the timing circuit is reset in order to initiate a new timing operation under the proper system conditions.

As long as there is a substantial demand for elevator service in the up direction, the timing circuits associated with the up demand timing relay KT cannot effect pickup thereof. Thus, if an elevator car is located at the first floor, is conditioned for up travel and is fully loaded or if the ratio of stops made by the elevator cars while conditioned for travel in the up direction to all stops made by the elevator cars exceeds a predetermined value during a predetermined time interval, make contacts 77U2 or UA2 and TA2, respectively, are closed to complete a discharge path for the capacitor C11. Consequently, although under these conditions the elevator system is conditioned for no demand return operation (break contacts NDR7 are open and make contacts NDR8 are closed), the capacitor C11 cannot charge to effect energization of the relay KT. It will be apparent, therefore, that a timing operation of these circuits cannot begin until the termination of a substantial demand for elevator service in the up direction, and such timing operation cannot be completed to interrupt no demand return operation of the system unless such substantial demand for up service continuously is absent for a predetermined period of time after the termination thereof. As a result, the elevator system maintains its no demand return operation despite momentary decrease of a substantial demand for service in the up direction.

If the ratio of the number of stops made by the elevator cars A, B and C while conditioned for travel in the up direction to the total number of stops made by the elevator cars exceeds a predetermined value, the stop ratio relay UA is energized and picked up. It will be noted that the relay UA is connected in series with the secondary winding of a transformer TR3 across the cathode and anode electrodes of an electronic tube TU13. The tube TU13 also has a control electrode, which is connected to the junction of resistors R52 and R53. This tube may be of the cold-cathode type or of the high-vacuum hot-cathode type. However, for present purposes it will be assumed that the tube TU13 is a gaseous discharge tube of the hot-cathode type commonly known as a thyratron. The primary winding of the transformer TR3 may be energized from any suitable alternating-current source of energy.

The anode current flowing through the tube TU13 is controlled by a bridge circuit, which includes resistors R52, R53, R54, and R55. The resistors R52 and R54 are fixed resistors of equal resistance, whereas the resistors R53 and R55 are adjustable resistors. The value of effective resistance in the resistor R53 is dependent upon the number of stops made by the elevator cars while conditioned for up travel. The effective value of resistance in the resistor R55 is dependent upon the total number of stops made by the elevator cars. It will be noted that the resistor R52 and the effective value of the resistor R53 are connected in series across the buses L1 and L2. The resistor R54 and the effective value of the resistor R55 also are connected serially across the buses L1 and L2. The cathode electrode of the tube TU13 is connected to the junction of the resistors R54 and R55.

In order to explain the operation of the bridge circuit, let it be assumed that the tube TU13 fires when its control electrode becomes positive relative to its cathode electrode. It will be assumed further that at the start of a measuring period the effective values of the resistors R53 and R55 are equal, that each stop of an elevator car increases the effective value of the resistor R55 by 10,000 ohms and that each stop of an elevator car while conditioned for travel in the up direction increases the effective value of the resistor R53 by 20,000 ohms. It will be recalled that the bus L1 is assumed to be a positive bus and that the bus L2 is assumed to be a negative bus.

If an elevator car makes a stop while conditioned for travel in the down direction, the effective value of the resistor R55 is increased by 10,000 ohms. Since this increases the negative bias on the control electrode of the tube TU13, the tube does not fire. If an elevator car now makes a stop while conditioned for travel in the up direction, an additional 10,000 ohms is added to the effective value of the resistor R55, which now has a total effective value of 20,000 ohms. However, the up stop also increases the effective value of the resistor R53 by 20,000 ohms under the assumed conditions, and the bridge consequently is balanced. Since there is no potential difference between the control and cathode electrodes of the tube TU13, the tube does not fire under the assumed conditions.

If an elevator car again makes a stop while conditioned for travel in the up direction, the effective value of the resistor R55 becomes 30,000 ohms, whereas the effective value of the resistor R53 becomes 40,000 ohms. Consequently, under the assumed conditions, the bridge is unbalanced, and a positive bias is applied to the control electrode of the tube TU13 which results in the firing of the tube. The relay UA thereupon picks up. Under these assumed conditions, the tube fires when the ratio of stops made by the elevator cars while conditioned for travel in the up direction to the total stops made by the elevator cars exceeds one-half.

If each stop made by an elevator car while conditioned for travel in the up direction were to increase the effective resistance of the resistor R53 by 30,000 ohms, it follows that the tube TU13 would fire whenever the ratio of the stops made by the elevator cars while conditioned for travel in the up direction to the total stops made by the elevator cars exceeds one-third.

The adjustments of the resistors R53 and R55 respectively in accordance with the up stops and the total stops made by the elevator cars are controlled by the up stop counting stepping switch KXU and the stop counting stepping switch KX. These stepping switches are similar in construction to the assigned zone stepping switch KA of FIG. 5 and the down demand midpoint stepping switch SZ of FIG. 7. Thus, the stepping switch KXU has a level KXUa, comprising a pair of brushes which are displaced from each other by 180 degrees about a shaft KXUS. These brushes are connected to the bus L2. Associated with the brushes of the level KXUa is a semi-circular row of contacts, including a pair of homing contacts, numbered zero, and ten additional contacts, respectively numbered one through ten, a plurality of which are connected to taps on the resistor R53. The stepping switch KXU also has cam-operated homing contacts KXU1, which are open when the brushes of the level KXUa are in their homing position, as is illustrated in FIG. 11, and which are closed for all other positions of the brushes. In addition, the switch KXU is provided with self-stepping break contacts KXU2. The junction of the contacts KXU1 and KXU2 is connected to the reset relay RT through a blocking rectifier RE13 and either make contacts TA4 or make contacts RT3.

Referring now to the stop counting stepping switch KX, this switch includes a level KXa, comprising a pair of brushes which are displaced from each other by 180 degrees about a shaft KXS. These brushes also are connected to the bus L2. Associated with the brushes of the level KXa is a semi-circular row of contacts disposed for engagement by the brushes and including a pair of homing contacts, numbered zero, and ten additional contacts, respectively numbered one through ten, a plurality of which are connected to taps on the resistor R55. The stepping switch KX also has cam-operated homing contacts KX1, which are open when the brushes of the level KXa are in their homing position, as is illustrated in FIG. 11, and which are closed in all other positions of the brushes. In addition, the stepping switch KX has self-stepping break contacts KX2. The junction of the contacts KX1 and KX2 is connected to the reset relay RT through a blocking rectifier RE14, and either make contacts TA4 or make contacts RT3.

The coil of the stop counting stepping switch KX is connected for energization across the buses L1 and L2 through a circuit having three parallel arms, a separate one for each of the elevator cars in the system. One of the arms includes make contacts M14 and break contacts M15 of the running relay for the elevator car A. A second arm includes the corresponding make contacts BM14 and break contacts BM15 of the running relay associated with the car B, while the third arm includes the corresponding make contacts CM14 and break contacts CM15 of the running relay for the car C. Referring to the arm associated with the car A, for example, when the car A is running, make contacts M14 are closed and break contacts M15 are open. As the car A stops at a floor, the contacts M14 open and the contacts M15 close. However, the contacts M15 are designed to close slightly before the contacts M14 open. Consequently, for each stop of the elevator car A, a pulse of current is supplied to the coil of the stepping switch KX to advance the brushes of the level KXa one step or position in clockwise direction, as viewed in FIG. 11.

For resetting purposes, the coil of the stepping switch KX is connected across the buses L1 and L2 through make contacts RT5 of the reset relay, the self-stepping contacts KX2 and the homing contacts KX1, recalling that the contacts KX1 are closed whenever the brushes of the level KXa are away from their homing position. Consequently, as long as the contacts RT5 remained closed, the self-stepping contacts KX2 alternately open and close, and the brushes of the level KXa step rapidly in a clockwise direction until they reach their homing position, at which time the cam-operated homing contacts KX1 are opened.

The circuit associated with the coil of the up stop counting stepping switch KXU is identical to that associated with the coil of the stepping switch KX, with the exception that make contacts of the up preference relays are added to effect response of the stepping switch KXU only to stops of the elevator cars while conditioned for travel in the up direction.

As is clearly shown in FIG. 11, the coil of the stepping switch KXU is connected across the buses L1 and L2 through a circuit having three parallel arms, each of which is associated with a separate one of the elevator cars. Thus, for the car A, the coil of the stepping switch KXU is connected across the buses L1 and L2 through make contacts M12, break contacts M13 and make contacts W16. The contacts M12 and M13 operate in the same manner as the contacts M14 and M15 associated with the stepping switch KX. However, because of the presence of make contacts W16 and similar contacts BW16 and CW16 for the elevator cars B and C, respectively, the coil of the stepping switch KXU is energized once for each stop of an elevator car while conditioned for travel in the up direction.

It will be noted that one of the homing contacts of the level KXUa and the contacts numbered 1 and 2 thereof are connected directly to each other and have no resistance therebetween. This is for the purpose of preventing operation of the relay UA unless at least three stops have been made by elevator cars conditioned for travel in the up direction. The number of such stops required before the relay UA is permitted to operate may be controlled by the number of contacts which are connected directly to each other. If desired, the first resistance step (that between the contacts numbered 2 and 3 of the level KXUa) may be made slightly larger than the remaining resistance steps to assure the desired operation.

The stepping switches KX and KXU are reset at predetermined intervals. Such intervals are measured by circuits associated with an electronic tube TU14, which has its anode and cathode electrodes connected across the buses L1 and L2 through the ratio timing relay TA and break contacts RT1 of the reset relay. The contacts RT1 also are connected in series with a charging resistor R56 and a firing capacitor C12 across the buses L1 and L2. The tube TU14 has a control electrode, which is connected to the junction of the resistor R56 and the capacitor C12. A capacitor discharge resistor R57 is connected through make contacts RT2 across the capacitor C12. The tube TU14 may be of any desired type, such as a hot-cathode, high-vacuum tube or a thyratron. For present purposes, it will be assumed that this tube is a cold-cathode gaseous-discharge tube.

When the reset relay RT drops out, it opens its make contacts RT2 to interrupt the discharge circuit for the capacitor C12. Closure of break contacts RT1 effects the charging of the capacitor C12 through the resistor R56 at a rate determined by the resistance and the capacitance of the charging circuit. Upon expiration of the time required for the voltage across the capacitor C12 to build up to a suitable value, the tube TU14 fires to establish the following energizing circuit for the ratio timing relay TA:

L1, RT1, TA, TU14, L2

The time delay in pickup of the relay TA depends upon the specific requirements of each installation. As representative of suitable parameters, it will be assumed that this relay has a time delay in pickup of the order of ninety seconds. The resistor R56 or the capacitor C12 or both of these components may be adjustable for the purpose of adjusting the time delay of the relay TA.

In picking up, the relay TA closes its make contacts TA3 to establish a holding circuit around the tube TU14. Inasmuch as the contacts TA3 shunt the plate and cathode electrodes of the tube TU14, the discharge therebetween is terminated.

Closure of make contacts TA2 of the ratio timing relay partially completes a discharge circuit for the capacitor C11 in the timing circuit of the up demand timing relay KT. In order to complete this discharge circuit, make contacts UA2 of the stop ratio relay must be closed to indicate that the ratio of the up stops to the total stops is greater than a predetermined value. Closure of make contacts TA4 results in energization of the reset relay RT, provided that the brushes of the stepping switch KX or of the stepping switches KX and KXU are away from their homing position (homing contacts KX1 or KX1 and KXU1 are closed).

When the reset relay RT picks up, it closes its make contacts RT3 to establish a self-holding circuit around the contacts TA4. Closure of make contacts RT4 and RT5 results in the resetting of the stepping switches KXU and KX, respectively, as discussed above. Finally, break contacts RT1 open to deenergize the ratio timing relay TA and to interrupt the charging circuit of the capacitor C12, while make contacts RT2 close to establish a discharge circuit for the capacitor C12 through the resistor R57.

It is believed desirable at this point to describe a sequence of operations of the stepping switches KX and KXU. Let it be assumed that the components are in the conditions illustrated in FIG. 11 and that break contacts RT1 have just reclosed to initiate the charging of the capacitor C12. It will be assumed further that the resistors R53 and R55 are proportioned to pick up the stop ratio relay UA when the ratio of up stops to total stops is three-fourths (75%) or more.

As the capacitor C12 charges, it will be assumed that the elevator car A stops, while conditioned for down travel, at the third floor and that the elevator car B successively stops, during up travel, at the second, fourth and fifth floors.

As the car A stops at the third floor, make contacts M14 of its running relay open, and break contacts M15 thereof close. However, it will be recalled that there is a brief time during which both of these sets of contacts are closed, and the coil of the stop counting stepping switch KX consequently is energized. Immediately thereafter, however, make contacts M14 open to deenergize the coil, and, in response to such deenergization, the shaft KXS of the level KXa rotates to move the brushes associated therewith one step in a clockwise direction. Consequently, one of the brushes now is in engagement with the contact numbered 1 of the level KXa. During the stepping operation, the self-stepping contacts KX2 open and reclose without affecting the operation of the system. Since the brushes of the level KXa are away from their homing position, the homing contacts KX1 now are closed, but such closure also has no effect on system operation at this time.

It will be assumed that the advance of the brushes of the level KXa increases the effective value of the resistor R55 to 10,000 ohms. This places a negative bias on the control electrode of the tube TU13, and the stop ratio relay UA consequently remains dropped out.

During the foregoing operation of the stepping switch KX, make contacts M12 open and break contacts M13 close. However, since the elevator car A is conditioned for travel in the down direction, make contacts W16 are open, and the coil of the stepping switch KXU thus remains deenergized.

As the elevator car B stops successively at the second, fourth and fifth floors, make contacts BM14 and break contacts BM15 supply three successive pulses of energy to the coil of the stepping switch KX for the purpose of advancing the brushes associated with the level KXa three additional steps. Consequently, the aforementioned brush of the level KXa now engages the contact numbered 4. It will be assumed that each step introduces 10,000 ohms of the resistor R55 to give a total effective value of 40,000 ohms.

Inasmuch as the elevator car B is conditioned for up travel, make contacts BW16 of its up preference relay are closed. Thus, since the car B has stopped successively at the second, fourth and fifth floors, make contacts BM12 and break contacts BM13 coact to supply three successive pulses of current to the coil of the stepping switch KXU. This advances the shaft KXUS three steps to bring one of the brushes associated therewith into engagement with the contact numbered 3 of the level KXUa.

It will be assumed that the amount of resistance between the contacts numbered 2 and 3 of the level KXUa is 41,000 ohms. Since the effective value of the resistor R53 is 41,000 ohms as compared to an effective value of 40,000 ohms for the resistor R55, the bridge is unbalanced in a direction supplying a positive bias to the control electrodes of the tube TU13. As a result, the tube discharges during those half cycles of the secondary voltage of the transformer TR3 when the anode electrode is positive with respect to the cathode electrode of the tube to pick up the relay UA. The relay UA preferably is a somewhat sluggish relay to prevent response of the relay to brief stepping operations of the stepping switches.

It will be assumed next that at this stage, the capacitor C12 has charged sufficiently to fire the tube TU14 and thus to pick up the ratio timing relay TA. The relay TA closes its make contacts TA3 to establish with break contacts RT1 a self-holding circuit. In addition, make contacts TA2 close. Since make contacts UA2 also are closed, a discharge circuit is completed for the capacitor C11 through the resistor R50.

The ratio timing relay TA also closes its make contacts TA4 to establish with the closed homing contacts KXU1 and KX1 and their respective associated blocking rectifiers RE13 and RE14 an energizing circuit for the reset relay RT. The reset relay opens its break contacts RT1 to interrupt the charging circuit of the capacitor C12 and to deenergize the ratio timing relay TA. In addition, make contacts RT2 close to establish with the resistor R57 a discharge circuit for the capacitor C12. Closure of make contacts RT3 establishes with the homing contacts KXU1 and KX1 and their respective associated blocking rectifiers RE13 and RE14 a self-holding circuit for the reset relay.

Closure of make contacts RT4 completes with the self-stepping contacts KXU2 and the homing contacts KXU1 a self-stepping circuit for the coil of the up stop counting stepping switch KXU. Consequently, the shaft KXUS rapidly steps in a clockwise direction until its associated brushes arrive at their homing position, at which time the homing contacts KXU1 are cam-operated to open in order to interrupt the self-stepping circuit. As a result, the brushes remain in their homing position.

Closure of make contacts RT5 completes with the self-stepping contacts KX2 and the homing contacts KX1 a self-stepping circuit for the coil of the stop counting stepping switch KX. Consequently, the shaft KXS rapidly steps in a clockwise direction until the brushes associated therewith engage the homing contacts of the level KXa, at which time the homing contacts KX1 are cam-operated to open to interrupt the self-stepping circuit for the coil of the stepping switch KX. As a result, the brushes remain in their homing position.

It will be recalled that the opening of break contacts RT1 upon pickup of the reset relay RT resulted in dropout of the ratio timing relay TA. Such dropout was accompanied by opening of make contacts TA2 to interrupt the discharge circuit of the capacitor C11 therethrough. Inasmuch as the brushes of the stepping switches KXU and KX now are in their homing positions under the assumed conditions, the control and cathode electrodes of the tube TU13 both are connected to the bus L2. Thus, the tube TU13 ceases to conduct current, and the stop ratio relay UA consequently is deenergized and dropped out. As a result, make contacts UA2 in the discharge circuit of the capacitor C11 also are open.

Since the cam-operated homing contacts KXU1 and KX1 both are open at this time, the reset relay RT is deenergized and dropped out. Opening of make contacts RT3, RT4 and RT5 has no immediate effect on system operation. However, the reset relay opens its make contacts RT2 to interrupt the discharge circuit for the capacitor C12 and closes its break contacts RT1 to initiate another timing operation of the ratio timing relay TA.

By inspection of FIG. 11, it will be observed that the blocking rectifiers RE13 and RE14 prevent energization of the coils of the stepping switches KX and KXU, respectively, through the cam-operated homing contacts KXU1 and KX1, respectively.

From the foregoing discussion, it is clear that the circuits associated with the stepping switches KX and KXU measure the ratio of up stops to total stops of the elevator cars for each interval determined by the ratio timing relay TA, and if the ratio for any such interval is equal to at least a predetermined value, a discharge circuit is completed for the capacitor C11 (make contacts UA2 and TA2 are closed) in order to prevent the initiation of a timing operation of the up demand timing relay KT. Conversely, if such ratio is not equal to at least such predetermined value during such interval, the discharge circuit for the capacitor C11 is interrupted, provided that the elevator system is conditioned for no demand return operation (break contacts NDR7 are open and make contacts NDR8 are closed) and the up by-pass relay 77U is dropped out to open its make contacts 77U2.

The multiple available car relay MFC, when energized, indicates that at least two elevator cars are available for assignment when there is a demand for service. In order for this relay to be energized, there must be a down zone demand for service (make contacts ZD5 are closed) or an up zone demand for service (make contacts DU3 are closed). It will be observed that the energizing circuit for this relay includes two resistors R58 and R59. The resistor R58 has a plurality of taps, to each of which is connected make contacts of the available car relay associated with one of the elevator cars A, B and C. These contacts, FR16, BFR16 and CFR16, respectively, also are connected to each other in a manner such that if at least two of the contacts are closed, a portion of the resistor R58 is shorted out. If this be the case, and if there is a down or up zone demand for service, the effective resistance of the resistor R58 is such that the current flowing therethrough is sufficient to pick up the relay MFC. For example, if the elevator cars A and C both are available for assignment, make contacts FR16 and CFR16 are closed to establish the following energizing circuit:

L1, R58a, FR16, CFR16, R58d, MFC7, ZD5 or DU3, MFC, L2

Upon pickup, the relay MFC opens its break contacts MFC7 to introduce the resistor R59 in series with the effective resistance of the resistor R58. This results in a decrease in current flowing through the relay MFC, but such decrease is insufficient to effect dropout of the relay. When the available car relay for the elevator car A or C drops out, however, make contacts FR16 or CFR16, as the case may be, open to introduce the full resistance of the resistor R58 in series with the relay MFC and the resistor R59. Consequently, the relay MFC drops out, the resistor R59 insuring that such dropout occurs. When the multiple available car relay MFC drops out, it closes its break contacts MFC7 to short out the resistor R59. Such shorting insures that the relay will pick up the next time at least two elevator cars are available for assignment, provided that there is an up or a down zone demand for elevator service, as aforesaid. From the preceding discussion, it will be apparent that the relay MFC must be dropped out when there is no up or down zone demand for service and/or when one or no elevator car is available for assignment.

For purposes which will be discussed hereinafter, the floors served by the present elevator system, in addition to being divided into first, second and third down zones and low and high up zones, as heretofore explained, are divided into low and high zones. The low zone comprises the first, second and third floors, while the high zone includes the fourth, fifth and sixth floors. The present elevator control system includes a high zone demand relay KBH and a low zone demand relay KBL.

The high zone demand relay KBH, when dropped out as a result of the opening of break contacts K3–5 and/or K2–6, indicates the existence of a demand for down service for the high zone. It will be recalled that, generally speaking, the down zone demand registering relay K3 is picked up to open its break contacts K3–5 when a down floor call is registered for a floor in the third down zone (sixth floor) and that the down zone demand registering relay K2 is picked up to open its break contacts K2–6 when a down floor call is registered for a floor in the second down zone (fourth and fifth floors).

If an elevator car is assigned to serve the third down zone, make contacts F3C4 in parallel with the contacts K3–5 are closed to render the latter contacts ineffective to maintain deenergization of the relay KBH. Similarly, if an elevator car is assigned to serve the second down zone, make contacts F2C6 in parallel with the contacts K2–6 are closed to render the latter contacts ineffective to maintain deenergization of the relay KBH. In addition, it will be observed that, in general, if there is a demand for up service for the high up zone (fourth and fifth floors), break contacts DUH5 are open, and the relay KBH must be dropped out, since the low up zone demand relay DUL must be dropped out (make contacts DUL4 are open) in order for the relay DUH to be picked up. Conversely, in general, if there is a demand for up service for the low up zone (second and third floors), the high zone demand relay KBH is energized through make contacts DUL4, and it also may be energized through break contacts DUH5. Assuming, for example, that there is a demand for down service for the third down zone, that an elevator car has been assigned to serve the third down zone, that there is no demand for down service for the second down zone, or for up service for the high up zone, the following energizing circuit is completed:

L1, F3C4, K2–6, DUH5, KBH, L2

If make contacts DUL4 simultaneously are closed to indicate the existence of a demand for up service for the low up zone, a parallel energizing circuit is provided through such contacts for the relay KBH.

The low zone demand relay KBL, when dropped out as a result of the opening of break contacts K3–5 and/or K2–6, indicates the existence of a demand for down service for the high zone (fourth, fifth and sixth floors) and, when dropped out as a result of the opening of break contacts K1–6 and/or K0–4, indicates the existence of a demand for down service for the low zone (first, second and third floors). It will be recalled that, generally speaking, the down zone demand registering relay K1 is picked up to open its break contacts K1–6 when a down floor call is registered for a floor in the first down zone (second and third floors) and that the down zone demand registering relay K0 is picked up to open its break contacts K0–4 when there is an artificial demand for service for the lower terminal or first floor. Consequently, the relay KBL, when dropped out, may indicate the existence of a demand for down service for the high zone and/or the low zone.

If an elevator car is assigned to serve the first down zone, make contacts F1C6 in parallel with the contacts K1–6 are closed to render the latter contacts ineffective to maintain deenergization of the low zone demand relay KBL. Similarly, if an elevator car is assigned to serve the lower terminal or first floor, make contacts F0C3 in parallel with the contacts K0–4 are closed to render the latter contacts ineffective to maintain deenergization of the relay KBL. Finally, it will be observed that, in general, if there is a demand for up service for the low up zone (second and third floors, break contacts DUL5 are open), the relay KBL must be dropped out.

The example which follows is illustrative of the principles of operation set forth in the preceding discussion. Assuming that there are demands for down service for the third and first down zones, that elevator cars are assigned to serve the third and first down zones, that there is no demand for down service for the second down zone, that there is no artificial demand for service for the first floor and that there is no demand for up service for the low up zone, the following energizing circuit is completed for the low zone demand relay KBL:

L1, F3C4, K2–6, F1C6, K0–4, DUL5, KBL, L2

If the relay DUL subsequently should pick up to indicate the existence of a demand for up service for the low up zone, its break contacts DUL5 will open to deenergize the relay KBL, while its make contacts DUL4 will close to energize and pick up the high zone demand relay KBH.

Considering only the effect of the break contacts of the down zone demand registering relays K0, K1, K2 and K3 associated with the relays KBH and KBL, it will be apparent from the preceding discussion that the high zone demand relay KBH, when dropped out by the opening of break contacts K3–5 and/or K2–6, indicates the existence of a demand for down service for the high zone (fourth, fifth and sixth floors). On the other hand, the low zone demand relay KBL, when dropped out, indicates the existence of a demand for down service for either the high or the low zone (first, second and third floors). If the relay KBL is dropped out and the relay KBH is picked up, the demand for down service definitely is for the low zone. When the relays KBL and KBH both are dropped out, there must be a demand for down service for at least the high zone, and there may be a simultaneous demand for down service for the low zone. Furthermore, if the low up zone demand relay DUL is picked up, the high zone demand relay KBH must be picked up, and the low zone demand relay KBL must be dropped out. Finally, if the high up zone demand relay DUH is picked up, the relay KBH must be dropped out (the relay DUL must be dropped out in order for the relay DUH to be picked up) and the respective conditions of the break contacts of the down zone demand registering relays K0, K1 K2 and K3 and of the make contacts of the assigned zone relays F0C, F1C, F2C and F3C associated with the relay KBL determined the condition of the latter relay, as heretofore explained.

FIGURE 12

When more than one elevator car is available for assignment, for example, during periods of light traffic, and such cars are located at different floors, means are provided in the present control system for selecting a particular one of such cars to respond to a demand or demands for elevator service. In order to expedite service, it is desirable to select that available car which is in the best position to respond to the demand or demands for service, commensurate with practical circuit design considerations. In a preferred embodiment of the invention, such selection is based upon the locations of the available elevator cars with respect to the zone or zones for which the demand or demands for service exist and the type of service, up or down, which is desired.

The circuits of FIG. 12 provide a means for accomplishing the foregoing and are based upon the following considerations:

(1) The floors of the structure served by the elevator cars are divided into a plurality of zones in order to determine the respective locations of available cars relative to a zone for which there is a demand for service. For convenience, only a low zone (first, second and third floors) and a high zone (fourth, fifth and sixth floors) are considered in the present elevator system, although it will be understood that the floors may be divided into a greater number of zones if desired, depending upon traffic conditions, the total number of floors served by the specific installation, etc. (It will be recalled, in addition, that the six floors served by the present elevator system are divided into first, second and third down zones, comprising the second and third, the fourth and fifth and the sixth floors, respectively, and into low and high up zones, comprising the second and third and the fourth and fifth floors, respectively. Furthermore, it also will be recalled that the lower terminal or first floor for certain purposes is considered to be a separate "down" zone.) The conditions of the high zone demand relay KBH and the low zone demand relay KBL generally determine whether there is a demand for service for the high zone and/or for the low zone.

(2) When there is a service demand and more than one car is available for assignment, scanning means in the form of the high zone stepping switch FSH and the low zone stepping switch FSL are employed to select the particular elevator car which is to respond to the demand.

(3) When there is a demand for down service for the high zone, the stepping switch FSH effects the selection, in general, of the highest available car located in the high zone. If no available car is located in the high zone, however, the highest available car in the low zone generally is selected by operation of the stepping switch FSL. If there is a demand for up service for the high zone, such zone is scanned for an available car. If no such car is located in the high zone, the low zone is scanned for an available car.

(4) If there is a demand for down service for the low zone, the stepping switch FSL effects the selection, in general, of the highest available car in the low zone. However, if there is no available car above the lower terminal or first floor in the low zone, scanning is continued to select an available car which is not the next car to be dispatched from the first floor and, if there is no such car, then an available car that is the next car to be dispatched from the first floor. Finally, if no available car is located in the low zone, in general, the highest available car located in the high zone then is selected. When there is a demand for up service for the low zone, the scanning for an available car starts in the low zone and proceeds in the same sequence as the scanning for an available car when there is a demand for down service for the low zone.

(5) When there are demands for down service for both the high and low zones, the high zone and then the low zone is scanned for an available car. If there are demands for up service for both the low and high zones, the low zone and then the high zone is scanned for an available car.

The stepping switches FSH and FSL, which are similar to the stepping switches discussed heretofore, and their associated components now will be discussed in detail. The high zone stepping switch FSH is employed for selecting an available elevator car which is located in the high zone to respond to a demand for service for such zone, as indicated by closure of break contacts KBH1. Under certain conditions to be discussed below, the stepping switch FSH also is used for selecting a car to respond to a low zone service demand.

The stepping switch FSH comprises two levels, FSHa and FSHb. Each of these levels, in turn, includes a semi-circular row of contacts, which are engaged by two brushes, the brushes being displaced from each other by 180 degrees about a common shaft FSHS. The brushes of the two levels are connected to each other.

In FIG. 12, the brushes associated with the stepping switch FSH are illustrated in their homing position, in which they engage blank contacts (numbered 0). The remaining seven positions or contacts associated with each of the brushes are numbered 1 through 7, respectively. The stepping switch FSH also is provided with a set of homing contacts FSH1. These contacts are cam-operated by the stepping switch to open when the brushes associated therewith are in their homing position. When the brushes are in any position other than their homing position, the contacts FSH1 are closed.

In order to step the shaft FSHS, the high zone stepping switch FSH is provided with a set of self-stepping break contacts FSH2. In order to energize the coil of the switch FSH initially, the contacts FSH2 must be closed, and certain other conditions, to be discussed below, must be met. Upon energization of the coil of the stepping switch FSH through its contacts FSH2, these contacts open, and if no other energizing circuit is completed for the coil, the brushes of the switch step rapidly in a clockwise direction, as viewed in FIG. 12. As long as the coil of the switch is energized continuously, however, the brushes cannot step, and they remain in a fixed position.

The high zone no selection relay SHN is energized immediately after the brushes of the stepping switch FSH have scanned for an available car in the high zone and have found none. Thus, when the brushes of the level FSHa reach their seventh position, the relay SHN picks up to open its make contacts SHN1, and further stepping of the brushes is prevented as a result of the continuous energization of the coil of stepping switch through break contacts SLN2 and a blocking rectifier RE15. It will be observed that the rectifier RE15 prevents energization of the high zone no selection relay SHN until the brushes of the level FSHa reach their seventh position. It also will be observed that energization of the relay SHN is accompanied by closure of its make contacts SHN2 to energize the coil of the low zone stepping switch FSL and by opening of its break contacts SHN3.

The stepping switch FSL is employed for selecting an available car which is located in the low zone to respond to a demand for service for such zone, as indicated by closure of break contacts KBL1 and make contacts KBH2. This stepping switch also is used for selecting a car to respond to a high-zone service demand, if no car is available in the high zone.

The low zone stepping switch FSL also comprises two levels, FSLa and FSLb. Each of these levels includes a semi-circular row of contacts, which are engaged by two brushes, the brushes being displaced from each other by 180 degrees about a common shaft FSLS. The brushes of the two levels are connected to each other.

In FIG. 12, the brushes associated with the stepping switch FSL also are illustrated in their homing position, in which they engage blank contacts (numbered 0). The remaining ten positions or contacts associated with each of the brushes are numbered 1 through 10, respectively. The stepping switch FSL is provided with a set of homing contacts FSL1. These contacts are cam-operated by the stepping switch to open when its brushes are in their homing position. When the brushes are in any position other than their homing position, the contacts FSL1 are closed.

The stepping switch FSL is provided with a set of self-stepping break contacts FSL2. In order to energize the coil of the switch FSL initially, the contacts FSL2 must be closed, and certain other conditions, to be discussed hereinafter, must be met. Upon energization of the coil of the switch FSL through its contacts FSL2, these contacts open, and if no other energizing circuit is completed for the coil, the brushes of the switch step rapidly in a clockwise direction, as viewed in FIG. 12. As long as the coil of the switch is energized continuously, however, the brushes cannot step, and they remain in a fixed position.

The low zone no selection relay SLN is energized immediately after the brushes of the stepping switch FSL have scanned for an available car in the low zone and have located none. When the brushes of the level FSLb reach their tenth position, the relay SLN picks up to open its break contacts SLN3, and the coil of the stepping switch FSL is energized continuously through break contacts SHN3 and a blocking rectifier RE16 in order to prevent further stepping of the brushes. It will be noted that the rectifier RE16 prevents energization of the relay SLN until the brushes of the level FSLb reach their tenth position. It also will be noted that pickup of the relay SLN is accompanied by opening of its break contacts SLN2 and by closure of its make contacts SLN1 to energize the coil of the high zone stepping switch FSH through the self-stepping contacts FSH2.

The b level of the stepping switch FSH and the a level of the stepping switch FSL are employed for effecting energization of the demand response relays FCR, BFCR and CFCR associated with the elevator cars A, B and C, respectively. Pickup of one of these relays indicates that the associated elevator car has been selected, during a scanning operation of either the stepping switch FSH or FSL, to be assigned to respond to a demand for service. The relays FCR, BFCR and CFCR preferably are somewhat sluggish relays in order to prevent response thereof to brief stepping operations of the stepping switches.

It is believed desirable at this point to describe several cycles of operation of the circuits illustrated in FIG. 12. Consequently, several examples will be presented in which there are various demands for elevator service and in which certain of the elevator cars are located in specific positions with respect to the six floors of the structure served thereby. It will be understood that when it is stated that there is a demand for up service for the low zone, it is assumed that an up floor car is registered for the second and/or third floor; that a demand for up service for the high zone refers to the registration of an up floor call for the fourth and/or fifth floor; that a demand for down service for the low zone refers to the registration of a down floor call for the second and/or third floor and/or the existence of an artificial demand for service for the first floor; that a demand for down service for the high zone has reference to the registration of a down floor call for the fourth and/or fifth and/or sixth floor; that a car in the first zone is located at the second or third floor; that a car in the second zone is located at the fourth or fifth floor; and finally that a car in the third zone is positioned at the sixth floor. Furthermore, in all examples, it will be assumed that the elevator car B is not available for assignment (make contacts BFR17, BFR18 and BFR19 are open) and that the cars A and C are available for assignment (make contacts FR17, CFR17, FR18, CFR18, FR19 and CFR19 of the available car relays FR and CFR associated with the cars A and C, respectively, are closed; make contacts MFC8, MFC10, MFC11 and MFC12 of the multiple available car relay MFC are closed and break contacts MFC9 and MFC13 thereof are open). Additionally, assume for each example that the stepping switches FSH and FSL initially are in the conditions illustrated in FIG. 12.

Example 1.—Under the above conditions, it will be assumed that the elevator car A is located in the first zone (make contacts Z1–5 are closed), that the car C is located in the second zone (make contacts CZ2–6 are closed) and that there is a demand for down or for up service for the high zone (break contacts KBH1 are closed, make contacts KBH2 are open and make contacts ZD6 and ZD7 of the down zone demand relay or make contact DU4 and DU5 of the up zone demand relay, as the case may be, are closed). Under these conditions, the following energizing circuit is completed for the coil of the high zone stepping switch FSH:

L1, MFC8, KBH1, FSH2, FSH, L2

Such energization results in the rapid scanning for an available car in the high zone by the brushes of stepping switch FSH. When these brushes arrive at their sixth position, the following circuit is established through the level FSHa for energizing continuously the coil of the stepping switch:

L1, ZD6 or DU4, MFC10, CZ2–6, CFR17, FSH, L2

As a result, the scanning operation of the brushes is terminated. As the same time, the level FSHb effects completion of the following energizing circuit:

L1, ZD6 or DU4, MFC10, CFR18, CFCR, L2

Pickup of the demand response relay CFCR for the elevator car C indicates that the car C has been selected to be assigned to respond to the up or down service demand for the high zone.

After the car C is so assigned, the down zone demand relay ZD or the up zone demand relay DU, as the case may be, the available car relay CFR and the multiple available car relay MFC drop out by a sequence of operations which will be discussed hereinafter. As a result, make contacts ZD6 or DU4, CFR17, CFR18, MFC8 and MFC10 open and break contacts MFC9 close to drop out the demand response relay CFCR and to effect the rapid resetting of the brushes of the stepping switch FSH to their homing position by means of the homing contacts FSH1 and the self-stepping contacts FSH2 in a manner which will be apparent from the preceding discussion.

It will be noted that in this example the elevator car C, which is located in the second zone, has been selected to be assigned to respond to the service demand for the high zone by operation of the high zone stepping switch FSH, bearing in mind that the elevator car A is located in the first zone and that the low zone stepping switch FSL did not participate in such selection.

Example 2.—In this example, it will be assumed that the elevator car C is located in the first zone (make contacts CZ1–5 are closed), that the car A is located at the lower terminal or first floor (make contacts Z0–17 are closed) and that, once again, there is a demand for down or for up service for the high zone (break contacts KBH1 and KBL1 are closed, make contacts KBH2 are open and make contacts ZD6 or DU4 and ZD7 or DU5 are closed).

Under these conditions, the brushes of the high zone stepping switch FSH rapidly scan for an available car in the high zone, as will be understood by reference to Example 1, but since there is none, the brushes continue to step until they reach their seventh position, at which time the level FSHa effects completion of the following energizing circuit:

L1, ZD6 or DU4, MFC10, SHN1 and SLN2, SHN, L2

Energization of the high zone no selection relay SHN indicates that the brushes of the stepping switch FSH have been unable to locate an available car in the high zone. It will be noted that at this time the coil of the stepping switch FSH continuously is energized through the rectifier RE15. As a result, the brushes associated with the stepping switch remain in their seventh position.

Pickup of the relay SHN is accompanied by opening of its break contacts SHN1 and SHN3 without immediate effect on system operation and by closure of its make contacts SHN2 to establish an energizing circuit for the coil of the low zone stepping switch FSL through its self-stepping contacts FSL2. Consequently, the brushes associated with the stepping switch FSL rapidly step in a clockwise direction until they reach their third position, at which time the following energizing circuit is completed by the level FSLb:

L1, ZD7 or DU5, MFC11, CZ1–5, CFR19, FSL, L2

Since the coil of the stepping switch FSL now is energized continuously, the brushes thereof cease their stepping operation and remain in their third position. The level FSLa thus effects completion of the following energizing circuit:

L1, ZD7 or DU5, MFC11, CFR18, CFCR, L2

Pickup of the demand response relay CFCR again indicates that the elevator car C has been selected to be assigned to respond to the up or down service demand for the high zone.

After the elevator car C is so assigned, the brushes of the high zone stepping switch FSH reset to their homing position and the demand response relay CFCR drops out in a manner which will be clear from the preceding discussion. Such resetting results in dropout of the high zone no selection relay SHN, which closes its break contacts SHN1 and SHN3 and opens its make contacts SHN2. In addition, make contacts ZD7 or DU5, CFR19, MFC11 and MFC12 open, while break contacts MFC13 close to effect the resetting of the brushes associated with the low zone stepping switch FSL to their homing position through the homing contacts FSL1 and the self-stepping contacts FSL2, as will be apparent from the preceding discussion.

In this case, it will be observed that the elevator car C, which is the highest available car in the low zone, has been selected to respond to the demand for elevator service for the high zone by operation of the stepping switches FSH and FSL in that order, it being assumed that the car C is located in the second zone, while the car A is positioned at the lower terminal or first floor.

Example 3.—Next, let it be assumed that the elevator car C is located in the third zone, that is, at the sixth floor (make contacts CZ3–5 are closed), that the car A is positioned in the first zone (make contacts Z1–5 are closed) and that there is a demand for up or for down service for the low zone (break contacts KBH1 are open and make contacts ZD6 or DU4, ZD7 or DU5 and KBH2 and break contacts KBL1 all are closed).

Under these conditions, no energizing circuit is established for the coil of the high zone stepping switch FSH. However, the following energizing circuit is completed for the coil of the low zone stepping switch FSL:

L1, MFC12, KBL1, KBH2, FSL2, FSL, L2

Consequently, the brushes of the stepping switch FSL step to their first position, wherein the $b$ level thereof effects completion of a circuit for continuously energizing the coil of the stepping switch FSL, as follows:

L1, ZD7 or DU5, MFC11, Z1–5, FR19, FSL, L2

As a result, these brushes cease their stepping action, and the level FSL$a$ effects energization of the demand response relay FCR for the elevator car A, as follows:

L1, ZD7 or DU5, MFC11, FR18, FCR, L2

Pickup of the relay FCR indicates that the elevator car A, which is located in the first zone, has been selected to be assigned to respond to the up or down service demand for the low zone. It will be noted that this selection has been accomplished by operation of the low zone stepping switch FSL alone, i.e., the high zone stepping switch FSH did not participate in such selection. As will be understood from the preceding discussion, the brushes of the stepping switch FSL subsequently are reset to their homing position.

Example 4.—In this example, it will be assumed that the elevator car C again is located in the third zone (make contacts CZ3–5 are closed), that the car A now is located in the second zone (make contacts Z2–6 are closed) and that once again there is a demand for down or for up service for the low zone (make contacts ZD6 or DU4, ZD7 or DU5 and KBH2 and break contacts KBL1 all are closed and break contacts KBH1 are open).

Since the contacts KBH1 are open and the contacts KBH2 and KBL1 are closed, the brushes of low zone stepping switch FSL rapidly scan the low zone for an available car. Inasmuch as there is no such car in the low zone, these brushes step to their tenth position, wherein the level FSL$b$ effects energization of the low zone no selection relay SLN, as follows:

L1, ZD7 or DU5, MFC11, SHN3 and SLN3, SLN, L2

In addition, the coil of the stepping switch FSL now is energized continuously through the rectifier RE16. Consequently, the brushes of this stepping switch cease stepping.

Pickup of the relay SLN is accompanied by opening of its break contacts SLN3 and SLN2 without immediate effect on system operation and by closure of its make contacts SLN1 to effect the stepping of the brushes associated with the high zone stepping switch FSH through its self-stepping contacts FSH 2. When these brushes reach their third position, a circuit is established through the level FSH$a$ for continuously energizing the coil of the stepping switch FSH through make contacts ZD6 or DU4, MFC10, CZ3–5 and CFR17. Consequently, the brushes stop in their third position, wherein energization of the demand response relay CFCR for the elevator car C is effected by the level FSH$b$ to indicate that the car C has been selected to be assigned to respond to the service demand for the low zone.

Recalling that the car C is located in the third zone while the car A is located in the second zone, this example illustrates a sequence of operations for selecting the highest available car in the high zone to respond to a service demand for the low zone when no available car is located in the low zone, the brushes of the low zone stepping switch FSL first scanning the low zone and the brushes of the high zone stepping switch FSH thereafter scanning the high zone for an available car. These brushes are reset to their respective homing positions in a manner which will be clear from the preceding discussion.

Example 5.—Again let it be assumed that there is a demand for up or for down service for the low zone and that the elevator car C is positioned at the sixth floor in the third zone, but that now, however, the car A is located at the lower terminal or first floor (make contacts Z0–17 are closed) and that it has been selected as the next car which is to be dispatched therefrom (break contacts N10 are open and make contacts N11 are closed).

Inasmuch as break contacts KBH1 are open, while break contacts KBL1 and make contacts KBH2 are closed, the brushes of the low zone stepping switch FSL scan through their first three positions for an available elevator car located above the first floor in the first zone, but finding none, continue through their next three positions to scan for an available car which is located at the first floor and which has not been selected as the next car to be dispatched therefrom and finally for an available car positioned at the first floor which has been selected as the next car to be dispatched therefrom. Thus, when the brushes arrive at their seventh position, the following circuit is completed under the assumed conditions by the level FSL$b$:

L1, ZD7 or DU5, MFC11, N11, Z0–17, FR19, FSL, L2

Since the coil of the stepping switch FSL now is continuously energized, its brushes cease stepping and remain in their seventh position. Furthermore, the demand response relay FCR for the elevator car A is energized through the level FSL$a$ and make contacts FR18 to signify that the car A has been selected to be assigned to respond to the service demand for the low zone. Subsequent to such assignment, the brushes of the stepping switch FSL reset to their homing position by a sequence which will be clear from the preceding discussion.

It will be noted in this example that the low zone stepping switch FSL has operated to effect the selection of an available elevator car located at the lower terminal floor to respond to a demand for service for the low zone and that the chosen car previously had been selected as the next car to be dispatched from the first floor.

Example 6.—Let it be assumed that, as in Example 5, the elevator car C is located in the third zone (sixth floor, make contacts CZ3–5 are closed) and that the car A is positioned at the lower terminal or first floor. Assume, however, that there are demands for down service for both the high and low zones (make contacts ZD6 and ZD7 and brake contacts KBH1 and KBL1 are closed, while make contacts KBH2 are open). As a result, it will be apparent from the preceding discussion that the brushes of the high zone stepping switch FSH scan the high zone for an available elevator car and that when these brushes reach their third position the level FSH$a$ effects continuous energization of the coil of the stepping switch FSH through make contacts ZD6, MFC10, CZ3–5 and CFR17. Consequently, the level FSH$b$ effects pickup of the demand response relay CFCR for the car C to indicate that such car has been selected to be assigned to respond to the demand for down service for the high zone. Subsequently, the brushes of the stepping switch FSH are reset to their homing position in a manner which will be clear from the foregoing discussion. In addition, the elevator car A, which, under the assumed conditions, is located at the first floor, will be assigned to respond to the demand for down service for the low zone, as will be explained hereinafter.

It will be apparent that if no available car had been located in the high zone, the scanning for an available elevator car would have continued through the low zone by operation of the high zone no selection relay SHN and the low zone stepping switch FSL when the brushes of the high zone stepping switch FSH reached their seventh position, as described in Example 2.

Example 7.—Assume that the elevator cars C and A are located at the sixth and first floors, respectively, as in the preceding example, and that the car A is not the next car which is to be dispatched from the first floor (break contacts N10 are closed and make contacts N11 are open). Instead of there being demands for down service for the high and low zones, however, it will be assumed that there are demands for up service for both the high and low zones (break contacts KBH1 are open, while make contacts DU4, DU5 and KBH2 and break contacts KBL1 are closed). As a result, it will be apparent from the foregoing discussion of Example 3 that the brushes of the low zone stepping switch FSL scan the low zone to locate an available car therein. Consequently, when these brushes arrive at their fourth position, the level FSLb effects completion of the following energizing circuit:

L1, DU5, MFC11, N10, Z0–17, FR19, FSL, L2

Since a circuit has been established for continuously energizing the coil of the stepping switch FSL, the level FSLa effects energization and pickup of the demand response relay FCR to indicate that the elevator car A has been selected to be assigned to respond to the demand for up service for the low zone. Subsequently, the brushes of the low zone stepping switch FSL will be reset to their homing position by a sequence which will be clear from the foregoing discussion. In addition, the elevator car C, which, under the assumed conditions, is located at the sixth floor, will be assigned to respond to the demand for up service for the high zone, as will be explained hereinafter.

It will be observed that if no available car had been located in the low zone, the scanning for an available elevator car would have continued through the high zone by operation of the low zone no selection relay SLN and the high zone stepping switch FSH when the brushes of the stepping switch FSL reached their tenth position, as described in Example 4. For instance, if, instead of being located at the lower terminal floor, the elevator car A had been positioned in the second zone (make contacts Z2–6 are closed), after the brushes of the low zone stepping switch FSL completed their scanning operation of the low zone, the brushes of the high zone stepping switch FSH, upon reaching their third position, would have effected pickup of the demand reponse relay CFCR to signify that the elevator car C had been selected to be assigned to respond to the demand for up service for the low zone. (It will be noted that the elevator car C in such instance would have been the highest available elevator car located in the high zone.) Subsequently, the car A would have been assigned to respond to the demand for up service for the high zone.

From Examples 6 and 7, it will be apparent that if there are service demands for both the high and low zones, the scanning for an elevator car which is available for assignment starts in the high zone and proceeds to the low zone for down service demands and starts in the low zone and proceeds to the high zone for up service demands. In each instance, the highest available car in the appropriate zone is the car which is selected to be assigned to respond to a service demand.

Although numerous additional illustrations might be cited, the seven examples set forth above are deemed sufficient for a full understanding of the operation of the stepping switches FSH and FSL. It will be appreciated that when more than one elevator car in the system is available for assignment, the circuits of FIG. 12 provide a means for selecting that available car which generally is located most conveniently relative to a zone of floors for which there is a demand for service.

FIGURES 13 and 14

Suitable door operating components are illustrated in FIG. 13 for the elevator car A, which is representative of all of the cars in the system. The car A is provided with a door DP, which is shown in open position and which is mounted to slide across a passage through which passengers enter and leave the elevator car. In the embodiment of FIG. 13, the door operating components for opening and closing the door DP include a lever 3, which is pivotally mounted on the car by means of a pivot 3A. The lever 3 is moved in a counterclockwise direction about the pivot 3A by means of the door-close solenoid DC for the purpose of closing the passage and is moved in a clockwise direction about the pivot 3A to open the door by means of the door-open solenoid DO.

It will be recalled that the door DP is provided with the limit switch 23, which is operated by the door and which is closed only when the door is in its fully closed position. In addition, it will be recalled that the switch 30 is a limit switch which is normally closed and which is opened as the door DP reaches its fully-open position, while the switch 27 is cam operated to close, as the door DP closes, when the door is approximately four inches from its fully-closed position.

It will be understood that a separate hoistway door DPH is provided for each of the floors served by the elevator car A. The coupling of the car door DP to the hoistway door DPH may be effected in a conventional manner, as by a vane DPV, which is secured to the door DP for reception in the slot of a slotted block DPB, which is mounted on the hoistway door DPH. Consequently, at each floor the hoistway door DPH associated therewith is moved in unison with the car door DP to close and to expose a hoistway passage through which load enters and leaves the elevator car A.

Operation

From the drawings illustrating the invention and from the foregoing discussion, in which the figures of the drawings are discussed in detail, it is possible to trace the operation of the elevator system in response to various demands for elevator service. Because of the complexity of the system, however, it will be helpful at this stage to describe a number of representative operations thereof. In order to simplify the presentation, the opening or closure of certain contacts upon pickup or dropout of the associated relay, solenoid or switch will not be discussed if such contact operation has no immediate or prospective effect under the conditions then being considered.

It will be assumed that the six-floor structure served by the present elevator system is a typical office building and that the traffic conditions which are discussed are representative of those which might be encountered during a typical business day. In order to follow a logical sequence of operations, let it be assumed that it is the morning of such a day immediately prior to the beginning of business hours. It also will be assumed that the direct-current buses L1 (positive) and L2 (negative) are energized, that each of the manually-operable switches MGS, BMGS, FIG. 1, and CMGS is in its closed condition to permit the starting of its respective associated motor 17, B17 and C17, that the brushes of all of the stepping switches employed in the control system are in their respective homing positions, as is illustrated in FIGS. 5, 7 and 12, and that all of the elevator cars are parked at the lower terminal or first floor (the zone position relays Z0, BZ0, FIG. 3, and CZ0 and the notching relays ND, BND, FIG. 6, and CND are picked up) with their motor-generator sets shut down (the motor-generator shutdown relays 139, B139, FIG. 6, and C139 are picked up through their respective self-holding circuits) and are conditioned for up travel (the up preference relays W, BW, FIG. 1, and CW are picked up). Furthermore, assume that the elevator car A has been selected as the next elevator car to be dispatched from the first floor (the next car relay N, FIG. 7, is picked up), that the first floor elevator car dispatching interval has expired (the first dispatching interval relay UHT, the second dispatching interval relay UT and the dispatching interval expired relay UTA, FIG. 9, are energized) and that no call for elevator service is registered in the system (the up call above relays 78U, B78U, FIG. 3, and C78U, the down call above relays DCA, BDCA, FIG. 5, and CDCA and the high zone demand relay KBH and the low zone demand relay KBL, FIG. 11, all are picked up).

Under these circumstances, it will be observed that the down zone call below relays KB, BKB and CKB (FIG. 8) also are picked up and that the doors of the elevator car A are open, while the doors of the cars B and C are closed (the door-control relays B45, FIG. 4, and C45 and the door relays BDS, FIG. 1, and CDS are picked up). In addition, since the three elevator cars are located at the first floor, the up call below relays 78D, B78D (FIG. 6) and C78D are picked up; and since no car is to be started from the first floor, the lower terminal no-start relays 981, B981 and C981 (FIG. 7) are energized.

Referring to FIG. 10, it will be observed that the lower terminal non-next relay SFB is energized and picked up, inasmuch as the elevator cars B and C are located at the first floor (make contacts BZ0–15 and CZ0–15 are closed) and neither of such cars has been selected as the next car to be dispatched therefrom (break contacts BN8 and CN8 are closed). For similar reasons, the lower terminal surplus car relay MFB is energized and picked up through the resistors R46 and R47.

Turning now to FIG. 4, the available car relay FR for the elevator car A also is energized and picked up. Since the doors of the car A are open, the cam-operated contacts 27 also are open (it will be recalled that the contacts 27 are closed as the doors of the car A close when such doors are approximately 4 inches from their fully closed position). However, since the first floor dispatching interval has expired and since the car A has been selected as the next car to be dispatched from the first floor, serially-connected make contacts UTA1 and N1, respectively, in parallel with the contacts 27, both are closed. Under the assumed conditions, all other contacts in the energizing circuit of the relay FR also are closed, with the exception of break contacts Z0–1 of the zone position relay Z0. The available car relays for the elevator cars B and C also are picked up. However, the relay BFR, for example, is energized through the cam-operated contacts B27, inasmuch as the doors associated with the car B are closed and the car B has not been selected as the next car to be dispatched from the lower terminal or first floor (make contacts BN1 are open).

Lastly, it will be assumed that the ratio timing relay TA (FIG. 11) is energized and picked up (it will be noted that the reset relay RT is dropped out under the assumed conditions and that consequently break contacts RT1 are closed and make contacts RT2 are open). With the foregoing exceptions, all electromagnetic relays, solenoids and switches in the elevator control system are deenergized.

At this stage, a passenger enters the elevator car A and operates the push button 5c to register a car call for the fifth floor. By reference to FIG. 3, it will be noted that the operation of the push button 5c completes an energizing circuit for the car call registering relay 5CR, and this relay closes its make contacts 5CR1 to establish a holding circuit around the push button 5c. In addition, the energization of the relay 5CR results in closure of its make contacts 5CR2 (FIG. 4) to establish the following energizing circuit:

L1, 5CR2, m5, m6, 38R, L2

Upon picking up, the car call above relay 38R opens its break contacts 38R2 to interrupt the energizing circuit for the available car relay FR, which subsequently drops out to indicate that the elevator car A no longer is available for assignment. (It will be recalled that the relay FR has a slight time delay in dropout.) The car call above relay also closes its make contacts 38R5 (FIG. 6) to energize the start relay SS for the car A through make contacts N4, UTA3 and Z0–5 and break contacts 70T3. (Under the assumed conditions, the non-interference time for the car A has expired, and break contacts 70T3 consequently are closed.)

Pickup of the relay SS indicates that the elevator car A is to be started from the first floor. Such pickup is accompanied by opening of make contacts SS2 in the holding circuit of the motor-generator shutdown relay 139, and thus the relay 139 drops out. Such dropout is accompanied by closure of break contacts 139–1 (FIG. 1) to energize the motor-generator starting relay 50 for the elevator car A, inasmuch as the manually-operable switch MGS is assumed to be in its closed condition. Upon pickup, the motor-generator starting relay closes its make contacts 50–1, 50–2 and 50–3 to connect the motor 17 of the elevator car A motor-generator set for energization.

It will be observed that the relay 139 also closes its break contacts 139–5 (FIG. 9) and opens its make contacts 139–6. However, opening of make contacts FR13 and closure of break contacts FR14 upon the aforesaid dropout of the available car relay FR prevents the timing circuits associated with the motor-generator timing relay MG from subsequently effecting pickup thereof.

In picking up, the start relay SS also closes its make contacts SS3 (FIG. 6) to establish with make contacts Z0–5 a self-holding circuit for the start relay. In addition, the start relay opens its break contacts SS4 (FIG. 7) to deenergize the next car relay N for the elevator car A.

Dropout of the relay N is accompanied by closure of its break contacts N5 to complete an energizing circuit for the clutch 72 (under the assumed conditions, make contacts Z0–6, BZ0–6 and CZ0–6 all are closed). As a result of its energization, the clutch connects the cam 73 for rotation in a counterclockwise direction, as viewed in FIG. 7, by the motor 71 to select one of the other elevator cars at the lower terminal floor as the next car to leave such floor. Consequently, when the cam protuberance 74 closes the switch BY, the following circuit is established:

L1, BZ0–7, BN, BSS4, BY, L2

The energization of the next car relay BN indicates that the elevator car B has been selected as the next car to be dispatched from the first floor in a manner which will be understood from the discussion of the operation of the elevator car A. Pickup of the relay BN is accompanied by opening of its break contacts BN5 to deenergize the clutch 72. Consequently, rotation of the cam 73 is terminated.

Dropout of the next car relay N for the elevator car A also results in closure of break contacts N2 (FIG. 4) to energize and pick up the door-control relay 45 for the car A. The relay 45 closes its make contacts 45–1 partially to complete a self-holding circuit around break contacts 70T2, while closure of make contacts 45–2 results in energization of the door-close solenoid DC to initiate a closing operation of the doors of the elevator car A.

Returning now to FIG. 7, the start relay SS, upon pickup, also opens its break contacts SS5 to deenergize and drop out the lower terminal no-start relay 981 for the car A. Such dropout results in closure of break contacts 981–2 (FIG. 4) to energize the second auxiliary running relay 80. In picking up, the relay 80 closes its make contacts 80–1 (FIG. 1) to prepare the up switch U and the running relay M for subsequent energization.

Pickup of the start relay SS for the elevator car A also is accompanied by closure of its make contacts SS6 (FIG. 9) to maintain the discharge circuit for the capacitor C5 when the first dispatching interval relay UHT drops out to open its make contacts UHT2 as a result of the opening of break contacts SS7 of the start relay. Dropout of the relay UHT is accompanied by the opening of its make contacts UHT3 to remove the holding circuit around the tube TU6. In addition, make contacts UHT4 open to drop out the second dispatching interval relay UT, while break contacts UHT5 close to establish a discharge circuit for the capacitor C6 through the resistor R37.

Upon dropout, the relay UT opens its make contacts UT1 to deenergize the dispatching interval expired relay UTA. Make contacts UT2 open but such opening has no immediate effect on system operation for the reason that under the assumed conditions break contacts H10 are closed.

As the door of the elevator car A arrives at its fully closed position, it closes the limit switch 23 (FIGS. 1 and 13). Assuming that all of the limit switches 23 associated with the doors of the car A and the car A hoistway are closed, the door relay DS (FIG. 1) is energized. When this relay picks up, it opens its break contacts DS2 (FIG. 4) to deenergize the door-close solenoid DC. The operation of this solenoid has been discussed above.

The door relay also closes its make contacts DS1 (FIG. 1) to complete the following energizing circuit:

L1, 80–1, W1, F1, 21, U, M, DS1, L2

As a result of its energization, the up switch U closes its make contacts U1 to complete an energizing circuit for the brake coil 18B. Consequently, the brake is released. In addition, make contacts U2 and U3 close to establish an energizing circuit for the generator field winding 16F with proper polarity for up travel of the elevator car A. Make contacts U4 close to complete with the limit switch 19 and break contacts E1 of the inductor slowdown relay E an energizing circuit for the speed relay V. The speed relay, in turn, closes its make contacts V1 to shunt the resistor R1 and thus increases the energization of the generator field winding 16F. Consequently, full energization is applied to the elevator car motor 14 to accelerate the elevator car A rapidly in the up direction.

The up switch U also closes its make contacts U5 to establish a holding circuit around the contacts 80–1 and W1. Finally, the up switch opens its break contacts U6 to prevent energization of the down preference relay X.

Turning next to the running relay M, it will be noted that pickup of this relay is accompanied by closure of its make contacts M1 to prepare the holding relay G, the inductor slowdown relay E and the inductor stopping relay F for subsequent energization. Make contacts M2 close to parallel the contacts 69H2. Make contacts M4 close to energize the non-interference relay 70T.

The non-interference relay 70T opens its break contacts 70T1 (FIG. 4) to deenergize the second auxiliary running relay 80. Upon dropout, the relay 80 opens its make contacts 80–1 (FIG. 1) without affecting operation, inasmuch as these contacts and the contacts W1 now are shunted by make contacts U5, as aforesaid. The non-interference relay also opens its break contacts 70T2 (FIG. 4) without affecting operation, since make contacts M10 closed upon pickup of the running relay to complete the holding circuit for the door-control relay 45.

Pickup of the running relay M also was accompanied by closure of its make contacts M7 (FIG. 3) to prepare the car call stopping relay T for subsequent energization, while break contacts M8 opened to prevent the cancellation of registered car calls until such contacts reclose.

It will be recalled that in the present embodiment of the invention, each elevator car has a floor selector of the type having a carriage which notches from a position corresponding to one floor to a position corresponding to the next succeeding floor in the direction of travel and in advance of the associated elevator car. Consequently, inasmuch as the car A is located at the first floor and is to answer a registered car call for the fifth floor, its floor selector carriage 15C (FIG. 1) proceeds to notch upwardly from its first-floor position toward its fifth-floor position. Thus, the brush $ss$ (FIG. 6) disengages the contact segment $s1$ to deenergize the notching erlay ND before engaging the contact segment $s2$ to reenergize the notching relay. As a result of such deenergization, the notching relay drops out to close its break contacts ND2 (FIG. 3) to complete the holding circuit for the up call above relay 78U through its make contacts 78U2. (It also will be recalled that under the assumed conditions the relay 78U is picked up and that the brush $ss$ disengages each floor selector contact segment associated therewith to drop out the notching relay ND before the brush $kk$ disengages the corresponding contact segment associated with the relay 78U.) It follows that, during notching of the floor selector carriage, the relay 78U is maintained energized and picked up through its holding circuit. Furthermore, the brush $kk$ engages the contact segment $k2$ to maintain the relay 78U energized therethrough before the brush $ss$ engages the contact segment $s2$ (FIG. 6) to reenergize the notching relay ND, which, in turn, reopens its break contacts ND2 (FIG. 3) to interrupt the holding circuit of the up call above relay 78U. It will be observed that a similar sequence occurs to maintain the relay 78U picked up as the elevator car A floor selector carriage notches to succeeding positions. Since, under the initial conditions, the down call above relay DCA (FIG. 5) also was energized and picked up, it will be apparent that break contacts ND3 of the notching relay operate in a similar manner to prevent dropout of the relay DCA during notching of the car A selector carriage.

As the elevator car A leaves the first floor, the brush $jj$ (FIG. 3) disengages the contact segment $j1$ to deenergize the zone position relay Z0. This relay opens its make contacts Z0–5 (FIG. 6) to deenergize the start relay SS. In dropping out, the start relay opens its make contacts SS6 (FIG. 9) and closes its break contacts SS7 to initiate a timing operation of the first dispatching interval relay UHT in a manner which will be clear from the preceding discussion of FIG. 9.

The zone position relay Z0 also closes its break contacts Z0–9 (FIG. 7) to energize the master lower terminal relay 982. Finally, the relay Z0 opens its make contacts Z0–16 (FIG. 10) to drop out the lower terminal surplus car relay MFB. (It will be recalled that at least two elevator cars, neither of which has been selected as the next car to be dispatched from the first floor, must be located at the such floor in order for the relay MFB to be picked up. Since, under the assumed conditions, the car B now has been selected as the next car to be dispatched from the first floor, break contacts BN9 of the next car relay BN for the car B are open. Consequently, when the car A leaves the first floor, the relay MFB must drop out, as aforesaid.)

As the elevator car A floor selector carriage arrives at its second-floor position, the brush $jj$ (FIG. 3) engages the contact segment $j2$ to energize and pick up the zone position relay Z1. Such pickup results in closure of make contacts Z1–4 (FIG. 10) to energize the low up zone position relay Z1U through the following circuit:

L1, W15, FA12, FR15, Z1–4, Z1U, L2

In addition, the brush $rr$ (FIG. 6) engages the contact segment r2 to reenergize the up call below relay 78D. under the assumed conditions, however, pickup of the relays Z1U and 78D has no immediate effect on system operation.

When the car A selector carriage notches to its fourth-floor position, the brush jj (FIG. 3) engages the contact segment j4 to energize and pick up the zone position relay Z2. This results in closure of make contacts Z2–5 (FIG. 10) to energize the high up zone position relay Z2U in a manner which will be clear from the preceding discussion of the energization of the low up zone position relay Z1U. At this time, however, such energization has no effect on system operation.

As the elevator car A approaches the fifth floor and its floor selector carriage notches to its fifth-floor position, the cam mm (FIG. 4) engages the operating member of the switch m5 to open the switch, thus effecting deenergization of the car call above relay 38R, inasmuch as the closed make contacts 5CR2 in the car call above circuit 20 now are below the switch and, under the assumed conditions, make contacts 6CR2 are open. Dropout of the relay 28R upon the opening of the switch m5, however, has no immediate effect on system operation under the assumed conditions.

The notching of the car A floor selector carriage to its fifth-floor position also results in engagement by the brush gg (FIG. 3) of the contact segment g5, which is associated with the fifth floor, to complete the following circuit:

L1, 5CR1, g5, gg, W6, T, M7, L2

As a result of its energization, the car call stopping relay T closes its make contacts T1 (FIG. 1) to complete with the closed make contacts M1 an energizing circuit for the holding relay G, the inductor slowdown relay E and the inductor stopping relay F. Had the elevator car A approached any other floor during its up trip for which a car call was registered, the engagement of the brush gg with the appropriate contact segment would have energized the car call stopping relay T in the same manner to initiate a stopping operation of the elevator car at such floor.

Upon energization, the holding relay G closes its make contacts G1 to establish a holding circuit around the contacts T1. As the elevator car A continues to approach the fifth floor, the inductor slowdown relay E finally reaches the inductor plate UEP associated with the fifth floor and consequently opens its break contacts E1. These contacts thereafter remain open until the coil of the inductor relay E is deenergized.

The effect of the opening of the contacts E1 is to interrupt the energization of the speed relay V. This relay opens its make contacts V1 to introduce the resistor R1 in series with the generator field winding 16F. As a result of the decrease in energization of the field winding, the elevator car A slows to its landing speed.

Further movement of the elevator car A toward the fifth floor brings the inductor stopping relay F into alignment with the inductor plate UFP for the fifth floor. This results in opening of break contacts F1 to interrupt the energization of the up switch U and the running relay M.

As a result of its deenergization, the up switch U opens its make contacts U1 to deenergize the coil 18B of the brake for the car A, and the brake shoe 18C thereupon is applied by its spring in the customary manner into engagement with its drum 18D. Since the up switch also opens its make contacts U2 and U3 to deenergize the field winding 16F, it follows that the elevator car A stops accurately at the fifth floor. Closure of break contacts U6 prepares the down preference relay X for subsequent energization.

Deenergization of the running relay M results in opening of its make contacts M1 to deenergize the holding relay G, the inductor slowdown relay E and the inductor stopping relay F. These relays reset without immediate effect on system operation. Opening of make contacts M4 initiates a timing-out operation of the non-interference relay 70T. Opening of make contacts M7 (FIG. 3) deenergizes the car call stopping relay T, and this relay drops out without affecting the operation of the system at this time.

Closure of break contacts M8 as the elevator car A stops at the fifth floor results in completion of the following cancelling circuit:

L1, 5CR1, 5CRN, h5, hh, M8, L2

Energization of the cancelling coil 5CRN resets the car call registering relay 5CR. In dropping out, the relay 5CR opens its holdingg contacts 5CR1 and opens its make contacts 5CR2 (FIG. 4) without affecting system operation. (It will be recalled that the switch m5 now is open.)

Opening of make contacts M10 (FIG. 4) upon dropout of the running relay results in interruption of the holding circuit for the door-control relay 45. As a result, the door-control relay closes its break contacts 45–3 to energize the door-open solenoid DO to initiate an opening operation of the doors of the elevator car A, including the associated hoistway door for the fifth floor.

It will be noted that dropout of the running relay M also is accompanied by closure of its break contacts M9 to energize the available car relay FR through the switch 27. Such energization under these conditions, however, does not affect system operation and is only momentary, inasmuch as the switch 27 is opened as the doors of the car A open when they are approximately four inches from their fully closed position. If desired, break contacts of the non-interference relay 70T may be inserted in series with the relay FR in order to prevent such momentary energization.

As the doors of the car A arrive at their fully open position, the limit switch 30 is opened to deenergize the door-open solenoid DO. The elevator car A now is stopped at the fifth floor, and its doors are open to permit departure of the passenger who registered the car call for the fifth floor.

Referring to FIG. 11, it will be observed that dropout of the running relay M results in operation of its contacts M12, M13, M14 and M15 to step the brushes of the up stop counting stepping switch KXU and of the stop counting stepping switch KX one step in a clockwise direction. Since, under the assumed conditions, the ratio timing relay TA is picked up to close its make contacts TA4, the brushes of these stepping switches immediately are reset to their homing positions, at which time the reset relay RT drops out to close its break contacts RT1 and to open its make contacts RT2, thus initiating a new timing operation of the circuits associated with the relay TA. Such operation has no effect on the elevator system. The operation of the stepping switches KXU and KX was set forth clearly in the discussion of FIG. 11.

Upon expiration of the time delay for which the non-interference relay 70T (FIG. 1) is adjusted, this relay drops out to close its break contacts 70T2 (FIG. 4) to energize the door-control relay 45. Upon pickup, the relay 45 closes its make contacts 45–2 to energize the door-close solenoid DC, thus initiating a closing operation of the doors of the elevator car A. When such doors arrive at approximately four inches from their fully closed position, the switch 27 is closed to energize the available car relay FR, indicating that the car A now is available for assignment.

Pickup of the available car relay FR is accompanied by closure of its make contacts FR5 to establish the following energizing circuit for the down call assigned relay FA:

L1, FR5, H1, 981–3, 78U4, 38R3, FA, L2

In addition, break contacts FR14 (FIG. 9) open to interrupt the discharge circuit of the capacitor C7 and make contacts FR13 close to initiate through break contacts 139–5 a timing operation of the motor-generator timing relay MG. (It will be recalled that the relay MG has a time delay in pickup of four minutes.) Break contacts FR15 (FIG. 10) open to drop out the high up zone position relay Z2U, but such dropout has no effect on system operation at this time.

Returning to the down call assigned relay FA (FIG. 4), pickup thereof is accompanied by closure of make contacts FA4 to energize the high call reversal relay 69H through make contacts DCA1 and break contacts X6, while make contacts FA6 close to establish a self-holding circuit for the relay FA through break contacts X7 and 38R3 and make contacts 78U4.

In picking up, the high call reversal relay 69H closes its make contacts 69H3 to establish a self-holding circuit through break contacts X6. The relay 69H also opens its break contacts 69H2 (FIG. 1) to deenergize the up preference relay W, inasmuch as make contacts M2 also are open. Dropout of the up preference relay is accompanied by closure of its break contacts W2 to energize and pick up the down preference relay X through break contacts U6 and 69L2 and the limit switch 24. Such pickup effects closure of make contacts X1 to prepare the down switch D and the running relay M for subsequent energization. Break contacts X2 open to prevent subsequent energization of the up preference relay W, while break contacts X6 (FIG. 4) open to deenergize and drop out the high call reversal relay 69H. Finally, break contacts X7 open to interrupt the holding circuit of the down call assigned relay FA.

In picking up, the down call assigned relay FA also opens its break contacts FA3 to deenergize the available car relay FR and closes its make contacts FA7 to energize the first auxiliary running relay RA through break contacts 42–2. It will be recalled that the relay FR has a slight time delay in dropout, while the relay RA has a slight time delay in pickup. These delays are such that before the respective expirations thereof sufficient time has elapsed for the up preference relay W to drop out and the down preference relay X to pick up, as noted above.

When the relay RA picks up, it closes its make contacts RA1 to establish with break contacts 70T1 an energizing circuit for the second auxiliary running relay 80, and this relay closes its make contacts 80–1 (FIG. 1) to prepare the down switch D and the running relay M for subsequent energization therethrough. Dropout of the relay FR is accompanied by closure of its break contacts FR4 (FIG. 4) partially to complete the second energizing circuit for the relay 80. Make contacts FR5 open to deenergize and drop out the down call assigned relay FA, inasmuch as break contacts X7 in the self-holding circuit thereof now are open, as noted heretofore. Make contacts FR13 (FIG. 9) open to interrupt the timing operation of the motor-generator timing relay MG. Closure of break contacts FR14 establishes a discharge path for the capacitor C7 through make contacts B139–6 and C139–6, and the capacitor as a result discharges through the resistor R39. Closure of break contacts FR15 (FIG. 10) has no immediate effect on operation, inasmuch as energization of the high up zone position relay Z2U is prevented by the open make contacts 69L4 and W15.

Returning to the dropout of the down call assigned relay FA (FIG. 4), closure of break contacts FA3 has no effect on operation of the available car relay FR, since make contact W7 of the up preference relay now are open. closure of break contacts FA5, however, results in completion of the aforesaid second energizing circuit for the second auxiliary running relay 80, while opening of make contacts FA7 results in dropout of the first auxiliary running relay RA.

It will be assumed that at this stage the doors of the elevator car A arrive at their fully closed position to energize and pick up the door relay DS (FIG. 1) through the switches 23, as will be clear from the preceding discussion. Closure of make contacts DS1 completes the following energizing circuit for the down switch D and the running relay M:

L1, 80–1, X1, F2, 22, D, M, DS1, L2

Opening of break contacts DS2 (FIG. 4) results in deenergization of the door-close solenoid DC.

As a result of its energization, the down switch D (FIG. 1) closes its make contacts D1 to release the brake for the elevator car A and closes its make contacts D2 and D3 to energize the generator field winding 16F with proper polarity for down travel of the car A. Make contacts D4 close to complete an energizing circuit for the speed relay V, and this relay closes its make contacts V1 to shunt the resistor R1. The elevator car A now is conditioned for full-speed operation in the down direction and accelerates away from the fifth floor.

Closure of make contacts D5 establishes a holding circuit around the contacts 80–1 and X1. Opening of break contacts D6 prevents energization of the up preference relay W.

The running relay M closes its make contacts M1 to prepare the relays G, E and F for subsequent energization. Closure of make contacts M4 reenergizes the non-interference relay 70T. This relay opens its break contacts 70T1 (FIG. 4) to drop out the second auxiliary running relay 80 without further effect on system operation. The opening of break contacts 70T2 has no effect on operation of the door-control relay 45, inasmuch as make contacts M10 close to complete the self-holding circuit of the relay 45 before the contacts 70T2 open. The running relay M also closes its make contacts M7 (FIG. 3) to prepare the car call stopping relay T for subsequent energization.

As the elevator car A approaches the first floor and the carriage of its floor selector notches to its first-floor position, the brush ff (FIG. 3) engages the contact segment f1, which is connected permanently to the bus L1, to complete the following circuit:

L1, f1, ff, X5, T, M7, L2

As a result of its energization, the car call stopping relay TT closes its make contacts T1 (FIG. 1) to complete with the contacts M1 an energizing circuit for the holding relay G, the inductor slowdown relay E and the inductor stopping relay F. Upon pickup, the relay G closes its make contacts G1 to establish a holding circuit around the contacts T1.

Continued movement of the elevator car A in the down direction brings the inductor slowdown relay E adjacent the inductor plate DEP for the lower terminal floor, and break contacts E2 open to deenergize the speed relay V. Thereupon, the speed relay opens its make contacts V1 to introduce the resistor R1 in series with the generator field winding 16F, and the elevator car A consequently slows down to a landing speed. The contacts E2 remain open until the coil of the inductor relay is deenergized.

The elevator car A next reaches the inductor plate DFP for the lower terminal floor, and break contacts F2 thus open to deenergize the down switch D and the running relay M. The contacts F2 also remain open until the coil of the inductor relay F is deenergized.

Deenergization of the down switch D results in opening of its make contacts D1 to apply the brake for the car A and in opening of its make contacts D2 and D3 to deenergize the generator field winding 16F. The elevator car A now stops accurately at the first floor. Closure of break contacts D6 prepares the up preference relay W for subsequent energization.

Dropout of the running relay M is accompanied by the opening of its make contacts M1 to deenergize and reset the relays G, E and F. Opening of make contacts M4 initiates a timing-out operation of the non-interference relay 70T. Opening of make contacts M7 (FIG. 3) results in deenergization and dropout of the car call stopping relay T without further affecting system operation.

The running relay also opens its make contacts M10 (FIG. 4) to interrupt the holding circuit of the door-control relay 45, and this relay consequently is deenergized and drops out. As a result, break contacts 45–3 close to energize the door-open solenoid DO, thus initiating an opening operation of the doors of the elevator car A.

Referring to FIG. 11 and recalling that the ratio timing relay TA has a ninety-second time delay in pickup, it will be assumed that such delay has not expired by the time the elevator car A arrives at the first floor. It also will be recalled that upon dropout of the running relay M, its break contacts M15 close slightly before its make contacts M14 open. Consequently, the stopping of the car A at the first floor results in the stepping of the brushes of the stop counting stepping switch KX one step in a clockwise direction to the position numbered 1, as will be apparent from the preceding discussion of FIG. 11. In the present discussion, it will be assumed that the stop ratio relay UA does not pick up within the time interval measured by the ratio timing relay TA and that consequently the stepping of the brushes of the stop counting stepping switch KX and the up stop counting stepping switch KXU has no effect on system operation.

Since the limit switch 24 (FIG. 1) opens as the elevator car A reaches the lower terminal floor, it follows that the down preference relay X is deenergized. This relay drops out to close its break contacts X2 to complete the following circuit:

L1, D6, X2, 69H2, W, L2

In picking up, the up preference relay W opens its break contacts W2 to prevent subsequent energization of the down preference relay X.

When the floor selector carriage of the elevator car A notched to its first-floor position, the brush $jj$ (FIG. 3) engaged the contact segment $j1$ to energize the zone position relay Z0 for the car A. Pickup of the relay Z0 resulted in closure of its make contacts Z0–8 (FIG. 7) to pick up the lower terminal no-start relay 981 and in opening of its break contacts Z0–9 to drop out the master lower terminal relay 982, inasmuch as all of the elevator cars now are located at the first floor. Such operations, however, have no further effect on the elevator system at this time. The relay Z0 also closed its make contacts Z0–16 (FIG. 10) to pick up the lower terminal surplus car relay MFB, since the cars A and C both are located at the first floor and neither of such cars has been selected as the next car to be dispatched therefrom (break contacts N9 and CN9, respectively, are closed).

It will be assumed that at this stage the doors of the elevator car A arrive at their fully open position to open the limit switch 30 (FIG. 4) and thus to drop out the door-open solenoid DO. After expiration of the non-interference time, break contacts 70T2 close to energize the door-control relay 45. Closure of make contacts 45–2 results in energization of the door-close solenoid DC to initiate a closing operation of the doors of the car A. When the doors of the car A are approximately four inches from their fully closed position, the switch 27 closes to energize the available car relay FR therethrough, indicating that the elevator car A now is available for assignment. As the doors arrive at their fully closed position, the contacts 23 (FIG. 1) associated therewith close to energize the door relay DS, and this relay opens its break contacts DS2 (FIG. 4) to deenergize the door-close solenoid DC.

It will be observed that at this time all of the elevator cars are located at the lower terminal or first floor, that the doors of the cars A and C are closed and that the cars A and C are available for assignment. Furthermore, the elevator car B has been selected as the next car to be dispatched from the first floor, and its doors consequently are open (break contacts BN2 of the next car relay BN are open).

If desired, circuits such as those illustrated in FIG. 8 of the Santini et al. Patent 2,740,495 may be provided which cause an elevator car whose motor-generator set is not running to lose its selection as the next elevator car to leave the first floor and which transfer such selection to a car whose motor-generator set is running as such car arrives at the first floor. Thus, under the present conditions, such circuits would have caused the car B to lose its selection as the next car to be dispatched from the first floor and would have transferred such selection to the car A when the latter car arrived at the first floor, inasmuch as the car A was the only car whose motor-generator set was running at that time.

It will be assumed that the first floor dispatching interval has expired, as indicated by pickup of the dispatching interval has expired, as indicated by pickup of the dispatching interval expired relay UTA (FIG. 9). It will be recalled that when the elevator car A left the first floor to answer its car call for the fifth floor, its start relay SS (FIG. 6) dropped out to open its make contacts SS6 (FIG. 9) and to close its break contacts SS7, thus initiating a timing operation of the first dispatching interval relay UHT. Upon the expiration of fifteen seconds therefrom, the relay UHT picked up to close its make contacts UHT4 and to open its break contacts UHT5. Inasmuch as the motor-generator set of only the elevator car A was running at that time, the motor-generator running relay H (FIG. 7) was dropped out to close its break contacts H10 (FIG. 9). (It will be recalled that at least two elevator car motor-generator sets must be running in order for the relay H to be picked up.) Consequently, closure of make contacts UHT4 resulted in energization and pickup of the second dispatching interval relay UT, and this relay closed its make contacts UT1 to energize the dispatching interval expired relay UTA. It will be appreciated, therefore, that when only one elevator car motor-generator set is running, the first floor dispatching interval in the present elevator system is reduced by one-half from thirty seconds to fifteen seconds. Pick up of the relay UTA was accompanied by closure of its make contacts UTA2 (FIG. 4). Consequently, since the elevator car B had been selected as the next car to be dispatched from the first floor (make contacts BN1 were closed), the expiration of the fifteen second dispatching interval resulted in pickup of the available car relay BFR to indicate that the elevator car B then was available for assignment. Thus, under the present conditions, all three elevator cars are available for assignment.

Returning to the energization of the available car relay FR for the elevator car A, pickup of this relay results in closure of its make contacts FR13 (FIG. 9) and in opening of its break contacts FR14 to initiate a timing operation of the circuits associated with the motor-generator timing relay MG. (It will be recalled that break contacts 139–5 of the motor-generator shutdown relay 139 associated with the car A are closed and make contacts 139–6 thereof are open when the motor-generator set of the car A is running.) At the expiration of four minutes from pickup of the relay FR, therefore, the motor-generator timing relay MG is energized in a manner which will be clear from the preceding discussion of FIG. 9. This relay closes its make contacts MG3 to establish a self-holding circuit and to extinguish the discharge between the plate and cathode electrodes of the tube TU8. In addition, make contacts MG1 (FIG. 6) close to energize the parking relay P, which closes its make contacts P3 to establish a self-holding circuit and its make contacts P4 to energize the motor-generator shutdown relay 139.

The relay 139, in turn, closes its make contacts 139–3 to complete a holding circuit therefor and opens its break contacts 139–2 to drop out the parking relay P. Additionally, the relay 139 opens its break contacts 139–1 (FIG. 1) to deenergize the motor-generator starting relay 50. Opening of make contacts 50–1, 50–2 and 50–3 disconnects the motor 17 of the car A motor-generator set from its three-phase source of energy to shut down the motor-generator set. In picking up, the motor-generator shutdown relay 139 also opens its break contacts 139–5 (FIG. 9) to deenergize and drop out the motor-generator timing relay MG and closes its make contacts 139–6 to complete a discharge path for the capacitor C7 through make contacts B139–6 and C139–6.

Assume, however, that after the arrival of the elevator car A at the first floor, as aforesaid, and before the motor-generator timing relay MG is energized to effect shutdown of the motor-generator set of the car A, a passenger enters the elevator car B and registers a car call for the sixth floor by operating the push button B6c (FIG. 3). Such operation completes an energizing circuit for the car call registering relay B6CR, and this relay closes its make contacts B6CR1 to establish a holding circuit around the push button B6c.

In addition, the energization of the car call registering relay B6CR results in closure of its make contacts B6CR2 (FIG. 4) to energize the car call above relay B38R for the elevator car B. Pickup of the relay B38R is accompanied by opening of its break contacts B38R2 to interrupt the energizing circut for the available car relay BFR. (It will be recalled that the relay BFR has a slight time delay in dropout.) The relay B38R also closes its make contacts B38R5 (FIG. 6) to energize the start relay BSS for the car B through make contacts BN4, UTA4 and BZ0–5 and break contacts B70T3.

In picking up, the start relay BSS closes its make contacts BSS3 to establish a self-holding circuit and opens its break contacts BSS2 to interrupt the holding circuit of the motor-generator shutdown relay B139. Dropout of the relay B139 results in closure of its break contacts B139–1 (FIG. 1) to effect the starting of the motor-generator set for the elevator car B in a manner which will be clear from the preceding discussion of the starting of the motor-generator set for the car A. The relay BSS also opens its break contacts BSS4 (FIG. 7) to deenergize and drop out the next car relay BN. Break contacts BSS5 also open to drop out the lower terminal no-start relay B9S1. The resulting closure of break contacts B9S1–2 (FIG. 4) prepares the second auxiliary running relay B80 for energization therethrough.

Upon pickup, the start relay BSS also closes its make contacts BSS6 (FIG. 9) to maintain the discharge circuit for the capacitor C5 and opens its break contacts BSS7 to deenergize and drop out the first dispatching interval relay UHT. The relay UHT opens its make contacts UHT4 to deenergize and drop out the second dispatching interval relay UT and closes its break contacts UHT5 to establish a discharge path for the capacitor C6. Finally, the relay UT opens its make contacts UT1 to drop out the dispatching interval expired relay UTA. Thus, the relays UHT, UT and UTA are reset to effect a new dispatching interval timing operation when the elevator car B leaves the first floor.

Returning to the dropout of the motor-generator shutdown relay B139 (FIG. 6), such dropout was accompanied by closure of break contacts B139–4 (FIG. 7) to effect pickup of the motor-generator running relay H. (It will be recalled that break contacts 139–4 also are closed and that in order for the relay H to be picked up, at least two sets of the break contacts associated therewith must be closed.) The relay H opened its break contacts H10 (FIG. 9) to effect a change in the lower terminal elevator car dispatching interval from fifteen to thirty seconds in a manner which will be clear from the preceding discussion of FIG. 9.

Returning to the previously-mentioned dropout of the next car relay BN for the elevator car B (FIG. 7), such dropout is accompanied by closure of break contacts BN2 (FIG. 4) to energize the door-control relay B45. Pickup of the relay B45 effects a closing operation of the doors of the car B in a manner which will be clear from the preceding discussion of the closing of the doors of the elevator car A. The relay BN also closes its break contacts BN5 (FIG. 7). As a result, the dispatching mechanism operates to select the elevator car C as the next car to leave the lower terminal floor. The operation of the dispatching mechanism for this purpose will be clear from the earlier discussion of its operation following the departure of the elevator A.

Selection of the elevator car C as the next car to be dispatched from the first floor is indicated by energization and pickup of its associated next car relay CN. Such pickup is accompanied by opening of break contacts CN5 to deenergize the electromagnetic clutch 72, thus terminating rotation of the cam 73. Pickup of the relay CN also effects the opening of the doors of the car C in a manner which will be clear from the preceding discussion of the opening of the doors of the car B. (Refer to the door control circuits for the cars A and B at the bottom of FIG. 4.)

It will be assumed that at this stage, the time delay in dropout of the available car relay BFR (FIG. 4) has expired and that the relay BFR consequently drops out. (It will be recalled that break contacts B38R2 opened to interrupt the energizing circuit for the relay BFR when the sixth-floor car call was registered for the car B.) Such dropout is accompanied by closure of break contact BFR4 to energize the second auxiliary running relay B80. Closure of make contacts B80–1 (FIG. 1), however, has no immediate effect on system operation, inasmuch as it is assumed that the doors of the elevator car B have not yet closed and consequently that make contacts BDS1 still are open.

Let it next be assumed that before the doors of the elevator car B close, a sufficient number of passengers enter the car to load the car to its rated capacity. In response to such loading, the load switch BLW (FIG. 1) opens its break contacts BLW1 and BLW3 and closes its make contacts BLW2, BLW4 and BLW5.

Referring to FIG. 6, it will be noted that if the first floor elevator car dispatching interval had not expired as aforesaid (make contacts UTA4 are open) and if the car B were only partially loaded (make contacts BLW2 are open), the car would remain at the lower terminal floor until the contacts UTA4 close to pick up the start relay BSS. In addition, it will be observed that closure of make contacts BLW2 to indicate that the car B is fully loaded, before closure of make contacts UTA4 to signify that the dispatching interval has expired, also would result in pickup of the relay BSS.

Closure of make contacts BLW4 (FIG. 10) of the load switch results in energization of the up by-pass relay 77U, since the elevator car B is located at the first floor (make contacts BZ0–14 are closed), is conditioned for up travel (make contacts BW14 are closed) and its non-interference time has expired (break contacts B70T5 are closed). Upon pickup, the relay 77U closes its make contacts 77U1 to energize the no demand return relay NDR, and the relay NDR closes its make contacts NDR6 to establish a self-holding circuit through break contacts KT1. Closure of make contacts 77U2 (FIG. 11) maintains a discharge circuit for the capacitor C11. This prevents the circuits associated with the up demand timing relay KT from effecting a timing operation, although break contacts NDR7 open and make contacts NDR8 close upon the aforesaid pickup of the no demand return relay. Closure of make contacts NDR5 (FIG. 8) prepares the down zone demand registering relay K0 for subsequent energization therethrough. (Under the assumed conditions break contacts SFB1 are open.)

Pickup of the no demand return relay NDR also results in interruption of the holding circuit for the motor-generator shutdown relay associated with the elevator car C (not shown), inasmuch as the car C has been selected as the next car to leave the first floor, as will be apparent by inspection of the circuits associated with the motor-generator shutdown relay 139 (FIG. 6) for the elevator car A, for example. Thus, if the car A under the assumed conditions had been selected as the next elevator car to leave the lower terminal floor (break contacts N3 are open), the opening of break contacts NDR3 upon pickup of the no demand return relay would interrupt the holding circuit of the motor-generator shutdown relay 139 to drop out such relay, thereby effecting the starting of the motor-generator set for the car A in a manner which will be clear from the preceding discussion. Consequently, it will be appreciated that pickup of the no demand return relay NDR under the assumed conditions results in the running of the motor-generator set for the elevator car C (not shown).

Pickup of the relay NDR conditions the elevator system for what conveniently may be termed no demand return operation. Such operation now will be described in detail.

Let it be assumed that after the elevator car B is loaded to capacity at the first floor its doors arrive at their fully closed position. Such closure results in pickup of the door relay BDS (FIG. 1), and this relay closes its make contacts BDS1 to energize the up switch BU and the running relay BM for the car B. Such energization results in up travel of the car B from the first floor in a manner which will be clear from the preceding discussion of the departure of the car A from the first floor. Consequently, the car B proceeds to answer all car calls which may be registered therefor, including the previously-mentioned car call for the sixth floor.

As the car B leaves the first floor, the brush Bjj (FIG. 3) disengages the contact segment Bj1 to denergize the zone position relay BZ0. In dropping out, the relay BZ0 opens its make contacts BZ0–5 (FIG. 6) to deenergize the start relay BSS for the car B, and this relay opens its make contacts BSS6 (FIG. 9) to interrupt the discharge circuit of the capacitor C5 and closes its break contacts BSS7 to initiate a timing operation of the first dispatching interval relay UHT.

The zone position relay BZ0 also closes its break contacts BZ0–9 (FIG. 7) to energize and pick up the master lower terminal relay 982, but such pickup has no immediate effect on system operation. Make contacts BZ0–14 (FIG. 10) open to deenergize the up by-pass relay 77U; but the resulting opening of make contacts 77U1 has no effect on the operation of the no demand return relay NDR, for the reason that this relay is maintained energized through its holding circuit. Make contacts 77U2 (FIG. 11) open to interrupt the discharge circuit for the capacitor C11 and consequently to initiate a timing operation of the circuits associated with the up demand timing relay KT in a manner which will be clear from the discussion of FIG. 11. It will be recalled that the relay KT has a time delay in pickup of the order of 2½ minutes.

Finally, the zone position relay BZ0, in dropping out, opens its make contacts BZ0–16 (FIG. 10) to drop out the lower terminal surplus car relay MFB. (It will be recalled that as least two of the parallel circuit branches associated with the relay MFB must be energized in order for this relay to be picked up. Inasmuch as the contacts BZ0–16 are open and break contacts CN9 are open to indicate that the elevator car C has been selected as the next car to leave the lower terminal floor, the relay MFB must be dropped out.) Dropout of the relay MFB is accompanied by the opening of its make contacts MFB1 (FIG. 4), MFB2 and similar contacts in the energizing circuit of the available car relay for the elevator car C (not shown). Since the elevator system is conditioned for no demand return operation (break contacts NDR1 are open) and since the elevator car A is located at the lower terminal floor (break contacts Z0–1 are open), the opening of make contacts MFB1 effects the deenergization and dropout of the available car relay FR for the elevator car A. In a like manner, dropout of the relay MFB results in the deenergization and dropout of the available car relay CFR for the car C (not shown). Such dropouts respectively indicate that the cars A and C no longer are available for assignment.

Inasmuch as the available car relay for each of the elevator cars A, B and C now is dropped out, make contacts FR13, BFR13 and CFR13 (FIG. 9) all are open to interrupt the charging circuit of the capacitor C7, while break contacts FR14, BFR14 and CFR14 all are closed to establish a discharge path for the capacitor. Consequently, the timing operation of the motor-generator timing relay MG is terminated.

Let it be assumed that shortly after the elevator car B leaves the lower terminal floor and before the lower terminal dispatching interval has expired, the car C becomes fully loaded, and one of the passengers therein registers a car call for a floor above the first floor. In response thereto, the start relay for the elevator car C (not shown) is energized, as will be apparent by inspection of the circuits associated with the start relays SS and BSS (FIG. 6) for the elevator cars A and B, respectively, and from the preceding discussion. In addition, the loading of the car C results in closure of its associated load switch make contacts CLW4 (FIG. 10) to energize the up by-pass relay 77U. (It will be recalled that the relay 77U dropped out upon the opening of make contacts BZ0–14 as the elevator car B left the first floor.) Pickup of the relay 77U results in closure of its make contacts 77U2 (FIG. 11) to discharge the capacitor C11 and thus to terminate the timing operation of the up demand timing relay KT.

Upon pickup, the start relay for the elevator car C opens its break contacts CSS4 (FIG. 7) to deenergize and drop out the next car relay CN. As a result, break contacts CN5 close to effect the selection of another elevator car, in this case the car A, as the next car to leave the first floor in a manner which will be apparent from the preceding discussion. Pickup of the next car relay N for the elevator car A is accompanied by the opening of its break contacts N8 (FIG. 10). Consequently, as the car C leaves the first floor, make contacts CZ0–15 of its associated zone position relay CZ0 (not shown) open to drop out the lower terminal non-next relay SFB, and this relay closes its break contacts SFB1 (FIG. 8) to energize the down zone demand registering relay K0 through now-closed make contacts NDR5 of the no demand return relay. Pickup of the relay K0 indicates the existence of a demand for first-floor service, such demand being an automatic or artificial demand, inasmuch as it was not registered in response to the registration of a floor call for the lower terminal floor, but in response to the conditioning of the system for no demand return operation.

It will be recalled that inasmuch as all of the elevator cars are conditioned for up travel, break contacts X10, BX10 and CX10 are closed to energize the down zone call below relays KB, BKB and CKB, respectively. Consequently, pickup of the down zone demand registering relay K0 to open its break contacts K0–3 (FIG. 9) effects the balancing of the bridge circuit associated with the down zone demand relay ZD, and this relay thus is energized in a manner which will be apparent from the preceding discussion of FIG. 9.

Pickup of the down zone demand relay ZD is accompanied by closure of its break contacts ZD2 (FIG. 7) to energize the no scan relay RNS. In picking up, the no scan relay closes its make contacts RNS1 and RNS2 (FIG. 4) and similar contacts associated with the elevator car C to prepare the down call assigned relays FA and BFA and such relay associated with the car C for subsequent energization therethrough.

Let it next be assumed that the elevator car B has arrived at the sixth floor in response to the registered car call therefor and has discharged its last passenger, and that the doors of the car B now are closed. By inspection of FIG. 4, it will be observed that the available car relay BFR is picked up through the following energizing circuit:

L1, B27, B38R2, B78U3, BSS1, BM9,
BFU2, BW7, BFA3, BZ0–1, BFR, L2

Closure of make contacts BFR5 completes the following energizing circuit:

L1, BFR5, RNS2, MFC2, H4 and
B78U4, B38R3, BFA, L2

(It will be noted that this energizing circuit includes the contacts RNS2 and MFC2, whereas the energizing circuit for the relay FA after the elevator car A answered its fifth-floor car call, when only one elevator car motor-generator set was running, included break contacts H1 and 981–3.)

It will be apparent by inspection of the drawings that pickup of the down call assigned relay BFA effects a change in the direction of travel for which the elevator car B is conditioned from up to down and causes the car B to run in the latter direction from the sixth floor in a manner which will be clear from the previous discussion of the pickup of the down call assigned relay FA when the elevator car A was located at the fifth floor. In addition, break contacts BFA3 open to interrupt the energizing circuit for the available car relay BFR, which, as previously noted, has a slight time delay in dropout. Break contacts BFA11 (FIG. 9) open to introduce the resistor R33 into the bridge circuit associated with the down zone demand relay ZD. Inasmuch as two resistors, R31 and R33, now are effective between the cathode electrode of the tube TU5 and the bus L2, whereas only one resistor R25, is effective between the control electrode of such tube and the bus L2, the relay ZD is deenergized and dropped out, as will be clear from the preceding discussion of FIG. 9.

When the down preference relay BX (FIG. 1) picks up to condition the elevator car B for down travel, break contacts BX10 (FIG. 8) open to deenergize the down zone call below relay BKB. (It will be recalled that break contacts K0–2 are open at this time.) Upon expiration of the time delay in dropout of the available car relay BFR (FIG. 4), make contacts BFR5 open to deenergize the down call assigned relay BFA. (Since the car B now is conditioned for down travel, break contacts BX7 in the holding circuit of the relay BFA are open.) In dropping out, the relay BFA closes its break contacts BFA11 (FIG. 9), but the resistor R33 remains effective in the cathode electrode circuit of the tube TU5, inasmuch as make contacts BKB2 now are open as a result of the above-noted dropout of the relay BKB. Consequently, the down zone demand relay ZD is maintained deenergized and dropped out.

When the relay ZD dropped out, it opened its make contacts ZD2 (FIG. 7) to deenergize the no scan relay RNS, and this relay opened its make contacts RNS1 and RNS2 (FIG. 4) in the circuits associated with the down call assigned relays FA and BFA, respectively, and similar contacts in the circuits associated with the down call assigned relay for the elevator car C.

Assume next that the elevator car B is approaching the first floor after having been started from the sixth floor as described above. Such approach is accompanied by engagement of the contact segment B$j$1 (FIG. 3) by the brush B$jj$ to pick up the zone position relay BZ0. The relay BZ0 closes its make contacts BZ0–11 (FIG. 8) to energize the down zone call below relay BKB therethrough. In addition, make contacts BZ0–15 (FIG. 10) close to energize the lower terminal non-next relay SFB. (It will be recalled that the car A was selected to be the next car to leave the first floor upon departure therefrom of the car C.) Upon pickup, the relay SFB opens its break contacts SFB1 (FIG. 8) to deenergize the down zone demand registering relay K0. Referring to FIG. 9, it will be observed that break contacts K0–3 and make contacts BKB2 both are closed to shunt the resistors R25 and R33, respectively. As a result, the down zone demand relay ZD is maintained dropped out, as will be apparent from the preceding discussion. Dropout of the relay K0 indicates that the artificial demand for first-floor service has been terminated.

Let it be assumed, however, that by the time the elevator car B approaches the first floor, as aforesaid, the car A has left the lower terminal floor to answer a car call therefor. Referring to FIG. 7, closure of make contacts BZ0–6 as the car B approaches the first floor effects the immediate selection of such car as the next car to be dispatched therefrom, as indicated by pickup of the next car relay BN by a sequence of operations which will be clear from the preceding discussion. The opening of break contacts BN8 (FIG. 10) results in deenergization of the lower terminal non-next relay SFB recalling that the relay SFB picked up as a result of the closure of make contacts BZ0–15 as the car B approached the first floor. Closure of break contacts SFB1 (FIG. 8) upon dropout of the lower terminal non-next relay once again effects energization and pickup of the down zone demand registering relay K0 through make contacts NDR5 to indicate the existence of an artificial demand for service for the first floor. If one of the elevator cars A or C has answered its last car call and is available for assignment (the available car relay FR FIG. 4, or CFR is picked up), pickup of the relay K0 results in the dispatching of such car to the first floor by a sequence of operations which will be clear from the preceding discussion of the dispatching of the car B from the sixth floor to the first floor upon pickup of the relay K0.

Let it next be assumed that while the elevator system is conditioned for no demand return operation, the rate of capacity loading of elevator cars at the lower terminal floor decreases to a point wherein the up by-pass relay 77U (FIG. 10) remains dropped out for a period of 2½ minutes from the last previous dropout thereof. Inasmuch as break contacts NDR7 (FIG. 11) and make contacts 77U2 have remained open and make contacts NDR8 have remained closed continuously for the aforesaid period of time, the capacitor C11 has charged sufficiently to fire the tube TU12 and thus to energize the up demand timing relay KT. As a result, break contacts KT1 (FIG. 10) open to interrupt the holding circuit of the no demand return relay NDR, which consequently drops out to terminate the no demand return operation of the elevator system.

Dropout of the relay NDR is accompanied by opening of its make contacts NDR5 (FIG. 8) to prevent the down zone demand registering relay K0 from registering an artificial demand for service for the lower terminal floor under the conditions described heretofore. In addition, the no demand return relay closes its break contacts NDR7 (FIG. 11) to establish a discharge path for the capacitor C11 and opens its make contacts NDR8 to drop out the up demand timing relay KT and to extinguish the discharge in the tube TU12.

From the foregoing description of operation, it will be appreciated that when there is a substantial demand for up service from the lower terminal floor, i.e., when an elevator car conditioned for up travel is loaded to capacity at the first floor, as indicated by pickup of the up by-pas relay 77U (FIG. 10), the no demand return relay NDR (FIG. 10) picks up to condition the elevator system for no demand return operation. When an elevator car which has been selected as the next car to be dispatched from the lower terminal floor is loaded to capacity, make contacts of its associated load switch close to effect the starting of the car from the first floor, although the normal first floor elevator car dispatching interval has not expired, provided that a car call is registered for such car. Such operation will be apparent by inspection of the circuits associated with the start relay SS (FIG. 6) for the elevator car A, for example. When the system is conditioned for no demand return operation, if there is a "next" car and no other elevator car at the first floor or if there is no car at the lower terminal floor, as indicated by dropout of the lower terminal non-next relay SFB (FIG. 10), an artificial service demand automatically is established for the first floor as a result of the pickup of the down zone demand registering relay K0 (FIG. 8), in response to which an available car located above the first floor is dispatched thereto (thus, the term "no demand return operation"); that is, the control system tends to maintain at least a "next" car and one "non-next" car at the lower terminal floor in order to insure the provision of adequate service therefor. Finally, the elevator system remains conditioned for no demand return operation for at least a predetermined period of time, 2½ minutes in the present embodiment of the invention, as determined by the up demand timing relay KT (FIG. 11).

Since the elevator system no longer is conditioned for no demand return operation, successive elevator cars are dispatched from the first floor, in response to car calls for floors above the first floor, only at the expiration of the normal thirty second dispatching interval as determined by the first dispatching interval relay UHT, the second dispatching interval relay UT and the dispatching interval expired relay UTA (FIG. 9). This follows from the fact that the start relay associated with each elevator car cannot be energized until the dispatching interval expired relay UTA picks up to indicate that the thirty second dispatching interval has expired, as will be apparent by inspection of FIG. 6. It will be observed that the start relay SS for the car A, for example, cannot pick up until make contacts UTA3 close, and similarly for the start relays respectively associated with the cars B and C.

Referring to FIG. 8, it will be noted, however, that an energizing circuit is completed for the down zone demand registering relay K0 if no elevator car is located at the lower terminal floor (break contacts Z0–10, BZ0–10 and CZ0–10 are closed), if one-half of the normal thirty second dispatching interval, or fifteen seconds, has expired (make contacts UHT1 are closed) and if break contacts PD3 are closed to indicate that the elevator system is not conditioned for instant dispatch operation. (Instant dispatch operation will be discussed below.) Pickup of the relay K0 under these conditions results in the dispatching of an available elevator car to the first floor. Thus, the control system automatically tends to provide regular service for the lower terminal floor.

If at least two elevator cars are available for assignment when the relay K0 picks up as above, it is necessary to select a particular one of such cars to respond to the artificial demand for first floor service. Suppose, for instance, that the elevator car A has answered its last call and is available for assignment at the third floor (the available car relay FR, FIG. 4, and the zone position relay Z1, FIG. 3, are picked up), that the car C also has answered its last call and is available for assignment at the sixth floor (the available car relay CFR and the zone position relay CZ3, which are not shown, are picked up) and that the car B is traveling up in response to a car call and consequently is not available for assignment at this time (the available car relay BFR, FIG. 4, is dropped out). Since two cars are available for assignment and there is a demand for first floor service, one of such cars is selected to respond to this service demand by the following sequence of operations.

When the down zone demand registering relay K0 picks up, its break contacts K0–3 (FIG. 9) open to effect energization and pickup of the down zone demand relay ZD in a manner which will be apparent from the preceding discussion. Opening of the break contacts K0–4 (FIG. 11) results in dropout of the low zone demand relay KBL. It will be noted that under the assumed conditions the high zone demand relay KBH is energized and picked up through break contacts K3–5, K2–6 and DUH5. Pickup of the relay KBH and dropout of the relay KBL under these circumstances indicates the existence of a demand for down service for the low zone (first, scond and third floors).

Inasmuch as the down zone demand relay ZD is picked up, its make contacts ZD5 are closed; and since make contacts FR16 and CFR16 are closed to indicate that the elevator cars A and C, respectively, are available for assignment, the multiple available car relay MFC is picked up. (It will be recalled that in order for the relay MFC to be picked up, at least two elevator cars must be available for assignment.) Opening of break contacts MFC7 introduces the resistor R59 in series with the relay MFC. The purpose of this resistor will be understood from the preceding discussion of FIG. 11. Opening of break contacts MFC1 (FIG. 4) prevents energization of the down call assigned relay FA therethrough, and similarly for the down call assigned relay for the elevator car C (not shown). (It will be observed that when the down zone demand relay ZD picked up, its make contacts ZD2, FIG. 7, closed to pick up the no scan relay RNS. The relay RNS, in turn, closed its make contacts RNS1, FIG. 4, in the energizing circuit of the relay FA and similar contacts in the energizing circuit of the down call assigned relay for the car C.)

Referring to FIG. 12, and bearing in mind the immediately preceding discussion, it will be observed that break contacts KBH1 of the high zone demand relay KBH are open, and consequently no energizing circuit is completed for effecting the stepping of the brushes of the high zone stepping switch FSH. However, make contacts KBH2 are closed and, since break contacts KBL1 of the low zone demand relay KBL and make contacts MFC12 of the multiple available car relay MFC also are closed, a circuit is completed for effecting the stepping of the brushes of the low zone stepping switch FSL. When these brushes reach their first position (numbered 1), the level FSL*b* effects completion of a circuit for continuously energizing the coil of the stepping switch FS through make contacts ZD7, MFC11, Z1–5 and FR19, and the brushes thus cease their stepping action. In addition, the level FS*a* completes through make contacts ZD7, MFC11 and FR18 an energizing circuit for the demand response relay FCR to indicate that the elevator car A has been selected to be assigned to respond to the demand for first floor service.

It will be appreciated that this selection process is the same as that which has been described in greater detail in Example 3 in the discussion of FIG. 12, wherein the elevator car C was located at the sixth floor and the car A was located in the first zone (second and third floors). If, instead of being located at the third floor in the first zone, the elevator car A had been located at the fourth or fifth floor in the second zone, as in Example 4 in the discussion of FIG. 12, the brushes of the stepping switch FSL first would have scanned the low zone for an available car and, finding none, would have stopped in their tenth position to effect pickup of the low zone no selection relay SLN. Closure of make contacts SLN1 then would have caused the brushes of the high zone stepping switch FSH to scan the high zone, and the car C would have been selected to be assigned to respond to the service demand for the first floor.

Returning to the pickup of the demand response relay FCR for the elevator car A, this relay closes its make contacts FCR1 (FIG. 4) to energize the down call assigned relay FA. In picking up, the relay FA closes its make contacts FA4 to energize the high call reversal relay 69H through make contacts DCA1 and break contacts X6. As a result, the elevator car A, which, under the assumed conditions, is located at the third floor, is dispatched therefrom down to the first floor in a manner which will be clear from the preceding discussion.

The down call assigned relay FA also opens its break contacts FA3 (FIG. 4) to interrupt the energizing circuit of the available car relay FR, which, it will be recalled, has a slight time delay in dropout. Break contacts FA11 (FIG. 9) open to introduce the resistor R32 into the bridge circuit associated with the down zone demand relay ZD, thus unbalancing the bridge circuit in a direction such that the relay ZD is deenergized, and this relay consequently drops out.

It will be noted that when the down preference relay X (FIG. 1) picks up to condition the elevator car A for down travel, break contacts X10 (FIG. 8) open to drop out the down zone call below relay KB, inasmuch as break contacts K0–2 are open. The relay KB opens its make contacts KB2 (FIG. 9) to maintain the relay ZD dropped out upon reclosure of break contacts FA11 when the down call assigned relay FA (FIG. 4) drops out as a result of the opening of make contacts RNS1. (In picking up, the down preference relay X opens its break contacts X7 to interrupt the holding circuit of the relay FA. It will be observed that the no scan relay RNS, FIG. 7, drops out upon dropout of the down zone demand relay ZD and the resulting opening of make contacts ZD2.)

Upon expiration of its time delay in dropout, the available car relay FR opens its make contacts FR16 (FIG. 11) in the circuit of the multiple available car relay MFC, which dropped out upon dropout of the down zone demand relay ZD and the consequent opening of make contacts ZD5.

Referring to FIG. 12, the aforementioned dropouts of the down zone demand relay ZD and the multiple available car relay MFC result in opening of their respective make contacts ZD7, MFC11 and MFC12 and closure of break contacts MFC13 to effect dropout of the demand response relay FCR and resetting of the brushes of the low zone stepping switch FSL in a manner which will be clear from the preceding discussion.

As the elevator car A approaches the first floor, its associated zone position relay Z0 (FIG. 3) picks up to open its break contacts Z0–10 (FIG. 8). As a result, the down zone demand registering relay K0 drops out, thus indicating the termination of the artificial demand for first floor service.

Down floor calls

It now will be assumed that the elevator car C is located at the first floor and has been selected by the dispatching mechanism as the next car to be dispatched therefrom (the next car relay CN, FIG. 7, is picked up). Consequently, the doors associated with the car C are open, as will be understood from the preceding discussion. In addition, the car A also is located at the first floor (the zone position Z0, FIG. 3, is picked up) with its doors closed and is available for assignment (the available car relay FR, FIG. 4, is picked up). Finally, the elevator car B is available for assignment (the available car relay BFR is picked up) at the sixth floor (the zone position relay BZ3, FIG. 3, is picked up).

At this stage, a prospective passenger at the fourth floor registers a down floor call therefor by pressing the push button 4D (FIG. 2) to energize the down floor call registering relay 4DR therethrough. In picking up, the relay 4DR closes its make contacts 4DR1 to establish a holding circuit around the push button 4D. In addition, the relay 4DR closes its make contacts 4DR4 (FIG. 8) to energize the down zone demand registering relay K2, thus indicating that there is a demand for down service for a floor in the second down zone.

The relay K2 opens its break contacts K2–2 and closes its make contacts K2–3 to initate a timing operation of the down zone timing relay K2T. Furthermore, the relay K2 opens its break contacts K2–5 (FIG. 9) to effect energization and pickup of the down zone demand relay ZD in a manner which will be clear from the preceding discussion. (It will be noted that under the assumed conditions only the resistor R31 is effective between the cathode electrode of the tube TU5 and the bus L2, inasmuch as make contacts H9, KB2, BKB2 and CKB2 and break contacts FA11, BFA11 and CFA11 all are closed.)

Pickup of the down zone demand relay ZD is accompanied by opening of its break contacts ZD1 (FIG. 7) to deenergize and drop out the master lower terminal relay 982, but such dropout has no immediate effect on system operation. (Inasmuch as the elevator car B is assumed to be located at the sixth floor, its associated zone position relay BZ0, FIG. 3, is dropped out to close its break contacts BZ0–9, FIG. 7. Such closure initially effected pickup of the relay 982.)

Closure of make contacts ZD2 results in pickup of the no scan relay RNS. Such pickup indicates that the elevator car which is to be selected to respond to the demand for down service is to proceed to the highest floor for which a down floor call is registered, in this case the fourth floor. Closure of make contacts RNS2 (FIG. 4) prepares the down call assigned relay BFA for energization therethrough.

Turning now to FIG. 11, closure of make contacts ZD5 results in pickup of the multiple available car relay MFC, inasmuch as it is assumed that the elevator cars A and B are available for assignment (make contacts FR16 and BRF16, respectively, are closed). It also will be observed that when the down zone demand registering relay K2 was energized as aforesaid, its break contacts K2–6 opened to drop out the high zone demand relay KBH and the low zone demand relay KBL.

Pickup of the multiple available car relay MFC is accompanied by opening of its break contacts MFC1 (FIG. 4), MFC2 and similar contacts associated with the down call assigned relay CFA for the elevator car C (not shown) to prevent energization of the respective down call assigned relays therethrough.

Referring to FIG. 12, it will be noted that as a result of the foregoing sequence of operations the following contacts are closed: make contacts MFC8, MFC10, MFC11, MFC12, ZD6 and ZD7 and break contacts KBH1 and KBL1; and the following contacts are open: make contacts KBH2 and break contacts MFC9 and MFC13. Consequently, the brushes of the high zone stepping switch FSH step until they arrive at their second position, at which time the coil of the stepping switch FSH is energized continuously through make contacts BZ3–5 and BFR17. As a result, the brushes cease their stepping action, and the level FSHb effects pickup of the demand response relay BRCR through make contacts BFR18, thus indicating that the elevator car B, which, under the assumed conditions, is located at the sixth floor, has been selected to be assigned to respond to the demand for service for the second down zone. It will be noted that under the assumed conditions it is immaterial whether or not the elevator car C, which is located at the first floor and has been selected as the next car to be dispatched therefrom, is available for assignment. It will be appreciated that the preceding selection process is similar to that which has been described in greater detail in Example 3 in the discussion of FIG. 12.

Pickup of the demand response relay BFCR results in closure of its make contacts BFCR1 (FIG. 4) to complete the following energizing circuit:

L1, BFR5, RNS2, BFCR1, H4 and B78U4, B38R3, BFA, L2

Pickup of the down call assigned relay BFA indicates that the elevator car B is assigned to respond to a demand for down service (in this case, to the down floor call for the fourth floor in the second down zone) and results in a sequence of operations which has the following effects, although not necessarily in the order listed, as will be understood by inspection of the drawings and from the previous discussion: the up preference relay BW (FIG. 1) drops out and the down preference relay BX picks up to indicate that the direction of travel for which the car B is conditioned has been reversed from up to down, and this car thereafter travels in the latter direction from the sixth floor as a result of pickup of the second auxiliary running relay B80 (FIG. 4); the available car relay BFR drops out to indicate that the car B no longer is available for assignment, and the down call assigned relay BFA also drops out; the master lower terminal relay 982 (FIG. 7) picks up, while the no scan relay RNS drops out; the down zone call below relay BKB (FIG. 8) drops out to indicate that a down zone demand for service is registered for a zone below the zone in which the down-traveling car B is located; the down zone demand relay ZD (FIG. 9) and the multiple available car relay MFC (FIG. 11) drop out; the demand response relay BFCR (FIG. 12) drops out, and the brushes of the high zone stepping switch FSH are reset to their homing position.

As the elevator car B leaves the sixth floor, its floor selector carriage notches to its fifth-floor position. Inasmuch as under the assumed conditions no call is registered for the fifth floor, such notching does not effect the stopping of the car B thereat, as will be apparent by inspection of FIGS. 2 and 3. However, the notching of the selector carriage is accompanied by engagement of the brush B$jj$ (FIG. 3) with the contact segment B$j$5 to energize and pick up the zone position relay BZ2. Closure of make contacts BZ2–3 (FIG. 8) completes the following circuit:

L1, 4DR4, K2N, BZ2–3, BSH8, BX9, BLW3, L2

Energization of the cancelling coil K2N results in resetting of the down zone demand registering relay K2, and this relay closes its break contacts G2–2 to establish a discharge path for the capacitor C3 and opens its make contacts K2–3, thus terminating the timing operation of the circuits associated with the down zone timing relay K2T. Break contacts K2–5 (FIG. 9) close to shunt the resistor R27, thereby effecting the direction connection of the control electrode of the tube TU5 to the bus L2 to ensure the continued deenergization of the down zone demand relay ZD. Finally, the relay K2 closes its break contacts K2–6 (FIG. 11) to energize the high zone demand relay KBH and the low zone demand relay KBL, but pickup of these relays has no immediate effect on system operation.

In picking up, the zone position relay BZ2 also closes its make contacts BZ2–4 (FIG. 8) to energize the down zone call below relay BKB through the following circuit:

L1, K0–2, K1–4, BZ2–4, RE10, BKB, L2

Pickup of the relay BKB, however, also has no immediate effect on the operation of the system.

As the elevator car B continues its downward travel, its floor selector carriage notches to its fourth-floor position. As a result, the brush B$dd$ (FIG. 2) engages the contact segment B$d$4 to complete an energizing circuit for the floor call stopping relay BS as follows:

L1, 4DR1, B$d$4, B$dd$, F2C2, BSH1, BFU11, BX3, BLW1, BS, L2

Upon pickup, the relay BS closes its make contacts BS1 (FIG. 1) to complete with the closed make contacts BM1 an energizing circuit for the holding BG, the inductor slowdown relay BE and the inductor stopping relay BF. Had a down floor call been registered for the fifth floor, the engagement of the brush B$d$ (FIG. 2) with the contact segment B$d$5 would have energized the floor call stopping relay BS in the same manner to initiate a stopping operation of the elevator car B at the fifth floor.

Upon energization, the holding relay BG (FIG. 1) closes its make contacts BG1 to establish a holding circuit around the contacts BS1. Continued downward movement of the elevator car B brings the inductor slowdown relay BE adjacent the inductor plate BDEP for the fourth floor, and a magnetic circuit consequently is completed which results in the opening of break contacts BE2 to deenergize the speed relay BV. Thereupon, the speed relay opens its make contacts BV1 to introduce the resistor BR1 in series with the generator field winding B16F. The decrease in energization of the field winding slows the elevator car B to a landing speed. The contacts BE2 remain open until the coil of the inductor slowdown relay BE is deenergized.

The continued movement of the elevator car B at a slow speed brings the inductor stopping relay BF adjacent the inductor plate BDFP, and break contacts BF2 thus open to deenergize the down switch BD and the running relay BM. Dropout of the down switch BD results in opening of its make contacts BD1 to apply the brake for the car B and opening of its make contacts BD2 and BD3 to deenergize the generator field winding B16F. The elevator car B now stops accurately at the fourth floor.

The inductor stopping relay BF also closes its make contacts BF3 (FIG. 2) to complete the following cancelling circuits:

L1, 4DR1, 4DRN, B$e$4, B$ee$, BX4, BFR2, BF3, L2

In resetting, the relay 4DR opens its holding contacts 4DR1.

It will be noted that the aforementioned dropout of the running relay BM is accompanied by closure of its break contacts BM6 in parallel with the contacts BF3 to maintain the cancelling circuit when the contacts BF3 open upon opening of make contacts BM1 (FIG. 1) to drop out the relays G, E and F.

It will be assumed that the passenger at the fourth floor enters the elevator car B and presses the car call push button B2c (FIG. 3). As a result, the car call registering relay B2CR is energized and closes its holding contacts B2CR1. If sufficient time has elaped for the non-interference relay B70T (FIG. 1) to drop out, its break contacts B70T1 (FIG. 4) close to complete with break contacts B981–2, BFR4 and BFA5 an energizing circuit for the second auxiliary running relay B80. This results in closure of make contacts B80–1 (FIG. 1), and, when the doors of the car B are closed, make contacts BDS1 close to complete an energizing circuit for the down switch BD and the running relay BM. These cooperate in the manner previously discussed to move the elevator car B toward the second floor.

As the elevator car B nears the second floor, the brush B$ff$ engages the contact segment B$f$2 (FIG. 3) to complete the following energizing circuit:

L1, B2CR1, B$f$2, B$ff$, BX5, BT, BM7, L2

In picking up, the car call stopping relay BT closes its make contacts BT1 (FIG. 1) to energize the relays BG, BE and BF through the contacts BM1. The energized relays BE and BF cooperate in the manner previously described to stop the elevator car B at the second floor. As the elevator car stops, the brush B$hh$ (FIG. 3) engages the contact segment B$h$2 to complete the following cancelling circuit:

L1, B2CR1, B2CRN, B$h$2, B$hh$, BM8, L2

In resetting, the relay B2CR opens its holding contacts B2CR1.

After the passenger departs the elevator car B and sufficient time has elapsed for the non-interference relay B70T (FIG. 1) to drop out, break contacts B70T1 (FIG. 4) close once again to complete an energizing circuit for the second auxiliary running relay B80. Upon closure of the doors of the car B, an energizing circuit is completed for the down switch BD (FIG. 1) and the running relay BM. These cooperate in the manner previously discussed to move the car B toward the first floor, and the car stops at the first floor in a manner which will be clear from the preceding discussion. In addition, it will be understood that upon reaching the first floor, the car B becomes conditioned for up travel as a result of the deenergization of the down preference relay BX (FIG. 1) and the energization of the up preference relay BW.

It will be observed that the elevator car B returned to the first floor although no call was registered therefor.

Thus, in the present embodiment of the invention, an elevator car, once conditioned for down travel, always returns to the lower terminal floor (unless it is assigned to answer an up floor call for a floor below the location of the car at the time of such assignment, as will be explained hereinafter).

For purposes of the discussion which follows, it should be pointed out again that the floors of the structure above the first floor in the illustrated embodiment of the invention are divided into three down zones, the first down zone comprising the second and third floors, the second down zone including the fourth and fifth floors, while the sixth floor constitutes the third down zone.

Let it be assumed next that down floor calls are registered for the fourth and sixth floors (the down floor call registering relays 4DR and 6DR (FIG. 2), respectively are picked up). In addition, asume that the elevator car C is located at the first floor, that it has been selected by the dispatching mechanism to be the next car to leave the first floor (the next car relay CN, FIG. 7, is picked up) and that the lower terminal floor elevator car dispatching interval has not expired (the dispatching interval expired relay UTA, FIG. 9, is dropped out). Consequently, the car C is not available for assignment, i.e., the available car relay CFR (not shown) is dropped out, as will be apparent by inspection of the circuits associated with the available car relays FR and BFR (FIG. 4). Furthermore, it will be assumed that the elevator car A is traveling down in the first down zone and that after the aforementioned down floor calls for the fourth and sixth floors are registered, the car B becomes available for assignment at the second floor, as indicated by pickup of its associated available car relay BFR.

Under these conditions, it will be observed that the zone position relays Z1 (FIG. 3), BZ1 and CZ0 (not shown) are picked up. Referring to FIG. 5, it also will be observed that pickup of the down floor call registering relays 4DR and 6DR results in opening of their respective break contacts 4DR2, 4DR3, 6DR2, 6DR3 and similar contacts for the elevator car C to effect dropout of the down call above relays DCA, BDCA and CDCA (not shown). In addition, closure of make contacts 4DR4 (FIG. 8) and 6DR4 results in pickup of the down zone demand registering relays K2 and K3, respectively, to indicate the existence of demands for down service for the second and third down zones. As a result, break contacts K2–2 and K3–2 open and make contacts K2–3 and K3–3 close to initiate timing operations of the circuits respectively associated with the down zone timing relays K2T and K3T. Furthermore, break contacts K2–4 open, but the down zone call below relay BKB remains picked up through break contacts BX10 of the down preference relay for the car B and through break contacts K0–2, make contacts BZ1–3 and the rectifier RE10; while the relay CKB remains energized through break contacts CX10 of the down preference relay for the car C and through make contacts CZ0–11 and the rectifier RE11. It will be noted that the down zone call below relay KB for the elevator car A is picked up through break contacts K0–2, make contacts Z1–3 and the rectifier RE9 under the assumed conditions.

The down zone demand registering relays K2 and K3 also open their respective break contacts K2–6 and K3–5 (FIG. 11) to drop out the high zone demand relay KBH and the low zone demand relay KBL, but such dropouts have no immediate effect on system operation.

By reference to FIG. 9, it will be observed that the cathode electrode of the tube TU5 is connected to the bus L2 through the resistor R31, since the remaining resistors between the cathode electrode and the bus L2 are shunted by the contacts respectively associated therewith. Consequently, opening of break contacts K2–5 and K3–4 results in energization and pickup of the down zone demand relay ZD.

In picking up, the relay ZD closes its make contacts ZD3 (FIG. 8) but such closure has no immediate effect on operation of the master down call above relay MCA for the reason that, under the assumed conditions, break contacts BW12 and CW12 and make contacts DCA4, BDCA4, CDCA4 and AHC2 all are open. Consequently, closure of make contacts ZD2 (FIG. 7) results in energization of the no scan relay RNS to signify that an elevator car which is to be assigned to answer down floor calls shall run to the highest floor for which such a call is registered. This relay closes its make contacts RNS2 (FIG. 4) to energize the down call assigned relay BFA, thus indicating that the elevator car B now is assigned to answer down floor calls. Pickup of the relay BFA is accompanied by closure of its make contacts BFA6 to establish a self-holding circuit through break contacts BX7 and B38R3 and parallel make contacts B78U4 and H4. Such pickup also results in the dispatching of the car B in the up direction from the second floor by a sequence of operations which will be clear from the preceding discussion. (It will be noted that during such sequence the available car relay BFR drops out to indicate that the car B no longer is available for assignment.)

The down call assigned relay BFA also closes its make contacts BFA10 (FIG. 8) to energize the highest down call relay AHC through break contacts BSH9. Pickup of this relay signifies that a specific elevator car, in this case the car B, has been assigned to run to the highest floor for which a down floor call is registered. Closure of make contacts AHC2 results in pickup of the master down call above relay MCA, which opens its break contacts MCA1 (FIG. 7) to drop out the no scan relay RNS without further effect on system operation. The relay MCA also closes its make contacts MCA2, but such closure has no immediate effect on the operation of the system for the reason that no elevator car is available for assignment (make contacts FR12, BFR12 and CFR12 are open).

Opening of break contacts FA11 (FIG. 9) to introduce the resistor R32 in series with the resistor R31 also has no immediate effect on system operation, and the down zone demand relay ZD remains picked up, since the bridge circuit which controls the operation thereof now is balanced, inasmuch as the number of down zones requiring service exceeds the number of elevator cars assigned to answer down floor calls (break contacts K2–5 and K3–4 are open).

It will be observed that the elevator car B has not been assigned to serve a specific down zone. Consequently, the car B does not stop at the fourth floor in response to the down floor call which is assumed to be registered therefor, inasmuch as make contacts BX3 (FIG. 2) are open to prevent energization of the floor call stopping relay BS. As a result, the elevator car B continues its upward travel past the fourth floor.

As the car B approaches the sixth floor, its floor selector carriage notches to its sixth-floor position to effect engagement of the contact segment BG6 (FIG. 3) by the brush B$gg$. Such engagement results in energization of the car call stopping relay BT, as a result of which the car B stops at the sixth floor, as will be apparent from the foregoing discussion.

The notching of the car B floor selector carriage to its sixth-floor position also is accompanied by engagement of the contact segment B$n$6 (FIG. 5) by the brush B$nn$ to energize the down call above relay BDCA. Pickup of the relay BDCA results in closure of its make contacts BDCA1 (FIG. 4) to energize and pick up the high call reversal relay B69H through make contacts BFA4 and break contacts BX6. This relay closes its make contacts B69H3 to establish a holding circuit through the contacts BX6. Closure of make contacts B69H1 (FIG. 1) has no immediate effect on system operation. It will be noted, however, that had the highest floor for which a down floor call were registered been a floor other than the sixth floor, closure of the contacts B69H1 would have effected the stopping of the car B at such other floor by virtue of energization of the relays BG, BE and BF therethrough. Opening of break contacts B69H2 effects dropout of the up reference relay BW as the elevator car B comes to a stop and its running relay BM drop out to open its make contacts BM2. As a result, break contacts BW2 close to energize and pick up and down preference relay BX. Consequently, the elevator car B is located at the sixth floor and is conditioned for down travel.

The down call above relay BDCA also closes its make contacts BDCA4 (FIG. 8). Consequently, closure of break contacts BW12 upon the above-mentioned dropout of the up preference relay BW completes a second energizing circuit for the master down call above relay MCA through break contacts BSH10 and make contacts ZD3. (It will be recalled that the relay MCA initially was energized through make contacts AHC2 and ZD3.)

Pickup of the down preference relay BX, as aforesaid, is accompanied by closure of its make contacts BX9 (FIG. 8) to energize the cancelling coil K3N as follows:

L1, 6DR4, K3N, BZ3–3, BSH8, BX9, BLW3, L2

(It will be observed that the zone position relay BZ3, FIG. 3, picked up to close its contacts BZ3–3 as the elevator car B approached the sixth floor and the brush B$jj$ engaged the contact segment B$j$6 when the car B floor selector carriage notched to its sixth-floor position.) Energization of the cancelling coil K3N effects the resetting of the down zone demand registering relay K3, which opens its make contacts K3–3 to interrupt the charging circuit of the capacitor C2 and closes its break contacts K3–2 to discharge the capacitor through the resistor R18. Thus, the timing operation of the circuits asociated with the down zone timing relay K3T is terminated.

Returning to the pickup of the down preference relay BX, its make contacts BX4 (FIG. 2) close to energize the cancelling coil 6DRN through make contacts 6DR1 and break contacts BFR2 and BM6, inasmuch as the brush B$ee$ is in engagement with the contact segment B$e$6. As a result, the energization of the down floor call registering relay 6DR is neutralized, and this relay is reset. Break contacts BX6 (FIG. 4) open to deenergize and drop out the high call reversal relay B69H without further effect on system operation. Break contacts BX7 open to interrupt the holding circuit of the down call assigned relay BFA, and this relay consequently drops out to close its break contacts BFA3. However, such closure has no immediate effect on operation of the available car relay BFR, since the elevator car B is not conditioned for up travel (make contacts BW7 are open). The relay BFA also opens its make contacts BFA10 (FIG. 8) to drop out the highest down call relay AHC, but such dropout has no immediate effect on system operation.

Turning to FIG. 8, opening of break contacts BX10 effects deenergization of the down zone call below relay BKB, since break contacts K2–4 still are open as a result of the previously-mentioned registration of the down floor call for the fourth floor and break contacts BND4 also are open. (Refer to the energizing circuit for the notching relay BND, FIG. 6.) Dropout of the relay BKB indicates that a down zone demand for service is registered for a down zone below that in which the car B is located, the car being conditioned for down travel.

Referring now to FIG. 9, dropout of the down zone demand registering relay K3, as noted above, is accompanied by closure of its break contacts K3–4 to shunt the resistor R28. Although break contacts BFA11 closed when the down call assigned relay BFA dropped out as aforesaid, make contacts BKB2 in series therewith open when the down zone call below relay BKB drops out. Consequently, the resistors R33 and R31 remain interposed between the cathode electrode of the tube TU5 and the bus L2. Since only the resistor R27 now is inserted between the control electrode of this tube and the bus L2, the latter electrode has a negative potential with respect to the cathode electrode. Thus, the down zone demand relay ZD is deenergized. Dropout of the relay ZD under these conditions indicates that the number of down zones for which demands for down service now are registered do not exceed the number of elevator cars which are located above such zones and which are conditioned for down travel. (Under the assumed conditions, there are now one such zone and one such car.) Such dropout is accompanied by opening of make contact ZD3 (FIG. 8) to drop out the master down call above relay MCA, and this relay closes its break contacts MCA1 (FIG. 7); but the no scan relay RNS is maintained deenergized as a result of the opening of make contacts ZD2.

Let it now be assumed that, in the immediately preceding example, after the elevator car B is assigned to answer the highest down floor call, as indicated by pickup of the highest down call relay AHC (FIG. 8), and before it arrives at the sixth floor, down floor calls are registered for the fifth, third and second floors by operation of the push buttons 5D, 3D and 2D (FIG. 2) to energize the respective down floor call registering relays 5DR, 3DR and 2DR. Such energization is accompanied by closure of make contacts 3DR4 and 2DR4 (FIG. 8) to pick up and down zone demand registering relay K1, thus indicating the existence of a demand for down service for the first down zone. (It will be recalled that the down zone demand registering relays K2 and K3 already are picked up as a result of the registration of down floor calls for the fourth and sixth floors respectively, so that closure of make contacts 5DR4 has no immediate effect on system operation.)

Pickup of the relay K1 is accompanied by opening of its break contacts K1–2 and closure of its make contacts K1–3 to initiate a timing operation of the circuits associated with the down zone timing relay K1T. Opening of break contacts K1–4 has no immediate effect on operation, inasmuch as the down zone call below relays KB, BKB and CKB are energized through circuits which do not involve these contacts, as explained previously. Opening of break contacts K1–5 (FIG. 9) also has no immediate effect on system operation, for the reason that the down zone demand relay ZD already is energized and picked up, as explained heretofore.

Returning to FIG. 8, it will be recalled that when the down call assigned relay BFA picked up to indicate that the elevator car B was assigned to answer down floor calls, make contacts BFA10 closed to energize the highest down call relay AHC through break contacts BSH9, thus indicating that the car B was assigned to run to the highest floor for which a down floor call was registered. In addition, pickup of the relay AHC was accompanied by closure of make contacts AHC2 to energize the master down call above relay MCA through make contacts ZD3, and this relay opened its break contacts MCA1 (FIG. 7) to drop out the no scan relay RNS and closed its make contacts MCA2.

Assume that at this stage the elevator car A has arrived at the first floor (the zone position relay Z0, FIG. 3, is picked up), that it is conditioned for up travel (the up preference relay W, FIG. 1, is picked up), that its doors are closed (the switch 27, FIG. 4, is closed), and that, consequently, it is available for assignment (the available car relay FR is picked up). As a result, make contacts FR12 (FIG. 7) are closed to establish the following energizing circuit:

L1, ZD2, MCA2, FR12, SH7, SZR, L2

Opening of break contacts SZR1 upon pickup of the scan relay SZR prevents the subsequent self-stepping of the brushes of the down demand mid-point stepping switch SZ. Closure of make contacts SZR2 partially completes an energizing circuit for the down demand mid-point relay SC.

It will be observed that an energizing circuit also is completed for the pulsing relay SCR through its self-interrupting contacts SCR1 and break contacts FZM4. Consequently, the relay SCR pulses and thus alternately closes and opens its make contacts SCR2, as a result of which the coil of the down demand mid-point stepping switch SZ alternately is energized and deenergized. Such operation is accompanied by the stepping of the brushes associated with the stepping switch SZ in a counterclockwise direction, as viewed in FIG. 7.

It will be recalled from the preceding discussion that under the assumed conditions the highest down call relay AHC (FIG. 8) and the down zone demand registering relays K1, K2 and K3 all are energized and picked up. Consequently, break contacts AHC1, K1–1, K2–1 and K3–1 (FIG. 7) are open to introduce the resistors R11, R9, R8 and R7, respectively, into the voltage divider circuit associated with the level SZa. Thus, when the brushes associated with the stepping switch SZ step from their second to their third position, the bridge circuit which controls operation of the tube TU1 becomes balanced. As a result, the tube TU1 fires to energize the down demand mid-point relay SC.

Upon pickup, the relay SC closes its make contacts SC1 to energize the coil of the stepping switch SZ continuously through break contacts FZT1. Such energization prevents the further stepping of the brushes of the stepping switch SZ. Closure of make contacts SC2 establishes the following energizing circuit through the level SZb:

L1, SC2, FZ1, F1C4, L2

Pickup of the zone relay FZ1 indicates that the elevator car which is to be assigned to respond to a demand for down service shall serve the first down zone, comprising the second and third floors. Such pickup is accompanied by closure of make contacts FZ1–3 to energize the master zone relay FZM.

Opening of break contacts FZM3 has no immediate effect on operation. Break contacts FZM4 open to interrupt continuously the energizing circuit of the pulsing reday SCR to prevent further pulsing thereof. Break contacts FZM5 open to prevent energization therethrough of the zone resetting relay FZT, while make contacts FZM6 close to charge the capacitor C1 through the resistor R15.

Turning now to FIG. 5, it will be observed that as a result of the foregoing sequence of operations make contacts FZM1 and FZ1–1 are closed. In addition, under the assumed conditions break contacts 2DR2 through 6DR2 are open to drop out the down call above relay DCA as a result of the registration of down floor calls for the second through sixth floors, respectively; break contacts FR7 of the available car relay FR are open and make contacts FR8 and FR9 thereof are closed, since the elevator car A is available for assignment; break contacts MFC3 of the multiple available car relay MFC are closed, inasmuch as it is assumed that the car A is the only car which is available for assignment; and make contacts Z0–3 of the zone position relay Z0 also are closed, since the car A is located at the lower terminal or first floor. (Inasmuch as the elevator car B is not available for assignment under the assumed conditions, make contacts BFR8 of the available car relay BFR are open. Consequently, the assigned zone stepping switch BKA is not involved in the present discussion.)

Under these conditions, the brushes of the assigned zone stepping switch KA step in a counterclockwise direction, as viewed in FIG. 5. When the brushes arrive at their second position, the level KAc effects completion of the following energizing circuit:

L1, FR9, FZ1–1, RE1, KA, L2

Thus, the coil of the stepping switch KA now is energized continuously, and its self-stepping contacts KA2 are open. As a result, the stepping action of its brushes ceases, and the brushes remain in their second position.

It will be observed that at this time an energizing circuit simultaneously is completed for the down zone assigned relay SH through break contacts 38R4 to indicate that the elevator car A has been assigned to serve a particular down zone. In picking up, the relay SH closes its make contacts SH4 to establish a holding circuit for the relay through break contacts X8 and 38R4. It will be noted that the contacts X8 and SH4 also provide a second energizing circuit for the coil of the stepping switch KA through the rectifier RE1.

The relay SH also closes its make contacts SH5 to energize the assigned zone relay F1C through the d level of the stepping switch KA. Pickup of this relay indicates that the assigned car A is to serve the first down zone. Make contacts SH6 close to prepare the assigned zone stopping relay ST for subsequent energization through the level KAe of the assigned zone stepping switch. Make contacts SH3 close to prepare the down call above relay DCA for subsequent energization through the level KAa.

The down zone assigned relay SH also opens its break contacts SH7 (FIG. 7) to drop out the scan relay SZR. (Since, under the assumed conditions, the elevator cars B and C are not available for assignment, make contacts BFR12 and CFR12 are open.)

In picking up as aforesaid, the assigned zone relay F1C closes its make contacts F1C3 to shunt the resistor R9. As a result, a negative bias is applied to the control electrode of the tube TU1 to deenergize and drop out the down demand mid-point relay SC. In addition, break contacts F1C4 open to deenergize the zone relay FZ1.

Upon dropout, the relay FZ1 opens its make contacts FZ1–3 to drop out the master zone relay FZM, which opens its make contacts FZM6 to interrupt the charging circuit of the capacitor C1 and closes its break contacts FZM5 to discharge the capacitor through the zone resetting relay FZT and thus to pick up such relay. As a result of this sequence of operations, the brushes of the down demand mid-point stepping switch SZ reset to their homing position, as will be understood from the preceding discussion of FIG. 7.

Returning for a moment of FIG. 5, it will be noted that in dropping out the zone relay FZ1 and the master zone relay FZM open their respective make contacts FZ1–1 and FZM1 without immediate effect on system operation, inasmuch as the coil of the assigned zone stepping switch KA remains energized through the rectifier RE1, break contacts X8 and make contacts SH4, and the down zone assigned relay SH is maintained picked up through these contacts and break contacts 38R4.

In pickup, the relay SH and the assigned zone relay F1C open their respective break contacts SH1 and F1C1 (FIG. 2) to prevent energization of the floor call stopping relay S therethrough. In addition, break contacts F1C2 in the circuit of the floor call stopping relay BS and similar contacts in the circuit of the floor call stopping relay for the elevator car C (not shown) open to prevent energization therethrough of such relays and thus to prevent the stopping of the cars B and C, respectively, at the second and third floors in the first down zone in response to registered down floor calls therefor.

Break contacts SH8 (FIG. 8) open to prevent energization therethrough of the down zone demand registering relay cancelling coils K1N, K2N and K3N, while break contacts F1C5 open to terminate the timing operation of the circuits associated with the down zone timing relay K1T. The assigned zone relay F1C also closes its make contacts F1C6 (FIG. 11) to shunt the open break contacts K16, but such closure has no immediate effect on system operation, since break contacts K3–5 and K2–6 are open under the assumed conditions.

Turning now to FIG. 4, pickup of the down zone assigned relay SH for the elevator car A also is accompanied by closure of its make contacts SH2 to pick up the down call assigned relay FA through make contacts FR5, H2 and 78U4 and break contacts 38R3. Such pickup results in closure of make contacts FA6 to establish a self-holding circuit for the down call assigned relay. Break contacts FA3 open to deenergize the available car relay FR. Make contacts FA4 close to prepare the high call reversal relay 69H for subsequent energization. Make contacts FA7 close to energize the first auxiliary running relay RA through break contacts 42–2. After a slight time delay, the relay RA picks up to close its make contacts RA1, thus energizing the second auxiliary running relay 80 through break contacts 70T1. Pickup of the relay 80 effects the acceleration of the elevator car A in the up direction from the first floor in a manner which will be clear from the preceding discussion.

Pickup of the down call assigned relay FA also is accompanied by opening of its break contacts FA11 (FIG. 9) to remove the shunt across the resistor R32 in the voltage divider circuit associated with the cathode electrode of the tube TU5. The down zone demand relay ZD, however, remains picked up, inasmuch as the bridge circuit associated therewith is balanced, since the resistors R26, R27 and R28 are effective in the circuit of the control electrode of the tube TU5, while the resistors R31, R32 and R33 are effective in the circuit of the cathode thereof under the assumed conditions.

At the expiration of its slight time delay in dropout, the available car relay FR (FIG. 4) drops out to open its make contact FR5, but such opening has no immediate effect on operation of the down call assigned relay FA which is maintained energized through its holding circuit, as aforesaid. The relay FR also closes its break contact FR7 (FIG. 5) to prepare the assigned zone stepping switch KA for subsequent operation to return its brushes to their homing position.

At the elevator car A leaves the first floor and its floor selector carriage notches to its second-floor position, the brush $jj$ (FIG. 3) disengages the contact segment $j1$ to drop out the zone position relay Z0 and engages the contact segment $j2$ to pick up the zone position relay Z1. In dropping out, the relay Z0 opens its make contact Z0–8 (FIG. 7) to drop out the lower terminal no-start relay 981 without further affecting system operation. Make contacts Z0–15 (FIG. 10) open to drop out the lower terminal non-next relay SFB. (Since, under the assumed conditions, the elevator car C has been selected as the next car to be dispatched from the lower terminal floor, break contacts CN8 are open, and inasmuch as the car B is not located at the first floor, make contacts BZ0–15 are open.)

Pickup of the zone position relay Z1 is accompanied by closure of its make contacts Z1–1 (FIG. 5) to energize the assigned zone stopping relay ST through make contacts SH6 and the $e$ level of the assigned zone stepping switch KA, but pickup of the relay ST does not affect system operation at this time. Closure of make contacts Z1–2 (FIG. 8) prepares the cancelling coil K1N associated with the down zone demand registering relay K1 for subsequent energization therethrough, while make contacts Z1–3 close to provide a parallel energizing path for the down zone call below relay KB through break contacts K0–2 and the rectifier RE9. (Inasmuch as the elevator car A is conditioned for up travel, break contacts X10 of the down preference relay X also are closed.)

Since no circuit is completed for stopping the car A at the second floor in response to the down floor call which is assumed to be registered therefor, the car continues its upward travel past the second floor. As the elevator car A approaches the third floor and its floor selector carriage notches to its third-floor position, the brush $nn$ (FIG. 5) engages the contact segment $n3$ to pickup the down call assigned relay DCA through make contacts SH3 and the $a$ level of the assigned zone stepping switch KA. (It will be recalled that the brushes of the switch KA are in their second position.) Such pickup is accompanyied by closure of make contacts DCA1 (FIG. 4) to energize the high call reversal relay 69H through make contacts FA4 and break contacts X6. As a result, make contacts 69H1 (FIG. 1) close to energize the holding relay G, the inductor slowdown relay E and the inductor stopping relay F through make contacts M1. These relays operate in the manner previously described to stop the elevator car A at the third floor. In addition, break contacts 69H2 open to effect dropout of the up preference relay W when make contacts M2 open as the car A comes to a stop and its running relay M drops out. Dropout of the relay W is accompanied by closure of its break contacts W2 to energize the down preference relay X. Consequently, the elevator car A now is stopped at the third floor and is conditioned for down travel.

In picking up, the down preference relay X closes its make contacts X4 (FIG. 2) to complete the following cancelling circuit:

L1, 3DR1, 3DRN, $e3$, $ee$, X4, FR2, M6, L2

Consequently, the down floor call for the third floor is cancelled.

The down preference relay also opens its break contacts X6 (FIG. 4) to deenergize the high call reversal relay 69H but dropout of this relay has no immediate effect on system operation. Break contacts X7 open to interrupt the holding circuit for the down call assigned relay FA, and this relay drops out to open its make contacts FA7, thus deenergizing the first auxiliary running relay RA. Dropout of the relay RA is accompanied by opening of its make contacts RA1 to prevent energization of the second auxiliary running relay 80 therethrough. However, the relay FA closes its break contacts FA5 to complete an energizing circuit for the relay 80 when break contacts 70T1 close upon expiration of the non-interference time for the elevator car A. As a result, make contacts 80–1 (FIG. 1) close partially to complete an energizing circuit for the down switch D and the running relay M. Thus, upon closure of the doors of the elevator car A, the door relay DS picks up through the limit switches 23 to close its make contacts DS1 to initiate movement of the car A in the down direction from the third floor, as will be understood from the preceding discussion.

Pickup of the down preference relay X also is accompanied by opening of break contacts X8 (FIG. 5). It will be recalled, however, that the cam $pp$ is not in engagement with one of the switches in the $p$ row when the floor selector carriage for the elevator car A is in its third-floor position. Consequently, since the brushes of the assigned zone stepping switch KA are in their second position, the down zone assigned relay SH and the coil of the stepping switch KA are maintained energized through the level KAb and the switches $p1$ and $p2$.

Pickup of the down preference relay X also results in closure of its make contacts X9 (FIG. 8) to energize the cancelling coil K1N as follows:

L1, 2DR4, K1N, Z1–2, SH8 and ST4, X9, LW3, L2

Thus, the down zone demand registering relay K1 is reset, although a down floor call still is registered for the second floor under the assumed conditions (make contacts 2DR4 are closed).

Turning now to FIG. 9, it will be observed that the resetting of the relay K1 is accompanied by closure of its break contacts K1–5 to shunt the resistor R26. In dropping out, however, the down call assigned relay FA closed its break contacts FA11 to shunt the resistor R32 through make contacts KB2. Under these conditions, if the elevator car B has not yet answered the down floor call which was assumed to be registered for the sixth floor, the bridge circuit associated with the down zone demand relay ZD remains balanced, and this relay consequently is maintained energized. If, however, such call has been answered by the car B, break contacts K3–4 are closed to shunt the resistor R28. As a result thereof, a negative bias is applied to the control electrode of the tube TU5 to deenergize and drop out the relay ZD, as will be clear from the preceding discussion. Dropout of the relay ZD under such circumstances indicates that the number of remaining down zones requiring service does not exceed the number of elevator cars which are conditioned for down travel and which are located above such zones, i.e., only the second down zone now requires service (down floor calls are registered for the fourth and fifth floors) and the car B is located at the sixth floor in the third down zone and is conditioned for down travel.

Assuming that the doors of the elevator car A have closed to initiate downward movement of the car from the third floor as discussed heretofore, the notching of the car A floor selector carriage to its second-floor position results in engagement of the contact segment $c2$ (FIG. 2) by the brush $cc$ to complete the following energizing circuit:

L1, 2DR1, $c2$, $cc$, ST2, ST3, FU11, X3, LW1, S, L2

Pickup of the floor call stopping relay S effects the stopping of the car A at the second floor in a manner which will be clear from the preceding discussion. Engagement of the contact segment $e2$ by the brush $ee$ results in cancellation of the registered down floor call for the second floor. It will be understood that the car A subsequently travels to and stops at the first floor. The notching of the car A floor selector carriage to its second-floor position also is accompanied by engagement of the cam $pp$ (FIG. 5) with the actuating member of the switch $p2$. Consequently, the switch is opened to interrupt the circuit for continuously energizing the coil of the assigned zone stepping switch KA. Thus, the circuit comprising break contact FR7, the homing contacts KA1 and the self-stepping contacts KA2 effects the resetting of the brushes of the stepping switch KA to their homing position, as will be understood from the discussion of FIG. 5.

Opening of the switch $p2$ also results in dropout of the down zone assigned relay SH, and this relay opens its make contacts SH3, SH5, and SH6 to drop out the down call above relay DCA, the assigned zone relay F1C and the assigned zone stopping relay ST, respectively. Such dropouts, however, have no immediate effect on the operation of the system.

It will be observed from the above example that after an elevator car is dispatched to the highest floor for which a down floor call is registered, another car which is assigned to serve a specific down zone of floors above the location of the last-named car travels up to the highest floor in such zone for which a down floor call is registered, reverses its direction of travel from up to down and answers all down floor calls which may be registered for floors in such zone. It also will be understood that the elevator car B will answer the down floor calls which are assumed to be registered for the fourth and fifth floors after answering the down floor call for the sixth floor, unless the car C becomes available for assignment before the car B answers the call for the sixth floor and is assigned specifically to serve the second down zone (fourth and fifth floors).

Let it now be assumed that the elevator car B has stopped at the sixth floor in response to a down floor call and is conditioned for down travel, that the car A is located at the fourth floor and is available for assignment (the zone position relay Z2, FIG. 3, and the available car relay FR, FIG. 4, are picked up), that the car C again is positioned at the first floor and has been selected as the next car to be dispatched therefrom but is not available for assignment and that down floor calls are registered for the second, third, fourth and fifth floors. It will be noted that these conditions are similar to those in the preceding example except for the locations of the cars A and B and except for the fact that the down floor call for the sixth floor has been cancelled.

By inspection of FIG. 8 and in view of the preceding discussion, it will be observed that the down zone demand registering relays K1 and K2 and the down zone call below relays KB and CKB are picked up, while the down zone call below relay BKB is dropped out. Consequently, the down zone demand relay ZD (FIG. 9) is energized and picked up. Since the elevator car B is located at the sixth floor, it will be understood that the down call above relay BDCA (FIG. 5) also is picked up.

Returning to FIG. 8, it will be noted that under the assumed conditions the highest down call relay AHC now is dropped out to open its make contacts AHC2. The master down call above relay MCA, however, is energized through the following circuit:

L1, BDCA4, BW12, BSH10, ZD3, MCA, L2

As will be understood from the preceding discussion, pickup of the relay MCA effects the stepping of the brushes of the down demand mid-point stepping switch SZ (FIG. 7) to their third position, since under the assumed conditions break contacts K1–1 and K2–1 are open and break contacts AHC1 are closed. As a result, the zone relay FZ1 is energized to indicate that an elevator car is to be assigned to serve the first down zone. Closure of make contacts FZ1–3 completes an energizing circuit for the master zone relay FZM, and this relay closes its make contacts FZM1 (FIG. 5) to effect the stepping of the brushes of the assigned zone stepping switch KA. When these brushes arrive at their second position, the level KA$c$ effects pickup of the down zone assigned relay SH and the continuous energization of the coil of the stepping switch KA through make contacts FR9 and FZ1–1. In picking up, the relay SH closes its break contacts SH5 to energize the assigned zone relay F1C through the level KA$d$, and this relay picks up to effect the resetting of the brushes of the down demand mid-point stepping switch SZ (FIG. 7) to their homing position, as will be understood from the preceding discussion.

Pickup of the relay SH also is accompanied by closure of its make contacts SH2 (FIG. 4) to energize the down call assigned relay FA.

Inasmuch as the elevator car A is located at the fourth floor in the second down zone and has been assigned to serve the first down zone, the direction of travel for which the car is conditioned must be reversed from up to down. Returning to FIG. 5, it will be noted that the down call above relay DCA is energized through the following circuit by means of the $a$ level of the assigned zone stepping switch KA, although down floor calls are assumed to be registered for the fourth and fifth floors (break contacts 4DR2 and 5DR2 are open):

L1, SH3, RE4, $n4$, $nn$, DCA, L2

In picking up, the down call above relay DCA closes its make contacts DCA1 (FIG. 4) to energize the high call reversal relay 69H through make contatcts FA4 and break contacts X6. From the preceding discussion, it will be apparent that pickup of the relay 69H changes the direction of travel for which the car A is conditioned from up to down. Consequently, movement of the car A is initiated from the fourth floor in the down direction.

As the elevator car A leaves the fourth floor and its floor selector carriage notches to its third-floor position, the brush $jj$ (FIG. 3) disengages the contact segment $j4$ to drop out the zone position relay Z2 and thereafter engages the contact segment $j3$ to energize the zone position relay Z1. Pickup of the relay Z1 is accompanied by closure to make signals Z1–1 (FIG. 5) to energize the assigned zone stopping relay ST through make contacts SH6 and the *e* level of the assigned zone stepping switch K*a*. Closure of make contacts ST2 and ST3 (FIG. 2) completes the following energizing circuit:

L1, 3DR1, *c*3, *cc*, ST2, ST3, FU11, X3, LW1, S, L2

Pickup of the floor call stopping relay S effects the stopping of the elevator car A at the third floor, as will be apparent from the foregoing discussion. Subsequently, the elevator car A answers the down floor call which is assumed to be registered for the second floor in a manner similar to its answering of the down floor call for the third floor, and the brushes of the assigned zone stepping switch KA (FIG. 5) reset to their homing position.

It will be observed that although the elevator car A was located at the fourth floor and a down floor call was assumed to be registered for such floor, the car did not answer such call, inasmuch as the care was assigned to serve the first down zone and consequently no energizing circuit was completed for the floor call stopping relay S (FIG. 2) when the brush *dd* was in engagement with the contact segment *d*4 (make contacts ST1 and ST3 and break contacts SH1 were open). In other words, the elevator car A "by-passed" the down floor call for the fourth floor.

Assume, however, that the elevator car A is available for assignment at the fourth floor, that a down floor call is registered for such floor by operation of the push button 4D to pick up the down floor call registering relay 4DR, that no down call is registered for the fifth floor and that the assigning circuits have operated to assign the car A to serve the second down zone (fourth and fifth floors). Under these conditions, it will be observed by inspection of the drawings and from the preceding discussion that the following energizing circuit is completed for the floor call stopping relay S:

L1, 4DR1, *d*4, *dd*, ST1, ST3, FU11, X3, LW1, S, L2

Pickup of the relay S is accompanied by closure of its make contacts S2 (FIG. 4) to energize the auxiliary door control relay 42 through make contacts FR6. (Since the available car relay FR is provided with a slight time delay in dropout, the contacts FR6 are closed at this time.) In picking up, the relay 42 opens its break contacts 42–2 to prevent energization of the first auxiliary running relay RA. In addition, break contacts 42–3 open to deenergize the door-control relay 45, and this relay closes its break contacts 45–3 to energize the door-open solenoid DO. Consequently, the doors of the elevator car A open to permit the entry of passenger who registered the down floor call for the fourth floor. Pickup of the relay 42 also is accompanied by closure of its make contacts 42–1 (FIG. 1) to energize the non-interference relay 70T, and this relay opens its break contacts 70T2 (FIG. 4) to maintain deenergization of the door-control relay 45.

Upon expiration of the time delay in dropout of the available car relay FR, such relay drops out to open its make contacts FR6, thus deenergizing the auxiliary door control relay 42. Inasmuch as the car A now is conditioned for down travel (break contacts X7 are open), as will be understood from the foregoing discussion, opening of make contacts FR5 upon dropout of the relay FR effects deenergization of the down call assigned relay FA. Consequently, the relay FA opens its make contacts FA7 to prevent energization of the first auxiliary running relay RA when break contacts 42–2 close upon the aforementioned dropout of the relay 42.

In dropping out, the relay 42 also opens its make contacts 42–1 (FIG. 1) to initiate a timing-out operation of the non-interference relay 70T. Upon expiration of the non-interference time, the relay 70T drops out to initiate a closing operation of the doors of the car A in a manner which will be clear from the preceding discussion. Subsequently, movement of the car A is initiated from the fourth floor in the down direction.

Assume next that the down floor call registering relay 6DR (FIG. 2) is picked up to indicate that a down floor call has been registered for the sixth floor and that priority floor calls are registered for the first down zone (second and third floors) and for the second down zone (fourth and fifth floors), i.e., that the down zone timing relays K1T and K2T are picked up in a manner which will be clear from the preceding discussion of FIG. 8 to signify that a down floor call has been registered for a floor in each of the corresponding down zones continuously for at least forty seconds and that no elevator car was assigned specifically to serve either of such zones before such times expired. In other words, the first and second down zones are timed-out down zones. It is assumed further that subsequent to the pickup of the relays 6DR, K1T and K2T, the elevator car A becomes available for assignment at the third floor (the zone position relay Z1, FIG. 3, and the available car relay FR, FIG. 4, are picked up) and that the cars B and C are not available for assignment at this time. (For example, the cars B and C are traveling up to answer car calls therefor, their respective locations being immaterial.)

If there were no timed-out down zones, the elevator car A would be assigned to run to the highest floor for which a down floor call is registered (in this case, the sixth floor), in a manner which will be understood from the foregoing discussion. Such is not the case, however, when there is at least one timed-out down zone and such down zone does not include the highest floor for which a down floor call is registered.

Referring to FIG. 8, pickup of the down zone timing relays K1T and K2T is accompanied by closure of their respective make contacts K1T and K2T to energize the down zone priority relay KMT through make contacts H7. Closure of make contacts KHT4 effects pickup of the highest down call relay AHC, and this relay closes its make contacts AHC2 to complete an energizing circuit for the master down call above relay MCA through make contacts ZD3.

Opening of break contacts KMT5 (FIG. 9) prevents the direct connection of the control electrode of the tube TU5 to the bus L2 (negative) under the assumed conditions, while make contacts KMT6 close to connect the cathode electrode of this tube directly to the bus L2 through make contacts H9 in order to insure that the down zone demand relay ZD remains picked up.

Turning now to FIG. 7, pickup of the master down call above relay MCA is accompanied by opening of its break contacts MCA1 and closure of its make contacts MCA2 to effect the selection of a specific zone of assignment for the elevator car A by operation of the down demand midpoint stepping switch SZ. It will be observed, however, that pickup of the down zone priority relay KMT, as aforesaid, results in opening of its break contacts KMT1 to render the brushes of the level SZ*a* of the stepping switch SZ ineffective to control the bias applied to the control electrode of the tube TU1. In addition, make contacts KMT2 close to apply a negative bias to the control electrode from the bus L2 through break contacts SCT1, thus preventing energization of the down demand midpoint relay SC. Finally, make contacts KMT3 close to connect the brushes of the level SZ*c* directly to the bus L2 through break contacts FZT4.

It will be noted that pickup of the down zone timing relays K1T and K2T also is accompanied by opening of their respective break contacts K1T1 and K2T1. Consequently, when the brushes of the level SZ*c* arrive at their fourth position, the following energizing circuit is established.

L1, SCT, K3T1, KMT3, FZT4, L2

In picking up, the firing relay SCT opens its break contacts SCT1 and closes its make contacts SCT2 to effect the firing of the tube TU1 and consequently pickup of the down demand mid-point relay SC, as will be understood from the discussion of FIG. 7. Thus, the brushes of the stepping switch SZ remain in their fourth position. Make contacts SCT3 close to establish a holding circuit for the firing relay through make contacts KMT3 and break contacts FZT4 to maintain energization of the relay SCT until the zone resetting relay FZT picks up to open its contacts FZT4.

Since the brushes of the level SZ*b* are stopped in position No. 4, the zone relay FZ2 is energized and picked up through make contacts SC2 and break contacts F2C4. Pickup of the relay FZ2 indicates that an available elevator car shall serve the second down zone, that is, under the assumed conditions, the highest timed-out down zone.

In picking up, the zone relay FZ2 closes its make contacts FZ2–3 to energize the master zone relay FZM, and this relay closes its make contacts FZM1 (FIG. 5) to effect operation of the assigned zone stepping switch KA to assign the elevator car A to serve the second down zone, as indicated by pickup of the assigned zone relay F2C, in a manner which will be clear from the preceding discussion. Thus, this example illustrates operation of the elevator system wherein a floor for which a priority down floor call is registered is given preference insofar as the assignment of an available car is concerned. In addition, if such a call is registered for a floor in each of a plurality of down zones, the first available elevator car is dispatched to the highest of such zones.

It will be observed that pickup of the assigned zone relay F2C to indicate that the elevator car A is assigned to serve the second down zone is accompanied by opening of break contacts F2C5 (FIG. 8) to deenergize and drop out the down zone timing relay K2T. Such dropout is accompanied by opening of make contacts K2T3 without immediate effect on system operation, inasmuch as the down zone priority relay KMT remains energized through make contacts K1T3 under the assumed conditions. Consequently, if another elevator car becomes available for assignment before the car A answers the priority down floor call for the third floor after answering the priority down floor call for the fourth floor, such other car will be assigned to serve the first down zone in a manner which will be understood from the foregoing discussion. Thereafter, a succeeding available car will be assigned to answer the down floor call which is assumed to be registered for the sixth floor.

By inspection of the drawings and from the above discussion, it will be appreciated that the registration of an artificial demand for service for the lower terminal or first floor, as indicated by pickup of the down zone demand registering relay K0 under conditions heretofore set forth, effects system responses similar to those for the registration of a down zone demand for service as signified by pickup of the down zone demand registering relay K1, K2 or K3.

If more than one elevator car is available for assignment to respond to a down zone demand for service, as indicated by pickup of the multiple available car relay MFC (FIG. 11), it will be observed that opening of break contacts MFC1 (FIG. 4), MFC2, MFC3 (FIG. 5), MFC4 and similar contacts in the respective circuits of the down call assigned relay CFA and the assigned zone stepping switch CKA for the car C (not shown) prevents operation of the down call assigned relays and assigned zone stepping switches. Upon the selection of a specific car to respond to such demand by operation of the circuits of FIG. 12 as hereinbefore described, the associated demand response relay FCR, BFCR or CFCR, as the case may be, closes its make contacts FCR1 (FIG. 4) or BFCR1, FCR2 (FIG. 5) or BFCR2 or similar contacts for the relay CFCR to permit operation of the down call assigned relay and the assigned zone stepping switch for the selected elevator car.

Although additional illustrations might be set forth, the preceding examples are deemed sufficient for a full understanding of system operation in response to the registration of down floor calls.

*Up floor calls*

For purposes of the following discussion, it will be recalled that the intermediate floors of the structure in the illustrated embodiment of the invention are divided into two up zones, a low up zone, comprising the second and third floors, and a high up zone, including the fourth and fifth floors.

Let it now be assumed that up floor calls are registered for the second and fifth floors by operation of the respective push buttons 2U and 5U (FIG. 2) to energize the up floor call registering relays 2UR and 5UR. Assume also that the elevator car C has been selected as the next car to leave the first floor and that it is not available for assignment, that the car B is adjacent the fourth floor and is conditioned for down travel and that, after registration of the aforementioned up floor calls for the second and fifth floors, the car A becomes available for assignment at the first floor (the zone position relay Z0, FIG. 3, and the available car relay FR, FIG. 4, are picked up).

In picking up, the up floor call registering relays 2UR and 5UR (FIG. 2) close their respective make contacts 2UR1 and 5UR1 to establish holding circuits around the push buttons 2U and 5U. Opening of break contacts 2UR2 and 5UR2 (FIG. 3) effects dropout of the up call above relay 78U, and opening of break contacts 5UR3 results in dropout of the up call above relay B78U for the elevator car B. It will be understood that similar contacts in the up call above circuit associated with the elevator car C (not shown) effect deenergization of the relay C78U. Dropout of each of these relays indicates that an up floor call has been registered for a floor which is above the location of the respective associated elevator car, but such dropouts have no immediate effect on system operation.

The up floor call registering relay 2UR also closes its make contacts 2UR5 (FIG. 10) to energize the low up zone call relay KL, and the relay 5UR closes its make contacts 5UR4 to pick up the high up zone call relay KH. Opening of the break contacts KL1 and closure of make contacts KL2 initiates a timing operation of the circuits associated with the low up zone timing relay KLT, while opening of break contacts KH3 and closure of make contacts KH4 initiates a timing operation of the circuits associated with the high up zone timing relay KHT. It will be recalled that each of these relays has a forty-second time delay in pickup. Make contacts KL3 close to energize the low up zone demand relay DUL through break contacts ZD4, AL2, AH3 and KHT3. Additionally, closure of make contacts KL4 partially completes a holding circuit for the low up zone assigned relay AL.

Pickup of the low up zone demand relay DUL is accompanied by closure of its make contacts DUL1 to energize the up zone demand relay DU through make contacts H11. Break contacts DUL2 open to prevent energization of the high up zone demand relay DUH, although make contacts KH5 closed upon pickup of the high up zone call relay KH as aforesaid. Closure of make contacts DUL3 partially completes an energizing circuit for the low up zone assigned relay AL. Opening of break contacts DUL5 (FIG. 11) results in dropout of the low zone demand relay KBL, but such dropout has no effect on system operation under the assumed conditions.

Upon pickup, the up zone demand relay DU closes its make contacts DU1 (FIG. 6) to energize the up call assigned relay FU through make contacts FR11 and break contacts MFC5. Consequently, the relay FU closes its make contacts FU8 to establish a self-holding circuit through break contacts 80–2. (Inasmuch as the elevator car A is assumed to be conditioned for up travel, break contacts W10 are open.) In addition, the relay FU opens its break contacts FU2 (FIG. 4) to deenergize the available car relay FR, which, it will be recalled, has a slight time delay in dropout. Make contacts FU4 close to energize the first auxiliary running relay RA through break contacts 42–2. It also will be recalled that the relay RA is provided with a slight time delay in pickup.

Returning to FIG. 10, the up call assigned relay FU also closes its make contacts FU10 to complete an energizing circuit for the low up zone assigned relay AL through the now-closed make contacts DUL3. Pickup of the relay AL results in closure of its make contacts AL1 to complete a discharge path for the capacitor C9 through the resistor R43. Consequently, the timing operation of the circuits associated with the low up zone timing relay KLT is terminated. Break contacts AL2 open to drop out the low up zone demand relay DUL, while make contacts AL3 close to complete the self-holding circuit for the relay AL through make contacts KL4 in order to maintain energization of the low up zone assigned relay upon the opening of make contacts DUL3. The relay DUL also opens its make contacts DUL1 to deenergize the up zone demand relay DU, and this relay opens its make contacts DU1 (FIG. 6) to prepare the up call assigned relay FU for subsequent deenergization. (The relay FU is maintained picked up through its holding circuit.) Break contacts DUL5 (FIG. 11) close to reenergize the low zone demand relay KBL, but pickup of this relay is without immediate effect on system operation.

Assuming that the time delay in pickup of the first auxiliary running relay RA (FIG. 4) has expired, such relay picks up to close its make contacts RA1, thus energizing the second auxiliary running relay 80 through break contacts 70T1. Closure of make contacts 80–1 (FIG. 1) initiates up travel of the elevator car A from the first floor in a manner which will be clear from the preceding discussion. Opening of break contacts 80–2 (FIG. 6) results in dropout of the up call assigned relay FU, and this relay opens its make contacts FU4 (FIG. 4) to drop out the first auxiliary running relay RA, but such dropout does not affect system operation at this time.

Upon expiration of its time delay in dropout, the available car relay FR closes its break contacts FR1 (FIG. 2) to prepare the floor call stopping relay S for energization. Break contacts FR2 close to permit subsequent cancellation of registered up floor calls. In addition, break contacts FR15 (FIG. 10) close to prepare the low up zone position relay Z1U and the high up zone position relay Z2U for energization therethrough.

As the elevator car A leaves the first floor, its floor selector carriage notches to its second-floor position to effect engagement of the contact segment $a2$ (FIG. 2) by the brush $aa$. Such operation results in completion of the following energizing circuit:

L1, 2UR1, FUH1, $a2$, $aa$, FR1, FA1, W3, LW1, S, SL2

Pickup of the floor call stopping relay S results in closure of make contacts S1 (FIG. 1) to effect a stopping operation of the elevator car A at the second floor in a manner which will be understood from the preceding discussion. As the car stops, the running relay M (FIG. 1) drops out to close its break contacts M6 (FIG. 2), thus completing the following cancelling circuit.

L1, 2UR1, 2URN, $b2$, $bb$, W4, FR2, M6, L2

As a result, the up floor call registering relay 2UR is reset.

In resetting, the up floor call registering relay 2UR opens its make contacts 2UR1 to interrupt the holding circuit around the push button 2U. Closure of break contacts 2UR2 (FIG. 3), 2UR3 and similar contacts for the elevator car C has no immediate effect on operation of the up call above relays 78U, B78U, C78U, inasmuch as under the assumed conditions an up floor call still is registered for the fifth floor (break contacts 5UR2, 5UR3 and similar contacts for the car C are open), and these relays consequently remain dropped out. Thus, make contacts 78U3 (FIG. 4) remain open to prevent pickup of the available car relay FR. (It will be noted that the lower terminal no-start relay 981, FIG. 7, dropped out as the car A left the first floor and the zone position relay Z0 dropped out to open its make contacts Z0–8. As a result, make contacts 981–1, FIG. 4, in the energizing circuit of the relay FR also are open.)

It will be observed that the notching of the car A floor selector carriage to its second-floor position also is accompanied by engagement of the contact segment $j2$ (FIG. 3) by the brush $jj$ to pick up the zone position relay Z1.

Turning now to FIG. 10, it will be noted that dropout of the up floor call registering relay 2UR also is accompanied by opening of its make contacts 2UR5 to deenergize the low up zone call relay KL. In picking up, the zone position relay Z1 closes its make contact Z1–4 to complete the following energizing circuit:

L1, W15, FA12, FR15, Z1–4, Z1U, L2

Pickup of the low up zone position relay Z1U results in opening of its break contacts Z1U1 to maintain denergization of the low up zone call relay KL as long as the floor selector carriage of the elevator car A is in its second or its third-floor position to energize the zone position relay Z1. Consequently, the relay KL cannot be energized under these conditions even though make contacts 3UR5 may be closed to indicate the registration of an up floor call for the third floor. It will be appreciated that this prevents the dispatching of another available elevator car to serve the low up zone in response to such registration.

Dropout of the low up zone call relay KL is accompanied by closure of its break contacts KL1 and opening of its make contacts KL2 to reset the timing circuits associated with the low up zone timing relay KLT. (It will be recalled that make contacts AL1 previously closed to terminate the timing operation of these circuits.) The relay KL also opens its make contacts KL4 to interrupt the holding circuit of the low up zone assigned relay AL, and as a result this relay drops out. Such dropout is accompanied by closure of break contacts AL2. The low up zone demand relay DUL, however, remains deenergized, inasmuch as make contacts KL3 now are open. Consequently, closure of the contacts AL2 effects pickup of the high up zone demand relay DUH through break contacts ZD4, AH3 and DUL2 and make contacts KH5. As a result, make contacts DUH4 close to energize the up zone demand relay DU, but pickup of this relay has no immediate effect on system operation. In addition, break contacts DUH5 (FIG. 11) open to drop out the high zone demand relay KBH without further effect on system operation under the assumed conditions.

Assume next that the passenger who enters the elevator car A at the second floor registers a car call for the third floor by pressing the push button $3c$ (refer to the car call registering circuits shown in FIG. 3). Upon expiration of the non-interference time, break contacts 70T1 (FIG. 4) close to energize the second auxiliary running relay 80. Thus, closure of the doors of the car A initiates up travel of the car to answer the car call for the third floor and the up floor call which is assumed to be registered for the fifth floor in a manner which will be clear from the preceding discussion. Let it be assumed, however, that the elevator car B has reached the first floor and has become available for assignment (the available car relay BFR, FIG. 4, is picked up) before the car A is prepared to leave the third floor after answering the car call therefor. Closure of make contacts BFR11 (FIG. 6) results in pickup of the up call assigned relay BFU through break contacts MFC6 and make contacts DU2. Opening of break contacts BFU2 (FIG. 4) results is deenergization of the available car relay BFR, while make contacts BFU4 close to energize the first auxiliary running relay BRA, which subsequently closes its make contacts BRA1 to pick up the second auxiliary running relay B80. It will be understood that this sequence of operations effects upward travel of the car B from the first floor.

In picking up, the relay BFU also closes its make contacts BFU9 (FIG. 6) to energize the high up zone assigned relay BFUH through make contacts DUH3 and KH2. As a result, the relay BFUH closes its make contacts BFUH3 to establish a self-holding circuit through break contacts BZ2-2. Consequently, the relay BFUH is maintained energized until the elevator car B approaches the high up zone and its floor selector carriage notches to its fourth-floor position to pick up the zone position relay BZ2 (FIG. 3), which then opens its contacts BZ2-2 (FIG. 6). (Since the car B is conditioned for up travel, break contact BW11 of the up preference relay BW are open.)

Upon expiration of its time delay in dropout, the available car relay BRF (FIG. 4) drops out to open its make contacts BFR11 (FIG. 6). Inasmuch as the holding circuit of the up call assigned relay BFU also is open, this relay drops out to open its make contacts BFU9. The high up zone assigned relay BFUH, however, is maintained energized through its self-holding circuit, as noted above.

Pickup of the relay BFUH also is accompanied by opening of its break contacts BFUH1 (FIG. 2) and BRUH2 to prevent the elevator car B from answering registered up floor calls for the second and third floors. Thus, even though such calls may be registered, the car B by-passes such floors. In addition, make contacts BFUH4 (FIG. 10) close to energize the master high up zone assigned relay AH, and this relay closes its make contacts AH2 to establish a discharge path for the capacitor C8 through the resistor R41, thus terminating the timing operation of the circuits associated with the high up zone timing relay KHT. Break contacts AH3 open to deenergize and drop out the high up zone demand relay DUH, and this relay opens its make contacts DUH4 to effect dropout of the up zone demand relay DU, but such dropout has no immediate effect on system operation. Furthermore, break contacts DUH5 (FIG. 11) close to reenergize the high zone demand relay KBH. Pickup of this relay, however, also has no immediate effect on the operation of the system.

As the elevator car B approaches the fourth floor, its floor selector carriage notches to its fourth-floor position to pick up the zone position relay BZ2 (FIG. 3) through the contact segment Bj4 and the brush Bjj. As a result, break contacts BZ2-2 (FIG. 6) open to interrupt the holding circuit of the high up zone assigned relay BFUH, and this relay drops out to open its make contacts BFUH4 (FIG. 10) thus deenergizing the master high up zone assigned relay AH. Dropout of this relay, however, has no immediate effect on system operation. In addition, make contacts BZ2-5 close to complete the following energizing circuit:

L1, BW15, BFA12, BFR15, BZ2-5, Z2U, L2

In picking up, the high up zone position relay Z2U opens its break contacts Z2U1 to drop out the high up zone call relay KH. Such dropout is accompanied by closure of break contacts KH3 and opening of make contacts KH4 to reset the timing circuits associated with the high up zone timing KHT. (It will be recalled that make contacts AH2 previously had closed to terminate the timing operation of these circuits.) Make contacts KH5 open to maintain deenergization of the high up zone demand relay DUH, although break contacts AH3 closed upon dropout of the master high up zone assigned relay AH as previously noted.

Subsequent to this sequence of operations, the elevator car B stops at the fifth floor in response to the registered up floor call therefor, as will be understood from the preceeding discussion. As a result, the up floor call registering relay 5UR (FIG. 2) is reset to close its break contacts 5UR2 (FIG. 3), 5UR3 and similar contacts in the up floor call above circuit for the elevator car C. Consequently, the up call above relays 78U, B78U and C78U are energized, inasmuch as an up floor call no longer is registered in the system. Closure of make contacts 78U3 (FIG. 4), B78U3 and similar contacts for the elevator car C prepares the available car relays FR, BFR and CFR for subsequent energization therethrough.

Let it be assumed, however, that after the elevator car A answers its third-floor car call and the car B is assigned to serve the high up zone, but while the car B is traveling up and before it answers the up floor call for the fifth floor as described above, the doors of the car A close to initiate upward travel of the car A by effecting energization of the up switch U and the running relay M (FIG. 1) through make contacts DS1 of the door relay DS. (It will be noted that make contacts 80–1 are closed, inasmuch as the second auxiliary running relay 80, FIG. 4, is energized through break contacts 981–2, FR4, FA5 and 70T1.) It will be assumed further that the car A rather than the car B answers the up floor call for the fifth floor.

Under these conditions, it is desirable to terminate upward travel of the elevator car B, since it is assumed that an up floor call no longer is registered in the system, that no car call is registered for the car B and that the car B is not assigned to answer a down floor call. Thus, cancellation of the up floor call for the fifth floor by the car A results in the resetting of the up floor call registering relay 5UR (FIG. 2), and this relay closes its break contacts 5UR3 (FIG. 3) to energize the up call above relay B78U. Pickup of the relay B78U is accompanied by closure of its make contacts B78U1 (FIG. 2) to energize the floor call stopping relay BS, provided that break contacts BND1 are closed.

Referring to FIG. 6, it will be recalled that during notching of the floor selector carriage associated with the car B, no contact segment in the Bs row is engaged by the brush Bss, and the notching relay BND consequently is dropped out. If, for example, the car B floor selector carriage notches from its second to its third-floor position, the relay BND drops out when the brush Bss disengages the contact segment Bs2. As a result, break contacts BND1 (FIG. 2) close to complete an energizing circuit for the floor call stopping relay BS, since the car B is running (make contacts BM5 are closed) in the up direction (make contacts BW5 are closed), is not assigned to answer a down floor call (break contacts BFA2 are closed), no car call is registered for the car B (break contacts B38R1 are closed) and no up floor call is registered for a floor above the car B (make contacts B78U1 are closed). In picking up, the relay BS closes its make contacts BS1 (FIG. 1) to effect a stopping operation of the elevator car B at the third floor, as will be understood from the preceding discussion. It will be observed by inspection of FIG. 4 that the available car relay BFR subsequently picks up to indicate that the car B is available for assignment.

Next, assume that the elevator cars B and C both are conditioned for down travel adjacent the second floor and consequently that neither of these cars is available for assignment. Assume, in addition, that after the registration of an up floor call for the third and then for the fourth floor (the up floor call registering relays 3UR and 4UR, FIG. 2, respectively are picked up), the car A becomes available for assignment (the available car relay FR, FIG. 4, picks up) at the fifth floor and that subsequently an up floor call is registered for the fifth floor (the up floor call registering relay 5UR, FIG. 2, picks up). It will be noted that pickup of the available car relay FR is accompanied by opening of its break contacts FR1 to prevent energization therethrough of the floor call stopping relay S and by opening of its break contacts FR2 to prevent cancellation of the up floor call for the fifth floor.

Pickup of the up floor call registering relays 3UR and 4UR results in opening of their respective break contacts 3UR4 and 4UR4 (FIG. 6) to deenergize the up call below relay 78D, and this relay opens its make contacts 78D3 to prevent energization of the low call reversal relay 69L. In addition, the relay 78D opens its make contacts 78D1 (FIG. 2) to prevent subsequent energization of the floor call stopping relay S therethrough and closes its break contacts 78D2 (FIG. 4) to prepare the high call reversal relay 69H for energization.

Referring to FIG. 10, the registration of the up floor call for the third floor results in closure of make contacts 3UR5 to pick up the low up zone call relay KL through break contacts Z1U1, while the registration of the up floor calls for the fourth and fifth floors is accompanied by closure of make contacts 4UR5 and 5UR4, respectively, to energize the high up zone call relay KH through break contacts Z2U1. (It will be noted that pickup of the available car relay FR was accompanied by opening of break contacts FR15 to drop out the high up zone position relay Z2U.) Closure of make contacts KL3 results in pickup of the low up zone demand relay DUL, while closure of make contacts KL4 partially completes a holding circuit for the low up zone assigned relay AL. Make contacts KH5 also close, but such closure cannot effect pickup of the high up zone demand relay DUH, inasmuch as break contacts DUL2 open upon pickup of the low up zone demand relay. The last-named relay also closes its make contacts DUL1 to energize the up zone demand relay DU and closes its make contacts DUL3 to prepare the low up zone assigned relay AL for subsequent energization.

Pickup of the relay DU results in closure of make contacts DU1 (FIG. 6) to energize the up call assigned relay FU, and this relay closes its make contacts FN8 to complete a self-holding circuit through break contacts 80-2 and closes its make contacts FU7 to prepare the low call reversal relay 69L for energization. Closure of make contacts FU1 (FIG. 2) has no immediate effect on system operation, since make contacts 78D1 in series therewith now are open. Break contacts FU2 (FIG. 4) open to deenergize the available car relay FR, which has a slight time delay in dropout. Make contacts FU3 close to pick up the high call reversal relay 69H through break contacts 78D2 and X6, and this relay closes its make contacts 69H3 to complete a self-holding circuit. Make contacts FU4 close to energize the first auxiliary running relay RA through break contacts 42-2 It will be recalled that the relay RA has a slight time delay in pickup.

The up call assigned relay FU also closes its make contacts FU10 (FIG. 10) to energize the low up zone assigned relay AL through make contacts DUL3, and the relay AL closes its make contacts AL3 to complete a self-holding circuit through make contacts KL4. In addition, break contacts AL2 open to drop out the low up zone demand relay DUL, which opens its make contacts DUL1 to drop out the up zone demand relay DU. Break contacts DUL2 close, but such closure cannot effect pickup of the high up zone demand relay DUH, since break contacts AL2 now are open, as aforesaid. Make contacts DUL3 open, but the low up zone assigned relay AL is maintained energized through its holding circuit. In dropping out, the relay DU opens its make contacts DU1 (FIG. 6), but the up call assigned relay FU remains picked up through its self-holding circuit.

Returning to the pickup of the high call reversal relay 69H (FIG. 4), this relay opens its break contacts 69H2 (FIG. 1) to drop out the up preference relay W, inasmuch as make contacts M2 are open. Make contacts W1 open to prevent energization of the up switch U and the running relay M therethrough. Break contacts W2 close to energize the down preference relay X through break contacts U6 and 69L2 and the limit switch 24. Consequently, the elevator car A now is conditioned for down travel. Make contacts W3 (FIG. 2) open to prevent energization of the floor call stopping relay S, while make contacts W4 open to prevent the cancellation of registered up floor calls. Make contacts W7 (FIG. 4) open to prevent energization of the available car relay FR, and break contacts W9 (FIG. 6) close to prepare the low call reversal relay 69L for energization, while break contacts W10 close to mantain the holding circuit of the up call assigned relay FU upon subsequent opening of break contacts 80-2. Finally, make contacts W15 (FIG. 10) open to prevent energization therethrough of the low up zone position relay Z1U and the high up zone position relay Z2U.

In picking up, the down preference relay X (FIG. 1) closes its make contacts X1 to prepare the down switch D and the running relay M for subsequent energization therethrough and opens its break contacts X2 to prevent energization of the up preference relay W. In addition, break contacts X6 (FIG. 4) open to drop out the high call reversal relay 69H, but such dropout has no immediate effect on system operation.

It will be assumed at this stage that the time delays of the available car relay FR and the first auxiliary running relay RA expire. Consequently, make contacts RA1 and break contacts FR4 close to energize the second auxiliary running relay 80. Such energization effects downward travel of the elevator car A from the fifth floor in a manner which will be clear from the preceding discussion. Break contacts FR1 (FIG. 2) close, but such closure cannot effect pickup of the floor call stopping relay S, inasmuch as make contacts W3 now are open. Break contacts FR2 also close without immediately affecting system operation, inasmuch as make contacts W4 in series therewith also are open. Break contacts FR15 (FIG. 10) close to prepare the low up zone position relay Z1U and the high up zone position relay Z2U for subsequent energization.

It will be noted that the elevator car A did not answer the up floor call which is assumed to be registered for the fifth floor, although the car was stopped at the fifth floor at the time of such registration. Inasmuch as no energizing circuit is completed for the floor call stopping relay S (FIG. 2) when the floor selector carriage of the car A notches to its fourth-floor position, the car by-passes the fourth floor, although an up floor call also is assumed to be registered therefor. Thus, an elevator car which is located above the low up zone and which is assigned to answer an up floor call for a floor in such zone by-passes each floor in the high up zone for which an up floor call may be registered.

As the elevator car A continues its downward travel and its floor selector carriage notches to its third-floor position, the brush jj (FIG. 3) disengages the contact segment j4 to drop out the zone position relay Z2 and engages the contact segments j3 to energize the zone position relay Z1. Closure of make contacts Z1-4 (FIG. 10) prepares the low up zone position relay Z1U for subsequent energization.

In addition, the brush rr (FIG. 6) engages the contact segment r3 to energize the upcall below relay 78D through break contacts 2UR4. Pickup of the relay 78D is accompanied by closure of its make contacts 78D3 to energize the low call reversal relay 69L through break contacts W9 and make contacts FU7, and this relay closes its make contacts 69L3 to complete a holding circuit around the contacts FU7 and 78D3. In addition, make contacts 69L1 (FIG. 1) close to energize the holding relay G, the inductor slowdown relay E and the inductor stopping relay F, as a result of which a stopping operation of the elevator car A is effected at the third floor in a manner which will be understood from the preceding discussion. Opening of break contacts 69L2 prepares the down preference relay X for deenergization when make contacts M3 open upon dropout of the running relay M as the result of the opening of break contacts F2.

Pickup of the low call reversal relay 69L also is accompanied by closure of its make contacts 69L4 (FIG. 10) to energize the low up zone position relay Z1U through break contacts FA12 and FR15 and make contacts Z1-4, and this relay picks up to open its break contacts Z1U1, thus deenergizing the low up zone call relay KL. Opening of make contacts KL4 effects dropout of the low up zone assigned relay AL, which closes its break contacts AL2, but energization of the low up zone demand relay DUL is prevented by the opening of make contacts KL3. It will be noted, however, that closure of the contacts AL2 results in pickup of the high up zone demand relay DUH, inasmuch as under the assumed conditions up floor calls are registered for the fourth and fifth floors in the high up zone and make contacts KH5 consequently are closed. If the elevator car B or C is available for assignment at this time, pickup of the relay DUH effects a sequence of operations which results in the assignment of such car to serve the high up zone in a manner which will be clear from the preceding discussion of the assignment of the car B to serve such zone.

Assuming that the down switch D (FIG. 1) and the running relay M now drop out as a result of the opening of break contacts F2 of the inductor stopping relay F, make contacts M3 open to drop out the down preference relay X. Such dropout is accompanied by closure of break contacts X2 to pick up the up preference relay W through break contacts D6 and 69H2. Thus, the elevator car A, which is assigned to answer up floor calls, stops at the third floor, i.e., at the lowest floor for which such a call is registered, and is conditioned for subsequent travel in the up direction.

In picking up, the up preference relay W opens in break contacts W2 to maintain deenergization of the down preference relay X. In addition, make contacts W3 (FIG. 2) close to permit the subsequent energization of the floor call stopping relay S in response to registered up floor calls, while make contacts W4 close to permit the cancellation of such calls in response to the stopping of the car A at the respective corresponding floors. Thus, closure of the contacts W4 effects energization of the cancelling coil 3URN and the resetting of the up floor call registering relay 3UR. In resetting, the relay 3UR closes its break contacts 3UR2 (FIG. 3), 3UR3 and similar contacts in the up floor call above circuit for the elevator car C, but such closures have no immediate effect on operation of the respective up call above relays 78U, B78U and C78U, since it is assumed that up floor calls still are registered for the fourth and fifth floors.

The up preference relay W also closes its make contacts W6 (FIG. 3) to prepare the car call stopping relay T for subsequent energization in response to registered car calls for the elevator car A. Closure of make contacts W7 (FIG. 4) has no immediate effect on operation of the available car relay FR, inasmuch as make contacts 981–1 and 78U3 both are open. Consequently, the relay FR remains deenergized as long as an up floor call is registered for a floor above the floor at which the elevator car A is located. Break contacts W9 (FIG. 6) open to drop out the low call reversal relay 69L, but such dropout has no immediate effect on system operation. Opening of break contacts W10 has no immediate effect on the operation of the up call assigned relay FU, since break contacts 80–2 of the second auxiliary running relay 80 are closed to maintain the self-holding circuit of the relay FU. Consequently, this relay remains picked up until the relay 80 (FIG. 4) is energized upon closure of break contacts 70T1 to indicate that the non-interference time for the car A has expired. Make contacts W15 (FIG. 10) close to maintain energization of the low up zone position relay Z1U when make contacts 69L4 open upon the aforementioned dropout of the low call reversal relay 69L.

It will be understood from the preceding discussion that the elevator car A subsequently answers all car calls which may be registered therefor and the up floor calls which are assumed to be registered for the fourth and fifth floors, unless the car B or C answers either or both of such up floor calls before the car A does so.

It will be appreciated from the preceding example that if there are simultaneous demands for up service for the low and the high up zones, the first elevator car to become available for assignment is assigned to serve the low up zone, regardless of its location at the time of such assignment, i.e., the low up zone receives preferential service under such conditions. If another car becomes available for assignment before the first assigned car responds to the demand for up service for the high up zone (after responding to such demand for the low up zone), such other car will be assigned to serve the high up zone.

In this connection, suppose that the elevator car A becomes available for assignment (as indicated by pickup of the available car relay FR, FIG. 4) at an intermediate floor, that subsequently an up floor call is registered for such floor and that such floor is the lowest floor for which an up floor call is registered. By inspection of FIG. 6 and from the preceding discussion, it will be understood that under these conditions the up call below relay 78D is picked up. Assume that at this stage the car A is assigned to answer up floor calls, as indicated by pickup of the up call assigned relay FU. Consequently, it is necessary to open the doors of the car A in order to permit the entry of the passenger who registered the up floor call for the floor at which the car is located.

Referring to FIG. 2, and assuming, for example, that the car A is located at the third floor, that it is assigned to answer up floor calls and that the up floor call registering relay 3UR is picked up to signify the registration of an up floor call for the third floor, the following energizing circuit is completed:

L1, 3UR1, FUH2, $a3$, $aa$, FU1, 78D1, FA1, W3, LW1, S, L2

Pickup of the floor call stopping relay S is accompanied by closure of its make contacts S2 (FIG. 4) to energize the auxiliary door control relay 42 through make contacts FR6. Pickup of the relay 42 effects the opening of the doors of the elevator car A in a manner which will be clear from the preceding discussion. Subsequently, the doors reclose to initiate upward movement of the car A from the third floor.

Let it now be assumed that the elevator cars B and C are traveling down from the second floor and that the up floor call registering relays 2UR and 3UR (FIG. 2) are picked up to indicate that up floor calls have been registered for the second and third floors, respectively. Consequently, the low up zone call relay KL (FIG. 10) is picked up through make contacts 2UR5 and 3UR5. Assume also that an up floor call is registered for a floor in the high up zone (fourth and fifth floors) to pick up the high up zones call relay KH through make contacts 4UR5 or 5UR4 and that the last-named call is a priority up floor call; i.e., the high up zone timing relay KHT is picked up in a manner which will be clear from the preceding discussion of FIG. 10 to signify that such call has been registered continuously for at least forty seconds and that no elevator car has been assigned specifically to serve the high up zone. In other words, the high up zone is a timed-out up zone. It will be assumed further that subsequent to the pickup of the relays KL, KH and KHT, the elevator car A becomes available for assignment at the third floor (the available car relay FR, FIG. 4, picks up).

In picking up, the high up zone timing relay KHT (FIG. 10) opens its break contacts KHT3 to prevent energization of the low up zone demand relay DUL since, under the assumed conditions, make contacts KLT3 also are open. Consequently, break contacts DUL2 are closed to permit energization of the high up zone demand relay DUH.

Pickup of the relay DUH is accompanied by closure of its make contacts DUH1 (FIG. 6) to complete the following energizing circuit:

L1, DUH1, RE8, r3, rr, 78D, L2

Pickup of the up call below relay 78D prevents the reversal of the direction of travel for which the car A is conditioned. Thus the car remains conditioned for up travel, although an up floor call is registered for a floor below the floor at which the car is located.

The relay DUH also closes its make contacts DUH4 (FIG. 10) to energize the up zone demand relay DU, and this relay closes its make contacts DU1 (FIG. 6) to effect pickup of the up call assigned relay FU. As a result, make contacts FU9 close to energize the high up zone assigned relay FUH, thus indicating that the elevator car A is assigned to serve the high up zone. The relay FUH opens its break contacts FUH2 (FIG. 2) to prevent energization of the floor call stopping relay S for opening the doors of the car A at the third floor. In addition, make contacts FUH4 (FIG. 10) close to energize the master high up zone assigned relay AH, and this relay opens its break contacts AH3 to drop out the high up zone demand relay DUH, which, in turn, opens its make contacts DUH4 to deenergize the up zone demand relay DU. In addition, the relay DUH opens its make contacts DUH1 (FIG. 6), but the up call below relay 78D remains energized through the now-closed make contacts AH1.

From the preceding sequence of operations, it will be observed that the elevator car A has been assigned to serve the high up zone, although up floor calls simultaneously are registered for floors in the low up zone. Thus, up service is provided for the high up zone in preference to the low up zone when a priority up floor call is registered for a floor in the former zone and only a non-priority up floor call is registered for a floor in the latter zone.

Assume, however, that the same conditions exist as above, with the exception that the up floor call for the second floor also is a priority call, i.e., that the low up zone timing relay KLT (FIG. 10) is picked up to signify that such call has been registered continuously for at least forty seconds and that no elevator car has been assigned specifically to serve the low up zone. In other words, both the low and the high up zones are timed-out up zones.

Pickup of the relay KLT is accompanied by closure of its make contacts KLT3 to energize the low up zone demand relay DUL, and this relay opens its break contacts DUL2 to prevent energization of the high up zone demand relay DUH. Consequently, when the elevator car A becomes available for assignment at the third floor, it is assigned to serve the low up zone in a manner which will be clear by inspection of the drawings and from the preceding discussion.

Turning to FIG. 6, it will be noted that since make contacts DUH1 and AH1 and break contacts 2UR4 are open, the up call below relay 78D must be dropped out. Thus, when the up call assigned relay FU picks up, it closes its make contacts FU3 (FIG. 4) to energize the high call reversal relay 69H through break contacts 78D2 and X6. It will be understood from the preceding discussion that such energization effects the reversal of the direction of travel for which the elevator car A is conditioned from up to down. Consequently, the car A proceeds to travel down from the third floor in order to answer the priority up floor call for the second floor.

From this sequence of operations, it follows that up service is provided for the low up zone in preference to the high up zone when a priority up floor call is registered for a floor in the former zone, regardless of whether such a call is registered for a floor in the latter zone.

Referring to FIG. 9, it will be noted that pickup of the low up zone timing relay KLT and/or the high up zone timing relay KHT is accompanied by closure of make contacts KLT1 and/or KHT1, respectively, to apply a negative bias to the control electrode of the tube TU5 from the bus L2, provided that no priority down floor call is registered (break contacts KMT5 are closed) and that more than one elevator car motor-generator set is running (make contacts H8 are closed). The application of such bias prevents the subsequent pickup of the down zone demand relay ZD. As a result, an available elevator car cannot be assigned to provide service for a floor for which a non-priority down floor call is registered subsequent to pickup of the relay KLT and/or the relay KHT until the last-named relays drop out under conditions which will be clear by inspection of FIG. 10 and from the preceding discussion. However, if the down zone priority relay KMT (FIG. 8) is picked up to indicate the registration of a priority down floor call either before or after pickup of the relay KLT and/or the relay KHT, break contacts KMT5 (FIG. 9) open to render make contacts KLT1 and/or KHT1 ineffective to apply a negative bias to the control electrode of the tube TU5. Under these circumstances, therefore, the relay ZD may pick up to effect assignment of an available car to serve a down zone for which a priority down floor call is registered.

It also will be observed that if the relay ZD does pick up to indicate the existence of a down zone demand for service, its break contacts ZD4 (FIG. 10) open to prevent pickup of the low up zone demand relay DUL or the high up zone demand relay DUH. Thus, an available elevator car cannot be assigned to serve a non-timed-out up zone of floors as long as the relay ZD is picked up.

From the preceding discussion, it follows that if there are a plurality of demands for elevator service, up and down zones are given preferential service in the illustrated embodiment of the invention in accordance with the following sequence: timed-out down zones, timed-out up zones, non-timed-out down zones, non-timed-out up zones. Furthermore, within each of these categories there is a preferred sequence of assignment. In general, if more than one down zone requires service, the highest of such zones has priority, whereas if both the low and high up zones require service, the former has priority over the latter.

If more than one elevator car is available for assignment to respond to an up zone demand for service, as indicated by pickup of the multiple available car relay MFC (FIG. 11), it will be observed that opening of break contacts MFC5 (FIG. 6), MFC6 and similar contacts in the circuit of the up call assigned relay CFU for the car C (not shown) prevents energization of the respective up call assigned relays therethrough. Upon selection of a specific car to respond to such demand by operation of the circuits of FIG. 12 as hereinbefore described, the associated demand response relay FCR, BFCR or CFCR, as the case may be, closes its make contacts FCR3 (FIG. 6), BFCR3 or similar contacts for the relay CFCR to permit operation of the up call assigned relay for the selected elevator car.

Referring to FIGS. 10 and 11, if up traffic increases to a point wherein the ratio of up stops to total stops of the elevator cars, as measured by the up stop counting stepping switch KXU and the stop counting stepping switch KX, respectively, is equal to at least the predetermined value necessary to effect pickup of the stop ratio relay UA within the ninety second time interval determined by the ratio timing relay TA, make contacts UA1 and TA1 close to energize the no demand return relay NDR. Pickup of the relay NDR conditions the elevator system for no demand return operation, which has been described in detail hereinabove. Such pickup is accompanied by closure of make contacts NDR6 to complete a self-holding circuit through break contacts KT1. Opening of break contacts NDR7 and closure of make contacts NDR8 initiates a timing operation of the circuits associated with the up demand timing relay KT.

It will be recalled that pickup of the ratio timing relay TA is accompanied by closure of its make contacts TA4 to energize the reset relay RT, which effects the resetting of the stepping switches KXU and KX. As a result, the stop ratio relay UA drops out to open its make contacts UA1 and UA2, and break contacts RT1 open to drop out the relay TA, which opens its make contacts TA1 and TA2. It follows that the relay NDR remains energized to condition the elevator system for no demand return operation until up traffic decreases to a point wherein the ratio of up stops to total stops of the elevator cars during each interval measured by the ratio timing relay TA drops below the predetermined value and remains below such value continuously for a period of 2½ minutes. At the expiration of such period, the capacitor C11 has charged sufficiently to fire the tube TU12 and thus to pick up the up demand timing relay KT. As a result, break contacts KT1 open to interrupt the holding circuit of the relay NDR, which consequently drops out to terminate the no demand return operation of the elevator system. In addition, break contacts NDR7 close to establish a discharge path for the capacitor C11 through the resistor R50, and make contacts NDR8 open to drop out the up demand timing relay KT and to extinguish the discharge in the tube TU12.

If the elevator car A, for example, is assigned to answer down floor calls, as indicated by pickup of the down call assigned relay FA (FIG. 4), break contacts FA1 (FIG. 2) open to prevent the car from stopping, while conditioned for up travel (make contacts W3 of the up preference relay W are closed), at floors for which up floor calls are registered. Conversely, if the car A is assigned to answer up floor calls, as signified by pickup of the up call assigned relay FU (FIG. 6), break contacts FU11 (FIG. 2) open to prevent the car from answering registered down floor calls while conditioned for down travel (make contacts X3 of the down preference relay X are closed). It will be appreciated that the elevator cars B and C operate in a similar manner.

Let it now be assumed that the elevator car C is located at a floor above the first floor and that the car B is positioned at the first floor (the zone position relay BZ0, FIG. 3, is picked up) and has been selected as the next car to be dispatched therefrom (the next car relay BN, FIG. 7, is picked up). It also will be assumed that the thirty second first floor elevator car dispatching interval has not expired (the dispatching interval expired relay UTA, FIG. 9, is dropped out). At this stage, the elevator car A arrives at the first floor (the zone position relay Z0, FIG. 3, picks up). As the car A stops at the first floor, its doors are opened in a manner which will be understood from the preceding discussion.

Assume that before the non-interference time expires to drop out the non-interference relay 7OT (FIG. 1) and thus to effect reclosure of the doors of the car A, a passenger mistakenly enters the car A and registers a car call for a floor above. As a result, the car call above relay 38R (FIG. 4) is energized and picks up. Turning to FIG. 9, it will be observed that when the non-interference time expires to effect reclosure of the doors of the car A, break contacts 7OT4 close to establish the following energizing circuit:

L1, SS7, BSS7, CSS7, Z0–13, N7, 7OT4, 38R6, RE12, UTA, L2

In picking up, the dispatching interval expired relay UTA closes its make contacts UTA4 (FIG. 6) to prepare the start relay BSS for subsequent energization.

Assume that a passenger now enters the elevator car B and registers a car call above to pick up the car call above relay B38R (FIG. 4). Closure of make contact B38R5 (FIG. 6) completes an energizing circuit for the start relay BSS, and this relay closes its make contacts BSS3 to establish a self-holding circuit through make contacts BZ0–5. In addition, break contacts BSS4 (FIG. 7) open to drop out the next car relay BN, and this relay closes its break contacts BN5 to permit the selection by the dispatching mechanism of the elevator car A as the next car to leave the lower terminal or first floor in a manner which will be clear from the preceding discussion. The relay BN also closes its break contacts BN2 (FIG. 4) to effect pickup of the door-control relay B45, inasmuch as it is assumed that break contacts B7OT2 of the car B non-interference relay are closed. Such pickup initiates a closing operation of the doors of the car B.

Pickup of the start relay BSS also is accompanied by opening of its break contacts BSS5 (FIG. 7) to drop out the lower terminal no-start relay B981. This relay closes its break contacts B981–2 (FIG. 4) to energize the second auxiliary running relay B80. As a result, the elevator car B is started from the first floor upon closure of its doors, as will be understood from the preceding discussion. Subsequently, this car stops at the floor for which it is assumed a car call is registered. It will be noted that the car B has been started from the first floor although, under the assumed conditions, the normal thirty second dispatching interval, as determined by the dispatching interval relays UHT and UT (FIG. 9), has not expired.

The start relay BSS also closes its make contacts BSS6 to establish a discharge path for the capacitor C5 through the resistor R35 and opens its break contacts BSS7 to interrupt the charging circuit for the capacitor and to drop out the dispatching interval expired relay UTA, but such dropout has no immediate effect on the operation of the system.

When the next car relay N (FIG. 7) picks up to indicate that the elevator car A has been selected as the next car to leave the first floor, break contacts N2 (FIG. 4) open to deenergize the door-control relay 45. Dropout of the relay 45 effects the opening of the doors of the car A. In addition, make contacts N4 (FIG. 6) close to prepare the start relay SS for energization, while break contacts N7 (FIG. 9) open to prevent energization of the dispatching interval expired relay UTA therethrough.

As the elevator car B leaves the first floor, the zone position relay BZ0 (FIG. 3) drops out to open its make contacts BZ0–5 (FIG. 6), thus deenergizing the start relay BSS. In dropping out, the relay BSS opens its make contacts BSS6 (FIG. 9) to interrupt the discharge path for the capacitor C5 and closes its break contacts BSS7 to initiate a timing operation of the first dispatching interval relay UHT. Consequently, at the termination of the thirty second dispatching interval, the dispatching interval expired relay UTA picks up in a manner which will be clear from the preceding discussion. Closure of make contacts UTA3 (FIG. 6) results in energization of the start relay SS, inasmuch as it is assumed that the elevator car A has been selected as the next car to leave the first floor (make contacts N4 are closed), that the non-interference time for the car A has expired (break contacts 7OT3 are closed), that a car call above is registered for the car A (make contacts 38R5 are closed) and that the car A is located at the lower terminal floor (make contacts Z0–5 are closed). Pickup of the relay SS initiates the starting of the car A from the first floor, and this car subsequently answers the car call which is assumed to be registered therefor, as will be apparent from the foregoing discussion.

It now will be assumed that the business day has come to a close and that, as a result, those who occupy the office building which is assumed to be served by the present elevator system desire down service to an extent such that the elevator car A is loaded to capacity (make contacts LW5, FIG. 10, of the load switch LW are closed) when conditioned for down travel (make contacts X11 of the down preference relay X are closed). Consequently, the down by-pass relay 77D is energized and picked up to indicate the existence of a substantial demand for elevator service in the down direction. Such pickup is accompanied by closure of make contacts 77D1 to energize the instant dispatch relay PD, and this relay picks up to close its make contacts PD6 to establish a self-holding circuit through break contact DT1. The opening of break contacts PD7 has no immediate effect on system operation, since make contacts 77D2 closed to maintain the discharge path for the capacitor C10 upon the aforesaid pickup of the relay 77D. Consequently, the capacitor cannot charge, although make contacts PD8 in its charging circuit now are closed.

Pickup of the instant dispatch relay PD also is accompanied by opening of its break contacts PD3 (FIG. 8) to prevent energization therethrough of the down zone demand registering relay K0, which, when picked up, indicates the existence of an artificial demand for service for the lower terminal or first floor, as has been explained hereinbefore. Make contacts PD4 and PD5 (FIG. 9) close to energize continuously the second dispatching interval relay UT and thus the dispatching interval expired relay UTA by means of make contacts UT1. It will be appreciated that such continuous energization of the relay UTA results in the rapid dispatching of successive elevator cars from the first floor, inasmuch as pickup of this relay is not dependent upon the time delays introduced by the dispatching interval relays UHT and UT. This mode of system operation conveniently may be termed instant dispatch operation.

Next assume that the loading of elevator cars conditioned for down travel decreases to a point such that the down by-pass relay 77D (FIG. 10) drops out. Opening of make contacts 77D1 has no immediate effect on system operation for the reason that the instant dispatch relay PD is maintained energized through its holding circuit. Make contacts 77D2, however, open to interrupt the discharge circuit of the capacitor C10, and the capacitor thus charges through make contact PD8 and the resistor R49.

Assuming that the down by-pass relay 77D remains dropped out for a period of two minutes, the capacitor C10 charges sufficiently to fire the tube TU11 and thus to pick up the down by-pass timing relay DT. Such pickup is accompanied by opening of break contacts DT1 to interrupt the holding circuit of the instant dispatch relay PD, and this relay closes its break contacts PD3 (FIG. 8) to permit energization of the down zone demand registering relay K0 therethrough under conditions which have been explained heretofore. In addition, make contacts PD4 and PD5 (FIG. 9) open to drop out the second dispatching interval relay UT, and this relay, in turn, opens its make contacts UT1 to deenergize the dispatching interval expired relay UTA. Consequently, the rapid dispatching of successive elevator cars from the lower terminal or first floor, i.e., instant dispatch operation, is terminated.

Inasmuch as the instant dispatch relay PD (FIG. 10) now is deenergized and dropped out, its break contacts PD7 close to complete with the resistor R48 a discharge path for the capacitor C10, while its make contacts PD8 open to interrupt the charging circuit for the capacitor and the energizing circuit of the down by-pass timing relay DT. As a result, this relay drops out without immediate effect on the operation of the system.

From the preceding discussion, it will be clear that the termination of instant dispatch operation is subjected to the full delay of two minutes in the illustrated embodiment of the invention as the result of the operation of the down by-pass timing relay DT. Consequently, the elevator system maintains its instant dispatch service despite momentary decreases below capacity loading of elevator cars conditioned for down travel.

It now will be assumed that the elevator car B is located at the first floor (the zone position relay BZ0, FIG. 3, is picked up) and that the available car relay BFR (FIG. 4) is energized and picked up to indicate that the car B is available for assignment. Assume that at this stage traffic has diminished to an extent such that an elevator car or elevator cars continuously have been available for assignment for a period of four minutes. As a result, the motor-generator timing relay MG is energized in a manner which will be clear from the discussion of FIG. 9.

In picking up, the relay MG closes its make contacts MG3 to establish a holding circuit around the tube TU8 and to terminate the discharge between the plate and cathode electrodes thereof. In addition, make contacts MG2 (FIG. 6) close to energize the parking relay BP for the elevator car B. Pickup of this relay is accompanied by closure of its make contact BP3 to establish a holding circuit around the contacts MG2 and BFR10 and by closure of its make contacts BP4 to pick up the motor-generator shutdown relay B139. Make contacts B139–3 close to complete a self-holding circuit for the relay B139 around make contacts BZ0–4 and BP4 and break contact BM11. Assuming that the car B has been selected by the dispatching mechanism of FIG. 7 as the next car to leave the lower terminal floor, break contacts BN3 (FIG. 6) are open, and the aforesaid self-holding circuit is effected through break contacts PD2 and NDR4. Break contacts B139–2 open to drop out the parking relay BP, which opens its make contacts BP4, but the relay B139 is maintained energized through its holding circuit.

The motor-generator shutdown relay B139 also opens its break contacts B139–1 (FIG. 1) to drop out the motor-generator starting relay B50, and this relay effects shutdown of the motor-generator set for the elevator car B by opening its make contacts B50–1, B50–2 and B50–3 to deenergize the motor B17.

Assuming that the elevator car C also is located at the first floor and is available for assignment when the motor-generator timing relay MG (FIG. 9) picks up, it will be understood that its motor-generator set is shut down in a similar manner.

By inspection of FIG. 7, it will be observed that when the motor-generator shutdown relays B139 and C139 pick up to effect shutdown of the respective motor-generator sets for the elevator cars B and C, break contacts B139–4 and C139–4 open to drop out the motor-generator running relay H. (It will be recalled that at least two elevator car motor-generator sets must be running in order for the relay H to be picked up.) Dropout of the relay H, however, has no immediate effect on the operation of the system.

It will be assumed further that when the motor-generator timing relay MG (FIG. 9) picks up, the elevator car A is available for assignment (the available car relay FR, FIG. 4, is picked up) at a floor above the first floor. (It will be noted that make contacts FR13, FIG. 9, and break contacts 139–5 are closed to maintain the motor-generator timing relay MG picked up, although break contacts B139–5 and C139–5 opened when shutdown of the motor-generator sets for the cars B and C was effected.) Consequently, closure of make contacts MG1 (FIG. 6) of the motor-generator timing relay results in pickup of the parking relay P for the car A, and this relay closes its make contacts P3 to establish a holding circuit around the contacts MG1 and FR10. Closure of make contacts P4 prepares the motor-generator shutdown relay 139 for subsequent energization. (Inasmuch as the elevator car A is not located at the first floor, make contacts Z0–4 of the zone position relay Z0 are open at this time.)

In picking up, the parking relay P also closes its make contacts P1 (FIG. 4) to energize the high call reversal relay 69H through break contacts Z0–12 and X6. (It will be recalled that in order for the car A to be available for assignment, it must be conditioned for up travel. Consequently, break contacts X6 of the down preference relay X are closed.) Pickup of the relay 69H is accompanied by closure of its make contacts 69H3 to complete a self-holding circuit around the contacts P1 and Z0–12. In addition, break contacts 69H2 (FIG. 1) open to drop out the up preference relay W, and this relay closes its break contacts W2 to pick up the down preference relay X. The relay X, in turn, opens its break contacts X2 to prevent energization of the relay W and opens its break contacts X6 (FIG. 4) to drop out the high call reversal relay 69H, but such dropout has no immediate effect on system operation.

Dropout of the up preference relay W also results in opening of its make contacts W7 to deenergize the available car relay FR. When this relay drops out at the expiration of its slight time delay, make contacts FR13 (FIG. 9) open to drop out the motor-generator timing relay MG, while break contacts FR14 close to complete a discharge path for the capacitor C7 through the now-closed make contacts B139–6 and C139–6. Opening of make contacts MG1 (FIG. 6), however, has no immediate effect on system operation, inasmuch as the parking relay P is maintained energized through its holding circuit.

It will be observed that pickup of the parking relay P also is accompanied by closure of its make contacts P2 to pick up the first auxiliary running relay RA (FIG. 4) through break contacts Z0–2 and 42–2.

It will be understood that the preceding sequence of operations results in movement of the elevator car A down to the first floor. As the car approaches the first floor, the brush *jj* (FIG. 3) engages the contact segment *j*1 to energize the zone position relay Z0. Upon pickup, this relay opens its break contacts Z0–2 (FIG. 4) to drop out the first auxiliary running relay RA, but such dropout is without immediate effect on the operation of the system. In addition, make contacts Z0–4 (FIG. 6) close to prepare the motor-generator shutdown relay 139 for energization.

As the elevator car A stops at the first floor, its running relay M (FIG. 1) drops out to close its break contacts M11 (FIG. 6), thereby energizing the relay 139. Pickup of the relay 139 effects shutdown of the car A motor-generator set in a manner which will be clear from the preceding discussion of the shutdown of the motor-generator set of the car B. The relay 139 also closes its make contacts 139–3 to complete a self-holding circuit around make contacts Z0–4 and P4 and break contacts M11. Break contacts 139–2 open to deenergize the parking relay P, which drops out to open its make contacts P4. Such opening, however, has no immediate effect on operation, inasmuch as the relay 139 is maintained energized through its holding circuit.

Opening of break contacts 139–4 (FIG. 7) results in interruption of the remaining energization of the motor-generator running relay H, which, it will be recalled, dropped out when the motor-generator sets of the cars B and C were shut down. Break contacts 139–5 (FIG. 9) open to maintain dropout of the motor-generator timing relay MG, while make contacts 139–6 close to maintain the discharge path for the capacitor C7.

By inspection of the drawings and from the preceding discussion, it will be clear that the available car relay FR (FIG. 4) subsequently picks up to indicate that the elevator car A is available for assignment at the first floor. Consequently, all of the elevator cars in the system now are located at the first floor and are available for assignment, the elevator car B having been selected by the dispatching mechanism of FIG. 7 as the next car to leave the first floor (the next car relay BN is picked up).

It will be recalled that these are the conditions which were assumed to exist initially, except for the fact that the elevator car A rather than the car B had been selected as the next car to leave the lower terminal floor. It also will be recalled that the registration of a car call for the "next" car effects the starting of the motor-generator set thereof and the movement of such car to and its stopping at the floor for which such call is registered. In addition, since the motor-generator running relay H (FIG. 7) now is dropped out, break contacts H10 (FIG. 9) are closed to effect the reduction of the first floor elevator car dispatching interval by one-half in the illustrated embodiment of the invention, inasmuch as pickup of the first dispatching interval relay UHT to close its make contacts UHT4 effects immediate pickup through the contacts H10 of the second dispatching interval relay UT, and the latter relay thereupon closes its make contacts UT1 to pick up the dispatching interval expired relay UTA.

For example, assume that the relay UTA is picked up and that a car call is registered for the elevator car B to pick up the car call above relay B38R (FIG. 4). Closure of make contacts B38R5 (FIG. 6) results in pickup of the start relay BSS, and this relay opens its break contacts BSS2 to drop out the motor-generator shutdown relay B139. Consequently, the motor-generator set of the car B is started, and this car subsequently travels to and stops at the floor for which the car call is registered.

A registered up floor call also is effective for starting the "next" elevator car from the lower terminal floor, provided that the reduced dispatching interval has expired. For example, assume that an up floor call is registered for the fifth floor by operation of the pushbutton 5U (FIG. 2) to pick up the up floor call registering relay 5UR. This relay opens its break contacts 5UR3 (FIG. 3) to drop out the up call above relay B78U, which closes its break contacts B78U5 (FIG. 6) to energize the start relay BSS. Once again, the relay BSS opens its break contact BSS2, and as a result the motor-generator shutdown relay B139 drops out to start the car B motor-generator set. Subsequently the car B answers the up floor call which is assumed to be registered for the fifth floor, as will be apparent from the preceding discussion.

If, instead, a down floor call is registered for the fifth floor by operation of the pushbutton 5D (FIG. 2), the down floor call registering relay 5DR picks up to open its break contacts 5DR3 (FIG. 5), thus dropping out the down call above relay BDCA. Closure of break contacts BDCA3 (FIG. 6) again results in pickup of the start relay BSS to effect the starting of the car B motor-generator set by opening of break contacts BSS2 and the consequent deenergization of the motor-generator shutdown relay B139. The car B now leaves the first floor to answer the down floor call which is assumed to be registered for the fifth floor.

It also will be understood from the foregoing description of operation that the elevator car B subsequently is returned automatically to the first floor, and its motor-generator set thereafter is shut down by operation of the motor-generator timing relay MG (FIG. 9).

A second elevator car may be started from the lower terminal floor under any one of a plurality of conditions. Assume, for example, that the car C is away from the first floor, that the motor-generator sets of the cars A and B are shut down and that the car A has been selected by the dispatching mechanism of FIG. 7 as the next car to leave the first floor (the next car relay N is picked up). Since the car C is not located at the first floor, its zone position relay CZ0 (not shown—refer to the circuits for the relays Z0 and BZ0, FIG. 3) is dropped out to close its make contacts CZ0–9 (FIG. 7). As a result, the master lower terminal relay 982 is picked up, and its break contacts 982–1 (FIG. 6) are open to prevent energization of the start relay SS therethrough.

If a car call is registered for the car A (make contacts 38R5 are closed) and if the first floor elevator car dispatching interval (one-half the normal thirty-second interval, or fifteen seconds, under the assumed conditions) has expired (make contacts UTA3 are closed), the start relay SS picks up to initiate the starting of the car A motor-generator set and upward travel of the car.

Assume now that the elevator car C is traveling up, that the motor-generator sets of the cars A and B are shut down and that the car A has been selected as the next car to leave the first floor. Assume further that a down floor call is registered for the second floor by operation of the pushbutton 2D (FIG. 2) to pick up the down floor call registering relay 2DR. Such pickup is accompanied by closure of make contacts 2DR4 (FIG. 8) to energize the down zone demand registering relay K1. Pickup of the relay K1 is accompanied by opening of its break contacts K1–4, but such opening has no immediate effect on system operation, since all of the elevator cars are assumed to be conditioned for up travel and consequently break contacts X10, BX10 and CX10 of their respective down preference relays are closed to pick up the down zone call below relays KB, BKB and CKB.

Turning now to FIG. 9, and referring to the bridge circuit for controlling operation of the down zone demand relay ZD, it will be observed that under the assumed conditions break contacts K1–5 and make contacts H8, H9, KHT1, KLT1 and KMT6 are open, while all other contacts associated with this circuit are closed. Consequently, a negative bias is applied to the control electrode of the tube TU5 to prevent firing of the tube and pickup of the relay ZD. Thus, under these conditions, one down zone demand for service cannot effect the starting of a second elevator car from the first floor.

Assume now that a down floor call is registered for the fourth floor by operation of the pushbutton 4D (FIG. 2) to pick up the down floor call registering relay 4DR. As a result, make contacts 4DR4 (FIG. 8) close to pick up the down zone demand registering relay K2. Such pickup is accompanied by opening of break contacts K2–5 (FIG. 9) to balance the bridge circuit and thus to effect pickup of the down zone demand relay ZD. It will be noted that the relay ZD has picked up in response to the registration of two down zone demands for service.

Opening of break contacts ZD1 (FIG. 7) results in dropout of the master lower terminal relay 982, and this relay closes its break contacts 982–1 (FIG. 6) to pick up the start relay SS. (Inasmuch as the elevator car A has been selected as the next car to leave the first floor, make contacts N4 are closed. Assuming that the dispatching interval has expired, make contacts UTA3 also are closed. It will be noted that break contacts DCA3 are closed, since the down call above relay DCA, FIG. 5, is dropped out as a result of the registration of down floor calls for the second and fourth floors. Finally, it will be recalled from the preceding discussion that break contacts H5 of the motor-generator running relay H also are closed at this time.)

In picking up, the start relay SS closes its make contacts SS3 to establish a self-holding circuit through make contacts Z0–5. (It will be recalled that the zone position relay Z0 remains picked up until the car A leaves the first floor.)

The relay SS also opens its break contacts SS2 to interrupt the holding circuit of the motor-generator shutdown relay 139, and this relay drops out to effect the starting of the motor-generator set of the elevator car A in a manner which will be clear from the preceding discussion. Opening of break contacts SS5 (FIG. 7) results in dropout of the lower terminal no-start relay 981. Break contacts SS1 (FIG. 4) open to deenergize the available car relay FR, which has a slight time delay in dropout. Consequently, closure of break contacts 981–3 upon the aforesaid dropout of the relay 981 effects pickup of the down call assigned relay FA, and this relay closes its make contacts FA6 to complete a self-holding circuit. In addition, make contacts FA7 close to energize the first auxiliary running relay RA. After the expiration of its slight time delay in pickup, the relay RA closes its make contacts RA1 to pick up the second auxiliary running relay 80, which initiates upward travel of the car A.

It will be noted that, in dropping out, the motor-generator shutdown relay 139 (FIG. 6) closed its break contacts 139–4 (FIG. 7) to pick up the motor-generator running relay H. (Inasmuch as the elevator car C also is in operation under the assumed conditions, break contacts C139–4 also are closed.) Such pickup is accompanied by opening of break contacts H1 (FIG. 4), through which the down call assigned relay FA initially was energized, as described in the preceding paragraph. Such opening however, has no immediate effect on system operation, since the relay FA is maintained picked up through its holding contacts FA6. (If the inherent lag in pickup of the relay H is inadequate to insure pickup of the relay FA through the contacts H1, the relay H may be provided by any conventional means with a slight additional time delay in pickup.) Pickup of the relay H also results in closure of its make contacts H9 (FIG. 9) to shunt the resistor R30. Consequently, opening of break contacts FA11 upon the aforesaid pickup of the down call assigned relay for the car A has no effect on operation of the down zone demand relay ZD, and the relay ZD remains energized and picked up.

As the elevator car A approaches the second floor, no circuit is completed for stopping the car, and it thus by-passes such floor. As the car approaches the fourth floor and its floor selector carriage notches to its fourth-floor position, the brush nn (FIG. 5) engages the contact segment n4 to pick up the down call above relay DCA, and this relay closes its make contacts DCA1 (FIG. 4) to energize the high call reversal relay 69H through make contacts FA4 and break contacts X6. From the preceding discussion, it will be clear that such pickup effects the stopping of the car A at the fourth floor and the reversal of the direction of travel for which the car is conditioned from up to down.

It will be observed that pickup of the down call assigned relay FA (FIG. 4) also is accompanied by closure of its make contacts FA10 (FIG. 8) to energize the highest down call relay AHC. Pickup of this relay is accompanied by closure of its make contacts AHC2 to energize the master down call above relay MCA through make contacts ZD3. Opening of break contacts MCA1 (FIG. 7) results in dropout of the no scan relay RNS without immediate effect on system operation, while closure of make contacts MCA2 effects operation of the down demand mid-point stepping switch SZ and, subsequently, of the assigned zone stepping switch BKA (FIG. 5) to dispatch the elevator car B to answer the down call which is assumed to be registered for the second floor in the first down zone, as will be clear from the preceding discussion. (It will be noted that when the down zone assigned relay BSH, FIG. 5, picks up, its make contacts BSH2, FIG. 4, close to pick up the down call assigned relay BFA. As a result, break contacts BFA9, FIG. 6, open to interrupt the holding circuit of the motor-generator shutdown relay B139, thus effecting the starting of the car B motor-generator set. In addition, make contacts BFA7, FIG. 4, close to energize the first auxiliary running relay BRA, which, after its slight time delay in pickup, closes its make contacts BRA1, thus energizing the second auxiliary running relay B80 to initiate upward movement of the elevator car B.)

Let it be assumed that the down preference relay X (FIG. 1) is picked up to indicate that the elevator car A is conditioned for down travel. As a result, break contacts X10 (FIG. 8) are open. If a demand for down service is registered for a zone which is below the zone in which the car A is located, the down zone call below relay KB is dropped out, as explained heretofore. Consequently, make contacts KB2 (FIG. 9) in the bridge circuit which controls operation of the down zone demand relay ZD are open. Assuming that the elevator cars B and C are located at the first floor and that their motor-generating sets are shut down at this time, make contacts H9 of the motor-generator running relay are open. If there is no timed-out down zone, make contacts KMT6 of the down zone priority relay also are open. Thus, at least three down zone demands for service must be registered under these conditions in order for the relay ZD to be picked up to effect the starting of the car B or C from the first floor. (Inasmuch as there are only three down zones in the illustrated embodiment of the invention, it will be apparent by inspection of FIG. 8 and the circuits associated with the down zone demand registering relays K1, K2 and K3 and their respective cancelling coils K1N, K2N and K3N that three down zone demands for service cannot simultaneously be registered when only one elevator car is in operation and is conditioned for down travel. It will be appreciated by inspection of the drawings and from the description thereof, however, that the contrary is true for an elevator system serving a structure whose floors are divided into more than three down zones; i.e., in the latter case, the registration of three down zone demands for service under the assumed conditions will effect pickup of the down zone demand relay ZD to start another elevator car from the first floor.)

Referring to FIG. 6, it will be observed that the motor-generator set of an elevator car which has been selected as the next car to leave the first floor may be started if the elevator system is conditioned for no demand return operation or for instant dispatch operation. For example, if the car A is "next" (break contacts N3 are open), the holding circuit of the motor-generator shutdown relay 139 is interrupted to drop out this relay and thus to start the car A motor-generator set if break contacts PD1 are open to indicate that the elevator system is conditioned for instant dispach operation or break contacts NDR3 are open to indicate that the system is conditioned for no demand return operation. It will be recalled that instant dispatch operation and no demand return operation have been discussed in detail heretofore.

Finally, if the motor-generator sets of the cars B and C, for example, are running (the motor-generator running relay H, FIG. 7, is picked up) and if there is an up zone demand for service (the low up zone demand relay DUL, FIG. 10, or the high up zone demand relay DUH is picked up), the up zone demand relay DU is picked up through make contacts H11 and DUL1 or DUH1. Closure of make contacts DU1 (FIG. 6) results in pickup of the up call assigned relay FU, provided that break contacts MFC5 are closed to indicate that fewer than two elevator cars are available for assignment. Opening of break contacts FU6 results in dropout of the motor-generator shutdown relay 139, and such dropout results in the starting of the car A motor-generator set.

Although the invention has been described with reference to certain specific embodiments thereof, numerous modifications falling within the spirit and the scope of the invention are possible.

We claim as our invention:

1. In an elevator system for a structure having a plurality of vertically-spaced floors, a plurality of elevator cars, means mounting the elevator cars for movement relative to the structure to serve the floors, down floor call registering means operable for registering a call for elevator service in the down direction from each of a plurality of said floors, up floor call registering means operable for registering a call for elevator service in the up direction from each of a plurality of said floors, car call registering means for each of the elevator cars operable for registering a call for each of a plurality of said floors which may be desired by load in the associated elevator car, selecting means for selecting the next one of the elevator cars to leave a predetermined one of said floors in a predetermined one of said directions; separate first control means for each of the cars, each of the first control means having a first condition when all of the following factors are present: the associated car is (1) away from said predetermined floor, and (2) has no registered car call, each of the first control means having another condition when any of said factors therefor is absent; separate second control means for each of the cars, each of the second control means having a first condition when the associated car is at the predetermined floor but is not selected by the selecting means, said second control means for each car having another condition when the associated car is selected by the selecting means; separate third control means for each of the cars, each of the third control means having a first condition when the associated car is selected by the selecting means and having another condition when such car is not so selected; and scanning means for scanning each of the first control means, then each of the second control means and then each of the third control means until it reaches one of the control means in the first condition; and available car assigning means responsive to arrival of said scanning means at the last-named control means to select the first available elevator car in the following sequence:

(a) an elevator car located at a floor other than said predetermined floor, having no registered car call;

(b) an elevator car located at said predetermined floor which is not selected by said selecting means as the next car to leave such floor;

(c) an elevator car selected by said selecting means as the next car to leave said predetermined floor.

2. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direction; separate first control means for each of the cars, each of the first control means having a first condition provided that the following factors are present; the associated car is not selected by the selecting means and has no call registered by its car call means; each of the first control means having another condition when any of said factors therefor is absent; and scanning means for scanning each of the first control means until it reaches one of the control means in the first condition; available car segregating means responsive to arrival of the scanning means at the last-named control means to select as available a first car reached by the scanning means, which is not selected by the selecting means and which has no call registered by the associated car call registering means, first assigning means responsive to registration of a first call by the floor call registering means for a first one of floors for assigning a first available car selected by the scanning means to proceed to said first one of the floors to answer said first call, means cooperating with the first assigning means responsive to registration of a second call by the floor call registering means for a second one of the floors while the first available car is proceeding to the first one of the floors for assigning a second available car selected by the scanning means to proceed to said second one of the floors to answer said second call while ignoring said first call, and means responsive to registration of a third call by the floor call registering means for a third one of the floors while the second car is subject to said assignment for assigning a third car selected by the scanning means to proceed to the third one of the floors to answer the third call while ignoring the second call.

3. In an elevator system for a structure having a plurality of vertically-spaced floors including a lower terminal floor, said floors being divided into zones each including at least one of the floors, a plurality of elevator cars, means mounting each of the elevator cars for movement relative to the structure to serve said floors, call registering means operable for registering a call for elevator service from each of a plurality of said floors located in a plurality of said zones, said registering means including demand means for each of said zones operable for indicating demand for service in a predetermined direction for the associated one of said zones in response to registration of a call by the call registering means for at least one of the floors of the associated zone with no car set for travel in such associated zone, and assigning means operable for each of said elevator cars when stopped and available to any of said zones for which said demand means is operated, said assigning means including scanning means responsive to operation of one of said demand means in a first one of said zones when two of said elevator cars are stopped and available in different ones of said zones for selecting the closer of said two elevator cars to the first one of said zones for assignment, and means responsive to operation of said demand means for each of the zones and the scanning means for assigning the selected car to answer up call registration for the zone corresponding to the operated up demand means.

4. In an elevator system for a structure having a plurality of vertically-spaced floors, a plurality of elevator cars, means mounting each of the elevator cars for movement relative to the structure to serve the floors, floor call registering means operable for registering a call for elevator service in a first direction from each of a plurality of the floors, control means operating the elevator cars to answer calls registered by the floor call registering means, said floors being divided into a plurality of zones each including at least one of the floors, assigning means for assigning each of the cars, when available, to a separate one of said zones selected in dependence on call registration by the floor call registering means at the time of selection to answer call registration by the floor call registering means in a separate one of the zones, and demand means responsive to the difference between the number of zones for which exists a predetermined registration by the floor call registering means and the number of elveator cars providing down elevator service in said first direction for the floors for operating to increase the number of elevator cars assigned to such zones and thereby to increase the amount of elevator service in said first direction provided by the elevator cars for floors for which calls are registered by the floor call registering means.

5. In an elevator system for a structure having a plurality of vertically-spaced floors, a plurality of elevator cars, means mounting each of the elevator cars for movement relative to the structure to serve the floors, up floor call registering means operable for registering a call for elevator service in the up direction from each of a plurality of the floors, down floor call registering means operable for registering a call for elevator service in the down direction from each of a plurality of the floors, control means operating the elevator cars to answer calls registered by the floor call registering means, said floors being divided into a plurality of zones each including at least one of the floors, selecting means for selecting the next one of the elevator cars to leave the bottom one of said floors in the up direction, demand means responsive to the difference between the number of zones for which exists a predetermined registration by the down floor call registering menas and the number of elevator cars providing down elevator service for the floors for operating to increase the amount of down elevator service provided by the elevator cars for floors for which calls are registered by the down floor call registering means, and assigning means effective upon operation of the demand means to assign additional available elevator cars to provide down service for the floors, at least one of such additional cars being assigned to travel to an intermediate one of the floors having a call registered by the down floor call registering means, at least one of said additional cars during said assignment by the assigning means being conditioned to by-pass each floor for which a call is registered by the up floor call registering means in the event that such car is required to travel in the up direction as a result of such assignment in order to serve a floor for which a call is registered by the down floor call registering means, one of said additional available elevator cars being a car set for up travel which is not selected by the selecting means, at least one of the elevator cars assigned by the assigning means being conditioned to proceed up to the highest floor for which a call is registered by the down floor call registering means, to reverse at such highest floor provided that such car is required to travel in the up direction in order to reach such highest floor and to answer a call registered by the down floor call registering means for a floor below the reversed elevator car provided that no other elevator car is assigned by said assigning means to provide down service for the last-named floor.

6. In an elevator system for a structure having a plurality of vertically-spaced floors, a plurality of elevator cars, means mounting each of the elevator cars for movement relative to the structure to serve the floors, floor call registering means operable for registering a call for elevator service in a first direction from each of a plurality of the floors, control means operating the elevator cars to answer calls registered by the floor call registering means, said floors being divided into a plurality of zones each including at least one of the floors, and at least one of the zones including a plurality of said floors, priority means for at least part of the zones responsive to call registration by the floor call registering means for a zone for a predetermined time without answer for operation from a first condition to a second condition, a zone having an operated priority means being designated a "priority zone," each of said elevator cars having an available condition wherein it may be assigned to any of said zones, and assigning means responsive to a predetermined call registration by the floor call registering means for one of the zones with no elevator car position in such zone set for travel in a direction suitable for answering such call registration for assigning an elevator car in available condition to proceed to such zone for the purpose of answering such call registration for such zone without stopping for calls registered by the floor call registering means for any other of said zones, and priority preference means responsive to said priority means in the presence of a priority zone and a non-priority zone having a registered call for service in the same direction by the floor call registering means for controlling said assigned elevator car to answer the call registration for the priority zone prior to answering the call registration for the non-priority zone, said assigning means being effective while said assigned car is assigned to the priority zone for assigning a second elevator car in available condition to answer the call registration for the non-priority zone.

7. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direction, said floors being divided into a plurality of down zones each including at least one of the floors and into a plurality of up zones each including at least one of the floors, down demand means for each of the down zones, each of the down demand means being responsive to a predetermined condition including registration of at least one call by the down floor call registering means for the associated down zone for operation from a first condition to a second condition, the zone associated with an operated one of the down demand means being designated a "down demand zone," down priority means for each of the down zones, each of the down priority means being responsive to a predetermined time of call registration by the down floor call registering means for the associated down zone for operation from a first condition to a second condition, the down zone associated with an operated one of the down priority means being designated a "priority down zone," up demand means for each of the up zones, each of the up demand means being responsive to a predetermined condition including registration of at least one call by the up floor call registering means for the associated up zone for operation from a first condition to a second condition, the zone associated with an operated one of the up demand means being designated an "up demand zone," up priority means for each of the up zones, each of the up priority means being responsive to a predetermined time of call registration by the up floor call registering means for the associated up zone for operation from a first condition to a second condition, the up zone associated with an operated one of the up priority being designated a "priority up zone," and assigning means responsive to operation of each of the demand means for assigning an available one of the elevator cars to answer call registration by the call registering means associated with the respective demand means, said assigning means including scanning means effective if a plurality of the demand means are concurrently in operated condition for scanning sequentially for operated down priority means, up priority means, down demand means and up demand means, said scanning means being effective in response to the first operated one of the scanned means which it encounters for operation from a first to a second condition, and assignment means responsive to transfer of the scanning means to its second condition for assigning an elevator car other than a car selected by the selecting means, if available, to the lowest-numbered zone in the following list having an operated demand means:

(1) priority down zone;
(2) priority up zone;
(3) down demand zone;
(4) up demand zone.

8. In an elevator system for a structure having a plurality of vertically-spaced floors, a plurality of elevator cars, means mounting the elevator cars for movement relative to the structure to serve the floors, car call registering means for each of the elevator cars operable for registering a call for each of a plurality of said floors which may be desired by load in the associated elevator car, selecting means for selecting the next one of the elevator cars to leave the bottom one of said floors in the up direction, interval means for preventing departure of an elevator car selected by the selecting means during a predetermined interval, starting means responsive to registration of a call by the car call registering means for a car selected by the selecting means for starting such selected car provided that said predetermined interval has expired, blocking means responsive to operation of the car call registering means in a non-selected one of the cars located at the bottom one of the floors for blocking said departure-preventing operation of the interval means on the selected car, whereby said starting means is effective following registration of a car call in the selected car for starting the last-named elevator car prior to expiration of said predetermined interval provided that a call is registered by the car call registering means for an additional one of the elevator cars located at the bottom one of said floors.

9. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, said floors being divided into a plurality of down zones each including at least one of the floors and into a plurality of up zones each including at least one of the floors, down demand means for each of the down zones, each of the down demand means being responsive to a predetermined condition including registration of at least one call by the down floor call registering means for the associated down zone for operation from a first condition to a second condition, the zone associated with an operated one of the down demand means being designated a "down demand zone," down priority means for each of the down zones, each of the down priority means being responsive to call registration by the down floor call registering means for the associated zone for a predetermined time without answer for operation from a first condition to a second condition, the down zone associated with an operated one of the down priority means being designated a "priority down zone," up demand means for each of the up zones, each of the up demand means being responsive to a predetermined condition including registration of at least one call by the up floor call registering means for the associated up zone for operation from a first condition to a second condition, the zone associated with an operated one of the up demand means being designated an "up demand zone," up priority means for each of the up zones, each of the up priority means being responsive to call registration by the up floor call registering means for the associated zone for a predetermined time without answer for operation from a first condition to a second condition, the up zone associated with an operated one of the up priority means being designated a "priority up zone," and assigning means responsive to operation of each of the demand means for assigning an available one of the elevator cars to answer call registration by the call registering means associated with the respective demand means, said assigning means including scanning means effective if a plurality of the demand means are concurrently in operated condition for scanning sequentially for operated down priority means, up priority means, down demand means and up demand means, said scanning means being effective in response to the first operated one of the scanned means which it encounters for operation from a first to a second condition, and assignment means responsive to transfer of the scanning means to its second condition for assigning an available elevator car to the lowest-numbered zone in the following list having an operated demand means:

(1) priority down zone;
(2) priority up zone;
(3) down demand zone;
(4) up demand zone;

and assignment-responsive means responsive to assignment of an available car for again operating the scanning and assignmet means to assign another available car to the lowest numbered zone then existing in the above list which has no elevator car assigned thereto.

10. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direction; separate first control means for each of the cars, each of the first control means having a first condition provided that certain predetermined factors including the following factors are present: the associated car is not selected by the selecting means and has no call registered by its car call means; each of the first control means having another condition when any of said factors therefor is absent; and scanning means for scanning each of the first control means until it reaches one of the control means in the first condition; and available car assigning means responsive to arrival of the scanning means at the last-named control means to select as available for answering a call registered by the down floor call registering means the first car reached by the scanning means, which is not selected by the selecting means and which has no call registered by the associated car call registering means, and assigning means responsive to registration of a call by the down floor call registering means for a floor above the bottom one of the floors for assigning said available car to answer such call.

11. In an elevator system for a structure having a plurality of vertically-spaced floors including a lower terminal floor, a plurality of elevator cars, means mounting each of the elevator cars for movement relative to the structure to serve said floors, service demand registering means operable for registering a demand for elevator service for said lower terminal floor, control means responsive to a demand registered by said service demand registering means for moving one of the elevator cars to the lower terminal floor, detecting means having a first condition when any of said cars is at the lower terminal floor, said detecting means having a second condition when all of the cars are spaced from the lower terminal floor, actuating means responsive to said second condition of the detecting means due to absence of all of said elevator cars from the lower terminal floor for operating said service demand registering means, and means responsive to a predetermined setting of one of the cars for down travel for blocking operation of said service demand registering means by said actuating means.

12. In an elevator system for a structure having a plurality of vertically-spaced floors, a plurality of elevator cars, means mounting each of the elevator cars for movement relative to the structure to serve the floors, floor call registering means operable for registering a call for elevator service in a first direction from each of a plurality of the floors, control means operating the elevator cars to answer calls registered by the floor call registering means, said floors being divided into a plurality of zones each including at least one of the floors, priority means responsive to call registration by the floor call registering means in a zone for a predetermined time without answer for operation from a first condition to a second condition, a zone having an operated priority means being designated a "priority zone," demand means responsive to the difference between the number of zones for which exists a predetermined registration by the floor call registering means and the number of elevators cars providing elevator service in the first direction for the floors for operating to increase the amount of elevator service in the first direction provided by the elevator cars for floors for which calls are registered by the floor call registering means, and assigning means effective upon operation of the demand means for assigning an additional elevator car to a priority zone and in the absence of a priority zone to a predetermined zone having predetermined call registration by the floor call registering means.

13. In an elevator system for a structure having a plurality of vertically-spaced floors, a plurality of elevator cars, means mounting each of the elevator cars for movement relative to the structure to serve the floors, floor call registering means operable for registering a call for elevator service in a first direction from each of a plurality of the floors, control means operating the elevator cars to answer calls registered by the floor call registering means, said floors being divided into a plurality of zones each including at least one of the floors, each of said elevator cars under predetermined conditions being available for assignment to any of said zones and assigning means responsive to call registration by said floor call registering means for a plurality of said zones provided that none of the elevator cars is located in such zones for operation from a first condition to a second condition to assign an available one of the elevator cars to a first one of the last-named zones to answer call registration, said assigning means thereafter operating to a third condition for assigning another available one of the elevator cars to a second one of the last-named zones to answer call registration in the last-named zone.

14. In an elevator system for a structure having a plurality of vertically-spaced floors, a plurality of elevator cars, means mounting each of the elevator cars for movement relative to the structure to serve the floors, down floor call registering means operable for registering a call for elevator service in the down direction from each of a plurality of the floors, control means operating the elevator cars to answer calls registered by the floor call registering means, said floors being divided into a plurality of zones each including at least one of the floors, at least one of said zones including a plurality of the floors, demand means responsive to the difference between the number of zones for which exists a predetermined registration by the down floor call registering means and the number of elevator cars providing down elevator service for the floors for operating to increase the amount of down elevator service provided by the elevator cars for floors for which calls are registered by the down floor call registering means, and assigning means effective upon operation of the demand means to assign additional elevator cars to provide down service for the floors, at least one of such additional cars being assigned to travel to an intermediate one of the floors having a call registered by the down floor call registering means.

15. In an elevator system for a structure having a plurality of vertically-spaced floors including a lower terminal floor, said floors being divided into zones each including at least one of the floors, and at least one of the zones including a plurality of the floors, a plurality of elevator cars, means mounting each of the elevator cars for movement relative to the structure to serve said floors, up call registering means operable for registering a call for up elevator service from each of a plurality of said floors, down call registering means operable for registering a call for down elevator service from each of a plurality of said floors located in a plurality of said zones, availability means conditioning each of the elevator cars to be an available car for answering a call registered by the down call registering means under predetermined conditions wherein said available car is stopped, demand means for each of said zones operable for indicating a demand for down service for the associated one of said zones in response to a predetermined condition including registration of a call by the down call registering means for at least one of the floors of the associated zone, and assigning means effective when a demand is indicated by the down demand means for a high one of said zones with a plurality of available elevator cars located at different floors of the structure with no such available elevator car present in said high zone for assigning the highest of such available elevator cars present in a lower one of said zones to answer such demand for down service.

16. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of the elevator cars operable for registering a call for each of a plurality of said floors which may be desired by load in the associated elevator car, said floors being divided into a plurality of down zones each including at least one of the floors and into a plurality of up zones each including at least one of the floors, down demand means for each of the down zones, each of the down demand means being responsive to a predetermined condition including registration of at least one call by the down floor call registering means for the associated down zone for operation from a first condition to a second condition, the zone associated with an operated one of the down demand means being designated a "down demand zone," down priority means for each of the down zones, each of the down priority means being responsive to a predetermined call registration by the down floor call registering means for the associated down zone for operation from a first condition to a second condition, the down zone associated with an operated one of the down priority means being designated a "priority down zone," up demand means for each of the up zones, each of the up demand means being responsive to a predetermined condition including registration of at least one call by the up floor call registering means for the associated up zone for operation from a first condition to a second condition, the zone associated with an operated one of the up demand means being designated an "up demand zone," up priority means for each of the up zones, each of the up priority means being responsive to a predetermined call registration by the up floor call registering means for the associated up zone for operation from a first condition to a second condition, the up zone associated with an operated one of the up priority means being designated a "priority up zone," and assigning means responsive to operation of each of the demand means for assigning an available one of the elevator cars to answer call registration by the call registering means associated with the respective demand means, said assignnig means including scanning means effective if a plurality of the demand means are concurrently in operated condition for scanning sequentially for operated demand means, said scanning means being responsive to the first operated one of the scanned means which it encounters for operation from a first to a second condition, and assignment means responsive to transfer of the scanning means to its second condition for assigning successive available elevator cars respectively to the zones associated with such operated demand means in accordance with a predetermined sequence.

17. In an elevator system for a structure having a plurality of vertically-spaced floors including a lower terminal floor, said floors being divided into zones each including at least one of the floors, and at least one of said zones including a plurality of said floors, a plurality of elevator cars, means mounting each of the elevator cars for movement relative to the structure to serve said floors, call registering means operable for registering a call for elevator service from each of a plurality of said floors located in a plurality of said zones, said registering means including demand means for each of said zones operable for indicating demand for service in a predetermined direction for the associated one of said zones in response to registration of a call by the call registering means for at least one of the floors of the associated zone with no car set in such associated zone for travel in the direction of the demand, selecting means for selecting the next one of the elevator cars to leave the lower terminal floor, starting means for conditioning each of the elevator cars to start from the lower terminal floor under predetermined conditions, scanning means for scanning the elevator cars to select as available a first elevator car under certain conditions wherein such elevator car is not selected by the selecting means, provided that the scanning means also may select as available an elevator car which has a call registered by the call registering means for a floor above the last-named car if such car is located at the lower terminal floor, is not selected by the selecting means and is not conditioned to be started from the lower terminal floor by said starting means, and assigning means responsive to operation of said demand means for each of the zones for assigning said selected available car to answer call registration for the zone corresponding to the operated demand means.

18. In an elevator system for a structure having a plurality of vertically-spaced floors, a plurality of elevator cars, means mounting each of the elevator cars for movement relative to the structure to serve the floors, up floor call registering means operable for registering a call for elevator service in the up direction from each of a plurality of the floors, control means operating the elevator cars to answer calls registered by the up floor call registering means, said floors being divided into a plurality of zones each including at least one of the floors, and at least one of the zones including a plurality of said floors, and assigning means responsive to a predetermined call registration by the up floor call registering means for one of the zones with no elevator car positioned in such zone set for travel in a direction suitable for answering such call registration for assigning an elevator car to proceed to such zone for the purpose of answering such call registration for such zone, and low call reversal means responsive to presence of an assigned elevator car in the upper of two of said zones with up call registration by the up floor call registering means in at least the lower of said two zones when the elevator car is assigned to the lower of said two zones by the assigning means for controlling the assigned elevator car to proceed to the lowest floor in said two zones for which a call is registered by the up floor call registering means, to reverse, and to answer such up floor call registration.

19. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, selecting means for selecting the next one of the elevator cars to leave the bottom one of said floors in the up direciton, interval means for preventing departure during a predetermined interval of each of the elevator cars selected by the selecting means, interval-expired means operable from a first condition to a second condition in response to the expiration of said predetermined interval, by-pass means responsive to a predetermined loading of an elevator car for preventing such elevator car from answering a call registered by the floor call registering means, interval-modifying means responsive to operation of said by-pass means for an elevator car set for down travel for decreasing the value of the predetermined interval and for operating said interval-expired means to its second condition although the predetermined interval has not expired, and scanning means for scanning the elevator cars to select as available a first car reached by the scanning means under predetermined conditions wherein such first car is not selected by the selecting means and which has no call registered by the associated car call registering means, said scanning means being effective, in the absence of said first car, for selecting as available one of the elevator cars which is selected by the selecting means as the next one of the elevator cars to leave the bottom one of the floors provided that no call is registered by the car call registering means for the last-named car and that said interval-expired means has operated to its second condition.

20. In an elevator system for a structure having a plurality of vertically-spaced floors including a lower terminal floor, said floors being divided into zones each including at least one of the floors, and at least one of the zones including a plurality of the floors, a plurality of elevator cars, means mounting each of the elevator cars for movement relative to the structure to serve said floors, up call registering means operable for registering a call for up elevator service from each of a plurality of said floors, down call registering means operable for registering a call for down elevator service from each of a plurality of said floors located in a plurality of said zones, availability means conditioning each of the elevator cars to be an available car for answering a call registered by the call registering means under predetermined conditions wherein said available car is stopped, demand means for each of said zones operable for indicating a demand for service in a first direction for the associated one of said zones in response to a predetermined condition including registration of a call for service in said first direction by the call registering means for at least one of the floors of the associated zone, and assigning means effective when a demand is indicated by the demand means for a high one of said zones with a plurality of available cars located at different floors of the structure for assigning one of the available cars present in said high zone to answer such demand for service, said assigning means being effective in the absence of any such available elevator car in the high zone to assign the highest of such available elevator cars present in a lower one of said zones to answer such demands for service.

21. In an elevator system for a structure having a plurality of vertically-spaced floors including a lower terminal floor, said floors being divided into zones each including at least one of the floors, and at least one of the zones including a plurality of the floors, a plurality of elevator cars, means mounting each of the elevator cars for movement relative to the structure to serve said floors, call registering means operable for registering a call for elevator service in a first direction from each of a plurality of said floors located in a plurality of said zones, availability means conditioning each of the elevator cars to be an available car for answering a call registered by the call registering means under predetermined conditions wherein said available car is stopped, demand means for each of said zones operable for indicating a demand for service in said first direction for the associated one of said zones in response to a predetermined condition including registration of a call by the call registering means for at least one of the floors of the associated zone, and assigning means effective when a demand is indicated by the demand means for a low one of said zones with a plurality of available elevator cars located at different floors of the structure for assigning one of such available cars present in said low one of said zones above a predetermined one of the floors to answer such demand for service, selecting means for selecting the next elevator car to leave the predetermined one of the floors, said assigning means being effective provided that no such available car is present in the low one of said zones above the predetermined one of the floors for assigning an elevator car which is stopped at the last-named floor and which is not selected by the selecting means to answer such demand for down service for the last-named zone.

22. In an elevator system for a structure having a plurality of vertically-spaced floors, a plurality of elevator cars, means mounting each of the elevator cars for movement relative to the structure to serve the floors, up floor call registering means operable for registering a call for elevator service in the up direction from each of a plurality of the floors, control means operating the elevator cars to answer calls registered by the up floor call registering means, said floors being divided into a plurality of zones each including at least one of the floors, and at least one of the zones including a plurality of said floors, said control means including separate down-to-up reversing means for each of said cars, each of said reversing means being operable for stopping and reversing the associated elevator car when traveling down at any of a plurality of floors for which a call is registered by the up floor call registering means, and assigning means responsive to a predetermined call registration by the up floor call registering means for a zone for assigning an available elevator car to such zone to answer such call registration, a zone to which an elevator car is assigned being designated an "assigned zone," said control means comprising means responsive to said assignment, in the presence of a call registered by the up floor call registering means for a zone below a plural-floor assigned zone and with the assigned elevator car positioned above the lowest floor with up call registration by the up floor call registering means in the assigned zone for controlling the assigned elevator car to proceed to such lowest floor in the assigned zone, and means operating the reversing means for stopping and reversing the assigned elevator car at said lowest floor.

23. In an elevator system for a structure having a plurality of vertically-spaced floors, a plurality of elevator cars, means mounting each of the elevator cars for movement relative to the structure to serve the floors, up floor call registering means operable for registering a call for elevator service in the up direction from each of a plurality of floors, control means operating the elevator cars to answer calls registered by the up floor call registering means, said floors being divided into a plurality of zones each including at least one of the floors, and at least one of the zones including a plurality of said floors, and assigning means responsive to a predetermined call registration by the up floor call registering means for one of the zones with no elevator car positioned in such zone set for travel in a direction suitable for answering such call registration for assigning an elevator car to proceed to such zone for the purpose of answering such call registration for such zone, and zone preference means responsive to presence of an assigned elevator car in the lower of two of said zones each having a floor above such assigned elevator car for which a call is registered by the up floor call registering means when the elevator car is assigned to the higher of said two zones by the assigning means for controlling the assigned elevator car to by-pass such floor in the lower of said two zones and to answer up call registration in the upper of said two zones.

24. In an elevator system for a structure having a plurality of vertically-spaced floors including a main floor, a plurality of elevator cars, a separate source of power for each of the elevator cars, each of said sources having an operating condition wherein the source is capable of supplying power to the associated elevator car and a non-operating condition wherein the source is incapable of supplying power to the associated elevator car, means mounting each of the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars, each of the car call registering means being operable for registering a call for any of a plurality of floors which may be desired by load in the associated elevator car, selecting means for selecting an elevator car located at the main floor as the next car to leave the main floor, interval means for establishing an interval of time during which said next car cannot leave the main floor, control means cooperating with the elevator cars, the sources of power when in operating condition, the selecting means, the interval means and the call registering means for causing the elevator cars to answer calls registered by the call registering means, said floors being divided into successive zones each including at least one of said floors, and down demand means for each of said zones operable from a first condition to a second condition in response to a predetermined condition including registration of at least one call by the down floor call registering means for the assocaited zone, each of said down demand means cooperating with the control means to assign an elevator car to answer a call registered by the down floor call registering means for the associated zone under predetermined conditions, said control means including starting means effective with a predetermined part only of said elevator cars away from the main floor with the associated part of the sources of power in operating condition for placing an additional one of the sources in operating condition in response to the presence of a predetermined number of said down demand means in said second condition, said starting means including means effective with said part only of the elevator cars being set for up travel and with calls registered by the call registering means which can be answered by said part only of the elevator cars during up travel thereof for placing said additional one of the sources in operating condition in the presence of a number of said demand means less than said predetermined number in said second condition.

25. In an elevator system for a structure having a plurality of vertically-spaced floors including a main floor, a plurality of elevator cars, a separate source of power for each of the elevator cars, each of said sources having an operating condition wherein the source is capable of supplying power to the associated elevator car and a non-operating condition wherein the source is incapable of supplying power to the associated elevator car, means mounting each of the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars, each of the car call registering means being operable for registering a call for any of a plurality of floors which may be desired by load in the associated elevator car, selecting means for selecting an elevator car located at the main floor as the next car to leave the main floor, interval means for establishing an interval of time during which said next car cannot leave the main floor, control means cooperating with the elevator cars, the sources of power when in operating condition, the selecting means, the interval means and the call registering means for causing the elevator cars to answer calls registered by the call registering means, said floors being divided into successive zones each including at least one of said floors, and down demand means for each of said zones operable from a first condition to a second condition in response to a predetermined condition including registration of at least one call by the down floor call registering means for the associated zone, each of said down demand means cooperating with the control means to assign an elevator car to answer a call registered by the down floor call registering means for the associated zone under predetermined conditions, said control means including starting means effective in response to a predetermined loading of an elevator car for placing an additional one of the sources of power in operating condition provided that the associated elevator car has been selected by the selecting means as the next car to leave the main floor.

26. In an elevator system for a structure having a plurality of vertically-spaced floors including a lower terminal floor, said floors being divided into zones each including at least one of the floor, and at least one of the zones including a plurality of the floors, a plurality of elevator cars, means mounting each of the elevator cars for movement relative to the structure to serve said floors, call registering means operable for registering a call for elevator service in a first direction from each of a plurality of said floors located in a plurality of said zones, availability means conditioning each of the elevator cars to be an available car for answering a call registered by the call registering means under predetermined conditions wherein said available car is stopped, demand means for each of said zones operable for indicating a demand for service in said first direction for the associated one of said zones in response to a predetermined condition including registration of a call by the call registering means for at least one of the floors of the associated zone, and assigning means effective when a demand is indicated by the demand means for a low one of said zones with a plurality of available elevator cars located at different floors of the structure for assigning the one of such available cars present in said low one of said zones above a predetermined one of the floors to answer such demand for service, selecting means for selecting the next elevator car to leave the predetermined one of the floors, said assigning means being effective provided that no such available car is present in the low one of said zones above the predetermined one of the floors for assigning an elevator car which is stopped at the last-named floor and which is not selected by the selecting means to answer such demand for service for the last-named zone, said assigning means being effective if no such available elevator car is present in said low one of the zones and if no non-selected elevator car is present at the predetermined one of the floors for assigning an elevator car selected by the selecting means to answer such demand for service for the last-named zone.

27. In an elevator system for a structure having a plurality of vertically-spaced floors including a lower terminal floor, said floors being divided into zones each including at least one of the floors, and at least one of the zones including a plurality of the floors, a plurality of elevator cars, means mounting each of the elevator cars for movement relative to the structure to serve said floors, up call registering means operable for registering a call for up elevator service from each of a plurality of said floors, down call registering means operable for registering a call for down elevator service from each of a plurality of said floors located in a plurality of said zones, availability means conditioning each of the elevator cars to be an available car for answering a call registered by the down call registering means under predetermined conditions wherein said available car is stopped, demand means for each of said zones operable for indicating a demand for service in a first direction for the associated one of said zones in response to a predetermined condition including registration of a call by the call registering means for said first direction for at least one of the floors of the associated zone, and assigning means effective when a demand is indicated by the demand means for a low one of said zones with a plurality of available elevator cars located at different floors of the structure for assigning the one of such available cars present in said low one of said zones to answer such demand for service, said assigning means being effective under predetermined conditions wherein no such available elevator car is present in the low one of said zones for assigning one of such available elevator cars present in a higher one of said zones to answer such demand for service for the low one of said zones.

28. In an elevator system for a structure having a plurality of vertically-spaced floors including a lower terminal floor, said floors being divided into zones each including at least one of the floors, and at least one of the zones including a plurality of the floors, a plurality of elevator cars, means mounting each of the elevator cars for movement relative to the structure to serve said floors, up call registering means operable for registering a call for up elevator service from each of a plurality of said floors, down call registering means operable for registering a call for down elevator service from each of a plurality of said floors located in a plurality of said zones, availability means conditioning each of the elevator cars to be an available car for answering a call registered by the call registering means for service in a first direction under predetermined conditions wherein said available car is stopped, demand means for each of said zones operable for indicating a demand for service in said first direction for the associated one of said zones in response to a predetermined condition including registration of a call by the call registering means for at least one of the floors of the associated zone, and assigning means effective when a demand is indicated by the demand means for each of a plurality of said zones with a plurality of available elevator cars located at different floors of the structure for assigning the furthest of such available elevator cars in a second direction opposite to the first direction to answer the demand for service in said first direction for the furthest of such zones in the second direction.

29. In an elevator system for a structure having a plurality of vertically-spaced floors, a plurality of elevator cars, means mounting the elevator cars for movement relative to the structure to serve the floors, down floor call registering means operable for registering a call for down elevator service from each of a plurality of said floors, up floor call registering means operable for registering a call for up elevator service from each of a plurality of said floors, car call registering means for each of the elevator cars operable for registering a call for each of a plurality of said floors which may be desired by load in the associated elevator car, said floors being divided into a plurality of down zones each including at least one of the floors and into a plurality of up zones each including at least one of the floors, down demand means for each of the down zones, each of the down demand means being responsive to a predetermined condition including registration of at least one call by the down floor call registering means for the associated down zone for operation from a first condition to a second condition, the zone associated with an operated one of the down demand means being designated a "down demand zone," down priority means for each of the down zones, each of the down priority means being responsive to call registration by the down floor call registering means for the associated zone for a predetermined time without answer for operation from a first condition to a second condition, the down zone associated with an operated one of the down priority means being designated a "priority down zone," up demand means for each of the up zones, each of the up demand means being responsive to a predetermined condition including registration of at least one call by the up floor registering means for the associated up zone for operation from a first condition to a second condition, the zone associated with an operated one of the up demand means being designated an "up demand zone," up priority means for each of the up zones, each of the up priority means being responsive to call registration by the up floor call registering means for the associated zone for a predetermined time without answer for operation from a first condition to a second condition, the up zone associated with an operated one of the up priority means being designated a "priority up zone," and assigning means responsive to operation of each of the demand means for assigning an available one of the elevator cars to answer call registration by the call registering means associated with the respective demand means, said assigning means including scanning means effective if a plurality of the demand means are concurrently in operated condition for scanning sequentially for operated down priority means, up priority means, down demand means and up demand means, said scanning means being effective in response to the first operated one of the scanned means which it encounters for operation from a first to a second condition, and assignment means responsive to transfer of the scanning means to its second condition for assigning an available elevator car to the lowest-numbered zone in the following list having an operated demand means:

(1) highest priority down zone;
(2) lowest priority up zone;
(3) highest down demand zone;
(4) lowest up demand zone.

30. In an elevator system for a structure having a plurality of vertically-spaced floors including a lower terminal floor, a plurality of elevator cars, means mounting each of the elevator cars for movement relative to the structure to serve said floors, service demand registering means operable for registering a demand for elevator service for said lower terminal floor, control means responsive to a demand registered by said service demand registering means for moving one of the elevator cars to the lower terminal floor, first means responsive to the presence of at least a predetermined load in one of the elevator cars located at said lower terminal floor and set for up travel for operating said service demand registering means and for maintaining said service demand registering means in its operated condition for at least a predetermined time following departure of the last-named car from said lower terminal floor, and second means responsive to the presence of a predetermined plurality of the elevator cars at said lower terminal floor for preventing operation of said service demand registering means by said first means.

References Cited by the Examiner

UNITED STATES PATENTS

| | | | |
|---|---|---|---|
| 2,619,592 | 11/1952 | Paulson et al. | 187—29 X |
| 2,695,077 | 11/1954 | Suozzo | 187—29 |
| 2,717,056 | 9/1955 | Santini et al. | 187—29 |
| 2,740,495 | 4/1956 | Santini et al. | 187—29 |
| 2,748,894 | 6/1956 | Suozzo | 187—29 |
| 2,795,298 | 6/1957 | Suozzo et al. | 187—29 |
| 2,836,262 | 5/1958 | Hockstein et al. | 187—29 |
| 2,840,189 | 6/1958 | Santini et al. | 187—29 |
| 2,880,821 | 4/1959 | Beck et al. | 187—29 |
| 2,924,298 | 2/1960 | Macredis | 187—29 |
| 2,926,756 | 3/1960 | Hornung | 187—29 |
| 2,936,858 | 5/1960 | Hornung et al. | 187—29 |
| 2,944,634 | 7/1960 | Magee | 187—29 |
| 2,960,187 | 11/1960 | Bruns et al. | 187—29 |
| 3,078,962 | 2/1963 | Magee | 187—29 |

ORIS L. RADER, *Primary Examiner.*

MILTON O. HIRSHFIELD, *Examiner.*